US012546465B2

(12) United States Patent
Danesh et al.

(10) Patent No.: US 12,546,465 B2
(45) **Date of Patent: *Feb. 10, 2026**

(54) LIGHTING MODULE WITH KEYED HEAT SINK COUPLED TO THERMALLY CONDUCTIVE TRIM

(71) Applicant: DMF, Inc., Carson, CA (US)

(72) Inventors: Michael D. Danesh, Carson, CA (US); Benjamin Pin-Chun Chen, Lomita, CA (US); William Wai-Loong Young, La Habra Heights, CA (US); Amir Lotfi, Redondo Beach, CA (US)

(73) Assignee: DMF, Inc., Carson, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,489

(22) Filed: Mar. 14, 2022

(65) Prior Publication Data

US 2023/0040032 A1 Feb. 9, 2023

Related U.S. Application Data

(63) Continuation of application No. 17/318,193, filed on May 12, 2021, now Pat. No. 11,274,821, which is a (Continued)

(51) Int. Cl.

*F21V 17/16* (2006.01)
*F21V 5/04* (2006.01)

(Continued)

(52) U.S. Cl.

CPC ................ *F21V 29/70* (2015.01); *F21V 5/04* (2013.01); *F21V 17/16* (2013.01); *F21V 23/003* (2013.01); *F21V 29/10* (2015.01)

(58) Field of Classification Search

CPC ...... F21V 15/01; F21V 29/503; F21V 29/508; F21V 23/009; F21V 17/164; F21V 23/007; F21V 23/006

See application file for complete search history.

(56) References Cited

U.S. PATENT DOCUMENTS

| | | | |
|---|---|---|---|
| 1,133,535 | A | 3/1915 | Cain et al. |
| 1,454,722 | A | 5/1923 | Boutin |

(Continued)

FOREIGN PATENT DOCUMENTS

| | | | |
|---|---|---|---|
| CA | 2243934 | C | 6/2002 |
| CA | 2502637 | A1 | 9/2005 |

(Continued)

OTHER PUBLICATIONS

2006 International Building Code, Section 712 Penetrations, Jan. 2006, 4 pages.

(Continued)

*Primary Examiner* — Ismael Negron
(74) *Attorney, Agent, or Firm* — Smith Baluch LLP

(57) ABSTRACT

A lighting module includes a heat sink having a sidewall and a partition that defines a first cavity and a second cavity; a driver enclosure disposed in the first cavity and electrically insulated from the heat sink; a driver disposed in the driver enclosure to provide electrical power; a light source disposed in the second cavity and receiving the electrical power; an optical element positioned over the light source; and a retaining ring/optic cover closing the second cavity. A trim is mechanically and electrically coupled to the heat sink of the lighting module and connected to an electrical ground via the heat sink. The lighting module fits into a space having a width less than 2.4 inches. The heat sink includes at least one curved keyed feature reducing the volume of the heat sink and providing sufficient clearance for the heat sink to fit within an enclosed space.

20 Claims, 147 Drawing Sheets

Related U.S. Application Data continuation of application No. PCT/US2020/050767, filed on Sep. 14, 2020.

(60) Provisional application No. 63/045,250, filed on Jun. 29, 2020, provisional application No. 63/016,215, filed on Apr. 27, 2020, provisional application No. 62/899,348, filed on Sep. 12, 2019.

(51) Int. Cl.
*F21V 23/00* (2015.01)
*F21V 29/10* (2015.01)
*F21V 29/70* (2015.01)

(56) References Cited

U.S. PATENT DOCUMENTS 1,471,340 A 10/1923 Knight
1,856,356 A 5/1932 Owen
2,038,784 A 4/1936 Ghadiali
2,179,161 A 11/1939 Rambusch
2,197,737 A 4/1940 Appleton
2,352,913 A 7/1944 Morrill
2,528,989 A 11/1950 Ammells
2,597,595 A 5/1952 Ordas
2,642,246 A 6/1953 Larry
2,670,919 A 3/1954 Vincent
2,697,535 A 12/1954 Olson
2,758,810 A 8/1956 Good
D180,844 S 8/1957 Poliakoff
2,802,933 A 8/1957 Broadwin
2,998,512 A 8/1961 Duchene et al.
3,023,920 A 3/1962 Cook et al.
3,057,993 A 10/1962 Gellert
3,104,087 A 9/1963 Joseph et al.
3,214,126 A 10/1965 Roos
3,422,261 A 1/1969 McGinty
3,460,299 A 8/1969 Wilson
3,650,046 A 3/1972 Skinner
3,675,807 A 7/1972 Lund et al.
3,700,885 A 10/1972 Bobrick
3,711,053 A 1/1973 Drake
D227,989 S 7/1973 Geisel
3,773,968 A 11/1973 Copp
3,812,342 A 5/1974 Mcnamara
3,836,766 A 9/1974 Auerbach
3,874,035 A 4/1975 Schuplin
3,913,773 A 10/1975 Copp et al.
D245,905 S 9/1977 Taylor
4,088,827 A 5/1978 Kohaut
4,154,218 A 5/1979 Hulet
4,154,219 A 5/1979 Gupta et al.
4,176,758 A 12/1979 Glick
4,280,169 A 7/1981 Allen
4,399,497 A 8/1983 Druffel
4,450,512 A 5/1984 Kristofek
4,460,948 A 7/1984 Malola
4,520,435 A 5/1985 Baldwin
4,539,629 A 9/1985 Poppenheimer
4,601,145 A 7/1986 Wilcox
4,667,840 A 5/1987 Lindsey
4,723,747 A 2/1988 Karp et al.
4,729,080 A 3/1988 Fremont et al.
4,754,377 A 6/1988 Wenman
4,770,311 A 9/1988 Wang
4,880,128 A 11/1989 Jorgensen
4,910,651 A 3/1990 Montanez
4,919,292 A 4/1990 Hsu
4,929,187 A 5/1990 Hudson et al.
4,930,054 A 5/1990 Krebs
5,044,582 A 9/1991 Walters
D326,537 S 5/1992 Gattari
5,216,203 A 6/1993 Gower
5,222,800 A 6/1993 Chan et al.
5,239,132 A 8/1993 Bartow
5,250,269 A 10/1993 Langer et al.
5,266,050 A 11/1993 O'Neil et al.
5,291,381 A 3/1994 Price
5,303,894 A 4/1994 Deschamps et al.
5,382,752 A 1/1995 Reyhan et al.
5,420,376 A 5/1995 Rajecki et al.
5,444,606 A 8/1995 Barnes et al.
5,465,199 A 11/1995 Bray et al.
5,505,419 A 4/1996 Gabrius
5,544,870 A 8/1996 Kelly et al.
5,560,101 A 10/1996 Sandell
5,562,343 A 10/1996 Chan et al.
5,571,993 A 11/1996 Jones et al.
5,580,158 A 12/1996 Aubrey et al.
5,588,737 A 12/1996 Kusmer
5,603,424 A 2/1997 Bordwell et al.
5,609,408 A 3/1997 Targetti
5,613,338 A 3/1997 Esposito
D381,111 S 7/1997 Lecluze
5,662,413 A 9/1997 Akiyama et al.
D386,277 S 11/1997 Lecluze
5,690,423 A 11/1997 Hentz et al.
D387,466 S 12/1997 Lecluze
5,738,436 A 4/1998 Cummings et al.
5,778,625 A 7/1998 Druffel et al.
5,836,678 A 11/1998 Wright et al.
5,942,726 A 8/1999 Reiker
5,944,412 A 8/1999 Janos et al.
5,957,573 A 9/1999 Wedekind et al.
5,975,323 A 11/1999 Turan
6,030,102 A 2/2000 Gromotka
6,082,878 A 7/2000 Doubek et al.
6,095,669 A 8/2000 Cho
6,098,945 A 8/2000 Korcz
6,105,334 A 8/2000 Monson et al.
6,161,910 A 12/2000 Reisenauer et al.
6,170,685 B1 1/2001 Currier
6,170,965 B1 1/2001 Kotovsky
6,174,076 B1 1/2001 Petrakis et al.
6,176,599 B1 1/2001 Farzen
6,267,491 B1 7/2001 Parrigin
6,332,597 B1 12/2001 Korcz et al.
6,350,043 B1 2/2002 Gloisten
6,350,046 B1 2/2002 Lau
6,364,511 B1 4/2002 Cohen
6,375,338 B1 4/2002 Cummings et al.
6,402,112 B1 6/2002 Thomas et al.
6,423,899 B1 7/2002 Reiker
D461,455 S 8/2002 Forbes
6,461,016 B1 10/2002 Jamison et al.
6,474,846 B1 11/2002 Kelmelis et al.
6,491,413 B1 12/2002 Benesohn
D468,697 S 1/2003 Straub, Jr.
D470,970 S 2/2003 Huang
6,515,313 B1 2/2003 Ibbetson et al.
6,521,833 B1 2/2003 DeFreitas
D471,657 S 3/2003 Huang
6,583,573 B2 6/2003 Bierman
6,585,389 B2 7/2003 Bonazzi
6,600,175 B1 7/2003 Baretz et al.
D478,872 S 8/2003 Heggem
6,632,006 B1 10/2003 Rippel et al.
6,657,236 B1 12/2003 Thibeault et al.
6,666,419 B1 12/2003 Vrame
D487,600 S 3/2004 Fickas
D488,583 S 4/2004 Benghozi
6,719,438 B2 4/2004 Sevack et al.
6,758,578 B1 7/2004 Chou
6,777,615 B1 8/2004 Gretz
6,779,908 B1 8/2004 Ng
6,827,229 B2 12/2004 Dinh et al.
6,838,618 B2 1/2005 Newbold et al.
6,906,352 B2 6/2005 Edmond et al.
D509,314 S 9/2005 Rashidi
6,948,829 B2 9/2005 Verdes et al.
6,958,497 B2 10/2005 Emerson et al.
6,964,501 B2 11/2005 Ryan
6,967,284 B1 11/2005 Gretz
D516,235 S 2/2006 Rashidi

(56) References Cited

U.S. PATENT DOCUMENTS

| | | | |
|---|---|---|---|
| 7,025,476 | B2 | 4/2006 | Leadford |
| 7,025,477 | B2 | 4/2006 | Blessing |
| 7,064,269 | B2 | 6/2006 | Smith |
| D528,673 | S | 9/2006 | Maxik et al. |
| 7,102,172 | B2 | 9/2006 | Lynch |
| D531,740 | S | 11/2006 | Maxik |
| D532,532 | S | 11/2006 | Maxik |
| 7,148,420 | B1 | 12/2006 | Johnson et al. |
| 7,148,632 | B2 | 12/2006 | Berman et al. |
| 7,152,985 | B2 | 12/2006 | Benitez et al. |
| 7,154,040 | B1 | 12/2006 | Tompkins |
| 7,170,015 | B1 | 1/2007 | Roesch et al. |
| D536,349 | S | 2/2007 | Humber et al. |
| D537,039 | S | 2/2007 | Pincek |
| 7,181,378 | B2 | 2/2007 | Benitez et al. |
| D539,229 | S | 3/2007 | Murphey |
| 7,186,008 | B2 | 3/2007 | Patti |
| 7,190,126 | B1 | 3/2007 | Paton |
| 7,211,833 | B2 | 5/2007 | Slater, Jr. et al. |
| 7,213,940 | B1 | 5/2007 | Van De Ven et al. |
| 7,234,674 | B2 | 6/2007 | Rippel et al. |
| D547,889 | S | 7/2007 | Huang |
| D553,267 | S | 10/2007 | Yuen |
| D555,106 | S | 11/2007 | Pape et al. |
| D556,144 | S | 11/2007 | Dinh |
| 7,297,870 | B1 | 11/2007 | Sartini |
| 7,312,474 | B2 | 12/2007 | Emerson et al. |
| 7,320,536 | B2 | 1/2008 | Petrakis et al. |
| D561,372 | S | 2/2008 | Yan |
| D561,373 | S | 2/2008 | Yan |
| 7,335,920 | B2 | 2/2008 | Denbaars et al. |
| D563,896 | S | 3/2008 | Greenslate |
| 7,347,580 | B2 | 3/2008 | Blackman et al. |
| D570,012 | S | 5/2008 | Huang |
| 7,374,308 | B2 | 5/2008 | Sevack et al. |
| D570,504 | S | 6/2008 | Maxik et al. |
| D570,505 | S | 6/2008 | Maxik et al. |
| 7,399,104 | B2 | 7/2008 | Rappaport |
| 7,413,156 | B1 | 8/2008 | Cho |
| 7,429,025 | B1 | 9/2008 | Gretz |
| D578,677 | S | 10/2008 | Huang |
| 7,431,482 | B1 | 10/2008 | Morgan et al. |
| 7,432,440 | B2 | 10/2008 | Hull et al. |
| 7,442,883 | B2 | 10/2008 | Jolly et al. |
| 7,446,345 | B2 | 11/2008 | Emerson et al. |
| 7,470,048 | B2 | 12/2008 | Wu |
| 7,473,005 | B2 | 1/2009 | O'Brien |
| 7,488,097 | B2 | 2/2009 | Reisenauer et al. |
| 7,494,258 | B2 | 2/2009 | McNaught |
| 7,503,145 | B2 | 3/2009 | Newbold et al. |
| 7,524,089 | B2 | 4/2009 | Park |
| D591,894 | S | 5/2009 | Flank |
| 7,534,989 | B2 | 5/2009 | Suehara et al. |
| D596,154 | S | 7/2009 | Rivkin |
| 7,566,154 | B2 | 7/2009 | Gloisten et al. |
| D599,040 | S | 8/2009 | Alexander et al. |
| D600,836 | S | 9/2009 | Hanley et al. |
| 7,588,359 | B2 | 9/2009 | Coushaine et al. |
| 7,592,583 | B2 | 9/2009 | Page et al. |
| D606,696 | S | 12/2009 | Chen et al. |
| 7,625,105 | B1 | 12/2009 | Johnson |
| 7,628,513 | B2 | 12/2009 | Chiu |
| 7,651,238 | B2 | 1/2010 | O'Brien |
| 7,654,705 | B2 | 2/2010 | Czech et al. |
| D611,650 | S | 3/2010 | Broekhoff |
| 7,670,021 | B2 | 3/2010 | Chou |
| 7,673,841 | B2 | 3/2010 | Wronski |
| 7,677,766 | B2 | 3/2010 | Boyer |
| 7,692,182 | B2 | 4/2010 | Bergmann et al. |
| 7,699,283 | B2 | 4/2010 | Vrame |
| 7,704,763 | B2 | 4/2010 | Fujii et al. |
| D616,118 | S | 5/2010 | Thomas et al. |
| 7,712,922 | B2 | 5/2010 | Hacker et al. |
| 7,722,208 | B1 | 5/2010 | Dupre et al. |
| 7,722,227 | B2 | 5/2010 | Zhang et al. |
| 7,735,795 | B2 | 6/2010 | Wronski |
| 7,735,798 | B2 | 6/2010 | Kojima |
| 7,748,887 | B2 | 7/2010 | Zampini, II et al. |
| 7,766,518 | B2 | 8/2010 | Piepgras et al. |
| 7,769,192 | B2 | 8/2010 | Takagi et al. |
| 7,771,082 | B2 | 8/2010 | Peng |
| 7,771,094 | B2 | 8/2010 | Goode |
| D624,691 | S | 9/2010 | Zhang et al. |
| D624,692 | S | 9/2010 | Mackin et al. |
| D625,847 | S | 10/2010 | Maglica |
| D625,876 | S | 10/2010 | Chen et al. |
| D627,507 | S | 11/2010 | Lai et al. |
| D627,727 | S | 11/2010 | Alexander et al. |
| 7,828,465 | B2 | 11/2010 | Roberge et al. |
| D629,366 | S | 12/2010 | Ericson et al. |
| 7,845,393 | B2 | 12/2010 | Kao et al. |
| 7,857,275 | B2 | 12/2010 | de la Borbolla |
| 7,871,184 | B2 | 1/2011 | Peng |
| 7,874,539 | B2 | 1/2011 | Wright et al. |
| 7,874,703 | B2 | 1/2011 | Shastry et al. |
| 7,874,709 | B1 | 1/2011 | Beadle |
| D633,224 | S | 2/2011 | Lee |
| 7,909,487 | B1 | 3/2011 | Venetucci et al. |
| D636,117 | S | 4/2011 | Kim et al. |
| D636,118 | S | 4/2011 | Kim et al. |
| D636,903 | S | 4/2011 | Torenbeek |
| D637,339 | S | 5/2011 | Hasan et al. |
| D637,340 | S | 5/2011 | Hasan et al. |
| 7,950,832 | B2 | 5/2011 | Tanaka et al. |
| D639,499 | S | 6/2011 | Choi et al. |
| D640,819 | S | 6/2011 | Pan |
| 7,956,546 | B2 | 6/2011 | Hasnain |
| 7,959,332 | B2 | 6/2011 | Tickner et al. |
| 7,967,480 | B2 | 6/2011 | Pickard et al. |
| D642,317 | S | 7/2011 | Rashidi |
| 7,972,035 | B2 | 7/2011 | Boyer |
| 7,972,043 | B2 | 7/2011 | Schutte |
| D642,536 | S | 8/2011 | Robinson |
| D643,970 | S | 8/2011 | Kim et al. |
| 8,002,425 | B2 | 8/2011 | Russo et al. |
| D646,011 | S | 9/2011 | Rashidi |
| 8,013,243 | B2 | 9/2011 | Korcz et al. |
| 8,038,113 | B2 | 10/2011 | Fryzek et al. |
| D648,476 | S | 11/2011 | Choi et al. |
| D648,477 | S | 11/2011 | Kim et al. |
| D650,115 | S | 12/2011 | Kim et al. |
| 8,070,328 | B1 | 12/2011 | Knoble et al. |
| 8,096,670 | B2 | 1/2012 | Trott |
| D654,205 | S | 2/2012 | Rashidi |
| D656,262 | S | 3/2012 | Yoshinobu et al. |
| D656,263 | S | 3/2012 | Ogawa et al. |
| 8,142,057 | B2 | 3/2012 | Roos et al. |
| 8,152,334 | B2 | 4/2012 | Krogman |
| D658,788 | S | 5/2012 | Dudik et al. |
| D658,802 | S | 5/2012 | Chen |
| D659,862 | S | 5/2012 | Tsai |
| D659,879 | S | 5/2012 | Rashidi |
| D660,814 | S | 5/2012 | Wilson |
| 8,182,116 | B2 | 5/2012 | Zhang et al. |
| 8,201,968 | B2 | 6/2012 | Maxik et al. |
| D663,058 | S | 7/2012 | Pan |
| D663,466 | S | 7/2012 | Rashidi |
| D664,274 | S | 7/2012 | de Visser et al. |
| D664,705 | S | 7/2012 | Kong et al. |
| 8,215,805 | B2 | 7/2012 | Cogliano et al. |
| 8,220,970 | B1 | 7/2012 | Khazi et al. |
| 8,226,270 | B2 | 7/2012 | Yamamoto et al. |
| 8,235,549 | B2 | 8/2012 | Gingrich, III et al. |
| 8,238,050 | B2 | 8/2012 | Minano et al. |
| 8,240,630 | B2 | 8/2012 | Wronski |
| D667,155 | S | 9/2012 | Rashidi |
| 8,262,255 | B1 | 9/2012 | Rashidi |
| D668,372 | S | 10/2012 | Renshaw et al. |
| D668,809 | S | 10/2012 | Rashidi |
| D669,198 | S | 10/2012 | Qui |
| D669,199 | S | 10/2012 | Chuang |
| D669,620 | S | 10/2012 | Rashidi |
| 8,277,090 | B2 | 10/2012 | Fryzek et al. |
| D671,668 | S | 11/2012 | Rowlette, Jr. et al. |

(56) References Cited

U.S. PATENT DOCUMENTS 8,308,322 B2 11/2012 Santiago et al.
D672,899 S 12/2012 Ven et al.
D673,869 S 1/2013 Yu
D676,263 S 2/2013 Birke
D676,814 S 2/2013 Paul
8,376,593 B2 2/2013 Bazydola et al.
D677,417 S 3/2013 Rashidi
D677,634 S 3/2013 Korcz et al.
D679,044 S 3/2013 Jeswani et al.
D679,047 S 3/2013 Tickner et al.
8,403,289 B1 3/2013 Rinderer
8,403,533 B1 3/2013 Paulsel
8,403,541 B1 3/2013 Rashidi
8,405,947 B1 3/2013 Green et al.
D681,259 S 4/2013 Kong
8,408,759 B1 4/2013 Rashidi
D682,459 S 5/2013 Gordin et al.
D683,063 S 5/2013 Lopez et al.
D683,890 S 6/2013 Lopez et al.
D684,269 S 6/2013 Wang et al.
D684,287 S 6/2013 Rashidi
D684,719 S 6/2013 Rashidi
D685,118 S 6/2013 Rashidi
D685,120 S 6/2013 Rashidi
8,454,204 B1 6/2013 Chang et al.
D685,507 S 7/2013 Sun
D687,586 S 8/2013 Rashidi
D687,587 S 8/2013 Rashidi
D687,588 S 8/2013 Rashidi
D687,980 S 8/2013 Gravely et al.
D688,405 S 8/2013 Kim et al.
8,506,127 B2 8/2013 Russello et al.
8,506,134 B2 8/2013 Wilson et al.
D690,049 S 9/2013 Rashidi
D690,864 S 10/2013 Rashidi
D690,865 S 10/2013 Rashidi
D690,866 S 10/2013 Rashidi
D691,314 S 10/2013 Rashidi
D691,315 S 10/2013 Samson
D691,763 S 10/2013 Hand et al.
8,550,669 B2 10/2013 Macwan et al.
D693,043 S 11/2013 Schmalfuss et al.
D693,517 S 11/2013 Davis
D694,456 S 11/2013 Rowlette, Jr. et al.
8,573,816 B2 11/2013 Negley et al.
D695,441 S 12/2013 Lui et al.
D695,941 S 12/2013 Rashidi
D696,446 S 12/2013 Huh
D696,447 S 12/2013 Huh
D696,448 S 12/2013 Huh
8,602,601 B2 12/2013 Khazi et al.
D698,067 S 1/2014 Rashidi
D698,068 S 1/2014 Rashidi
8,622,361 B2 1/2014 Wronski
8,632,040 B2 1/2014 Mass et al.
D698,985 S 2/2014 Lopez et al.
D699,384 S 2/2014 Rashidi
D699,687 S 2/2014 Baldwin et al.
D700,387 S 2/2014 Snell
8,641,243 B1 2/2014 Rashidi
8,651,705 B2 2/2014 Wilcox
8,659,034 B2 2/2014 Baretz et al.
D700,991 S 3/2014 Johnson et al.
D701,175 S 3/2014 Baldwin et al.
D701,466 S 3/2014 Clifford et al.
8,672,518 B2 3/2014 Boomgaarden et al.
D702,867 S 4/2014 Kim et al.
D703,843 S 4/2014 Cheng
8,684,569 B2 4/2014 Pickard et al.
8,696,158 B2 4/2014 Santiago et al.
D705,472 S 5/2014 Huh
D705,481 S 5/2014 Zhang et al.
8,727,582 B2 5/2014 Brown et al.
D708,381 S 7/2014 Rashidi
8,777,449 B2 7/2014 Ven et al.
D710,529 S 8/2014 Lopez et al.
8,801,217 B2 8/2014 Oehle et al.
8,820,985 B1 9/2014 Tam et al.
8,833,013 B2 9/2014 Harman
8,845,144 B1 9/2014 Davies et al.
D714,989 S 10/2014 Rowlette, Jr. et al.
8,870,426 B2 10/2014 Biebl et al.
8,888,332 B2 11/2014 Martis et al.
8,890,414 B2 11/2014 Rowlette, Jr. et al.
D721,845 S 1/2015 Lui et al.
8,926,133 B2 1/2015 Booth
8,939,418 B2 1/2015 Green et al.
D722,296 S 2/2015 Taylor
D722,977 S 2/2015 Hagarty
D722,978 S 2/2015 Hagarty
8,950,898 B2 2/2015 Catalano
D723,781 S 3/2015 Miner
D723,783 S 3/2015 Miner
D725,359 S 3/2015 Miner
8,967,575 B1 3/2015 Gretz
D726,363 S 4/2015 Danesh
D726,949 S 4/2015 Redfern
D728,129 S 4/2015 Kreuzbichler
9,004,435 B2 4/2015 Wronski
9,039,254 B2 5/2015 Danesh
D731,689 S 6/2015 Bernard et al.
9,062,866 B1 6/2015 Christ et al.
9,065,264 B2 6/2015 Cooper et al.
9,068,719 B2 6/2015 Van De Ven et al.
9,068,722 B2 6/2015 Wronski et al.
D734,525 S 7/2015 Gordin et al.
D735,012 S 7/2015 Cowie
D735,142 S 7/2015 Hagarty
9,078,299 B2 7/2015 Ashdown
9,109,760 B2 8/2015 Shum et al.
9,109,783 B1 8/2015 Davis et al.
D739,355 S 9/2015 D'Aubeterre
D739,590 S 9/2015 Redfern
9,140,441 B2 9/2015 Goelz et al.
D741,538 S 10/2015 Ghasabi
9,151,457 B2 10/2015 Pickard et al.
9,151,477 B2 10/2015 Pickard et al.
D742,325 S 11/2015 Leung
D743,079 S 11/2015 Adair
D744,723 S 12/2015 Yoo
9,217,560 B2 12/2015 Harbers et al.
9,222,661 B2 12/2015 Kim et al.
9,239,131 B1 1/2016 Wronski et al.
D750,317 S 2/2016 Lui et al.
9,285,103 B2 3/2016 Van De Ven et al.
9,291,319 B2 3/2016 Kathawate et al.
9,301,362 B2 3/2016 Dohn et al.
D754,078 S 4/2016 Baldwin et al.
D754,079 S 4/2016 Baldwin et al.
D754,605 S 4/2016 McMillan
9,303,812 B2 4/2016 Green et al.
9,310,038 B2 4/2016 Athalye
9,310,052 B1 4/2016 Shum
9,322,543 B2 4/2016 Hussell et al.
D756,025 S 5/2016 Wronski et al.
9,347,655 B2 5/2016 Boomgaarden et al.
9,366,418 B2 6/2016 Gifford
9,371,966 B2 6/2016 Rowlette, Jr. et al.
D762,181 S 7/2016 Lin
9,395,051 B2 7/2016 Hussel et al.
D762,906 S 8/2016 Jeswani et al.
D764,079 S 8/2016 Wu
9,404,639 B2 8/2016 Bailey et al.
9,417,506 B1 8/2016 Tirosh
9,423,110 B1 8/2016 Newton et al.
D766,185 S 9/2016 Hagarty
9,447,917 B1 9/2016 Wronski et al.
9,447,953 B2 9/2016 Lawlor
D768,325 S 10/2016 Xu
D768,326 S 10/2016 Guzzini
D769,501 S 10/2016 Jeswani et al.
D770,065 S 10/2016 Tittle
9,476,552 B2 10/2016 Myers et al.
9,488,324 B2 11/2016 Shum et al.

(56) References Cited

U.S. PATENT DOCUMENTS

| | | | | |
|---|---|---|---|---|
| D774,676 | S | 12/2016 | Ng | |
| D776,324 | S | 1/2017 | Gierl et al. | |
| D777,967 | S | 1/2017 | Redfern | |
| 9,534,751 | B2 | 1/2017 | Maglica et al. | |
| D778,241 | S | 2/2017 | Holbrook et al. | |
| D778,484 | S | 2/2017 | Guzzini | |
| D779,100 | S | 2/2017 | Redfern | |
| 9,581,302 | B2 | 2/2017 | Danesh | |
| 9,599,315 | B1 | 3/2017 | Harpenau et al. | |
| 9,605,842 | B1 | 3/2017 | Davis | |
| 9,605,910 | B2 | 3/2017 | Swedberg et al. | |
| D785,228 | S | 4/2017 | Guzzini | |
| D786,472 | S | 5/2017 | Redfern | |
| D786,473 | S | 5/2017 | Dean | |
| D786,474 | S | 5/2017 | Fujisawa | |
| D788,330 | S | 5/2017 | Johnson et al. | |
| D790,102 | S | 6/2017 | Guzzini | |
| 9,673,597 | B2 | 6/2017 | Lee | |
| 9,689,541 | B2 | 6/2017 | Wronski | |
| D791,709 | S | 7/2017 | Holton | |
| D791,711 | S | 7/2017 | Holton | |
| D791,712 | S | 7/2017 | Holton | |
| 9,702,516 | B1 | 7/2017 | Vasquez et al. | |
| D795,820 | S | 8/2017 | Wengreen | |
| 9,732,947 | B1 | 8/2017 | Christ et al. | |
| 9,739,464 | B2 | 8/2017 | Wronski | |
| D799,105 | S | 10/2017 | Eder et al. | |
| D800,957 | S | 10/2017 | Eder et al. | |
| 9,791,111 | B1 | 10/2017 | Huang et al. | |
| 9,797,562 | B2 | 10/2017 | Dabiet et al. | |
| 9,803,839 | B2 | 10/2017 | Visser et al. | |
| D805,660 | S | 12/2017 | Creasman et al. | |
| 9,854,642 | B2 | 12/2017 | Kashani | |
| D809,176 | S | 1/2018 | Partington | |
| 9,860,961 | B2 | 1/2018 | Chemel et al. | |
| 9,863,619 | B2 | 1/2018 | Mak | |
| D809,465 | S | 2/2018 | Keirstead | |
| 9,903,569 | B2 | 2/2018 | O'Brien et al. | |
| 9,945,548 | B2 | 4/2018 | Williams et al. | |
| 9,964,266 | B2 | 5/2018 | Danesh | |
| D820,494 | S | 6/2018 | Cohen | |
| D821,615 | S | 6/2018 | Trice | |
| D821,627 | S | 6/2018 | Ko | |
| 9,995,439 | B1 | 6/2018 | Shum et al. | |
| 9,995,441 | B2 | 6/2018 | Power et al. | |
| D822,505 | S | 7/2018 | Gibson et al. | |
| D824,494 | S | 7/2018 | Martins et al. | |
| D825,829 | S | 8/2018 | Guo | |
| 10,041,638 | B2 | 8/2018 | Vasquez et al. | |
| 10,054,274 | B2 | 8/2018 | Athalye et al. | |
| D827,903 | S | 9/2018 | Wu | |
| 10,072,805 | B2 | 9/2018 | Bailey | |
| D832,218 | S | 10/2018 | Wronski et al. | |
| D833,977 | S | 11/2018 | Danesh et al. | |
| 10,125,959 | B2 | 11/2018 | Cohen | |
| 10,139,059 | B2 | 11/2018 | Danesh | |
| D836,976 | S | 1/2019 | Reese et al. | |
| 10,244,607 | B1 | 3/2019 | Kashani | |
| D847,414 | S | 4/2019 | Danesh et al. | |
| D847,415 | S | 4/2019 | Danesh et al. | |
| 10,247,390 | B1 | 4/2019 | Kopitzke et al. | |
| D848,375 | S | 5/2019 | Danesh et al. | |
| 10,281,131 | B2 | 5/2019 | Cohen | |
| 10,295,163 | B1 | 5/2019 | Cohen | |
| D850,695 | S | 6/2019 | Dabiet et al. | |
| D851,046 | S | 6/2019 | Peng et al. | |
| 10,408,395 | B2 | 9/2019 | Danesh | |
| 10,408,396 | B2 | 9/2019 | Wronski et al. | |
| 10,408,436 | B2 | 9/2019 | Wronski et al. | |
| D863,661 | S | 10/2019 | Tian et al. | |
| D864,877 | S | 10/2019 | Danesh | |
| D867,653 | S | 11/2019 | Gorman | |
| 10,488,000 | B2 | 11/2019 | Danesh et al. | |
| 10,551,044 | B2 | 2/2020 | Peng et al. | |
| 10,563,850 | B2 | 2/2020 | Danesh | |
| D877,957 | S | 3/2020 | Kopitzke, IV | |
| 10,591,120 | B2 | 3/2020 | Bailey et al. | |
| 10,609,785 | B1 | 3/2020 | Fardadi et al. | |
| D880,733 | S | 4/2020 | Lo et al. | |
| D883,562 | S | 5/2020 | Hu | |
| D885,648 | S | 5/2020 | Zeng | |
| D885,649 | S | 5/2020 | McLaughlin, III et al. | |
| 10,663,127 | B2 | 5/2020 | Danesh et al. | |
| 10,663,153 | B2 | 5/2020 | Nikooyan et al. | |
| D888,313 | S | 6/2020 | Xie et al. | |
| 10,683,994 | B2 | 6/2020 | Wronski et al. | |
| 10,684,003 | B2 | 6/2020 | Wronski et al. | |
| D890,410 | S | 7/2020 | Stanford et al. | |
| 10,704,745 | B2 | 7/2020 | Sherry et al. | |
| D892,069 | S | 8/2020 | Cohen | |
| 10,753,558 | B2 | 8/2020 | Danesh | |
| 10,808,917 | B2 | 10/2020 | Harris et al. | |
| 10,816,148 | B2 | 10/2020 | Danesh | |
| D901,398 | S | 11/2020 | Danesh et al. | |
| D901,745 | S | 11/2020 | Yang | |
| D902,871 | S | 11/2020 | Danesh et al. | |
| D903,605 | S | 12/2020 | Danesh et al. | |
| D905,327 | S | 12/2020 | Williams et al. | |
| D907,284 | S | 1/2021 | Danesh et al. | |
| D910,223 | S | 2/2021 | Cohen | |
| D917,401 | S | 4/2021 | Mohamed | |
| 10,975,570 | B2 | 4/2021 | Shen | |
| 10,982,829 | B2 | 4/2021 | Danesh | |
| 11,015,785 | B1 | 5/2021 | Schubert | |
| D922,331 | S | 6/2021 | Cohen | |
| 11,022,259 | B2 | 6/2021 | Bailey et al. | |
| 11,028,982 | B2 | 6/2021 | Danesh | |
| 11,047,538 | B2 | 6/2021 | Danesh et al. | |
| D924,467 | S | 7/2021 | Danesh et al. | |
| D925,109 | S | 7/2021 | Danesh et al. | |
| 11,060,705 | B1 | 7/2021 | Danesh et al. | |
| 11,067,231 | B2 | 7/2021 | Lotfi et al. | |
| 11,085,597 | B2 | 8/2021 | Danesh | |
| 11,118,768 | B2 | 9/2021 | Danesh | |
| D939,134 | S | 12/2021 | Danesh et al. | |
| 11,231,154 | B2 | 1/2022 | Kopitzke et al. | |
| D944,212 | S | 2/2022 | Peng et al. | |
| 11,242,983 | B2 | 2/2022 | Danesh | |
| 11,255,497 | B2 | 2/2022 | Danesh | |
| 11,274,821 | B2 * | 3/2022 | Danesh .................. | F21V 17/16 |
| 11,306,903 | B2 | 4/2022 | Young | |
| 11,391,442 | B2 | 7/2022 | Danesh | |
| 11,435,064 | B1 | 9/2022 | Danesh | |
| 11,435,066 | B2 | 9/2022 | Danesh | |
| 11,448,384 | B2 | 9/2022 | Nikooyan et al. | |
| D966,877 | S | 10/2022 | Kopitzke et al. | |
| D970,081 | S | 11/2022 | Kopitzke et al. | |
| 11,800,617 | B2 | 10/2023 | Kumar et al. | |
| 12,169,053 | B2 | 12/2024 | Lotfi et al. | |
| 12,203,631 | B2 | 1/2025 | Kopitzke et al. | |
| 12,209,736 | B2 | 1/2025 | Yong et al. | |
| 12,222,084 | B2 | 2/2025 | Cohen | |
| 12,228,268 | B2 | 2/2025 | Cohen | |
| 12,297,986 | B2 | 5/2025 | Vinh et al. | |
| 2002/0172047 | A1 | 11/2002 | Ashley | |
| 2003/0006353 | A1 | 1/2003 | Dinh et al. | |
| 2003/0016532 | A1 | 1/2003 | Reed | |
| 2003/0021104 | A1 | 1/2003 | Tsao | |
| 2003/0092323 | A1 | 5/2003 | Chou | |
| 2003/0161153 | A1 | 8/2003 | Patti | |
| 2004/0001337 | A1 | 1/2004 | Defouw et al. | |
| 2004/0120141 | A1 | 6/2004 | Beadle | |
| 2004/0156199 | A1 | 8/2004 | Rivas et al. | |
| 2005/0078474 | A1 | 4/2005 | Whitfield | |
| 2005/0225966 | A1 | 10/2005 | Hartmann et al. | |
| 2005/0227536 | A1 | 10/2005 | Gamache et al. | |
| 2005/0231962 | A1 | 10/2005 | Koba et al. | |
| 2005/0237746 | A1 | 10/2005 | Yiu | |
| 2006/0005988 | A1 | 1/2006 | Jorgensen | |
| 2006/0108137 | A1 | 5/2006 | Smith | |
| 2006/0158873 | A1 | 7/2006 | Newbold et al. | |
| 2006/0198126 | A1 | 9/2006 | Jones | |
| 2006/0215408 | A1 | 9/2006 | Lee | |
| 2006/0221620 | A1 | 10/2006 | Thomas | |

(56) References Cited

U.S. PATENT DOCUMENTS

2006/0237601 A1 10/2006 Rinderer
2006/0243877 A1 11/2006 Rippel
2006/0250788 A1 11/2006 Hodge et al.
2006/0262536 A1 11/2006 Nevers
2006/0262545 A1 11/2006 Piepgras et al.
2007/0012847 A1 1/2007 Tai
2007/0035951 A1 2/2007 Tseng
2007/0121328 A1 5/2007 Mondloch et al.
2007/0131827 A1 6/2007 Nevers et al.
2007/0185675 A1 8/2007 Papamichael et al.
2007/0200039 A1 8/2007 Petak
2007/0206374 A1 9/2007 Petrakis et al.
2008/0002414 A1 1/2008 Miletich et al.
2008/0019138 A1 1/2008 Otte et al.
2008/0112168 A1 5/2008 Pickard et al.
2008/0112170 A1 5/2008 Trott
2008/0112171 A1 5/2008 Patti et al.
2008/0130308 A1 6/2008 Behr et al.
2008/0137347 A1 6/2008 Trott et al.
2008/0165545 A1 7/2008 O'Brien
2008/0170404 A1 7/2008 Steer et al.
2008/0224008 A1 9/2008 Dal Ponte et al.
2008/0232116 A1 9/2008 Kim
2008/0247181 A1 10/2008 Dixon
2008/0285271 A1 11/2008 Roberge et al.
2009/0003009 A1 1/2009 Tessnow et al.
2009/0034261 A1 2/2009 Grove
2009/0080189 A1 3/2009 Wegner
2009/0086484 A1 4/2009 Johnson
2009/0097262 A1 4/2009 Zhang et al.
2009/0135613 A1 5/2009 Peng
2009/0141500 A1 6/2009 Peng
2009/0141506 A1 6/2009 Lan et al.
2009/0141508 A1 6/2009 Peng
2009/0147517 A1 6/2009 Li
2009/0161356 A1 6/2009 Negley et al.
2009/0237924 A1 9/2009 Ladewig
2009/0280695 A1 11/2009 Sekela et al.
2009/0283292 A1 11/2009 Lehr
2009/0290343 A1 11/2009 Brown et al.
2009/0310371 A1 12/2009 Goode
2010/0002320 A1 1/2010 Minano et al.
2010/0014282 A1 1/2010 Danesh
2010/0033095 A1 2/2010 Sadwick
2010/0061108 A1 3/2010 Zhang et al.
2010/0067226 A1 3/2010 Higuchi et al.
2010/0110690 A1 5/2010 Hsu et al.
2010/0110698 A1 5/2010 Harwood et al.
2010/0110699 A1 5/2010 Chou
2010/0148673 A1 6/2010 Stewart et al.
2010/0149822 A1 6/2010 Cogliano et al.
2010/0165643 A1 7/2010 Russo et al.
2010/0244709 A1 9/2010 Steiner et al.
2010/0246172 A1 9/2010 Liu
2010/0259919 A1 10/2010 Khazi et al.
2010/0270903 A1 10/2010 Jao et al.
2010/0277905 A1 11/2010 Janik et al.
2010/0284185 A1 11/2010 Ngai
2010/0302778 A1 12/2010 Dabiet et al.
2010/0328956 A1 12/2010 Zhang
2011/0043040 A1 2/2011 Porter et al.
2011/0063831 A1 3/2011 Cook
2011/0068687 A1 3/2011 Takahasi et al.
2011/0069499 A1 3/2011 Trott et al.
2011/0080750 A1 4/2011 Jones et al.
2011/0116276 A1 5/2011 Okamura et al.
2011/0121756 A1 5/2011 Thomas et al.
2011/0134634 A1 6/2011 Gingrich, III et al.
2011/0134651 A1 6/2011 Berman
2011/0140633 A1 6/2011 Archenhold
2011/0170294 A1 7/2011 Mier-Langner et al.
2011/0194299 A1 8/2011 Crooks et al.
2011/0216534 A1 9/2011 Tickner et al.
2011/0226919 A1 9/2011 Fryzek et al.
2011/0255292 A1 10/2011 Shen
2011/0267828 A1 11/2011 Bazydola et al.
2011/0285314 A1 11/2011 Carney et al.
2012/0020104 A1 1/2012 Biebl et al.
2012/0074852 A1 3/2012 Delnoij
2012/0106176 A1 5/2012 Lopez et al.
2012/0113642 A1 5/2012 Catalano
2012/0140442 A1 6/2012 Woo et al.
2012/0140465 A1 6/2012 Rowlette, Jr. et al.
2012/0162994 A1 6/2012 Wasniewski et al.
2012/0182744 A1 7/2012 Santiago et al.
2012/0188762 A1 7/2012 Joung et al.
2012/0243237 A1 9/2012 Toda et al.
2012/0250321 A1 10/2012 Blincoe et al.
2012/0266449 A1 10/2012 Krupa
2012/0268688 A1 10/2012 Sato et al.
2012/0287625 A1 11/2012 Macwan et al.
2012/0305868 A1 12/2012 Callahan et al.
2012/0314429 A1 12/2012 Plunk
2013/0009552 A1 1/2013 Page
2013/0010476 A1 1/2013 Pickard et al.
2013/0016864 A1 1/2013 Ivey et al.
2013/0033872 A1 2/2013 Randolph et al.
2013/0050994 A1 2/2013 Pieper
2013/0051012 A1 2/2013 Oehle et al.
2013/0077307 A1 3/2013 Yamamoto
2013/0083529 A1 4/2013 Gifford
2013/0141913 A1 6/2013 Sachsenweger
2013/0155681 A1 6/2013 Nall et al.
2013/0163254 A1 6/2013 Chang et al.
2013/0170232 A1 7/2013 Park et al.
2013/0170233 A1 7/2013 Nezu et al.
2013/0201699 A1 8/2013 Kato et al.
2013/0227908 A1 9/2013 Gulbrandsen et al.
2013/0258677 A1 10/2013 Fryzek et al.
2013/0265750 A1 10/2013 Pickard et al.
2013/0271989 A1 10/2013 Hussell et al.
2013/0292149 A1 11/2013 Cooper
2013/0294084 A1 11/2013 Kathawate et al.
2013/0301252 A1 11/2013 Hussell et al.
2013/0322062 A1 12/2013 Danesh
2013/0322084 A1 12/2013 Ebisawa
2013/0335980 A1 12/2013 Nakasuji et al.
2014/0029262 A1 1/2014 Maxik et al.
2014/0036497 A1 2/2014 Hussell et al.
2014/0049957 A1 2/2014 Goelz et al.
2014/0063776 A1 3/2014 Clark et al.
2014/0063818 A1 3/2014 Randolph et al.
2014/0071679 A1 3/2014 Booth
2014/0071687 A1 3/2014 Tickner et al.
2014/0140490 A1 5/2014 Roberts et al.
2014/0233246 A1 8/2014 Lafreniere et al.
2014/0254177 A1 9/2014 Danesh
2014/0268836 A1 9/2014 Thompson
2014/0268869 A1 9/2014 Blessitt et al.
2014/0299730 A1 10/2014 Green et al.
2014/0301092 A1 10/2014 Wronski
2014/0313775 A1 10/2014 Myers et al.
2014/0321122 A1 10/2014 Domagala et al.
2014/0347848 A1 11/2014 Pisavadia et al.
2015/0009676 A1 1/2015 Danesh
2015/0029732 A1 1/2015 Hatch
2015/0078008 A1 3/2015 He
2015/0085495 A1 3/2015 Seki
2015/0085500 A1 3/2015 Cooper et al.
2015/0092449 A1 4/2015 Demuynck et al.
2015/0131301 A1 5/2015 Ho
2015/0138779 A1 5/2015 Livesay et al.
2015/0153635 A1 6/2015 Chen et al.
2015/0184837 A1 7/2015 Zhang et al.
2015/0198324 A1 7/2015 O'Brien et al.
2015/0219317 A1 8/2015 Gatof et al.
2015/0233556 A1 8/2015 Danesh
2015/0241039 A1 8/2015 Fryzek
2015/0263497 A1 9/2015 Korcz et al.
2015/0276185 A1 10/2015 Bailey et al.
2015/0308662 A1 10/2015 Vice et al.
2015/0345761 A1 12/2015 Lawlor
2015/0362159 A1 12/2015 Ludyjan
2016/0084488 A1 3/2016 Wu et al.

(56) References Cited

U.S. PATENT DOCUMENTS

| | | | |
|---|---|---|---|
| 2016/0178181 | A1 | 6/2016 | LaDuca |
| 2016/0209007 | A1 | 7/2016 | Belmonte et al. |
| 2016/0238225 | A1 | 8/2016 | Doust |
| 2016/0308342 | A1 | 10/2016 | Witherbee et al. |
| 2016/0312987 | A1 | 10/2016 | Danesh |
| 2016/0348860 | A1 | 12/2016 | Danesh |
| 2016/0366738 | A1 | 12/2016 | Boulanger et al. |
| 2017/0003007 | A1 | 1/2017 | Wronski |
| 2017/0005460 | A1 | 1/2017 | Lee |
| 2017/0045213 | A1 | 2/2017 | Williams et al. |
| 2017/0059135 | A1 | 3/2017 | Jones |
| 2017/0138576 | A1 | 5/2017 | Peng et al. |
| 2017/0138581 | A1 | 5/2017 | Doust |
| 2017/0167672 | A1 | 6/2017 | Stauner et al. |
| 2017/0167699 | A1 | 6/2017 | Schubert et al. |
| 2017/0198896 | A1 | 7/2017 | May |
| 2017/0284616 | A1 | 10/2017 | Coakley et al. |
| 2017/0307188 | A1 | 10/2017 | Oudina et al. |
| 2017/0307198 | A1 | 10/2017 | Shah et al. |
| 2018/0112857 | A1 | 4/2018 | Wronski et al. |
| 2018/0123351 | A1 | 5/2018 | Andrews et al. |
| 2018/0142871 | A1 | 5/2018 | Morales |
| 2018/0156431 | A1 | 6/2018 | Zhuang et al. |
| 2018/0216809 | A1 | 8/2018 | Cohen |
| 2018/0224095 | A1 | 8/2018 | Cohen |
| 2018/0283677 | A1 | 10/2018 | Cohen |
| 2018/0372284 | A1 | 12/2018 | Danesh et al. |
| 2019/0032874 | A1 | 1/2019 | Bonnetto et al. |
| 2019/0041050 | A1 | 2/2019 | Cairns et al. |
| 2019/0049080 | A1 | 2/2019 | Danesh |
| 2019/0063701 | A1 | 2/2019 | Lotfi et al. |
| 2019/0063724 | A1 | 2/2019 | Vice et al. |
| 2019/0086043 | A1 | 3/2019 | Wronski |
| 2019/0093836 | A1 | 3/2019 | Danesh |
| 2019/0195475 | A1 | 6/2019 | Jones |
| 2019/0195479 | A1 | 6/2019 | Bonne |
| 2019/0301710 | A1 | 10/2019 | Harris |
| 2019/0353341 | A1 | 11/2019 | Spiro |
| 2020/0049326 | A1 | 2/2020 | Brown et al. |
| 2020/0182420 | A1 | 6/2020 | Cohen et al. |
| 2020/0291652 | A1 | 9/2020 | Shen |
| 2020/0323073 | A1 | 10/2020 | Cartrette et al. |
| 2020/0355334 | A1 | 11/2020 | Shen et al. |
| 2020/0393118 | A1 | 12/2020 | Danesh et al. |
| 2021/0010647 | A1 | 1/2021 | Danesh et al. |
| 2021/0010663 | A1 | 1/2021 | Nikooyan et al. |
| 2021/0033268 | A1 | 2/2021 | Danesh |
| 2021/0045221 | A1 | 2/2021 | Dejonge et al. |
| 2021/0071833 | A1 | 3/2021 | Hou et al. |
| 2021/0080084 | A1 | 3/2021 | Danesh et al. |
| 2021/0222845 | A1 | 7/2021 | Kopitzke et al. |
| 2021/0364139 | A1 | 11/2021 | Danesh |
| 2022/0018522 | A1 | 1/2022 | Kopitzke et al. |
| 2022/0018523 | A1 | 1/2022 | Vinh et al. |
| 2022/0018525 | A1 | 1/2022 | Danesh |
| 2022/0034488 | A1 | 2/2022 | Cohen |
| 2022/0042664 | A1 | 2/2022 | Lotfi et al. |
| 2022/0049841 | A1 | 2/2022 | Young et al. |
| 2022/0082233 | A1 | 3/2022 | Kopitzke et al. |
| 2022/0085610 | A1 | 3/2022 | Dejonge et al. |
| 2022/0243883 | A1 | 8/2022 | Cohen |
| 2023/0125086 | A1 | 4/2023 | Ungaro |

FOREIGN PATENT DOCUMENTS

| | | | |
|---|---|---|---|
| CA | 2691480 | C | 4/2012 |
| CA | 2734369 | A1 | 10/2013 |
| CA | 2561459 | A1 | 11/2013 |
| CA | 2815067 | | 11/2013 |
| CA | 2848289 | A1 | 10/2014 |
| CA | 2998173 | | 7/2018 |
| CN | 2182475 | Y | 11/1994 |
| CN | 1309618 | A | 8/2001 |
| CN | 201059503 | Y | 5/2008 |
| CN | 201259125 | Y | 6/2009 |
| CN | 101608781 | A | 12/2009 |
| CN | 201636626 | U | 11/2010 |
| CN | 102062373 | A | 5/2011 |
| CN | 202014067 | U | 10/2011 |
| CN | 202392473 | U | 8/2012 |
| CN | 202733693 | U | 2/2013 |
| CN | 103307518 | A | 9/2013 |
| CN | 103322476 | A | 9/2013 |
| CN | 203202661 | U | 9/2013 |
| CN | 203215483 | U | 9/2013 |
| CN | 101498411 | B | 11/2013 |
| CN | 203273663 | U | 11/2013 |
| CN | 203297980 | U | 11/2013 |
| CN | 203628464 | U | 12/2013 |
| CN | 203641919 | U | 6/2014 |
| CN | 204300818 | U | 4/2015 |
| CN | 104654142 | A | 5/2015 |
| CN | 204513161 | U | 7/2015 |
| CN | 204611541 | U | 9/2015 |
| CN | 204786225 | U | 11/2015 |
| CN | 204829578 | U | 12/2015 |
| CN | 103712135 | B | 4/2016 |
| CN | 205606362 | U | 9/2016 |
| CN | 206130742 | U | 4/2017 |
| CN | 103154606 | B | 5/2017 |
| CN | 206222112 | U | 6/2017 |
| CN | 107013845 | A | 8/2017 |
| CN | 107084343 | A | 8/2017 |
| DE | 9109828 | U1 | 2/1992 |
| DE | 199 47 208 | | 5/2001 |
| EP | 1 589 289 | | 10/2005 |
| EP | 1 672 155 | A1 | 6/2006 |
| EP | 1688663 | | 8/2006 |
| EP | 2 095 938 | A1 | 2/2008 |
| EP | 2 306 072 | A1 | 4/2011 |
| EP | 2 453 169 | A2 | 5/2012 |
| EP | 2 193 309 | B1 | 7/2012 |
| EP | 2 735 787 | A1 | 5/2014 |
| EP | 3 104 024 | A1 | 12/2016 |
| GB | 2325728 | | 12/1998 |
| GB | 2427020 | A | 12/2006 |
| GB | 2466875 | | 7/2010 |
| GB | 2471929 | | 1/2014 |
| GB | 2509772 | A | 7/2014 |
| JP | H02113002 | U | 9/1990 |
| JP | 2007091052 | A | 4/2007 |
| JP | 2007265961 | A | 10/2007 |
| JP | 2011060450 | A2 | 3/2011 |
| JP | 2012064551 | A2 | 3/2012 |
| JP | 2015002027 | A2 | 1/2015 |
| JP | 2015002028 | A2 | 1/2015 |
| JP | 2016219335 | A | 12/2016 |
| JP | 2017107699 | A2 | 6/2017 |
| KR | 1020110008796 | A | 1/2011 |
| KR | 1020120061625 | A | 6/2012 |
| MX | 2011002947 | A | 9/2011 |
| TW | 474382 | U | 1/2002 |
| WO | WO 2013/128896 | A1 | 9/2013 |
| WO | WO 2014/015656 | | 1/2014 |
| WO | WO 2015/000212 | A1 | 1/2015 |
| WO | WO 2016152166 | A2 | 9/2016 |
| WO | WO 2022/056180 | | 3/2022 |

OTHER PUBLICATIONS

Acrich COB Zhaga Module, Product Description, Seoul Semiconductor, Nov. 11, 2016, 39 pages.

<https://www.zhagastandard.org/books/book18/>, Mar. 2017, 5 pages. Accessed on May 14, 2018.

Bortz, J. C. et al., "Optimal design of a nonimaging TIR doublet lens for an illumination system using an LED source", Proc. SPIE 5529, Nonimaging Optics and Efficient Illumination Systems, (Sep. 29, 2004); doi: 10.1117/12.562598; https://doi.org/10.1117/12.562598, 10 pages.

BXUV.GuideInfo, Fire Resistance Ratings—ANSI/UL 263, UL Online Certifications Directory, last updated Nov. 3, 2016, 27 pages.

CEYY.GuideInfo, Outlet Boxes and Fittings Certified for Fire

(56) References Cited

OTHER PUBLICATIONS

Resistance, UL Online Certifications Directory, last updated May 16, 2013, 2 pages.
Canadian Office Action dated Dec. 23, 2013 from Canadian Application No. 2,778,581, 3 pages.
Canadian Office Action dated Mar. 22, 2016 from Canadian Application No. 2,879,629, 4 pages.
Canadian Office Action dated Dec. 6, 2016 from Canadian Application No. 2,879,629, 3 pages.
Canadian Office Action dated Mar. 9, 2017 from Canadian Application No. 2,931,588, 5 pages.
Canadian Office Action dated Feb. 1, 2016 from Canadian Application No. 2,879,486, 5 pages.
Canadian Office Action dated Jun. 12, 2017 from Canadian Application No. 2,927,601, 4 pages.
Canadian Office Action dated Aug. 11, 2017 from Canadian Application No. 2,941,051, 4 pages.
Carlon® Zip Box® Blue™ Switch and Outlet Boxes, Product Brochure, http://www.carlonsales.com/brochures.php, Jun. 20, 2006, 22 pages.
Cree LED Lamp Family Sales Sheet—Better light is beautiful light, Apr. 24, 2017, 2 pages.
DME Series Installation Instructions, Oct. 18, 2011, 2 pages.
DMF, Inc., "dmfLIGHTING: LED Recessed Lighting Solutions," Info sheets, Mar. 15, 2012, 4 pages.
DMF, Inc., "dmfLIGHTING: LED Recessed Downlighting," DRD2 Product Brochure, Oct. 23, 2014, 50 pages.
DMF, Inc., "dmfLIGHTING: LED Recessed Downlighting," Product Catalog, Aug. 2012, 68 pages.
Dross, O. et al., "Review of SMS design methods and real-world applications", Proc. SPIE 5529, Nonimaging Optics and Efficient Illumination Systems, (Sep. 29, 2004); doi: 10.1117/12.561336; https://doi.org/10.1117/12.561336, 14 pages.
Final Office Action mailed Apr. 27, 2016 from U.S. Appl. No. 14/184,601, 19 pages.
Final Office Action mailed Jul. 26, 2017 from U.S. Appl. No. 14/184,601, 18 pages.
Final Office Action mailed Jan. 29, 2016 from U.S. Appl. No. 14/183,424, 21 pages.
Final Office Action mailed Jun. 23, 2016 from U.S. Appl. No. 13/484,901, 18 pages.
Final Office Action mailed Apr. 2, 2015 from U.S. Appl. No. 13/484,901, 13 pages.
Halo, Halo LED H4 H7 Collection, SustainabLEDesign, Cooper Lighting, (emphasis on p. 18 "H7 Collection LED Modules—Halo LED H7 Module Features,") Mar. 28, 2012, 52 pages.
Halo, H7 LED Downlight Trims 49x Series, 6-inch LED Trims for Use with MI7x LED Modules, Cooper Lighting, ADV110422, rev. Aug. 12, 2011, 15 pages.
Halo, LED Module ML706x, Cooper Lighting, General Installation for All Modules/p. 1; Tether Installation/pp. 2-3; Installation into Halo H750x Series LED—only (Non-Screw Based), Recessed Fixture, p. 4, Oct. 20, 2009, 4 pages.
Medvedev, V. et al., "Uniform LED illuminator for miniature displays," Proc. SPIE 3428, Illumination and Source Engineering, (Oct. 20, 1998); doi: 10.1117/12.327957;https://doi.org/10.1117/12.327957, 13 pages.
"Membrane Penetrations in Fire-Resistance Rated Walls," https://www.ul.com/wp-content/uploads/2014/04/ul_MembranePenetrations.pdf, Issue 1, 2009, published Feb. 26, 2010, 2 pages.
"Metallic Outlet Boxes," UL 514A, Underwriters Laboratories, Inc., Feb. 16, 2004 (Title Page Reprinted Aug. 10, 2007), 106 pages.
"Metallic and Non-metallic Outlet Boxes Used in Fire-rated Assembly," https://iaeimagazine.org/magazine/2000/09/16/metallic-and-non-metallic-outlet-boxes-used-in-fire-rated-assembly/, Sep. 16, 2000, 5 pages.
Notice of Allowance mailed Mar. 26, 2018 for U.S. Appl. No. 14/184,601, 10 pages.
Non-Final Office Action mailed Mar. 15, 2010 from U.S. Appl. No. 12/100,148, 8 pages.
Non-Final Office Action mailed Apr. 30, 2010 from U.S. Appl. No. 12/173,232, 13 pages.
Non-Final Office Action mailed Sep. 5, 2014 from U.S. Appl. No. 13/791,087, 8 pages.
Non-Final Office Action mailed Jul. 20, 2015 from U.S. Appl. No. 14/184,601, 16 pages.
Non-Final Office Action mailed Dec. 15, 2016 from U.S. Appl. No. 14/184,601, 18 pages.
Non-Final Office Action mailed Feb. 6, 2018 from U.S. Appl. No. 15/167,682, 9 pages.
Non-Final Office Action mailed Sep. 15, 2015 from U.S. Appl. No. 13/484,901, 16 pages.
Non-Final Office Action mailed Oct. 16, 2014 from U.S. Appl. No. 13/484,901, 11 pages.
Non-Final Office Action mailed Sep. 6, 2017 from U.S. Appl. No. 14/726,064, 8 pages.
Non-Final Office Action mailed May 17, 2017 from U.S. Appl. No. 14/183,424, 20 pages.
Non-Final Office Action mailed Jun. 2, 2015 from U.S. Appl. No. 14/183,424, 20 pages.
Non-Final Office Action mailed Apr. 12, 2018 for U.S. Appl. No. 29/638,259, 5 pages.
Non-Final Office Action mailed May 16, 2018 for U.S. Appl. No. 15/132,875, 18 pages.
Notice of Allowance mailed Jan. 30, 2015 from U.S. Appl. No. 13/791,087, 9 pages.
Notice of Allowance mailed Jan. 16, 2015 from U.S. Appl. No. 29/467,026, 9 pages.
Notice of Allowance mailed Oct. 21, 2016 from U.S. Appl. No. 13/484,901, 7 pages.
Notice of Allowance mailed Mar. 24, 2016 from U.S. Appl. No. 14/247,149, 8 pages.
Notice of Allowance mailed May 22, 2018 from U.S. Appl. No. 14/183,424, 9 pages.
Notice of Allowance mailed May 10, 2018 from U.S. Appl. No. 14/726,064, 7 pages.
Notice of Allowance mailed Aug. 23, 2017 from Canadian Application No. 2,879,629, 1 page.
"Outlet Boxes for Use in Fire Rated Assemblies," https://www.ul.com/wp-content/uploads/2014/04/UI_outletboxes.pdf, Apr. 2007, 2 pages.
Parkyn, W. A. et al., "New TIR lens applications for light-emitting diodes", Proc. SPIE 3139, Nonimaging Optics: Maximum Efficiency Light Transfer IV, (Oct. 3, 1997); doi: 10.1117/12.290217, 7 pages.
Schreiber, P. et al., "Microoptics for homogeneous LED-illumination", Proc. SPIE 6196, Photonics in Multimedia, 61960P (Apr. 21, 2006); doi: 10.1117/12.663084; https://doi.org/10.1117/12.663084, 11 pages.
Van Giel, B. V. et al., "Design of axisymmetrical tailored concentrators for LED light source applications", Proc. SPIE 6196, Photonics in Multimedia, 619603 (Apr. 21, 2006); doi: 10.1117/12.660115; https://doi.org/10.1117/12.660115, 11 pages.
Zhen, Y. et al., "The optimal design of TIR lens for improving LED illumination uniformity and efficiency", Proc. SPIE 6834, Optical Design and Testing III, 68342K (Nov. 28, 2007); doi: 10.1117/12.756101, 9 pages.
Zou, H. et al., "58.1: Single-Panel LCOS Color Projector with LED Light Sources", SID Symposium, vol. 36, Issue 1, 4 pages (May 2005).
Notice of Allowance mailed Sep. 21, 2018 from U.S. Appl. No. 29/645,941, 5 pages.
"Advanced LED Solutions," Imtra Marine Lighting. Jun. 17, 2011. 39 pages.
"Portland Bi-Color, Warm White/Red," item:ILIM30941.Imtra Marine Products. 2012. 3 pages. Accessed athttp://www.imtra.com:80/0ade25fb-3218-4cae-a926-6abe64ffd93a/lighting-light-fixtures-downlights-3-to-4-inches-detail.htm on Jan. 25, 2013.
"Cree LMH2 LED Modules," Mouser Electronics. Accesssed at www.mouser.com/new/cree/creelmh2 on Sep. 9, 2012. 2 pages.
"Cree LMH2 LED Module with TrueWhite Technology," Cree Product Family Data Sheet. Dec. 21, 2011. 3 pages.

(56) References Cited

OTHER PUBLICATIONS

"Cree LMH2 LED Modules Design Guide," Cree Product Design Guide. 2011. 20 pages.
"Undercabinet Pucks, Xyris Mini LED Puck Light," Elco Lighting. Sep. 2018. 1 page.
"LED Undercabinet Pocket Guide," Elco Lighting. Nov. 2, 2016. 12 pages.
"Versi LED Mini Flush," Lithonia Lghting. Sep. 2013. 6 pages.
Notice of Allowance mailed Oct. 4, 2018 from U.S. Appl. No. 15/947,065 , 9 pages.
Notice of Allowance mailed Sep. 19, 2018 from U.S. Appl. No. 15/167,682 , 7 pages.
Non-Final Office Action mailed Jun. 25, 2018 for U.S. Appl. No. 29/541,565, 10 pages.
Non-Final Office Action mailed Oct. 24, 2018 for U.S. Appl. No. 15/688,266, 14 pages.
OneFrame Recessed LED Downlight. Dmflighting.com. Published Jun. 6, 2018. Retrieved at https://www.dmflighting.com/product/oneframe on Jun. 6, 2018. 11 pages.
Notice of Allowance mailed Oct. 9, 2018 from U.S. Appl. No. 29/653,142, 7 pages.
International Search Report and Written Opinion in PCT/US2018/048357 mailed Nov. 14, 2018, 13 pages.
Notice of Allowance mailed Nov. 27, 2018 from U.S. Appl. No. 15/167,682, 11 pages.
Non-Final Office Action mailed Dec. 5, 2018 from U.S. Appl. No. 14/942,937, 13 pages.
International Search Report and Written Opinion in International Patent Application No. PCT/US18/39048 mailed Dec. 14, 2018. 24 pages.
Notice of Allowance mailed Jan. 2, 2019 from U.S. Appl. No. 29/541,565, 6 pages.
Raco 4 i+A882:C958n. Octagon Welded Concrete Ring, 3-½ in. Deep with ½ and ¾ in. Knockouts and ilcludes 890 cover (20-Pack). Model # 280. Accessed at https://www.homedepot.com/p/RACO-4-in-Octagon-Welded-Concrete-Ring-3-1-2-in-Deep-with-1-2-and-3-4-in-Knockouts-and-ilcludes-890-cover-20-Pack-280/203638679 on Jan. 18, 2019. 3 pages.
Raco 4 in. Octagon Welded Concrete Ring, 6 in. Deep with ½ and ¾ in. Knockouts (10-Pack). Model # 276. Accessed at https://www.homedepot.com/p/RACO-4-in-Octagon-Welded-Concrete-Ring-6-in-Deep-with-1-2-and-3-4-in-Knockouts-10-Pack-276/203638675 on Jan. 16, 2019. 4 pages.
Notice of Allowance mailed Feb. 8, 2019 from U.S. Appl. No. 29/541,565, 5 pages.
Non-Final Office Action mailed Feb. 7, 2019 from U.S. Appl. No. 16/200,393, 32 pages.
Notice of Allowance mailed Jan. 28, 2019 from U.S. Appl. No. 29/664,471, 8 pages.
Non-Final Office Action mailed Jul. 24, 2018 from U.S. Appl. No. 29/638,259, 5 pages.
Final Office Action mailed Mar. 15, 2019 from U.S. Appl. No. 15/132,875, 15 pages.
International Search Report and Written Opinion in International Patent Application No. PCT/US18/62868 mailed Mar. 14, 2019, 13 pages.
CS&E PCT Collaborative Search and Examination Pilot Upload Peer Contribution in International Patent Application No. PCT/US18/62868 mailed Mar. 14, 2019, 61 pages.
Notice of Allowance mailed Apr. 1, 2019 from U.S. Appl. No. 15/167,682, 7 pages.
Non-Final Office Action mailed Apr. 4, 2019 from U.S. Appl. No. 29/678,482, 8 pages.
Notice of Allowance mailed Apr. 8, 2019 from U.S. Appl. No. 29/653,142, 8 pages.
Notice of Allowance mailed Apr. 17, 2019 from U.S. Appl. No. 29/678,478, 7 pages.
International Search Report and Written Opinion in International Patent Application No. PCT/US18/67614 mailed Apr. 25, 2019, 20 pages.
CS&E PCT Collaborative Search and Examination Pilot Upload Peer Contribution in International Patent Application No. PCT/US18/67614 mailed Apr. 24, 2019, 53 pages.
Specification & Features 4" Octagonal Concrete Box Covers. Orbit Industries, Inc. Accessed at https://www.orbitelectric.com on May 6, 2019. 1 page.
4" Octagon Concrete Boxes and Back Plates. Appleton. Accessed at www.appletonelec.com on May 6, 2019. 1 page.
Raco Commercial, Industrial and Residential Electrical Products. Hubbell. Accessed at www.Hubbell-RTB.com on May 6, 2019. 356 pages.
Imtra Marine Lighting 2008 Catalog. 40 pages.
Imtra Marine Lighting 2009 Catalog. 32 pages.
Imtra Marine Lighting Spring 2007 Catalog. 36 pages.
Final Office Action mailed Jun. 6, 2019 from U.S. Appl. No. 15/688,266, 7 pages.
Non-Final Office Action mailed Jun. 11, 2019 from U.S. Appl. No. 15/901,738, 6 pages.
Notice of Allowance mailed Jun. 12, 2019 from U.S. Appl. No. 16/016,040, 8 pages.
Cooper Lighting Halo ML56 LED System Product Sheet. Mar. 2, 2015. Accessed at http://www.cooperindustries.com/content/dam/public/lighting/products/documents/halo/spec_sheets/halo-ml56600-80cri-141689-sss.pdf. 8 pages.
Kwikbrace® New Construction Braces for Lighting Fixtures or Ceiling Fans 1-½ in. Depth. Hubbel. Accessed at https://hubbellcdn.com/specsheet/926.pdf on Jun. 27, 2019. 1 page.
IC1JB Housing 4" IC-Rated New Construction Junction Box Housing. AcuityBrands. Accessed at https://www.acuitybrands.com/en/products/detail/845886/juno/ic1jb-housing/4-ic-rated-new-construction-junction-box-housing on Jun. 27, 2019.
Ex-Parte Quayle Action mailed Jun. 27, 2019 from U.S. Appl. No. 29/683,730, 5 pages.
Notice of Allowance mailed Jul. 31, 2019 from U.S. Appl. No. 15/167,682 , 7 pages.
Supplemental Notice of Allowance mailed Aug. 5, 2019 from U.S. Appl. No. 15/947,065, 2 pages.
International Search Report and Written Opinion in International Patent Application No. PCT/US19/32281 mailed Aug. 2, 2019, 18 pages.
Notice of Allowance mailed Sep. 11, 2019 from U.S. Appl. No. 29/653,142, 6 pages.
Notice of Allowance mailed Sep. 19, 2019 from U.S. Appl. No. 16/016,040, 7 pages.
Corrected Notice of Allowance mailed Sep. 27, 2019 from U.S. Appl. No. 15/167,682 , 2 pages.
Final Office Action mailed Sep. 27, 2019 from U.S. Appl. No. 16/200,393, 34 pages.
Notice of Allowance mailed Feb. 15, 2019 from U.S. Appl. No. 15/947,065 , 9 pages.
Notice of Allowance mailed Oct. 1, 2019 from U.S. Appl. No. 14/942,937, 7 pages.
Final Office Action mailed Oct. 3, 2019 from U.S. Appl. No. 29/678,482, 6 pages.
Delhi Rehab & Nursing Facility ELM16-70884. Vertex Innovative Solutions Feb. 25, 2016. 89 pages.
SlimSurface surface mount downlighting. Philips Lightolier 2018. 8 pages.
Be seen in the best light. Lightolier by signify. Comprehensive 2019 Lighting Catalog. 114 pages.
Corrected Notice of Allowance mailed Oct. 10, 2019 from U.S. Appl. No. 16/016,040, 2 pages.
Cree® LMR2 LED Module. Product Family Data Sheet Cree 2011. 3 pages.
Notice of Allowance mailed Oct. 16, 2019 from U.S. Appl. No. 15/132,875, 12 pages.
International Search Report and Written Opinion in International Patent Application No. PCT/US2019/036477 mailed Oct. 17, 2019, 15 pages.
ML56 LED Lighting System 600 / 900 / 1200 Series Halo. Cooper Lighting Brochure 2015. Accessed at https://images.homedepot-static.com/catalog/pdfImages/06/06d28f93-4bf6-45be-a35a-a0239606f227.pdf. 41 pages.

(56) References Cited

OTHER PUBLICATIONS

Switch and Outlet Boxes and Covers Brochure. Appelton 2010. 77 pages.
Non-Final Office Action mailed Dec. 30, 2019 from U.S. Appl. No. 16/653,497, 8 pages.
Notice of Allowance mailed Feb. 5, 2020 from U.S. Appl. No. 15/901,738 , 8 pages.
Notice of Allowance mailed Feb. 5, 2020 from U.S. Appl. No. 29/678,482 , 13 pages.
Maxim Lighting Wafer Trifold Brochure LMXBRO1711 2017. Accessed at https://www.maximlighting.com/Upload/download/brochure/pdf/LMXBRO1711.pdf on Feb. 13, 2020. 2 pages.
Maxim Convert Fixture. LMXCAT 1805 Maxim Main Catalog 2018 p. 639.
Maxim Wafer. LMXCAT1805 Maxim Main Catalog 2018 pp. 636-638.
Maxim Lighting Trim Trifold LMXBRO1905 2019. Accessed at https://www.maximlighting.com/Upload/download/brochure/pdf/LMXBRO1905.pdf on Feb. 13, 2020. 2 pages.
International Search Report and Written Opinion in International Patent Application No. PCT/US2019/054220 mailed Feb. 24, 2020, 23 pages.
Final Office Action mailed Mar. 17, 2020 for U.S. Appl. No. 29/653,142, 13 pages.
LED Book Price Guide 2012. DMF Light. Issued Jun. 26, 2013. 3 pages.
DLER411 4" Recessed LED Retrofit Module. DMF Light. Issued Jun. 15, 2011. 1 page.
DLEI411 4" Recessed LED New Construction, IC. DMF Light. Issued Nov. 30, 2011. 1 page.
DLEIR411 4" Recessed LED Remodel, IC. DMF Light. Issued Jun. 15, 2011. 1 page.
3 & 4" DLE Ser ies LED Sample Case Now Available. DMF Light. Issued Jan. 6, 2012. 1 page.
DLEI3 3" Recessed LED New Construction, IC. DMF Light. Issued Nov. 30, 2011. 2 pages.
Ridgway-Barnes, SlimSurface LED Downlight: One of the thinnest LED surface mount downlights in the market. Philips Lighting Blog. Oct. 28, 2014. Accessed at http://applications.nam.lighting.philips.com/blog/index.php/2014/10/28/slimsurface-led-downlight-one-of-the-thinnest-led-surface-mount-downlights-in-the-market/. 3 pages.
SlimSurface LED S5R, S7R & S10R Round 5", 7" and 10" Apertures. Lightolier by Signify. Nov. 2018. 9 pages.
Non-Final Office Action mailed Apr. 2, 2020 for U.S. Appl. No. 16/522,275, 21 pages.
Innofit 8"Commercial Downlight. Greencreative. Accessed at https://greencreative.com/products/luminaires/commercial-downlighting/innofit-cdl-8-inch-12-19-27w/ on Apr. 28, 2020. 6 pages.
Notice of Allowance mailed May 18, 2020 from U.S. Appl. No. 15/901,738 , 7 pages.
Non-Final Office Action mailed May 20, 2020 for U.S. Appl. No. 15/688,266, 6 pages.
Non-Final Office Action mailed May 26, 2020 for U.S. Appl. No. 16/719,361, 10 pages.
Maxim Lighting International, "Wafer LED 7" RD 3000K Wall/Flush Mount", undated.
Maxim Lighting International, "Convert LED Flush Mount", undated.
Maxim Lighting International, "Views of the Wafer Flush Mount", undated.
Maxim Lighting International, "Product/Drawing Specification Sheet", undated.
International Search Report and Written Opinion in PCT/US2020/017331 mailed Jun. 22, 2020, 16 pages.
Taiwan Office Action and translation thereof dated Jun. 12, 2020 from Taiwan Application No. 108116564, 8 pages.
Access Lighting Installation Instructions. No. 20870LEDD/20871LEDD/20872LEDD. Dec. 16, 2019. 2 pages.
Model No. 20870LEDD-WH/ACR Infinite Specification Sheet. Access Lighting. Apr. 9, 2020. 1 page.
Notice of Allowance mailed Apr. 9, 2020 from U.S. Appl. No. 16/653,497, 7 pages.
Notice of Allowance mailed Jul. 10, 2020 from U.S. Appl. No. 29/694,475, 6 pages.
Corrected Notice of Allowability mailed Oct. 25, 2018 from U.S. Appl. No. 14/183,424, 3 pages.
Dmf DRD2 Recessed LED Downlight General Retrofit Junction Box Dated: Dec. 18, 2015 Downloaded Jul. 28, 2018, from https://www.a lconlighting.com/specsheets/DMF/DRD2-Junction-Box-Retrofit-Spec-Sheet .pdf, 6 pages.
Dmf DRD2 Recessed LED Downlight General New Construction 4", 5", 6" Aperture Dated: Aug. 31, 2016 Downloaded Jul. 28, 2018, from https://www. cansandfans.com/sites/default/files/DRD2-General-New-Construction-Spec-Sheet_7_0 .pdf , 9 pages.
Mar. 5, 2016—The DMF Lighting DRD2 Recessed LED Downlight General Retrofit Junction Box—Wet Location Rated is the ideal solution for Commercial LED recessed lighting retrofit applications. web cache https://www.alconlighting.com/dmf-drd2m.html (downloaded Jul. 28, 2018), 6 pages.
Ex Parte Quayle Office Action mailed Oct. 16, 2018 for U.S. Appl. No. 29/663,037, 7 pages.
Notice of Allowance mailed Nov. 19, 2018 from U.S. Appl. No. 29/663,037, 5 pages.
Notice of Allowance mailed Nov. 15, 2018 from U.S. Appl. No. 29/663,040, 5 pages.
LED modules advance in performance, standardization questions persist (Magazine). LEDs Magazine. Oct. 29, 2013. Accessed at https://www.ledsmagazine.com/leds-ssl-design/modular-light-engines/article/16695073/led-modules-advance-in-performance-standardization-questions-persist-magazine. 9 pages.
Notice of Allowance mailed Jul. 20, 2020 from U.S. Appl. No. 29/648,046, 5 pages.
Octagon Concrete Box Cover with (3) ½ in. & (2) ¾ in. Conduit Knockouts. Garvin. Accessed at https://www.garvinindustries.com/covers-and-device-rings/concrete-slab-box-covers-adaptor-rings/flat-covers-all-styles/cbp?gclid=Cj0KCQjw9b_4BRCMARIsADMUlypJc0K80UHdDTI9C5m4BDzR3U87PRYV1NdQIBFxEWQ21_3otTCTqEkaAi_DEALw_wcB on Jul. 20, 2020. 1 page.
Notice of Allowance mailed Jul. 28, 2020 from U.S. Appl. No. 16/719,361, 8 pages.
Notice of Allowance mailed Jul. 29, 2020 from U.S. Appl. No. 16/522,275, 8 pages.
Non-Final Office Action mailed Aug. 19, 2020 for U.S. Appl. No. 16/886,365, 16 pages.
Selectfit Downlight Installation Guide. Greencreative Mar. 10, 2020. 2 pages.
Commercial Downlight Installation Guide. Greencreative Mar. 17, 2020. 2 pages.
Selectfit4" Retrofit Downlight Specification Features. Greencreative Mar. 9, 2020. 4 pages.
4" Selectfit. Greencreative. Accessed at https://greencreative.com/products/luminaires/commercial-downlighting/4-selectfit-commercial-downlight/#installation_guide on Sep. 2, 2020. 4 pages.
Notice of Allowance mailed Sep. 8, 2020 from U.S. Appl. No. 29/678,482, 5 pages.
Corrected Notice of Allowance mailed Sep. 11, 2020 from U.S. Appl. No. 16/719,361, 2 pages.
Canadian Office Action in Application No. 2931588 dated Aug. 13, 2020, 5 pages.
Corrected Notice of Allowance mailed Sep. 14, 2020 from U.S. Appl. No. 16/522,275, 2 pages.
Notice of Allowance mailed Sep. 22, 2020 from U.S. Appl. No. 29/683,730, 6 pages.
Notice of Allowance mailed Sep. 22, 2020 from U.S. Appl. No. 29/653,142, 6 pages.
Notice of Allowance mailed Oct. 27, 2020 from U.S. Appl. No. 29/648,046, 5 pages.
Notice of Allowance mailed Oct. 27, 2020 from U.S. Appl. No. 29/694,475, 5 pages.
Notice of Allowance mailed Nov. 10, 2020 from U.S. Appl. No. 29/688,143, 6 pages.
Notice of Allowance mailed Nov. 10, 2020 from U.S. Appl. No. 29/688,172, 6 pages.

(56) References Cited

OTHER PUBLICATIONS

Non-Final Office Action mailed Nov. 30, 2020 from U.S. Appl. No. 17/000,702, 7 pages.
Notice of Allowance mailed Dec. 2, 2020 from U.S. Appl. No. 29/746,262, 6 pages.
International Search Report and Written Opinion in PCT/US2020/050767 mailed Dec. 9, 2020, 25 pages.
Non-Final Office Action mailed Dec. 16, 2020 from U.S. Appl. No. 17/080,080, 28 pages.
Canadian Office Action in Application No. 2941051 dated Dec. 8, 2020, 5 pages.
Final Office Action mailed Jan. 11, 2021 from U.S. Appl. No. 15/688,266, 7 pages.
Non-Final Office Action mailed Jan. 11, 2021 from U.S. Appl. No. 16/725,606, 7 pages.
Non-Final Office Action mailed Jan. 13, 2021 from U.S. Appl. No. 17/085,636, 14 pages.
Notice of Allowance mailed Jan. 15, 2021 from U.S. Appl. No. 17/000,702, 7 pages.
Notice of Allowance mailed Jan. 22, 2021 from U.S. Appl. No. 17/080,080, 14 pages.
Notice of Allowance mailed Jan. 22, 2021 from U.S. Appl. No. 16/886,365, 7 pages.
Final Office Action mailed Feb. 5, 2021 from U.S. Appl. No. 16/200,393, 7 pages.
"Electrical Boxes" accessed at http://electrical-inspector.blogspot.com/2013/06/electrical-boxes.html Jun. 22, 2013 retrieved from Wayback Machine Archive.org on Jan. 25, 2021. 12 pages.
"Electrical Boxes Volume and Fill Calculations" accessed at http://electrical-inspector.blogspot.com/2013/06/electrical-boxes-Volume-and-Fill-Calculations.html Jun. 22, 2013 retrieved from Wayback Machine Archive.org on Jan. 25, 2021. 8 pages.
U.S. Appl. No. 61/881,162, filed Sep. 23, 2013. Priority application to US Publication No. 2015/0085500 to Cooper et al. 31 pages.
Non-Final Office Action mailed Jan. 19, 2021 from U.S. Appl. No. 17/099,650, 15 pages.
Supplemental Notice of Allowance mailed Mar. 10, 2021 from U.S. Appl. No. 16/886,365, 2 pages.
Notice of Allowance mailed Apr. 6, 2021 from U.S. Appl. No. 16/200,393, 11 pages.
Non-Final Office Action mailed Apr. 12, 2021 from U.S. Appl. No. 29/694,475, 11 pages.
Notice of Allowance mailed Apr. 13, 2021 from U.S. Appl. No. 16/725,606, 7 pages.
Notice of Allowance mailed Apr. 26, 2021 from U.S. Appl. No. 17/080,080, 11 pages.
Corrected Notice of Allowance mailed Apr. 28, 2021 from U.S. Appl. No. 16/725,606, 2 pages.
Notice of Allowance mailed May 5, 2021 from U.S. Appl. No. 17/085,636, 8 pages.
Notice of Allowance mailed May 14, 2021 from U.S. Appl. No. 16/881,686, 8 pages.
Notice of Allowance mailed May 17, 2021 from U.S. Appl. No. 15/688,266, 9 pages.
Notice of Allowance mailed May 24, 2021 from U.S. Appl. No. 29/688,143, 6 pages.
Notice of Allowance mailed May 24, 2021 from U.S. Appl. No. 29/688,172, 6 pages.
Notice of Allowance mailed May 27, 2021 from U.S. Appl. No. 16/779,865, 9 pages.
Notice of Allowance mailed May 28, 2021 from U.S. Appl. No. 16/779,824, 11 pages.
Notice of Allowance mailed Jun. 1, 2021 from U.S. Appl. No. 16/719,361,7 pages.
Corrected Notice of Allowance mailed Jun. 21, 2021 from U.S. Appl. No. 16/779,865, 3 pages.
Non-Final Office Action mailed Jul. 14, 2021 from U.S. Appl. No. 17/118,742, 11 pages.
Supplemental Notice of Allowance mailed Aug. 13, 2021 1 from U.S. Appl. No. 16/779,824, 3 pages.
Notice of Allowance mailed Aug. 20, 2021 1 from U.S. Appl. No. 29/764,875, 5 pages.
Notice of Allowance mailed Sep. 16, 2021 from U.S. Appl. No. 16/779,865, 9 pages.
Non-Final Office Action mailed Oct. 18, 2021 from U.S. Appl. No. 29/696,830, 8 pages.
Notice of Allowance mailed Jul. 21, 2021 from U.S. Appl. No. 17/318,13 pages.
Supplemental Notice of Allowance mailed Aug. 19, 2021 1 from U.S. Appl. No. 17/318,193, 4 pages.
Notice of Allowance mailed Nov. 3, 2021 from U.S. Appl. No. 17/220,779, 7 pages.
Notice of Allowance mailed Nov. 5, 2021 1 from U.S. Appl. No. 17/318,193, 11 pages.
Non-Final Office Action mailed Nov. 5, 2021 from U.S. Appl. No. 17/379,748, 8 pages.
Notice of Allowance mailed Nov. 8, 2021 1 from U.S. Appl. No. 29/764,875, 5 pages.
Non-Final Office Action mailed Nov. 15, 2021 from U.S. Appl. No. 17/374,674, 7 pages.
Final Office Action mailed Nov. 16, 2021 from U.S. Appl. No. 17/099,650, 14 pages.
Notice of Allowance mailed Nov. 22, 2021 from U.S. Appl. No. 29/694,475, 7 pages.
Notice of Allowance mailed Nov. 24, 2021 from U.S. Appl. No. 17/234,421, 9 pages.
Non-Final Office Action mailed Nov. 30, 2021 from U.S. Appl. No. 17/395,522, 28 pages.
Non-Final Office Action mailed Dec. 1, 2021 from U.S. Appl. No. 16/883,144, 23 pages.
Corrected Notice of Allowance mailed Dec. 10, 2021 from U.S. Appl. No. 17/234,421, 2 pages.
Non-Final Office Action mailed Dec. 13, 2021 from U.S. Appl. No. 29/711,198, 8 pages.
Corrected Notice of Allowance mailed Jan. 11, 2022 from U.S. Appl. No. 29/694,475, 2 pages.
Corrected Notice of Allowance mailed Jan. 12, 2022 from U.S. Appl. No. 16/779,865, 9 pages.
Non-Final Office Action mailed Jan. 21, 2022 from U.S. Appl. No. 17/229,668, 5 pages.
Notice of Allowance from U.S. Appl. No. 17/379,748 mailed Feb. 16, 2022, 5 pages.
Notice of Allowance mailed Feb. 14, 2022 from U.S. Appl. No. 17/473,934, 9 pages.
Non-Final Office Action mailed Feb. 25, 2022 from U.S. Appl. No. 17/384,564 28 pages.
Notice of Allowance mailed Mar. 11, 2022 from U.S. Appl. No. 17/118,742 13 pages.
Notice of Allowance Mailed Apr. 27, 2022 from U.S. Appl. No. 16/883,144, 11 pages.
Notice of Allowance Mailed Apr. 27, 2022 from U.S. Appl. No. 17/374,674, 7 pages.
Notice of Allowance Mailed Apr. 27, 2022 from U.S. Appl. No. 17/473,934, 9 pages.
Petition for Inter Partes Review of U.S. Pat. No. 9,964,266 Pursuant to 37 C.F.R. § 42.100 et seq. *AMP Plus Inc. dbd Elco Lighting* v. *DMF, Inc*, IPR2019-01094 filed May 17, 2019. 108 pages.
IPR2019-01094 Exhibit 1001. U.S. Pat. No. 9,964,266 ("the '266 Patent"). 14 pages.
IPR2019-01094 Exhibit 1002. Declaration of Eric Bretschneider, Ph.D. ("Bretschneider"). 107 pages.
IPR2019-01094 Exhibit 1003. Curriculum Vitae of Dr. Bretschneider. 11 pages.
IPR2019-01094 Exhibit 1004. Excerpts from the File History of U.S. Pat. No. 9,964,266. 105 pages.
IPR2019-01094 Exhibit 1005. Imtra 2011 Marine Lighting Catalog—Advanced LED Solutions ("Imtra 2011"). 40 pages.
IPR2019-01094 Exhibit 1006. Imtra 2007 Marine Lighting Catalog ("Imtra 2007"). 36 pages.
IPR2019-01094 Exhibit 1007. U.S. Pat. No. 9,366,418 ("Gifford"). 9 pages.
IPR2019-01094 Exhibit 1008. Declaration of Colby Chevalier ("Chevalier"). 89 pages.

(56) References Cited

OTHER PUBLICATIONS

IPR2019-01094 Exhibit 1009. U.S. Pat. No. 7,102,172 ("Lynch"). 41 pages.
IPR2019-01094 Exhibit 1010. Illuminating Engineering Society, ANSI RP-16-10, Nomenclature and Definitions for Illuminating Engineering (approved as an American National Standard Jul. 15, 2005, approved by the IES Board of Directors Oct. 15, 2005). 4 pages.
IPR2019-01094 Exhibit 1011. Underwriters Laboratories Inc. Standard for Safety, Standard UL-8750, entitled Light Emitting Diode (LED) Equipment for Use in Lighting (1st ed. 2009). 5 pages.
IPR2019-01094 Exhibit 1012. Celanese CoolPoly® D5502 Thermally Conductive Liquid Crystalline Polymer Specification ("CoolPoly"). 1 page.
IPR2019-01094 Exhibit 1013. Illuminating Engineering Society of North America, IES Lighting Handbook (John E. Kaufman and Howard Haynes eds., Application vol. 1981) ("Lighting Handbook"). 5 pages.
IPR2019-01094 Exhibit 1014. California Energy Commission, PIER Lighting Research Program: Project 2.3 Low-profile LED Luminaires Final Report (Prepared by Lighting Research Center, Jan. 2005) ("PIER LRP"). 70 pages.
IPR2019-01094 Exhibit 1015. Jim Sinopoli, Using DC Power to Save Energy and End the War on Currents, GreenBiz (Nov. 15, 2012), https://www.greenbiz.com/news/2012/11/15/using-dc-power-save-energy-end-war-currents ("Sinopoli"). 6 pages.
IPR2019-01094 Exhibit 1016. Robert W. Johnson, "Thought Leadership White Paper: AC Versus DC Power Distribution" (Nov. 2012) ("Johnson"). 10 pages.
IPR2019-01094 Exhibit 1017. Lumileds, Luxeon Rebel General Purpose Product Datasheet, Specification DS64 (2016) ("Luxeon Rebel"). 26 pages.
IPR2019-01094 Exhibit 1018. U.S. Pat. No. 8,454,204 ("Chang"). 11 pages.
IPR2019-01094 Exhibit 1019. U.S. Department of Energy, CALiPER Benchmark Report: Performance of Incandescent A-Type and Decorative Lamps and LED Replacements (prepared by Pacific National Laboratory, Nov. 2008) ("CALiPER 2008"). 25 pages.
IPR2019-01094 Exhibit 1020. U.S. Pat. No. 3,836,766 ("Auerbach"). 13 pages.
IPR2019-01094 Exhibit 1021. U.S. Department of Energy, CALiPER Application Summary Report 16: LED BR30 and R30 Lamps (prepared by Pacific Northwest National Laboratory, Jul. 2012) ("CALiPER 2012"). 26 pages.
IPR2019-01094 Exhibit 1022. Sandia National Laboratories, Sandia Report: "The Case for a National Research Program on Semiconductor Lighting" (Jul. 2000) ("Haitz"). 24 pages.
IPR2019-01094 Exhibit 1023. Sylvania, Post Top Street Light LED Retrofit Kit Specification, LED40POST (2009) ("Sylvania"). 4 pages.
IPR2019-01094 Exhibit 1024. Webster's New Collegiate Dictionary (1973) ("Webster's"). 2 pages.
IPR2019-01094 Exhibit 1025. 3M Wire Connectors and Tools Catalog 2013 ("3M Catalog"). 22 pages.
IPR2019-01094 Exhibit 1026. Wakefield Semiconductor Heat Sinks and Thermal Products 1974 Catalog ("Wakefield"). 3 pages.
IPR2019-01094 Exhibit 1027. U.S. Department of Energy, Solid-State Lighting Research and Development Portfolio: Multi-Year Program Plan FY'07-FY'12 (prepared by Navigant Consulting, Inc., Mar. 2006) ("DOE 2006"). 129 pages.
IPR2019-01094 Exhibit 1028. U.S. Department of Energy, Solid-State Lighting ResearA1023:C1043elopment: Multi-Year Program Plan (Apr. 2013) ("DOE 2013"). 89 pages.
Declaration of Colby Chevalier from Central District of California Civil Docket for Case #: 2:18-cv-07090-CAS-GJS filed Jun. 3, 2019, signed Jun. 3, 2019. 2 pages.
Docket Listing in Inter Partes Review of U.S. Pat. No. 9,964,266. Docket Navigator *AMP Plus, Inc. d/b/a Elco Lighting et al* v. *DMF, Inc*. PTAB-IPR2019-01094. Downloaded Mar. 25, 2020. 4 pages.
Petition for Inter Partes Review of U.S. Pat. No. 9,964,266 Pursuant to 37 C.F.R. § 42.100 et seq. *AMP Plus Inc. dbd Elco Lighting* v. *DMF, Inc*, PTAB-IPR2019-01500 filed Aug. 14, 2019. 99 pages.
Docket Listing in Inter Partes Review of U.S. Pat. No. 9,964,266 . *AMP Plus, Inc. d/b/a Elco Lighting et al* v. *DMF, Inc*. PTAB-IPR2019-01500. Downloaded Mar. 25, 2020. 3 pages.
Civil Action No. 2:18-cv-07090. Complaint For Infringement And Unfair Competition. *DMF, Inc.* v. *AMP Plus, Inc. d/b/a Elco Lighting*. 52 pages. Dated Aug. 15, 2018.
Docket Listing in Civil Action No. 2:18-cv-07090. *DMF, Inc.* v. *AMP Plus, Inc. d/b/a Elco Lighting et al* CDCA-2-18-cv-07090. Downloaded on Mar. 25, 2020. 39 pages.
Civil Action No. 2:19-cv-4519.Complaint For Patent Infringement. *DMF, Inc.* v. *AMP Plus, Inc. d/b/a Elco Lighting*. 23 pages dated May 22, 2019.
Docket Listing in Civil Action No. 2:19-cv-4519. *DMF Inc* v. *AMP Plus, Inc. d/b/a Elco Lighting et al* CDCA-2-19-cv-04519. Downloaded on Mar. 25, 2020. 3 pages.
Decision Denying Institution of Inter Partes Review of U.S. Pat. No. 9,964,266 in IPR2019-01500 dated Mar. 17, 2020. 21 pages.
Defendants' Notice of Prior Art Pursuant To 35 U.S.C. § 282 in Civil Action No. 2:18-cv-07090-CAS-GJS dated Feb. 28, 2020. 7 pages.
Defendant AMP Plus, Inc.'s Opposition to DMF's Motion for Summary Judgement in Civil Action No. 2:18-cv-07090-CAS-GJS filed Feb. 10, 2020. 32 pages.
Declaration of Eric Bretschneider, Ph.D In Support of Amp Plus, Inc.'s Opposition to Dmf, Inc.'s Motion for Partial Summary Judgment in Civil Action No. 2:18-cv-07090-CAS-GJS filed Feb. 10, 2020. 210 pages.
Plaintiff DMF's Reply in Support Of Motion For Partial Summary Judgment in Civil Action No. 2:18-cv-07090-CAS-GJS filed Feb. 18, 2020. 33 pages.
Declaration of James R. Benya In Support of Plaintiff DMF's Motion for Summary Judgment in Civil Action No. 2:18-cv-07090-CAS-GJS filed Feb. 3, 2020. 193 pages.
Underwriters Laboratories Inc. Standard for Safely. UL 1598. Luminaires Jan. 11, 2020. 12 pages.
Exceptional LED Lighting Technology Product Portfolio. LightingScience 2012. 11 pages.
"Cree LMH2 LED Modules," Mouser Electronics. Sep. 9, 2012. 4 pages.
Slim Line Disc. EYE LEDs Specification Sheet 2012. 2 pages.
HiBay LED Heat Sink. Wakefield-vette. Dec. 11, 2017. 1 pages.
Thermal Management of Cree® XLamp® LEDs. Cree Application Note. 2004. 19 pages.
Imtra Marine Lighting Fall 2007 Catalog. 32 pages.
Cree LMH2 LED Modules Product Family Data Sheet. Cree 2011-2014, 18 pages.
Cree LMH2 LED Modules Design Guide. Cree 2011-2015, 23 pages.
Brochure of Elco EL49A, EL49ICA, EL49RA modules. Elco Lighting Nov. 25, 2009. 1 page.
Image of Elco E347/247 module identified by Elco in response to DMF's Request for Production in Civil Action No. 2:18-cv-07090-CAS-GJS on Aug. 28, 2019. 1 page.
Screenshots from the Deposition of Brandon Cohen in Civil Action No. 2:18-cv-07090-CAS-GJS. Conducted Sep. 2, 2020. 8 pages.
Defendant AMP Plus, Inc.'s Initial Disclosure and Designation of Expert Witnesses in Civil Action No. 2:19-CV-4519-CAS. 37 pages.
Defendant AMP Plus, Inc. D/B/A Elco Lighting's Supplemental Responses to Plaintiff DMF, Inc.'s First Set of Interrogatories (Nos. 1-16) in Civil Action No. 2:19-CV-4519-CAS, Redacted. 13 pages.
Final Written Decision in IPR2019-01094 dated Nov. 19, 2020, 58 pages.
U.S. Appl. No. 14/183,424, filed Feb. 18, 2014, Danesh.
U.S. Appl. No. 14/726,064, filed May 29, 2015, Bailey et al.
U.S. Appl. No. 15/132,875, filed Apr. 19, 2016, Danesh.
U.S. Appl. No. 15/167,682, filed May 27, 2016, Bailey et al.
U.S. Appl. No. 14/942,937, filed Nov. 16, 2015, Peng et al.
U.S. Appl. No. 15/637,742, filed Jun. 29, 2017, Kopitzke, IV.
U.S. Appl. No. 15/688,266, filed Aug. 28, 2017, Lofti et al.
U.S. Appl. No. 15/853,400, filed Dec. 22, 2017, Kashani.

(56) References Cited

OTHER PUBLICATIONS

U.S. Appl. No. 15/901,738, filed Feb. 21, 2018, Danesh.
U.S. Appl. No. 15/947,065, filed Apr. 6, 2018, Danesh.
U.S. Appl. No. 16/016,040, filed Jun. 22, 2018, Danesh.
U.S. Appl. No. 16/200,393, filed Nov. 26, 2018, Danesh.
U.S. Appl. No. 29/638,259, filed Feb. 26, 2018, Danesh.
U.S. Appl. No. 29/541,565, filed Oct. 5, 2015, Peng.
U.S. Appl. No. 29/645,941, filed Apr. 30, 2018, Danesh et al.
U.S. Appl. No. 29/653,142, filed Jun. 11, 2018, Danesh et al.
U.S. Appl. No. 29/664,471, filed Sep. 25, 2018, Danesh et al.
U.S. Appl. No. 29/678,478, filed Jan. 29, 2019, Danesh et al.
U.S. Appl. No. 29/678,482, filed Jan. 29, 2019, Danesh et al.
U.S. Appl. No. 29/683,730, filed Mar. 15, 2019, Danesh et al.
U.S. Appl. No. 29/694,475, filed Jun. 11, 2019, Peng et al.
U.S. Appl. No. 16/653,497, filed Oct. 15, 2019, Danesh et al.
U.S. Appl. No. 29/711,198, filed Nov. 29, 2019, Danesh et al.
U.S. Appl. No. 16/690,970, filed Nov. 21, 2019, Nikooyan et al.
U.S. Appl. No. 16/719,361, filed Dec. 18, 2019, Danesh et al.
U.S. Appl. No. 16/522,275, filed Jul. 25, 201, Danesh.
U.S. Appl. No. 16/725,606, filed Dec. 23, 2019, Bailey et al.
U.S. Appl. No. 29/648,046, filed May 17, 2018, Williams.
U.S. Appl. No. 16/779,824, filed Feb. 3, 2020, Danesh.
U.S. Appl. No. 16/779,865, filed Feb. 3, 2020, Danesh et al.
U.S. Appl. No. 29/688,172, filed Apr. 18, 2019, Danesh et al.
U.S. Appl. No. 29/688,143, filed Apr. 18, 2019, Danesh et al.
U.S. Appl. No. 16/883,144, filed May 26, 2020, Nikooyan et al.
U.S. Appl. No. 29/696,830, filed Jul. 1, 2019, Kopitzke.
U.S. Appl. No. 16/182,481, filed Nov. 6, 2018, Kopitzke.
U.S. Appl. No. 29/762,016, filed Dec. 14, 2020, Williams et al.
U.S. Appl. No. 17/118,742, filed Dec. 11, 2020, Danesh et al.
U.S. Appl. No. 29/752,046, filed Sep. 24, 2020, Peng et al.
U.S. Appl. No. 17/229,668, filed Apr. 13, 2021, Shen.
U.S. Appl. No. 17/318,193, filed May 12, 2021, Danesh et al.
U.S. Appl. No. 17/080,080, filed Oct. 26, 2020, Danesh.
U.S. Appl. No. 17/220,779, filed Apr. 1, 2021, Kopitzke et al.
U.S. Appl. No. 17/395,522, filed Aug. 6, 2021, Danesh.
U.S. Appl. No. 17/385,766, filed Jul. 26, 2021, Kopitzke.
U.S. Appl. No. 17/384,564, filed Jul. 23, 2021, Kopitzke et al.
U.S. Appl. No. 17/381,147, filed Jul. 20, 2021, Lofti et al.
U.S. Appl. No. 17/379,748, filed Jul. 19, 2021, Young et al.
U.S. Appl. No. 17/379,489, filed Jul. 19, 2021, Vinh et al.
U.S. Appl. No. 17/378,214, filed Jul. 16, 2021, Kopitzke et al.
U.S. Appl. No. 17/374,674, filed Jul. 13, 2021, Danesh.
U.S. Appl. No. 17/234,421, filed Apr. 19, 2021, Danesh.
U.S. Appl. No. 29/764,875, filed Jan. 4, 2021, Danesh et al.
U.S. Appl. No. 29/759,492, filed Nov. 23, 2020, Danesh et al.
U.S. Appl. No. 17/099,650, filed Nov. 16, 2020, Danesh et al.
U.S. Appl. No. 29/757,754, filed Nov. 9, 2020, Danesh et al.
U.S. Appl. No. 17/473,934, filed Sep. 13, 2021, Danesh et al.
U.S. Appl. No. 29/467,026, filed Sep. 13, 2013, Danesh et al.
U.S. Appl. No. 14/823,410, filed Aug. 11, 2015, Williams et al.
U.S. Appl. No. 14/791,249, filed Jul. 2, 2015, Lee.
U.S. Appl. No. 15/158,538, filed May 18, 2016, Kashani.
U.S. Appl. No. 15/897,955, filed Feb. 15, 2018, Fardadi et al.
U.S. Appl. No. 29/648,937, filed May 24, 2018, Kopitzke.
Notice of Allowance Mailed Jun. 7, 2022 from U.S. Appl. No. 29/683,638, 7 pages.
Non-Final Office Action mailed Jun. 20, 2022 from U.S. Appl. No. 17/381,147, 4 Pages.
Non-Final Office Action mailed Jun. 22, 2022 from U.S. Appl. No. 29/759,492, 6 Pages.
Notice of Allowance mailed Jul. 11, 2022 from U.S. Appl. No. 29/696,830, 5 Pages.
Final Office Action received Jul. 11, 2022 from U.S. Appl. No. 29/711,198, 7 Pages.
Non-Final Office Action dated Oct. 25, 2022 from U.S. Appl. No. 17/099,650, 10 Pages.
Canadian Notice of Allowance dated Nov. 23, 2022 from Canadian Application No. 3,102,022, 1 Page.
Final Office Action dated Dec. 15, 2022 from U.S. Appl. No. 29/743,066, 16 pages.
Canadian Office Action dated Dec. 19, 2022 from Canadian Application No. 3,135,470, 5 pages.
Canadian Office Action dated Dec. 16, 2022 from Canadian Application No. 3,130,524, 6 pages.
Supplemental Notice of Allowance mailed Jan. 17, 2023 from U.S. Appl. No. 17/384,564 2 pages.
Office Action dated Jan. 24, 2023 from U.S. Appl. No. 17/677,300, 5 pages.
Notice of Allowance mailed Mar. 1, 2023 from U.S. Appl. No. 29/711,198, 7 pages.
Non-Final Office Action mailed Mar. 17, 2023 from U.S. Appl. No. 17/723,370, 5 pages.
Notice of Allowance mailed Mar. 29, 2023 from U.S. Appl. No. 17/666,441, 9 pages.
Opinion from the Fed. Ct. of App. in *AMP Plus, Inc.* v. *DMF, Inc.* in case Nos. 2021-1595, 2021-1636 (Appeals from the PTAB in IPR2019-01094) decided on Nov. 10, 2022, 15 pages.
Chinese Office Action and English Translation in Chinese Application No. CN 202210354716.6, dated Jul. 29, 2023, 13 pages.
Notice of Allowance mailed Apr. 10, 2023 from U.S. Appl. No. 29/743,066, 7 pages.
Final Office Action mailed Apr. 12, 2023 from U.S. Appl. No. 29/759,492, 8 Pages.
Non-Final Office Action dated May 8, 2023 from U.S. Appl. No. 17/677,300 , 7 Pages.
Non-Final Office Action dated Jul. 7, 2023 from U.S. Appl. No. 17/826,847, 8 Pages.
Canadian Office Action in Canadian Application No. CA 3,135,470 , dated Jul. 27, 2023, 4 pages.
Whaling Museum Chooses Imtra LED Lighting for Popular Exhibit, LEDs Magazine Sep. 17, 2010; https://www.ledsmagazine.com/company-newsfeed/article/16690837/whaling-museum-chooses-imtra-led-lighting-for-popular-exhibit, 3 pages.
Imtra supplied its LED lighting to USA. Whaling Museum; LEDinside, Sep. 20, 2010, https://www.ledinside.com/news/2010/9/news_Imtra_LED_20100920, 1 page.
Non-Final Office Action dated Aug. 31, 2023 from U.S. Appl. No. 17/379,489, 11 Pages.
U.S. Appl. No. 17/666,441, filed Feb. 7, 2022, Danesh et al.
U.S. Appl. No. 29/663,037, filed Sep. 11, 2018, Danesh et al.
U.S. Appl. No. 29/663,040, filed Sep. 11, 2018, Danesh et al.
U.S. Appl. No. 29/746,262, filed Aug. 12, 2020, Danesh et al.
U.S. Appl. No. 29/820,189, filed Dec. 20, 2021, Danesh et al.
U.S. Appl. No. 17/902,469, filed Sep. 2, 2022, Danesh.
U.S. Appl. No. 16/881,686, filed May 22, 2020, Danesh et al.
U.S. Appl. No. 17/085,636, filed Oct. 30, 2020, Danesh et al.
U.S. Appl. No. 17/867,522, filed Jul. 18, 2022, Danesh et al.
U.S. Appl. No. 17/000,702, filed Aug. 24, 2020, Danesh.
U.S. Appl. No. 17/677,300, filed Feb. 22, 2022, Danesh.
U.S. Appl. No. 17/933,257, filed Sep. 19, 2022, Danesh et al.
U.S. Appl. No. 16/886,365, filed May 28, 2020, Shen.
U.S. Appl. No. 13/484,901, filed May 31, 2012, Danesh.
U.S. Appl. No. 17/902,474, filed Sep. 2, 2022, Danesh.
U.S. Appl. No. 29/743,066, filed Jul. 17, 2020, Young et al.
U.S. Appl. No. 17/723,370, filed Apr. 18, 2022, Young et al.
U.S. Appl. No. 16/033,122, filed Jul. 11, 2018, Fardadi et al.
U.S. Appl. No. 29/867,928, filed Nov. 14, 2022, Kopitzke.
U.S. Appl. No. 29/683,638, filed Mar. 14, 2019, Kopitzke et al.
U.S. Appl. No. 29/867,213, filed Oct. 14, 2022, Kopitzke et al.
U.S. Appl. No. 17/582,921, filed Jan. 24, 2022, Kopitzke et al.
U.S. Appl. No. 17/826,847, filed May 27, 2022, Danesh.
U.S. Appl. No. 18/068,639, filed Dec. 20, 2022, Danesh et al.
U.S. Appl. No. 18/171,379, filed Feb. 20, 2023, Kopitzke et al.
U.S. Appl. No. 18/055,070, filed Nov. 14, 2022, Kumar.
International Search Report and Written Opinion in PCT/US 23/65292 dated Nov. 6, 2023, 31 pages.
Non-Final Office Action dated Oct. 5, 2023 from U.S. Appl. No. 17/328,214, 12 Pages.
Final Office Action dated Oct. 12, 2023 from U.S. Appl. No. 17/723,370, 25 Pages.

(56) References Cited

OTHER PUBLICATIONS

Non-Final Office Action dated Oct. 23, 2023 from U.S. Appl. No. 17/381,147, 4 Pages.
Notice of Allowance dated Feb. 5, 2024 from U.S. Appl. No. 17/826,848, 8 Pages.
Non-Final Office Action dated Jul. 25, 2024 in U.S. Appl. No. 18/501,219, 5 Pages.
Notice of Allowance dated Jul. 25, 2024 in U.S. Appl. No. 17/378,214, 16 Pages.
Non-Final Office Action dated Aug. 8, 2024 in U.S. Appl. No. 29/752,046, 9 pages.
Notice of Allowance dated Aug. 12, 2024 in U.S. Appl. No. 17/381,147, 8 pages.
Notice of Allowance dated Sep. 17, 2024 in U.S. Appl. No. 17/723,370, 9 pages.
Non-Final Office Action dated Jan. 10, 2025 in U.S. Appl. No. 18/678,652, 6 pages.
Notice of Allowance dated Jan. 15, 2025 in U.S. Appl. No. 18/501,219, 7 pages.
Notice of Allowance dated Jan. 13, 2025 in U.S. Appl. No. 17/379,489, 12 pages.
Notice of Allowance dated Apr. 9, 2025 in U.S. Appl. No. 18/171,379, 8 pages.
Notice of Allowance dated Apr. 30, 2025 in U.S. Appl. No. 18/501,219, 7 pages.
Final Office Action dated May 28, 2025 in U.S. Appl. No. 29/752,046 9 pages.
Redacted Findings of Fact and Conclusion in U.S. Dist. Ct. of California, CV 2:18-CV-07090-CA5CJS, Jul. 29, 2024, 67 pages.
Canadian Office Action in Canadian App. No. 3,073,988 dated Jan. 20, 2025, 7 pages.
Canadian Office Action in Canadian App. No. 3,115,146 dated Mar. 26, 2024, 4 pages.
Canadian Office Action in Canadian App. No. 3,115,146 dated Feb. 19, 2025, 4 pages.
Canadian Office Action in Canadian App. No. 3,125,954 dated Apr. 11, 2025, 4 pages.

* cited by examiner

LIGHTING MODULE WITH KEYED HEAT SINK COUPLED TO THERMALLY CONDUCTIVE TRIM

CROSS-REFERENCE TO RELATED APPLICATION(S)

The present application is a continuation of, and claims priority to, U.S. Non-Provisional Application Ser. No. 17/318,193, filed May 12, 2021, entitled "MINIATURE LIGHTING MODULE AND LIGHTING FIXTURES USING SAME," which is a Bypass Continuation Application of International Application No. PCT/US2020/050767, filed Sep. 14, 2020, entitled "MINIATURE LIGHTING MODULE AND LIGHTING FIXTURES USING SAME," which claims priority to U.S. Provisional Application No. 63/045,250, filed Jun. 29, 2020, entitled "LIGHTING MODULE HAVING INSULATING ENCLOSURE AND ELECTRICALLY ISOLATED ELECTRICAL CONNECTOR AND DRIVER," U.S. Provisional Application No. 63/016,215, filed Apr. 27, 2020, entitled "LIGHTING MODULE HAVING INSULATING ENCLOSURE AND ELECTRICALLY ISOLATED ELECTRICAL CONNECTOR AND DRIVER," and U.S. Provisional Application No. 62/899,348, filed Sep. 12, 2019, entitled "LIGHTING MODULE HAVING INTEGRATED ELECTRICAL CONNECTOR AND SWITCH AND LIGHTING FIXTURES USING SAME." Each of the aforementioned applications is incorporated by reference herein in its entirety.

BACKGROUND

A lighting fixture is a ubiquitous device that provides artificial lighting in various indoor and outdoor settings. Conventional lighting fixtures reliant on incandescent or compact fluorescent lamp (CFL) lighting have typically used replaceable bulbs where the bulb contains the components to receive an electrical input and to emit light. More recently, light emitting diode (LED)-based lighting fixtures have utilized lighting modules that contain LEDs and corresponding driver electronics to manage and control electrical inputs received by the lighting fixture. The lighting module, which in some implementations may be in the form of a bulb, provides users a convenient form to install and/or replace light emitting components in a lighting fixture.

SUMMARY

The Inventors, via previous innovative designs for lighting modules, have recognized and appreciated lighting modules with a light source, a driver, and a standardized connector packaged into a single device generally simplifies the installation of the lighting module into a lighting fixture. However, the Inventors have also recognized the integration of these various components and the resultant size and/or shape of the packaging may prevent conventional lighting modules from being installed into ceiling, wall, and/or floor spaces with limited interior space.

In particular, multi-family housing and commercial spaces often include limited ceiling and/or wall space separating different floors and/or rooms. For example, the distance between adjoining floors and/or rooms may be less than 4 inches, which may preclude the installation of some conventional lighting modules especially if the lighting module is installed as part of a recessed lighting fixture. The amount of space available within a ceiling and/or wall space for the lighting module may be further reduced by the presence of other structures and/or materials disposed within the ceiling and/or wall. For example, the ceiling and/or wall space typically contains wiring, thermal insulation, sound insulation, and building support structures (e.g., wood/metal joists, t-bars).

In some jurisdictions, a separate enclosure (e.g., a junction box, a luminaire housing) may also be required to physically separate the lighting module from the other structures and materials disposed within the ceiling and/or wall space. The shape and/or dimensions of the enclosure may be constrained by the limited space in the ceiling and/or wall. For example, an enclosure may have a depth of about 2.25 inches and a characteristic width of about 4 inches. The enclosure may also house one or more wires/cables together with the lighting module to supply and/or receive electrical power to and/or from the lighting module. In some implementations, the lighting module may also include wires/cables providing a dimmer signal (e.g., a 0-10V signal). The combination of the enclosure and the wiring may further limit the space available for the lighting module.

In recognizing the limitations of conventional lighting modules, the Inventors have further recognized several challenges associated with miniaturizing a lighting module that retains a light source, a driver, and a standardized connector within a single package. First, the lighting module should provide sufficient space to house and package various components including, but not limited to the light source, the driver, an optical element (e.g., a reflector, an optical lens), a ground connection, and/or an electrically insulating enclosure to insulate the driver while maintaining a sufficiently small envelope so that the lighting module may fit within the limited space of the ceiling/wall space and/or the enclosure.

Second, the limited interior space of the ceiling and/or wall space within which the lighting module is deployed may appreciably hinder the dissipation of heat generated by the light source and/or the driver. Specifically, the small amount of air surrounding the lighting module may be heated more rapidly and to higher temperatures, thus limiting the extent the lighting module is cooled by the air within the ceiling and/or wall space. The limited heat dissipation may be further exacerbated if the lighting module is inserted into an enclosure due, in part, to the further reductions to the amount of air surrounding the lighting module and the possibility that enclosure may be formed of a thermally insulating material.

In view of the foregoing, the present disclosure is directed to various inventive implementations of a lighting module with a light source, a driver, and a standardized connector assembled in a sufficiently small package to enable installation into a limited enclosed space (e.g., a ceiling, wall, or floor space, an enclosure). The lighting module may include a heat sink that houses various components of the lighting module. The heat sink may include a partition that defines, in part, two cavities. The lighting module may include a light source and an optical element (e.g., a reflector, an optical lens) disposed within one cavity. The lighting module may further include a retaining ring to cover and enclose the cavity containing the light source. The lighting module may further include a driver, which supplies electrical power to the light source, disposed in the other cavity. In this manner, the partition may provide a barrier that physically separates the light source and the driver, which may reduce the risk of electrical shock (e.g., when a user is accessing the first cavity to replace the optical element and/or the light source).

In some implementations, the lighting module may further include a driver enclosure to contain the driver, thus providing an electrically insulating barrier separating the driver from other electrically conducting materials in the lighting module (e.g., the heat sink). In some implementations, the lighting module may include an electrical connector electrically coupled to the driver via one or more wires where the electrical connector extends out from the heat sink to connect to an external power source. In some implementations, an electrical connector may be directly integrated into the driver enclosure to remove any dangling wires extending from the lighting module. In some implementations, a ground cable may be disposed in one or both of the cavities to electrically ground the heat sink, a trim coupled to the heat sink, and/or the driver to an external ground. In some implementations, the lighting module may further include a selectable switch electrically coupled to the driver to enable user to adjust a power level, lumen output, and/or a color temperature of the light emitted by the light source. The switch may be supported by the driver enclosure. In some implementations, the lighting module may also include a trim used, in part, to cover the exposed edges of an opening in a ceiling, wall, or floor and/or an enclosure.

In one aspect, the lighting module may be configured to fit into a space having a width as small as 2.4 inches, a height less than 2.25 inches, and/or a volume as small as 18 cubic inches. This may be achieved, in part, by reducing the exterior dimensions of the lighting module. In some implementations, the exterior dimensions of the lighting module may be determined primarily by the heat sink. The heat sink may have an exterior width less than about 3 inches and/or an exterior height less than about 1.6 inches. The heat sink may further include one or more keyed features that reduces the width of at least part of the heat sink such that the heat sink is able to fit into a space having a width less than 2.4 inches. It should be appreciated that the lighting module described herein may be installed into larger spaces as well. For example, different-sized trims may be coupled to the lighting module with attachment mechanisms (e.g., a metal clip) arranged to facilitate installation to a particular-sized enclosure. In another example, the trim may include attachment mechanisms (e.g., a spring clip) to facilitate installation of the lighting module directly onto a ceiling or wall space without the use of an enclosure.

Generally, the lighting module may be installed into a ceiling, wall, or floor space or an enclosure disposed within the ceiling, wall, or floor space. In some implementations, the enclosure may be a 3/0 or 4/0 standard electrical junction box or a 4-10 inch recessed lighting fixture. In implementations where the lighting module is inserted into an enclosure, the enclosure may include one or more tabs and/or posts disposed within a cavity of the enclosure. The tabs and/or posts may provide at least one opening. The lighting module and, in particular, the heat sink may include corresponding opening(s) (e.g., a hole or a slot on a flange of the heat sink) that align with the opening(s) of the enclosure. A fastener may thus be inserted through the respective openings of the lighting module and the enclosure to attach the lighting module to the enclosure.

Due to the dimensional constraints imposed on the overall size of the lighting module, the lighting module and, in particular, the heat sink may include a sidewall with the one or more keyed features to provide sufficient clearance for the lighting module to be inserted into the enclosure without being obstructed by the one or more tabs and/or posts. For example, the enclosure may include a pair of posts and the heat sink may include two curved portions as the keyed features. The curved portions may be disposed diametrically opposite with respect to one another along the sidewall and extend into one or both cavities of the heat sink in order to provide a groove that allows the heat sink to be inserted between the pair of posts. The keyed features may be disposed near the opening(s) of the heat sink used to couple the lighting module to the enclosure. In some implementations, the pair of posts may be separated by a distance of about 2.4 inches.

In another aspect, the heat sink may include a flange that provides an interface to attach the trim to the heat sink. Specifically, the flange may include one or more receptacles that may each receive a connector on the trim. In some implementations, the receptacles may be disposed along an annular portion of the flange such that the receptacles do not intersect an outer edge or outer periphery of the flange. The receptacles, however, may be disposed along an inner edge of the annular portion of the flange. In some implementations, the receptacles may be shaped to form either a snap-fit connection or a twist-and-lock connection with the connectors of the trim. In some implementations, the connectors of the trim may each be a metal clip that is coupled to a base section of a main body of the trim using, for example, a fastener. The metal clip may include a first connecting end that is insertable into the receptacles of the heat sink to facilitate attachment of the trim to the heat sink. The metal clip may also include a second connecting end to couple the trim to a surface of an enclosure (e.g., the second connecting end functions as a friction clip).

In some implementations, the heat generated by the light source and/or the driver may be dissipated to the ambient environment primarily via the trim. In particular, the heat generated by the light source and/or the driver may be transferred to the partition and/or the sidewall of the heat sink where the heat may then conduct towards the flange. The annular portion of the flange may physically contact the base section of the trim, thus enabling the heat to transfer directly to the trim via heat conduction. Once the heat is transferred to the trim, the heat may be dissipated to the ambient environment via convection. In some implementations, the annular portion of the flange and the base section may be shaped and/or dimensioned to provide a sufficiently large contact area to transfer heat so that the light source may maintain a temperature below 125° C. The receptacle(s) and the connector(s) may also be shaped such that the heat sink and the trim are pressed against one another when the connector is secured to the receptacle. In some implementations, the contact between the heat sink and the trim may be sufficient such that the temperature drop from the heat sink to the trim is less than or equal to 20° C. to provide sufficient heat flow from the heat sink to the trim and from the trim to the ambient environment (e.g., air). The contact force may reduce the thermal contact resistance between the annular portion of the flange and the base section of the trim, thus increasing the rate of heat transfer from the heat sink to the trim. The trim and the heat sink may also be formed of a thermally conductive material, such as aluminum to further improve cooling of the lighting module.

It should be appreciated, however, that in other implementations the heat generated by the light source and/or the driver may be partially dissipated from the sidewall of the heatsink and into the surrounding air within the enclosure and/or the ceiling or wall space. For example, the lighting module may be installed into a sufficiently large enclosure and/or a sufficiently large ceiling or wall space such that cooling of the lighting module may be achieved via heat conduction to the trim and convection or thermal radiation from the heat sink to the surrounding space within the enclosure and/or the ceiling or wall space.

In some implementations, the contact between the heat sink and the trim may also electrically ground the trim to the heat sink. For example, the heat sink and the trim may each be formed of an electrically conductive material (e.g., aluminum). A portion of the receptacle (e.g., a ledge forming part of a snap-fit connection or twist-and-lock connection with the connector of the trim) may expose the electrically conductive material. This portion of the receptacle may physically contact the connector of the trim (e.g., a metal clip), thus forming an electrical connection that grounds the trim to the heat sink. In some implementations, the heat sink may be painted (e.g., with a black paint) and/or coated (e.g., anodized) with the exception of the portion of the receptacle that contacts the connector of the trim as described above.

In another aspect, the driver enclosure, which may generally be formed of an electrically insulating material, may be implemented in several way to electrically insulate the driver. In one example, the driver enclosure may include a driver cover with a base and a sidewall defining a cavity to contain the driver. The driver cover may be oriented such that the cavity containing the driver and the driver enclosure is substantially covered and enclosed. The driver may be disposed within the cavity of the driver cover and suspended near the partition of the heat sink without physically contacting the partition. In some implementations, an electrically insulating film may be placed onto the partition to separate the driver from the heat sink. In some implementations, the cavity of the driver cover may be filled with a potting compound that encapsulates the driver.

In another example, the driver enclosure may include a driver housing with a base and a sidewall defining the cavity of the driver enclosure. The base of the driver housing may rest on the partition of the heat sink. In this example, the driver cover may be shaped as a lid to cover and enclose the driver housing. Thus, the driver cover and the driver housing may form a substantially enclosed cavity to contain the driver. In some implementations, the driver cover and the driver housing may be assembled using tool-less coupling mechanisms (e.g., snap-fit connectors). However, it should be appreciated that in other implementations the driver cover and the driver housing may be assembled using other coupling mechanisms that involve use of a tool, such as a screw fastener or a bolt fastener. In yet another example, the driver enclosure may include two driver casings that each form part of the cavity of the driver enclosure. The driver casings may each have a sidewall that contacts one another along a parting line. Once assembled, the driver casings may form a substantially enclosed cavity to contain the driver.

As described above, the lighting module may also include an electrical connector that is integrated into the driver enclosure. In some implementations, the driver enclosure may be configured to electrically isolate the driver and the electrical connector such that the lighting module may safely operate without a separate ground connection. The exclusion of a ground cable may simplify the installation of the lighting module. With this arrangement, the driver may also be qualified as a class II power unit according to, for example, the standards set forth by the International Electrotechnical Commission (IEC).

In some implementations, the driver enclosure may also be shaped to substantially fill one of the cavities of the heat sink. For example, the driver enclosure may also include keyed features that align and conform with respective keyed features on the heat sink as described above. In some implementations, the driver enclosure may be fully disposed within the cavity of the heat sink such that no portion of the driver enclosure extends out from the envelope of the heat sink. For example, a top side of the driver enclosure may be substantially flush with the an opening of the cavity.

In another aspect, the lighting module described herein may also be "universal" where the lighting module is deployable in different types of lighting fixtures (e.g., in terms of one or more of form factor, size, electrical connection requirements) for different lighting applications. Said in another way, the lighting module may be interchangeable between lighting fixtures of different types and/or sizes to facilitate easy installation and replacement by those who are not experienced electrical contractors or lighting designers (e.g., homeowners, do-it-yourself enthusiasts, etc.). In this manner, a single type of lighting module may be used in different lighting fixtures across different built environments, thus simplifying installation and maintenance.

The lighting modules described herein may have a sufficiently compact form factor that enables the lighting module to fit into various types of lighting fixtures or other enclosures for the lighting module; examples of such containers/enclosures or lighting fixtures include, but not limited to, various types of electrical junction boxes, a recessed lighting fixture (e.g., a "can" housing of a recessed lighting fixture, a down light fixture), a wall sconce lighting fixture, under cabinet lighting, a cylinder light fixture, a surface mount lighting fixture, a pendant lighting fixture, a floodlight fixture, an outdoor lighting fixture (e.g., a tree lighting fixture, a step lighting fixture, a ground or pathway lighting fixture, a garden lighting fixture, a landscape lighting fixture), and a security lighting fixture.

In one exemplary implementation, a lighting module includes a heat sink with a sidewall defining a first cavity with an open end and a flange coupled to the sidewall and disposed along the open end of the first cavity having an annular portion with an outer edge and one or more receptacles, disposed on the annular portion without intersecting the outer edge, to receive one or more connectors of a trim when the trim is coupled to the heat sink. The lighting module further includes a driver, coupled to the heat sink, to receive an electrical power input from an external power source and to supply an electrical power output and a light source, disposed within the first cavity, to emit light based on the electrical power output.

In another exemplary implementation, a lighting module includes a heat sink comprising a rear end face, a sidewall coupled to the rear face and defining an interior cavity where the sidewall has at least one exterior width dimension such that at least a portion of the sidewall proximate to the rear face fits into a space having a width of less than 2.4 inches, a front end face that surrounds an aperture of the interior cavity and at least one connecting mechanism to couple a trim to the front end face of the heat sink. The lighting module further includes a light source positioned inside the interior cavity of the heat sink and including at least one light emitting diode (LED) and a driver, positioned inside the interior cavity of the heat sink, to receive electrical energy and supply regulated electrical energy to power the light source.

In another exemplary implementation, a lighting module includes a heat sink having a rear end face, a sidewall, and a front end face, the sidewall having at least one exterior width dimension such that at least a portion of the sidewall fits into a space having a width of less than 2.4 inches. The lighting module further includes a light source inside the heat sink, a driver, inserted through the rear end face of the heat sink, to power the light source where the driver is insulated from the heat sink and coupled to the heat sink using a connecting mechanism, one of a reflector or optical lens inside the heat sink to direct light produced by the light source out of the heat sink and into an area surrounding the lighting module, a retaining ring having a flat portion with a front surface, wherein at least a portion of the front surface of the retaining ring is substantially coplanar with an exterior surface of the front end face of the heat sink, and at least one connecting mechanism to couple a trim to the front end face of the heat sink.

In another exemplary implementation, a lighting module includes a heat sink comprising a sidewall and a partition coupled to the sidewall where the sidewall and the partition together define a first cavity and a second cavity. The lighting module further includes a driver enclosure coupled to the heat sink so as to substantially enclose the first cavity where the driver enclosure is formed of an electrically insulating material, a driver, disposed within the first cavity, to receive an electrical power input from an external power source and to supply an electrical power output, a light source, disposed in the second cavity, to emit light based on the electrical power output, and a switch, at least partially disposed in the first cavity and electrically coupled to the driver, to adjust a power output of the light emitted by the light source.

In another exemplary implementation, a lighting module includes a heat sink comprising a sidewall (1130) defining a first cavity with an open end and a flange coupled to the sidewall and disposed along the open end of the first cavity. The lighting module further includes a light source, disposed within the first cavity, to emit light and a trim, directly coupled to the flange of the heat sink, to cover an opening of a ceiling or wall space when the lighting module is installed into the ceiling or wall space. The heat sink and the trim are each formed of an electrically and thermally conductive material, the heat sink is thermally coupled to the trim such that heat generated by the light source is dissipated primarily to the trim through the flange of the heat sink, and the trim is electrically grounded to the heat sink.

In another exemplary implementation, a lighting module includes a heat sink comprising a sidewall, a partition coupled to the sidewall where the sidewall and the partition together define a first cavity and a second cavity, and a flange coupled to the sidewall and disposed along an open end of the first cavity, having a flat portion with an outer edge and one or more receptacles, disposed on the flat portion without intersecting the outer edge, to receive corresponding connectors of a trim when the trim is coupled to the heat sink where the one or more receptacles form a portion of at least one of a snap-fit connector or a twist-and-lock connector. The lighting module further includes a driver enclosure, fully disposed within the first cavity, defining a substantially enclosed driver cavity where the driver enclosure is formed of an electrically insulating material. The driver enclosure comprises a driver cover having a driver sidewall separating the driver cavity from the sidewall of the heat sink and a driver base covering the first cavity of the heat sink and the driver cavity and an insulating film, disposed on the partition of the heat sink and abutting the driver sidewall, to separate the driver cavity from the partition of the heat sink. The lighting module further includes a driver, disposed within the driver cavity, to receive an electrical power input and to supply an electrical power output, a light source, disposed in the second cavity and electrically coupled to the driver, to emit light based on the electrical power output, and at least one switch, at least partially disposed in the first cavity and electrically coupled to the driver, to adjust one of a power output, a lumen output, or a color temperature of the light emitted by the light source.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1I shows an exploded bottom perspective view of the lighting module of FIG. 1A.

FIG. 22D shows a bottom view of the driver cover of FIG. 22A.

FIG. 22E shows a front view of the driver cover of FIG. 22A.

FIG. 22F shows a left-side view of the driver cover of FIG. 22A.

FIG. 23A shows a top perspective view of a heat sink in the lighting module of FIG. 21A.

FIG. 23B shows a bottom perspective view of the heat sink of FIG. 23A.

FIG. 23C shows a top view of the heat sink of FIG. 23A.

FIG. 23D shows a bottom view of the heat sink of FIG. 23A.

FIG. 23E shows a front view of the heat sink of FIG. 23A.

FIG. 23F shows a left-side view of the heat sink of FIG. 23A.

FIG. 23G shows a top perspective cut-away view of a receptacle in the heat of FIG. 23A.

FIG. 23H shows a bottom perspective cut-away view of a receptacle in the heat of FIG. 23A.

FIG. 24A shows a top perspective view of a light source holder in the lighting module of FIG. 21A.

Figure 24A:
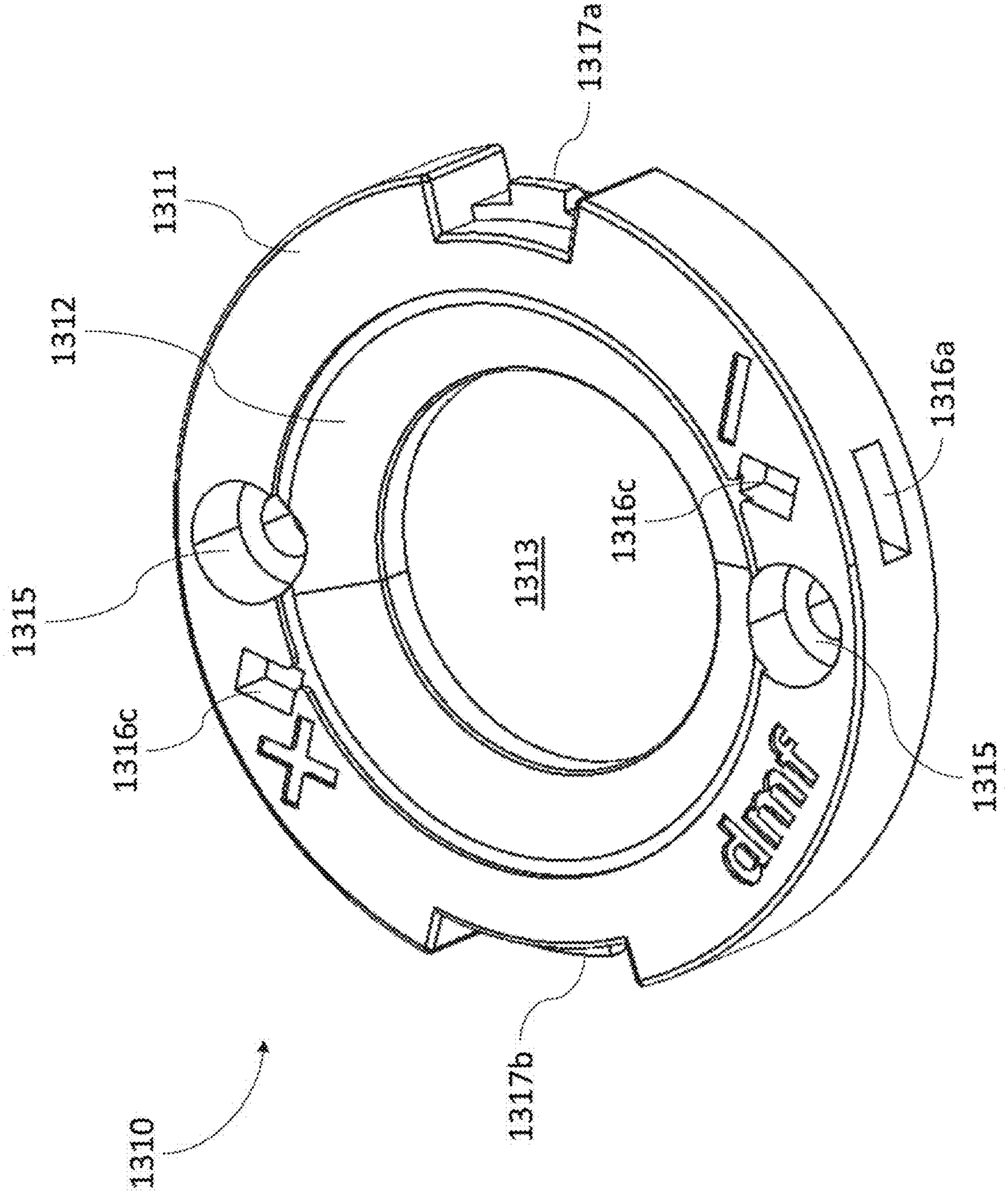
Figure 24B:
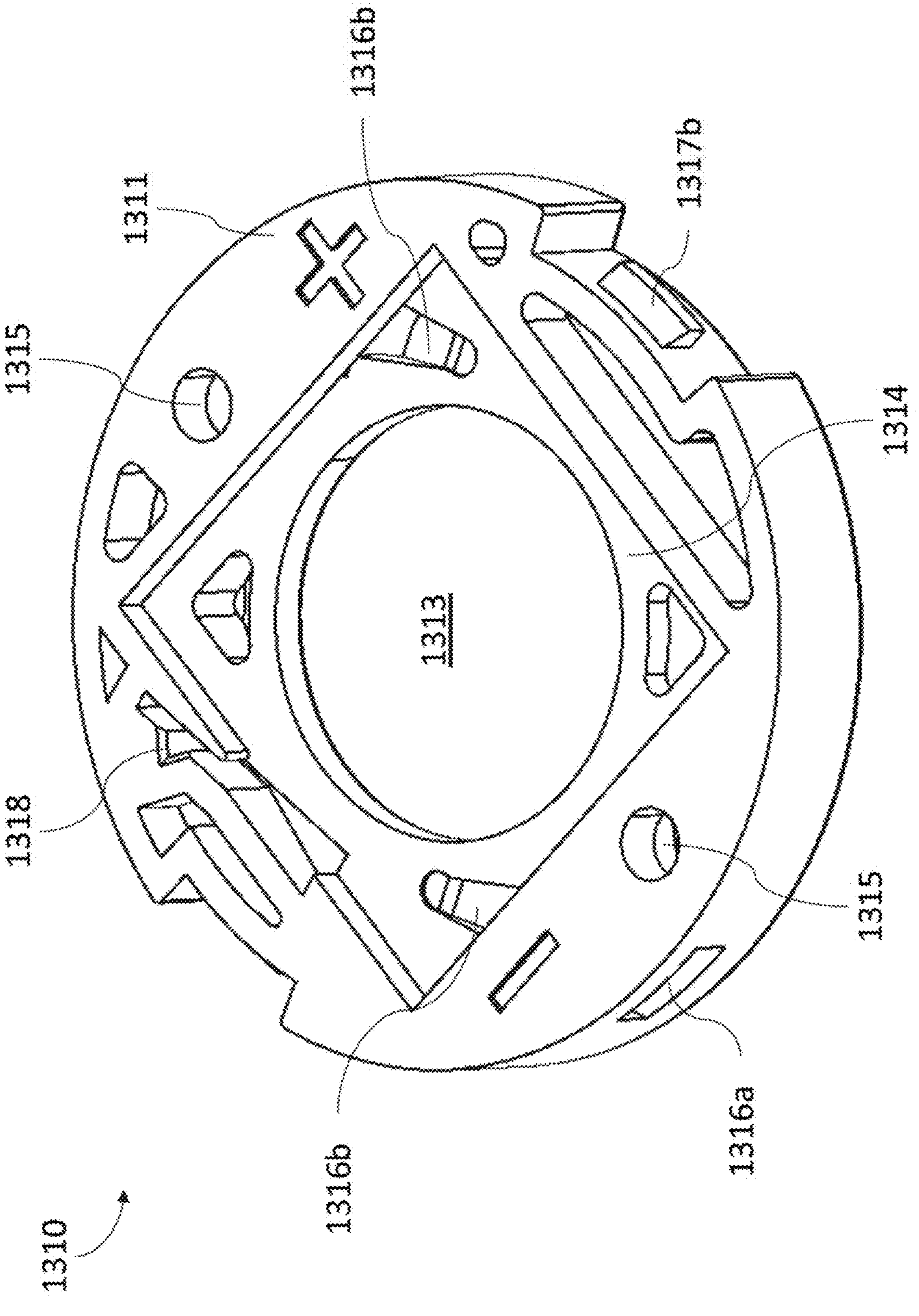

FIG. 24B shows a bottom perspective view of the light source holder of FIG. 24A.

Figure 24C:
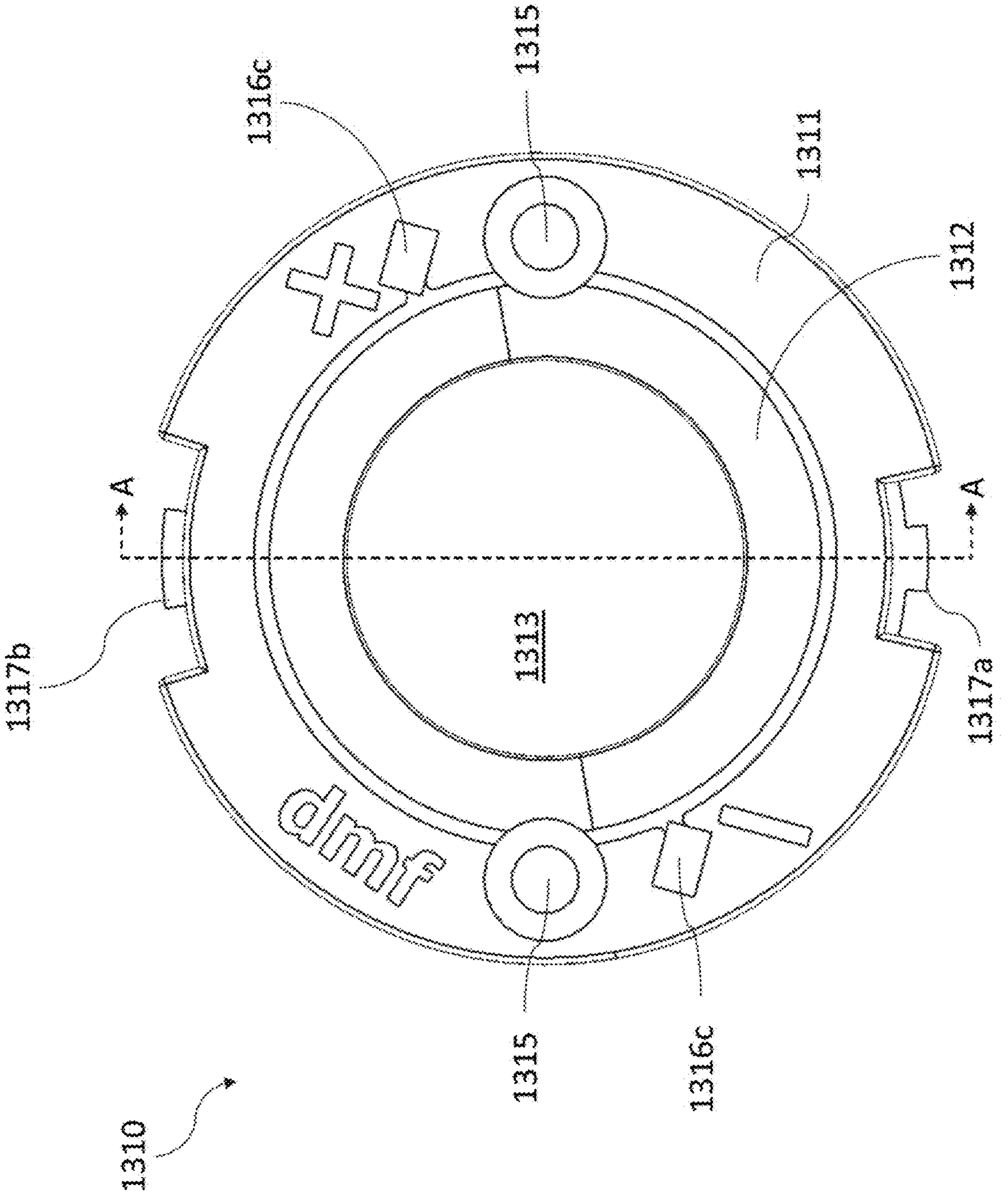

FIG. 24C shows a top view of the light source holder of FIG. 24A.

Figure 24D:
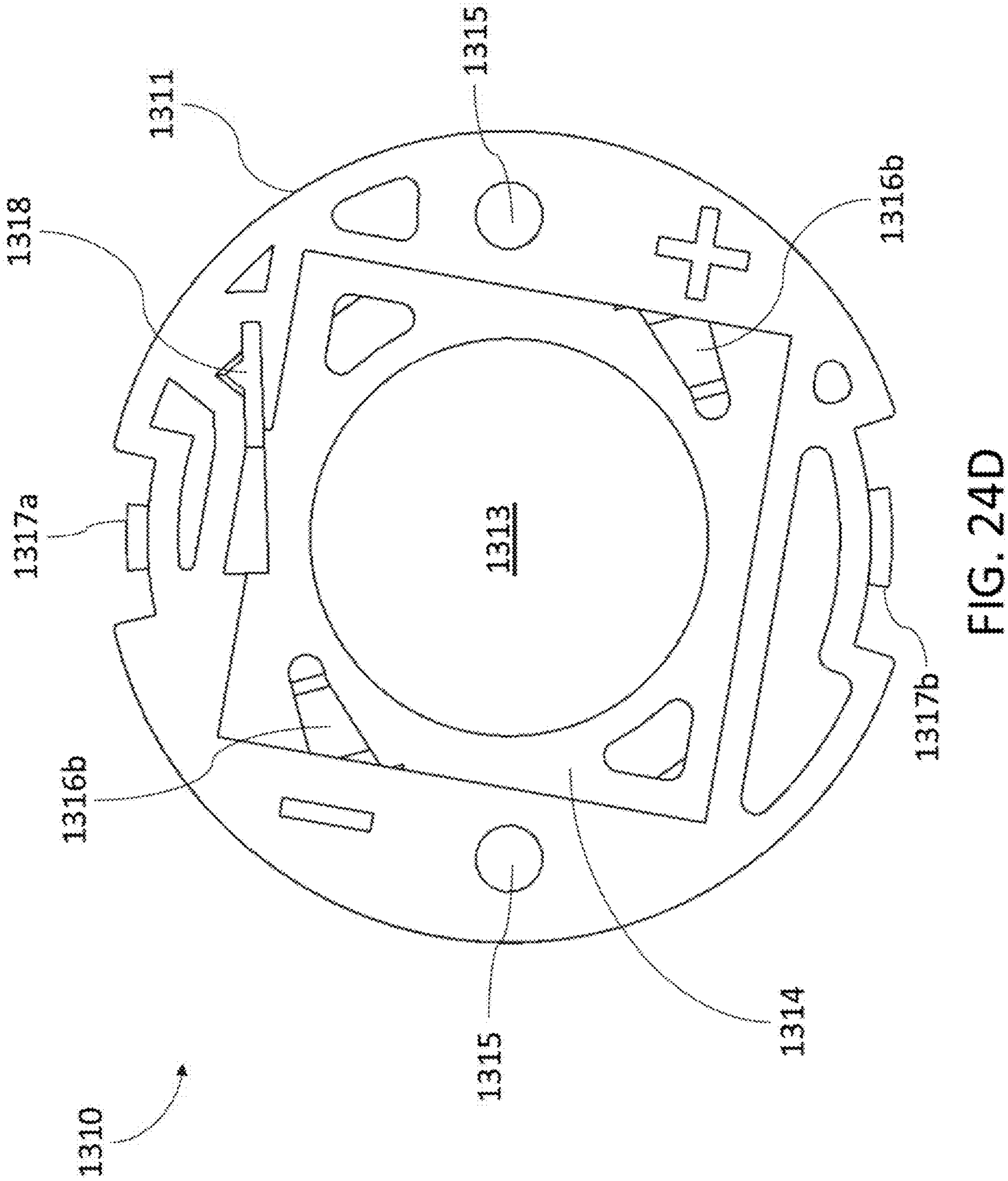

FIG. 24D shows a bottom view of the light source holder of FIG. 24A.

Figure 24E:
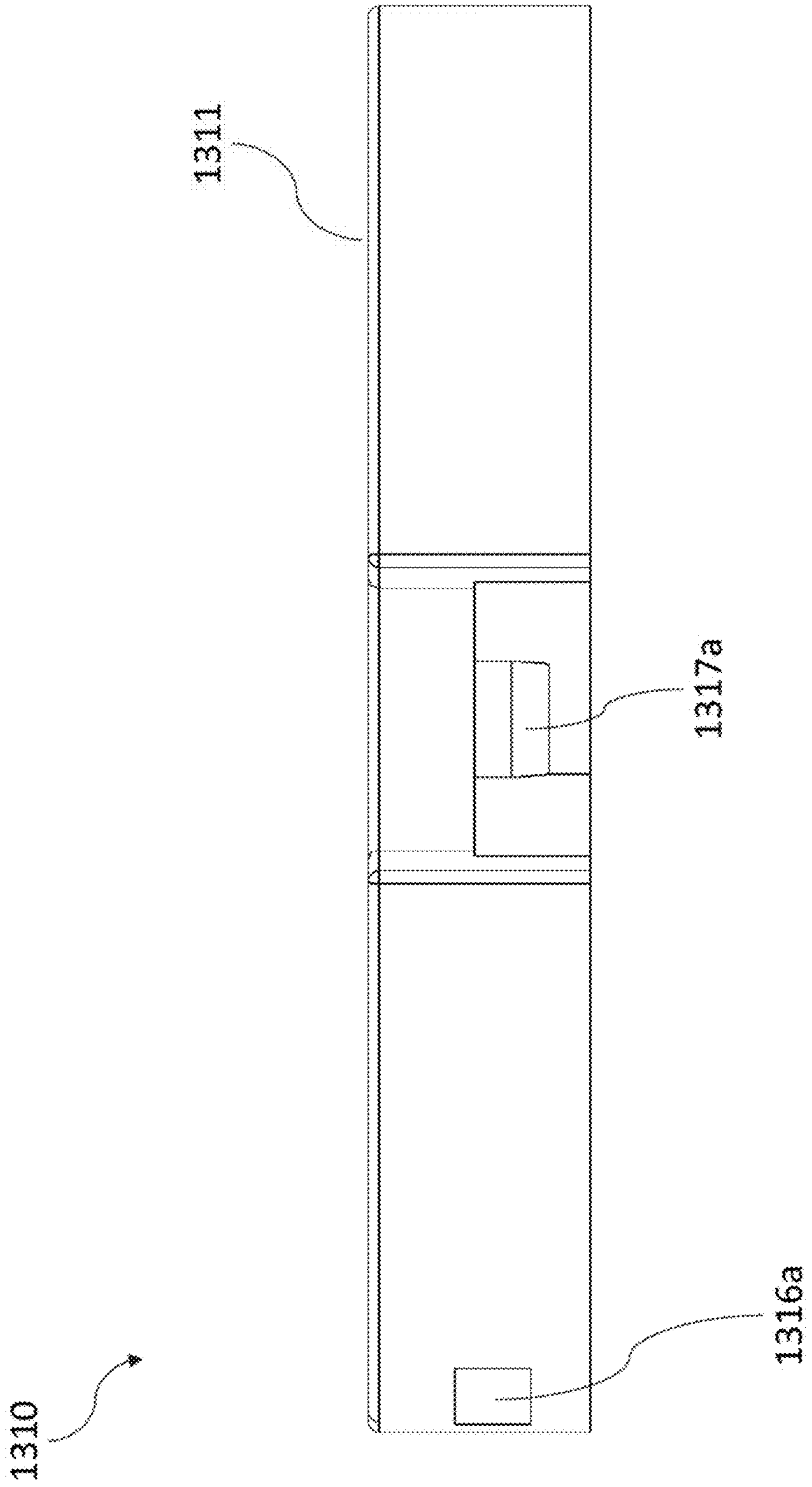

FIG. 24E shows a front view of the light source holder of FIG. 24A.

Figure 24F:
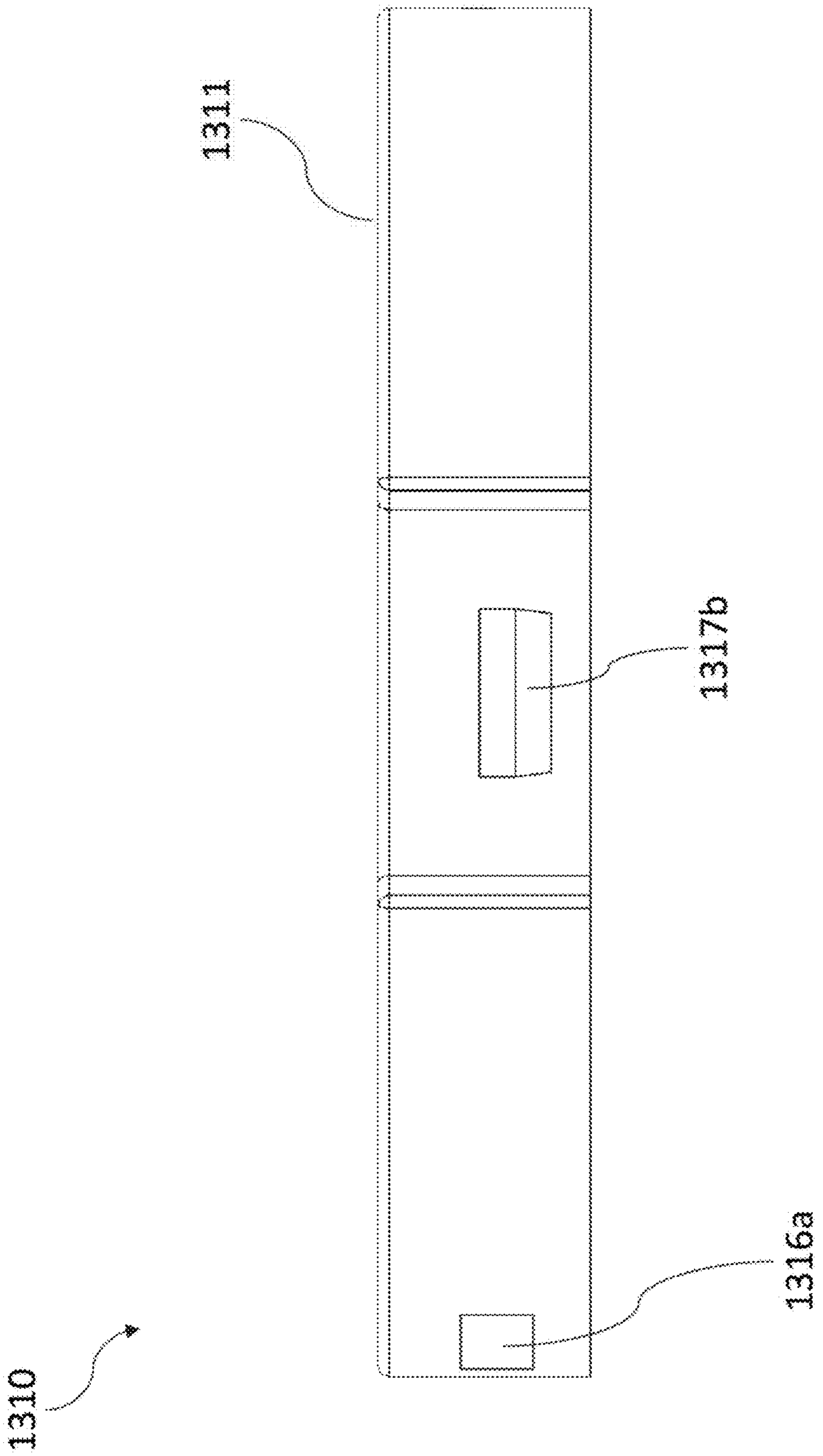

FIG. 24F shows a rear view of the light source holder of FIG. 24A.

Figure 24G:
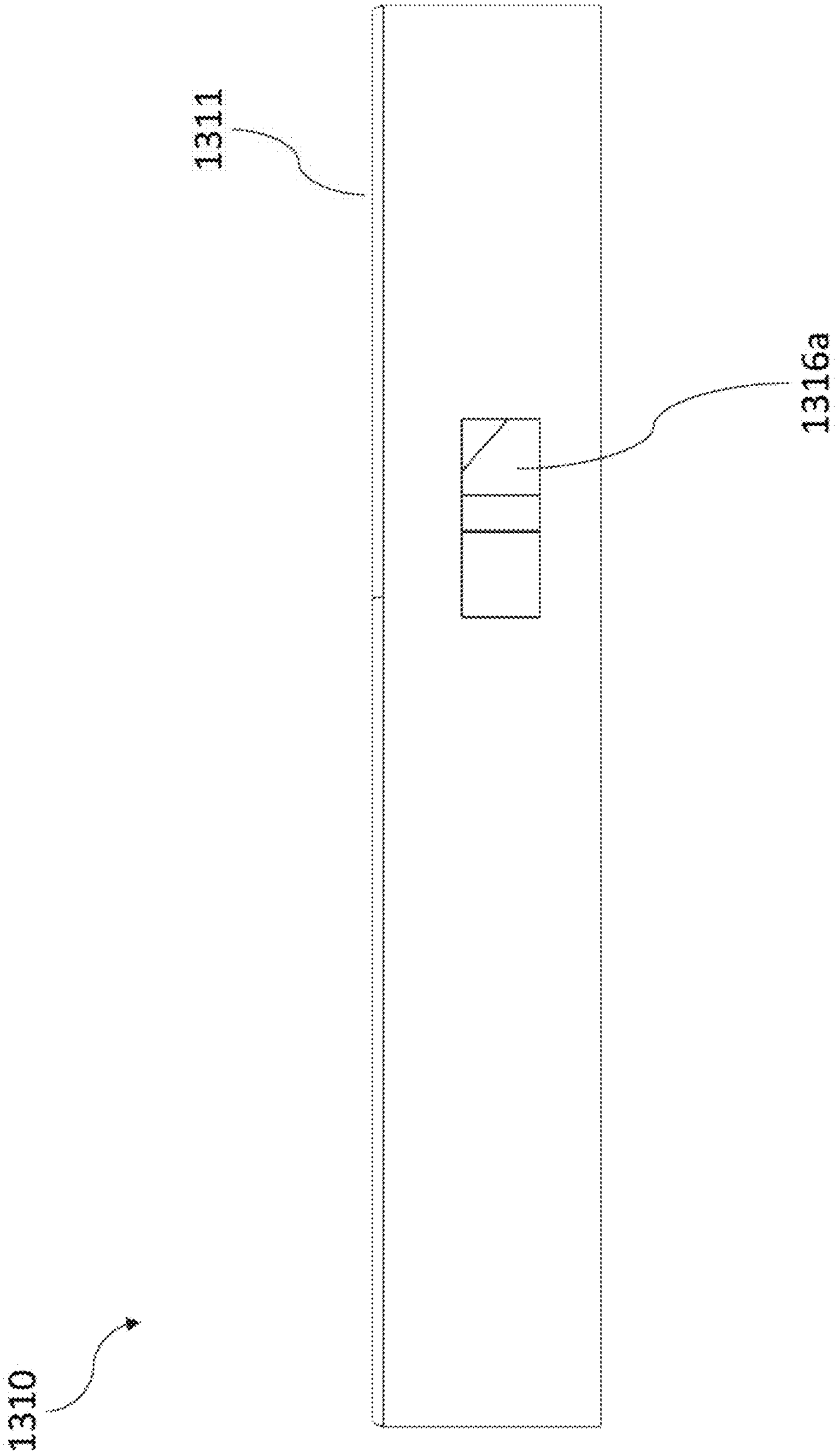

FIG. 24G shows a right-side view of the light source holder of FIG. 24A.

Figure 24H:
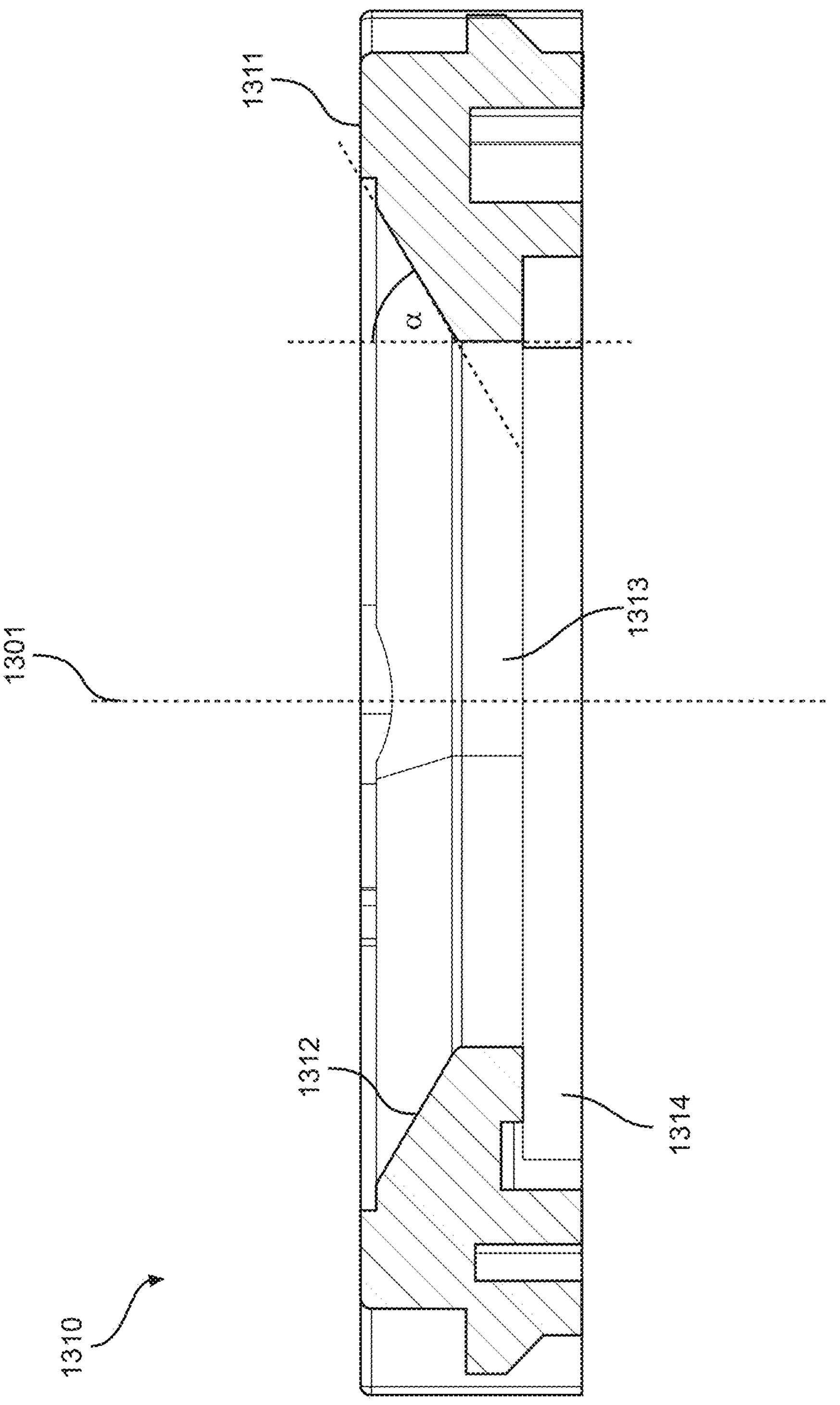

FIG. 24H shows a cross-sectional view of the light source holder corresponding to the cross-section A-A of FIG. 24C.

Figure 25A:
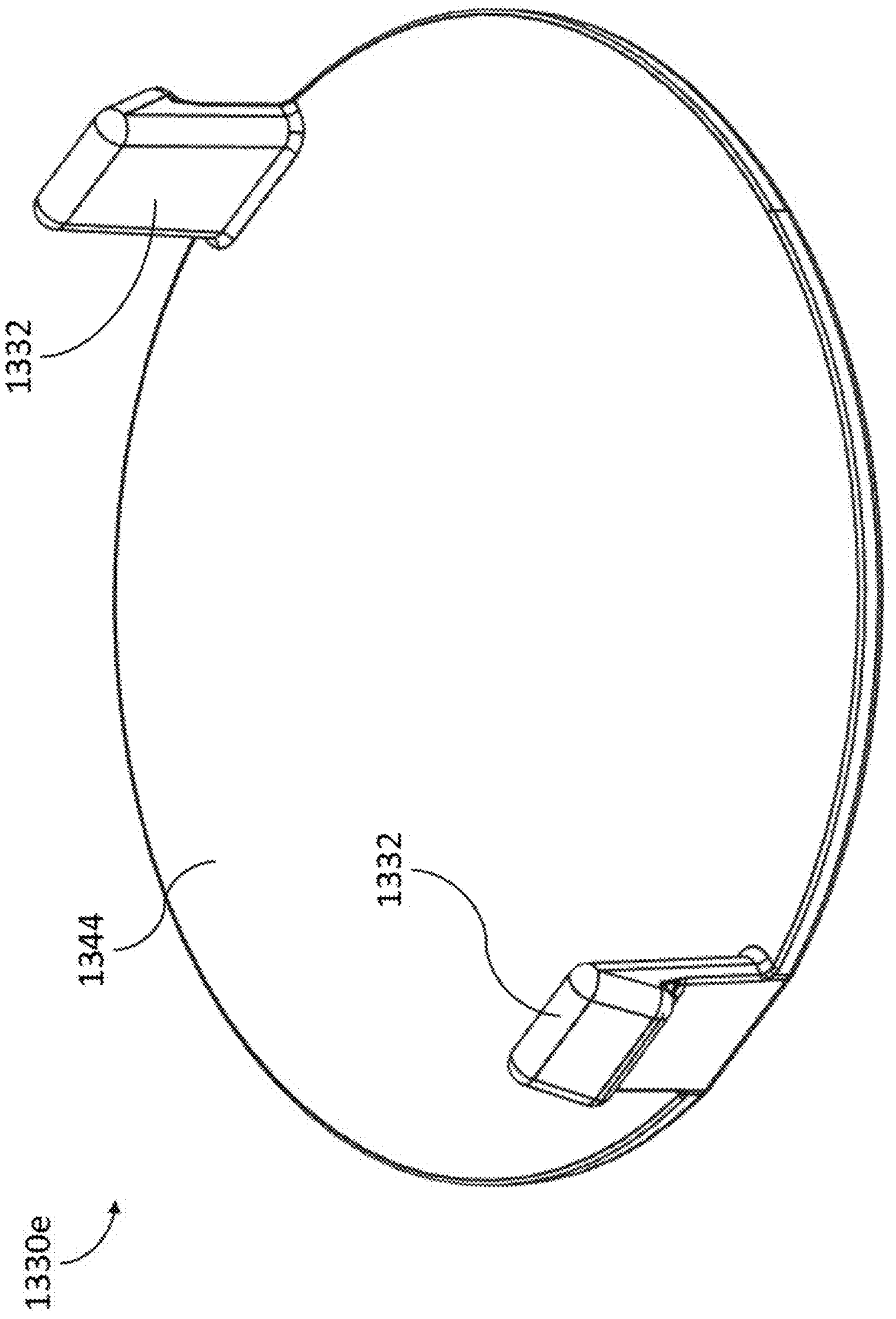

FIG. 25A shows a top perspective view of a retaining ring in the lighting module of FIG.

Figure 25B:
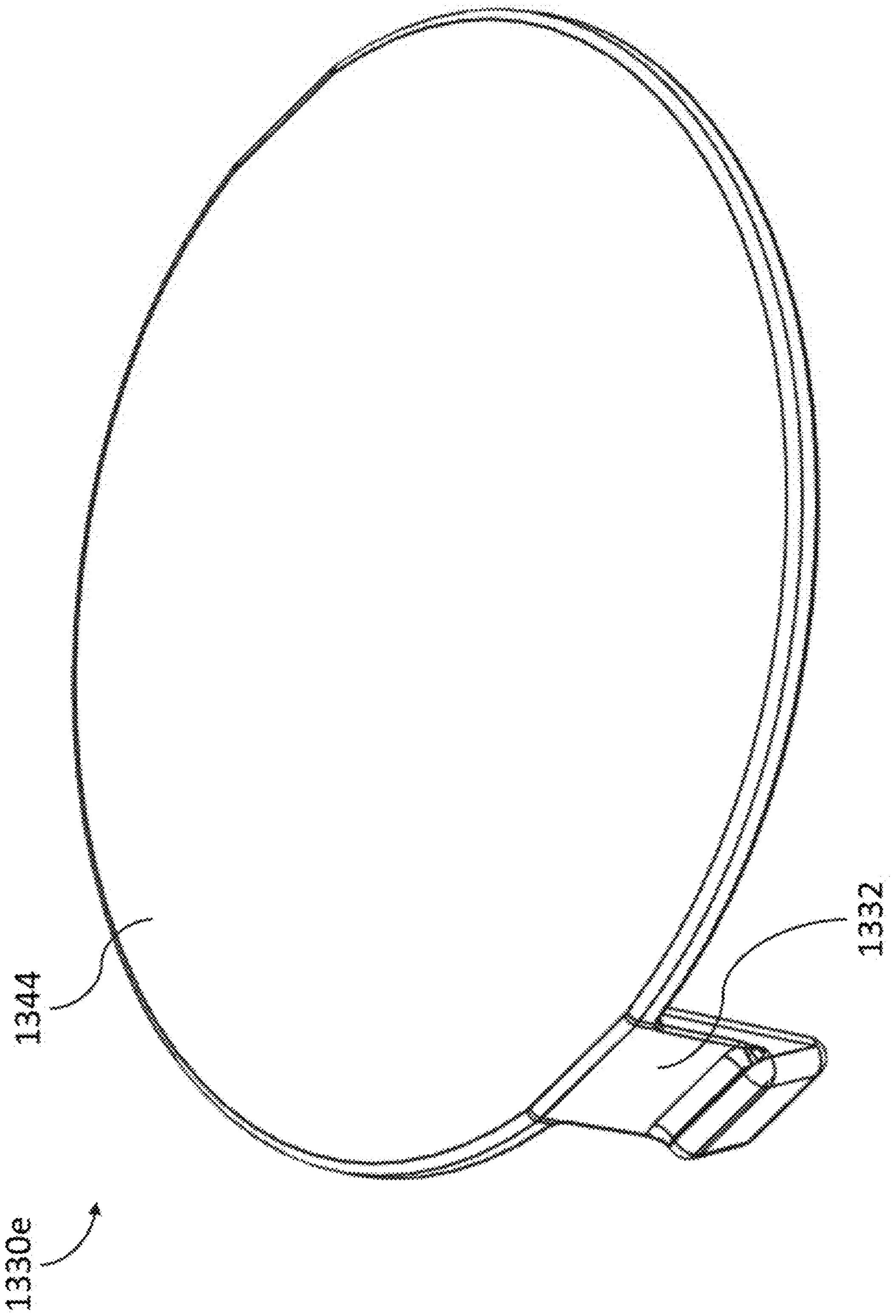

FIG. 25B shows a bottom perspective view of the retaining ring of FIG. 25A.

Figure 25C:
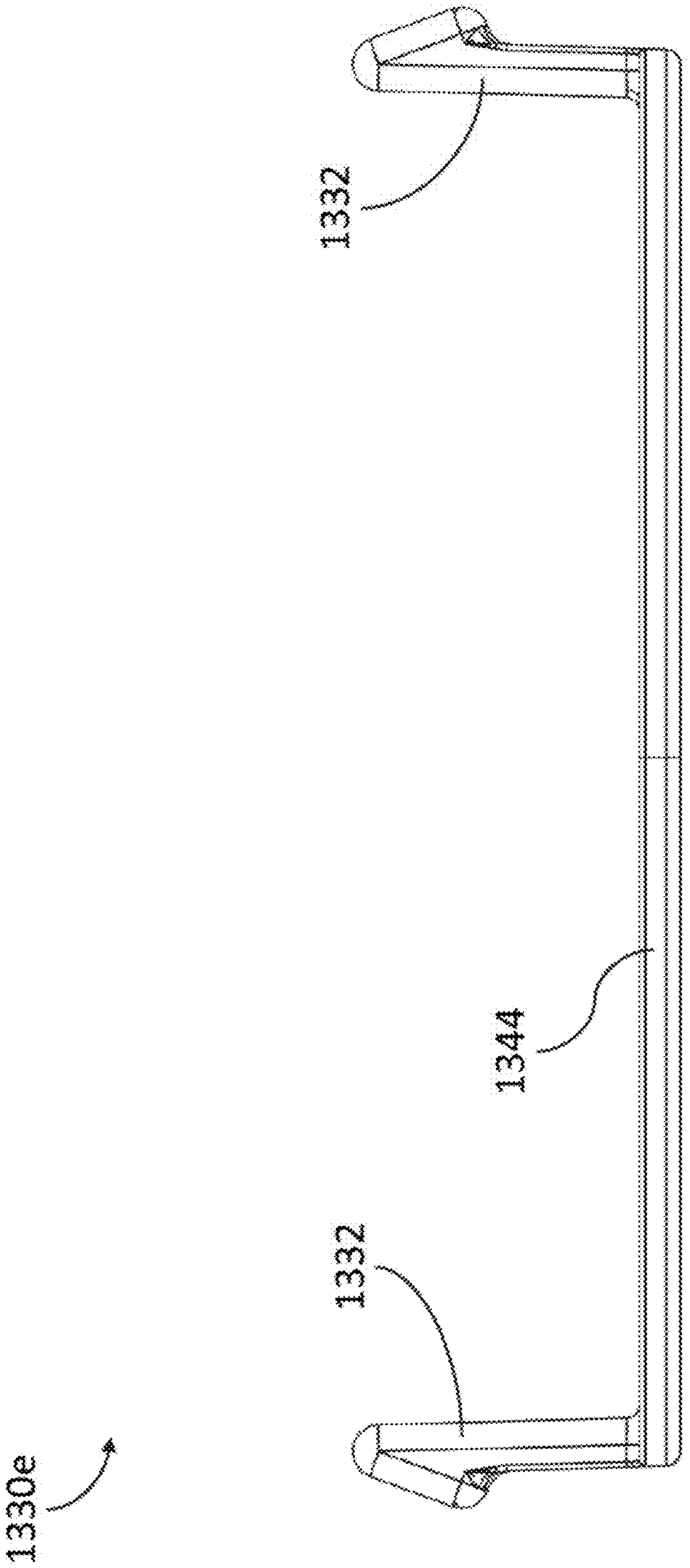

FIG. 25C shows a front view of the retaining ring of FIG. 25A.

Figure 20A:
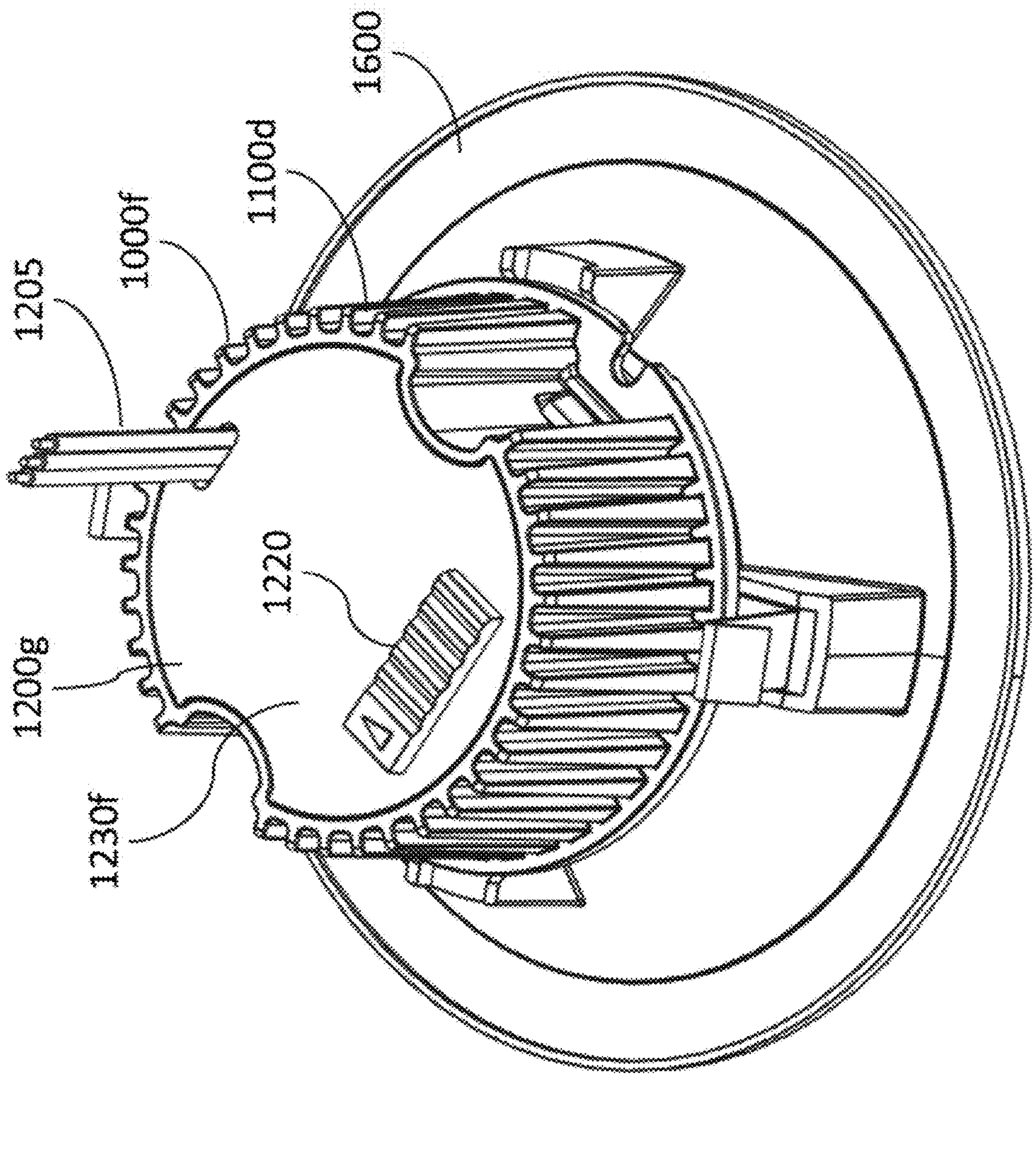
FIG. 20A shows a top perspective view of an exemplary lighting module with a ground connection coupled to a trim.
Figure 20B:
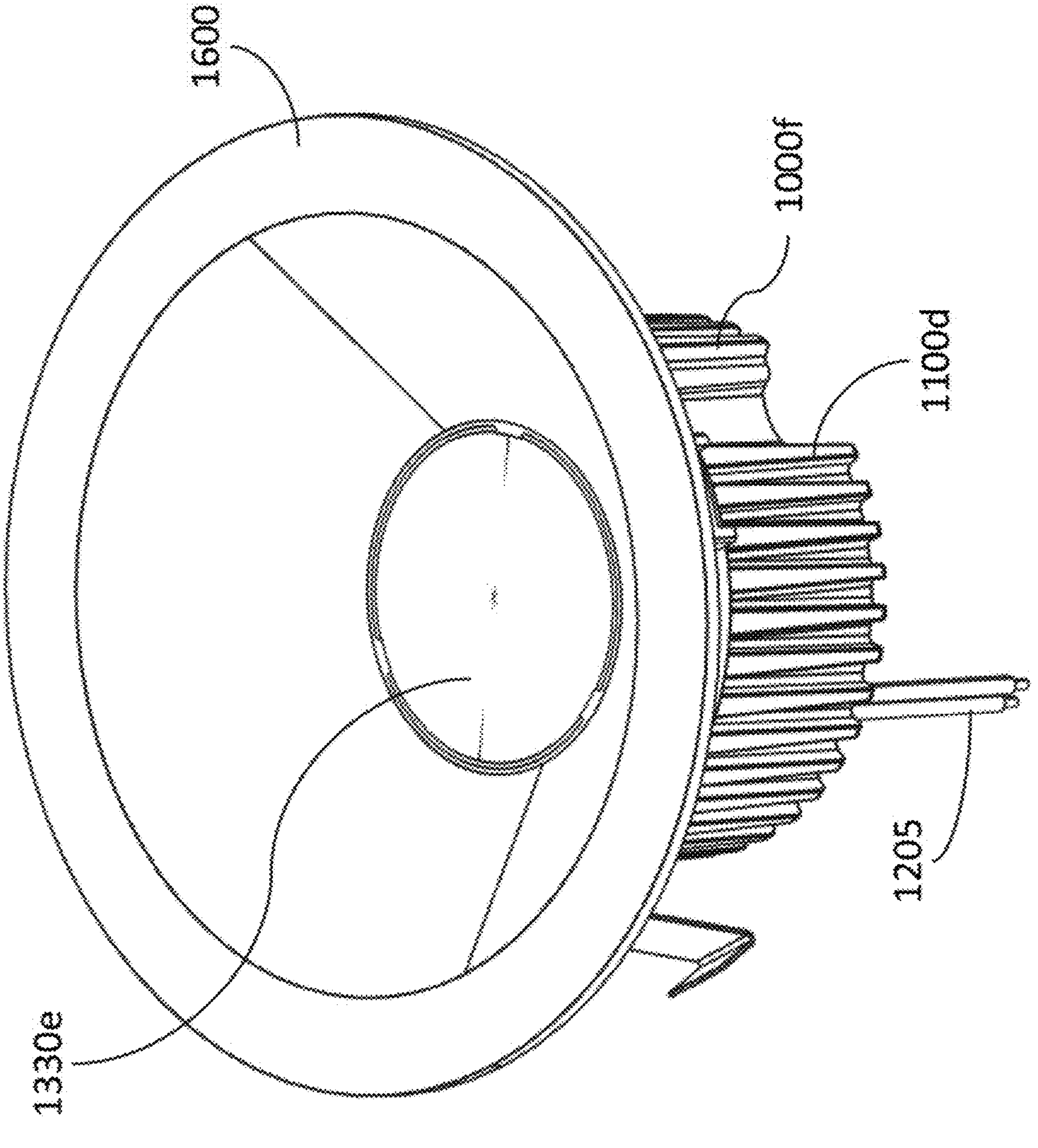
FIG. 20B shows a bottom perspective view of the lighting module and the trim of FIG. 20A.
Figure 20C:
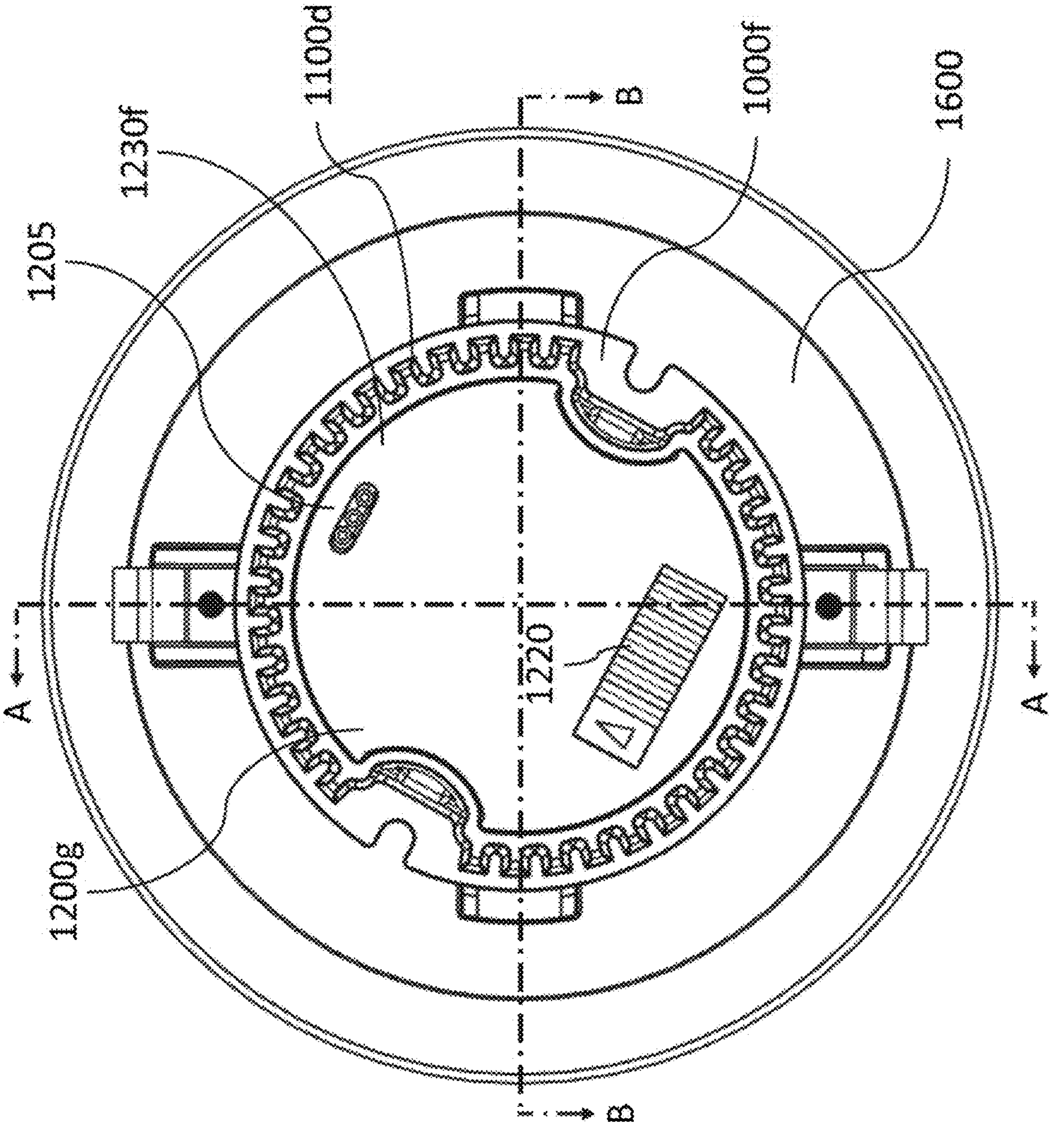
FIG. 20C shows a top view of the lighting module and the trim of FIG. 20A.
Figure 20D:
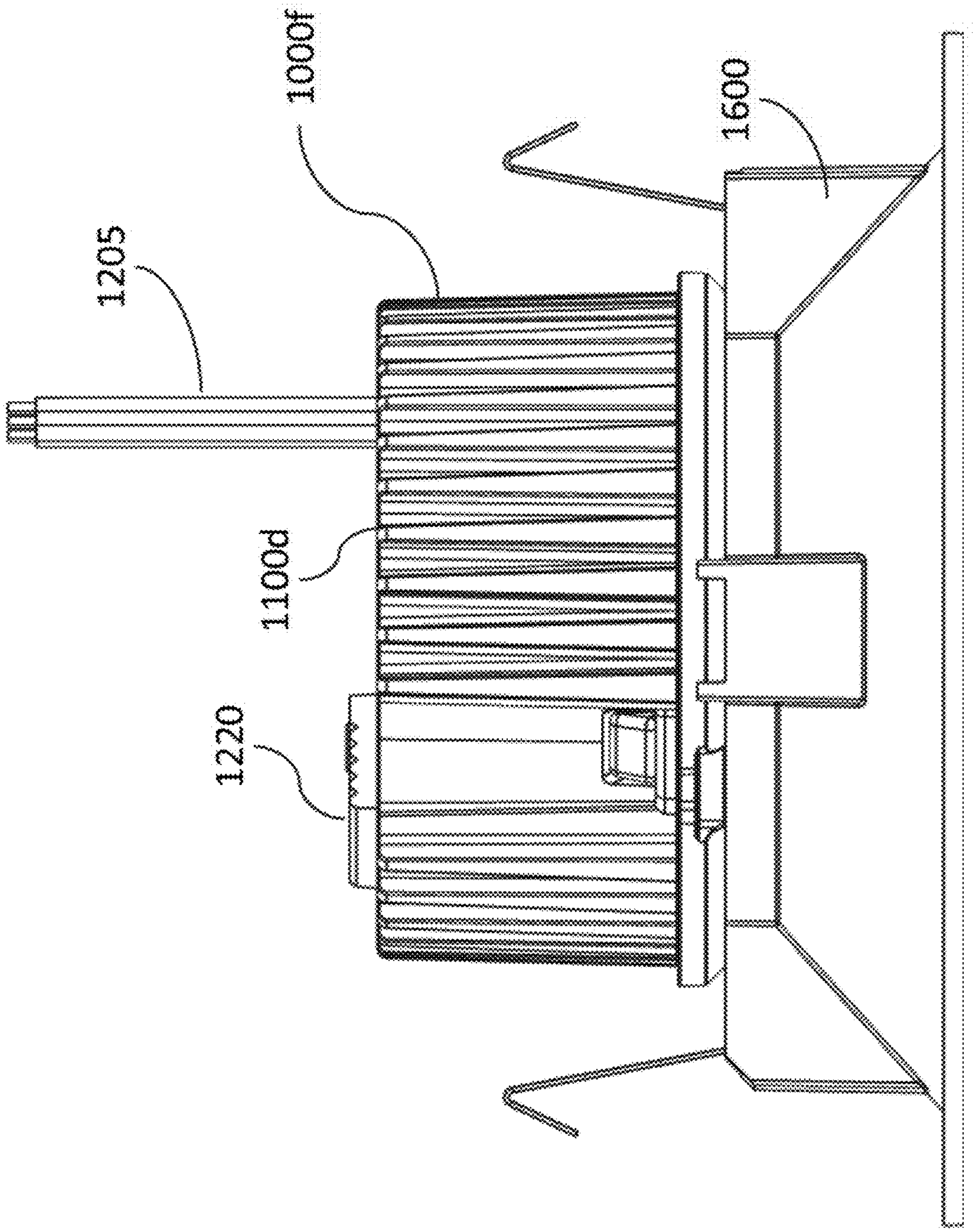
FIG. 20D shows a front view of the lighting module and the trim of FIG. 20A.
Figure 20E:
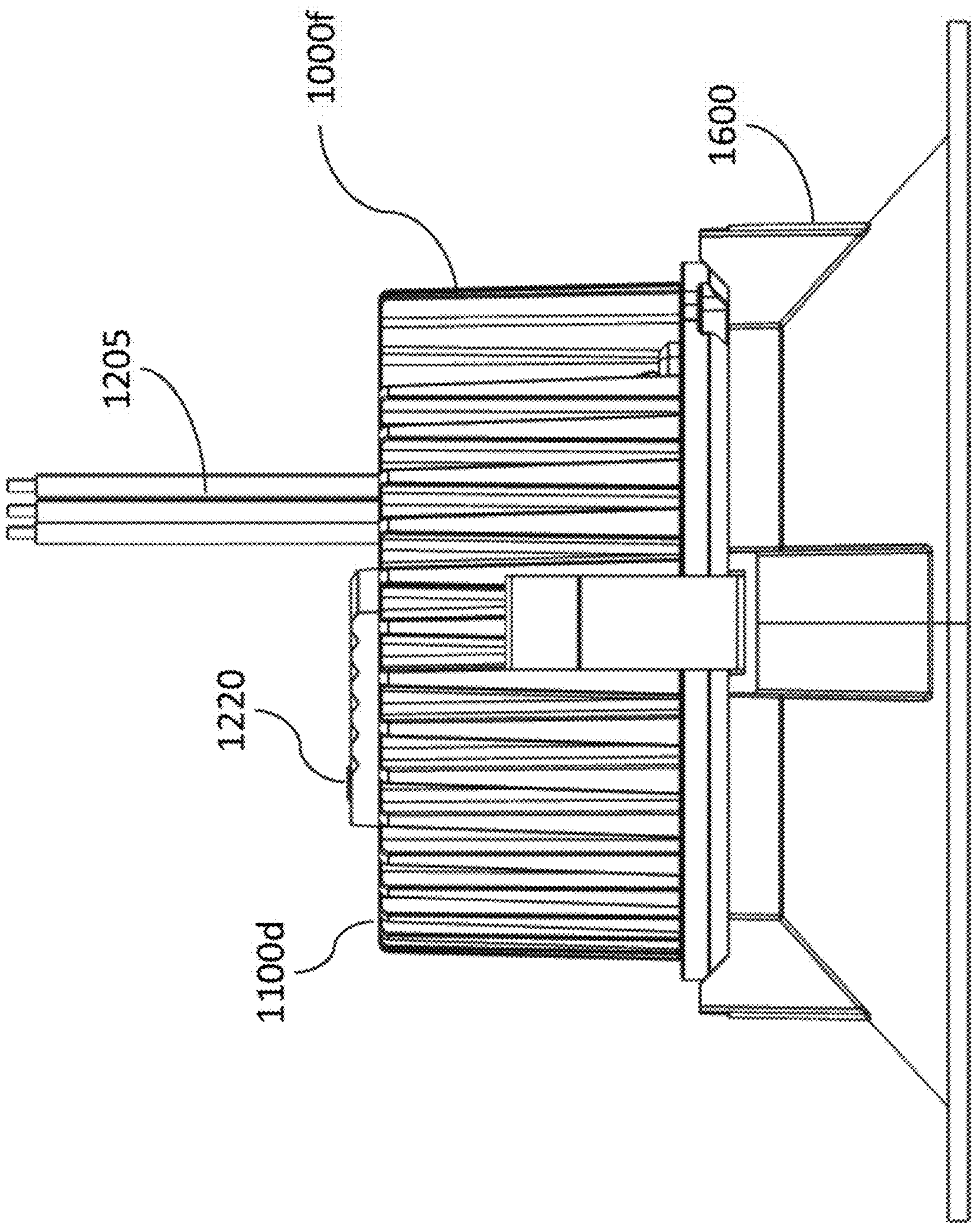
FIG. 20E shows a left-side view of the lighting module and the trim of FIG. 20A.
Figure 26A:
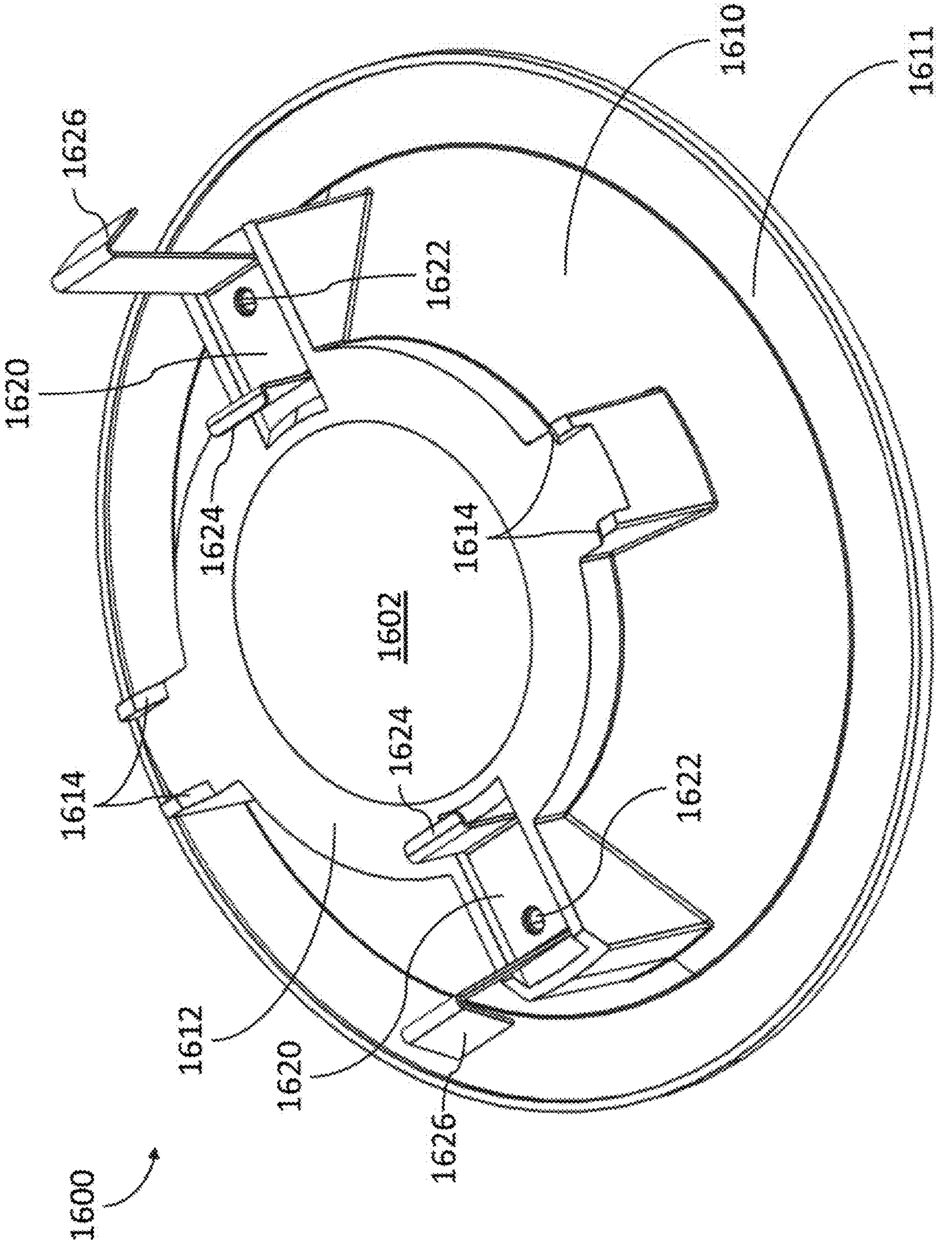

FIG. 26A shows a top perspective view of the trim of FIG. 20A.

Figure 26B:
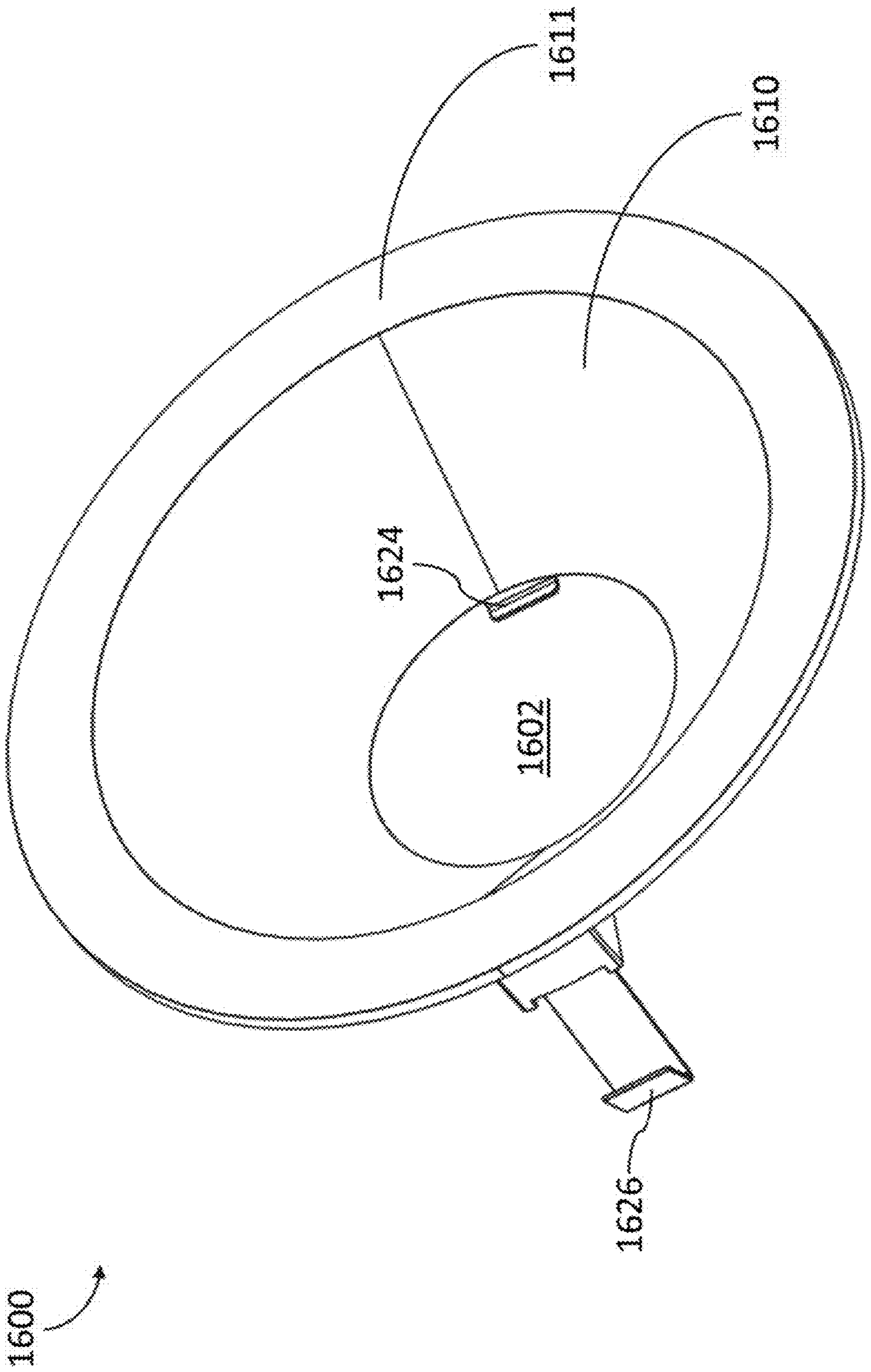

FIG. 26B shows a bottom perspective view of the trim of FIG. 26A.

Figure 26C:
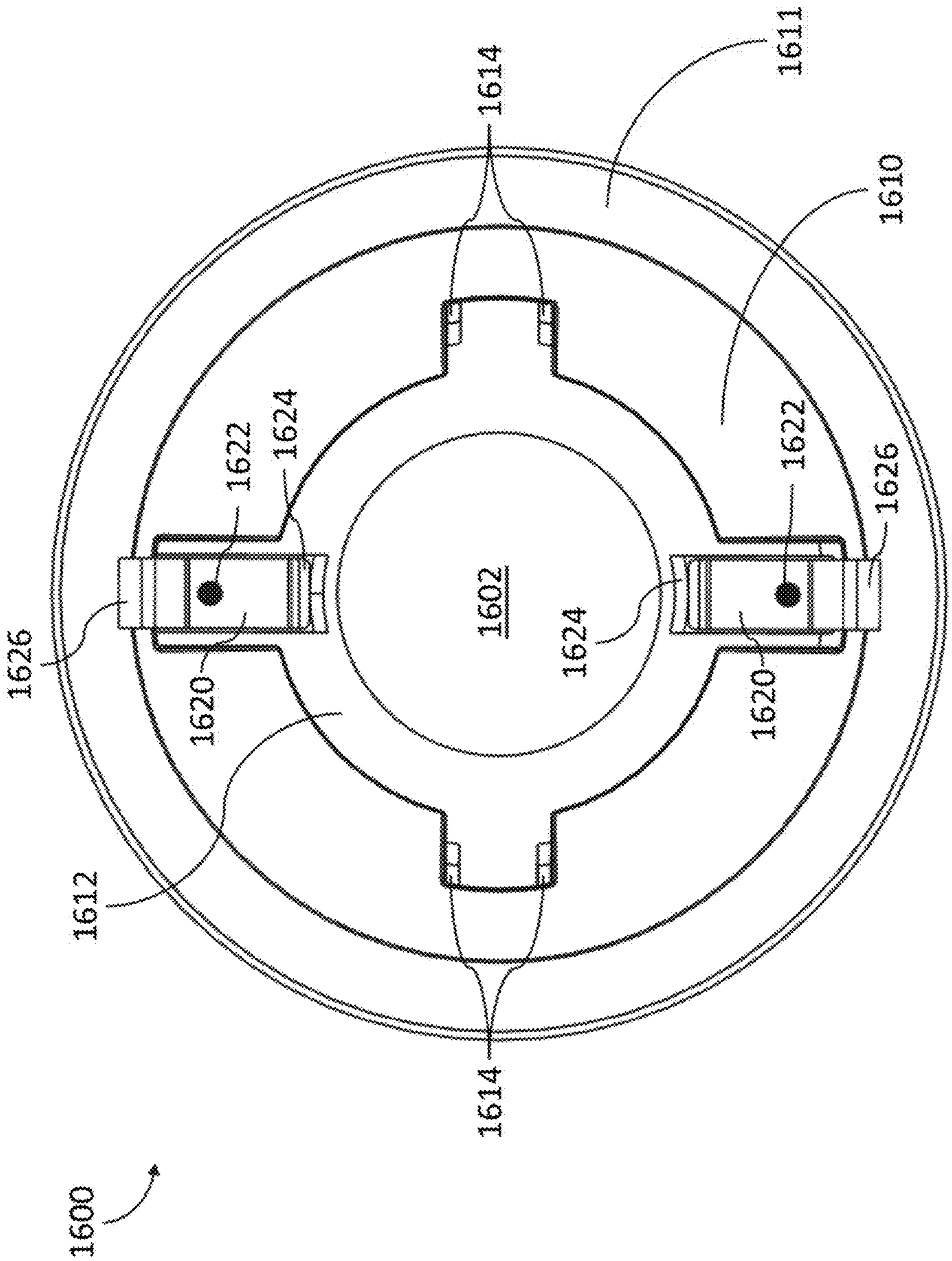

FIG. 26C shows a top view of the trim of FIG. 26A.

Figure 26D:
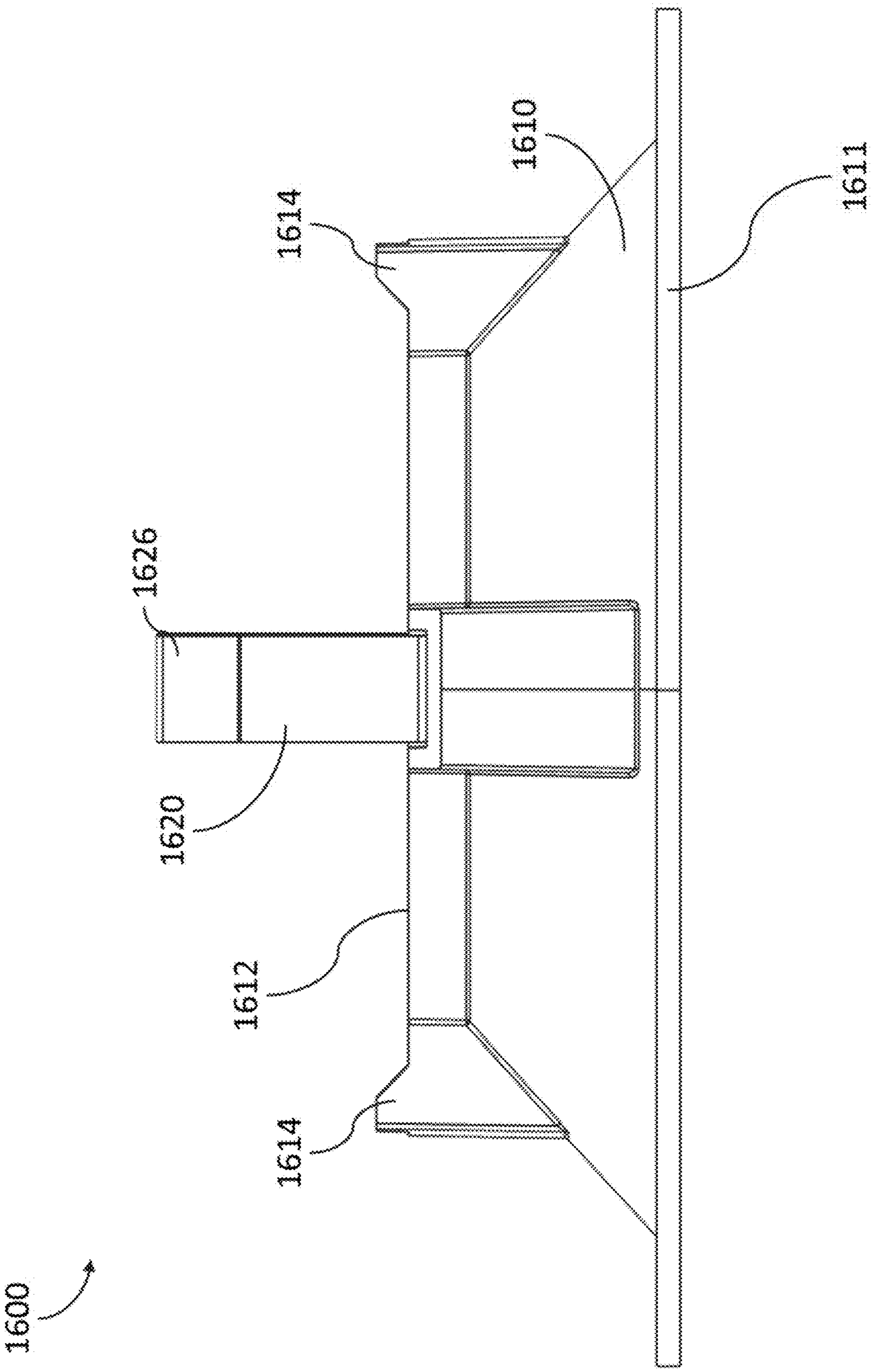

FIG. 26D shows a front view of the trim of FIG. 26A.

Figure 26E:
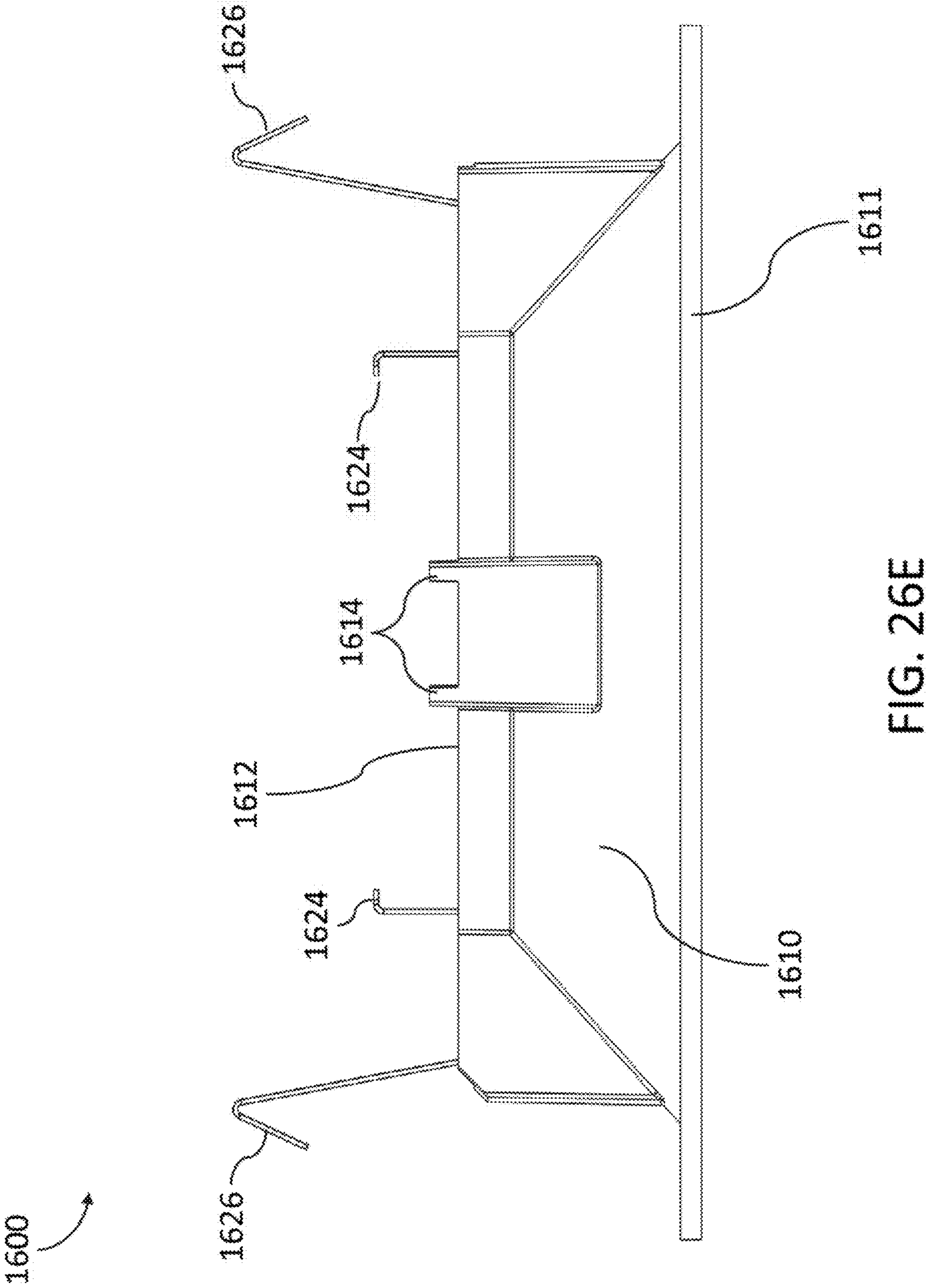

FIG. 26E shows a right-side view of the trim of FIG. 26A.

Figure 27A:
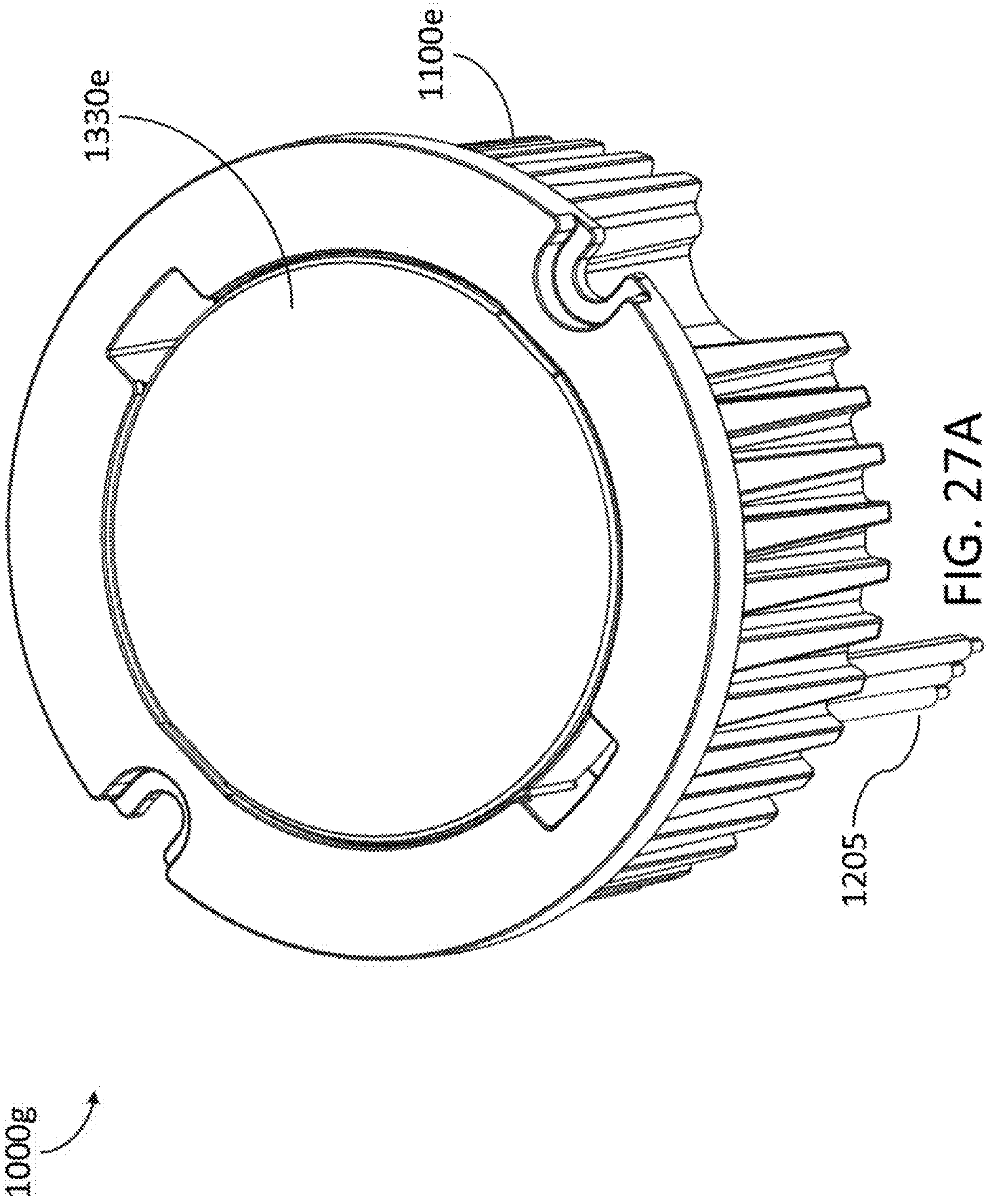

FIG. 27A shows a bottom perspective view of an exemplary lighting module with a ground connection and a receptacle forming part of a snap-fit connection.

Figure 27B:
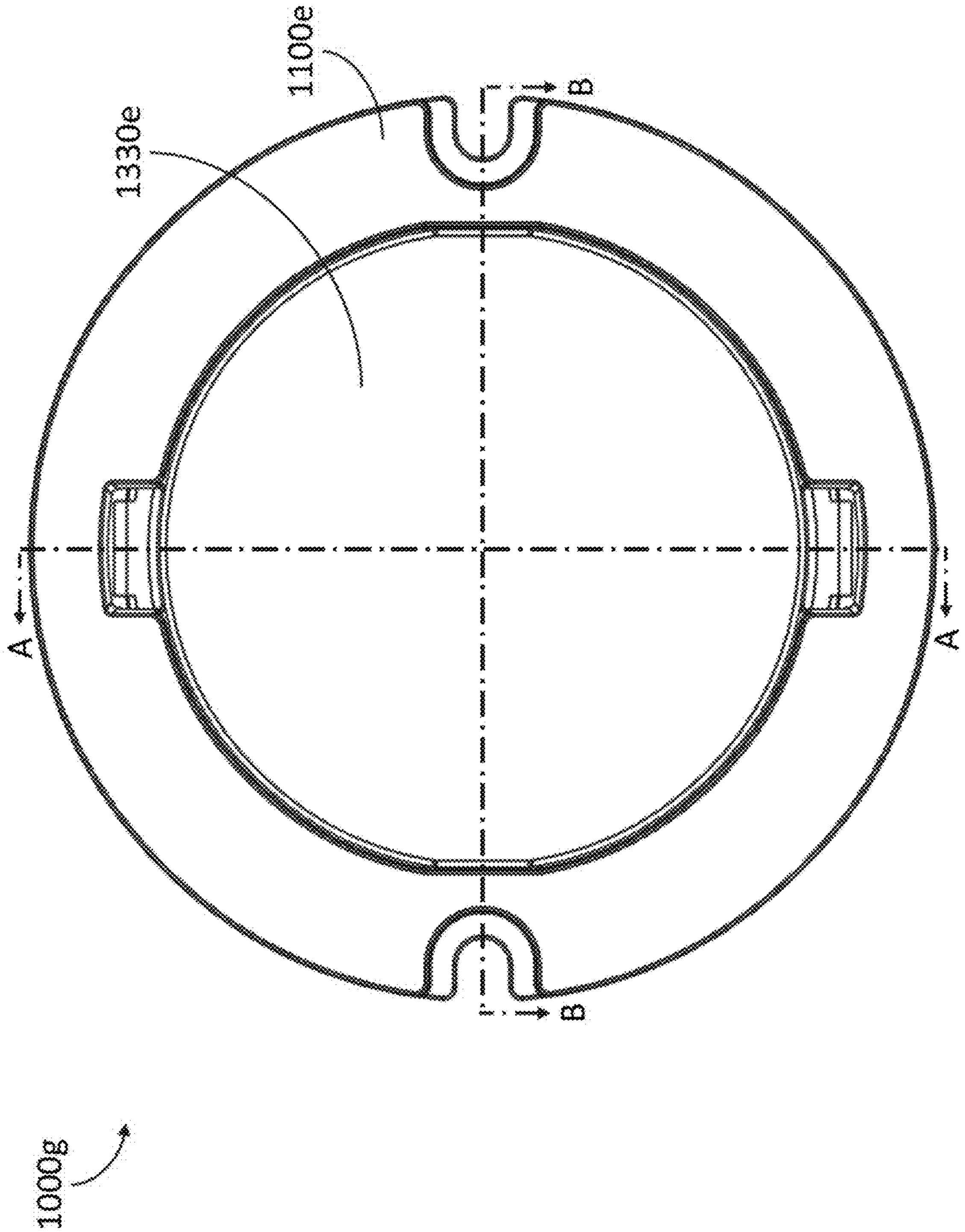

FIG. 27B shows a bottom view of the lighting module of FIG. 27A.

Figure 27C:
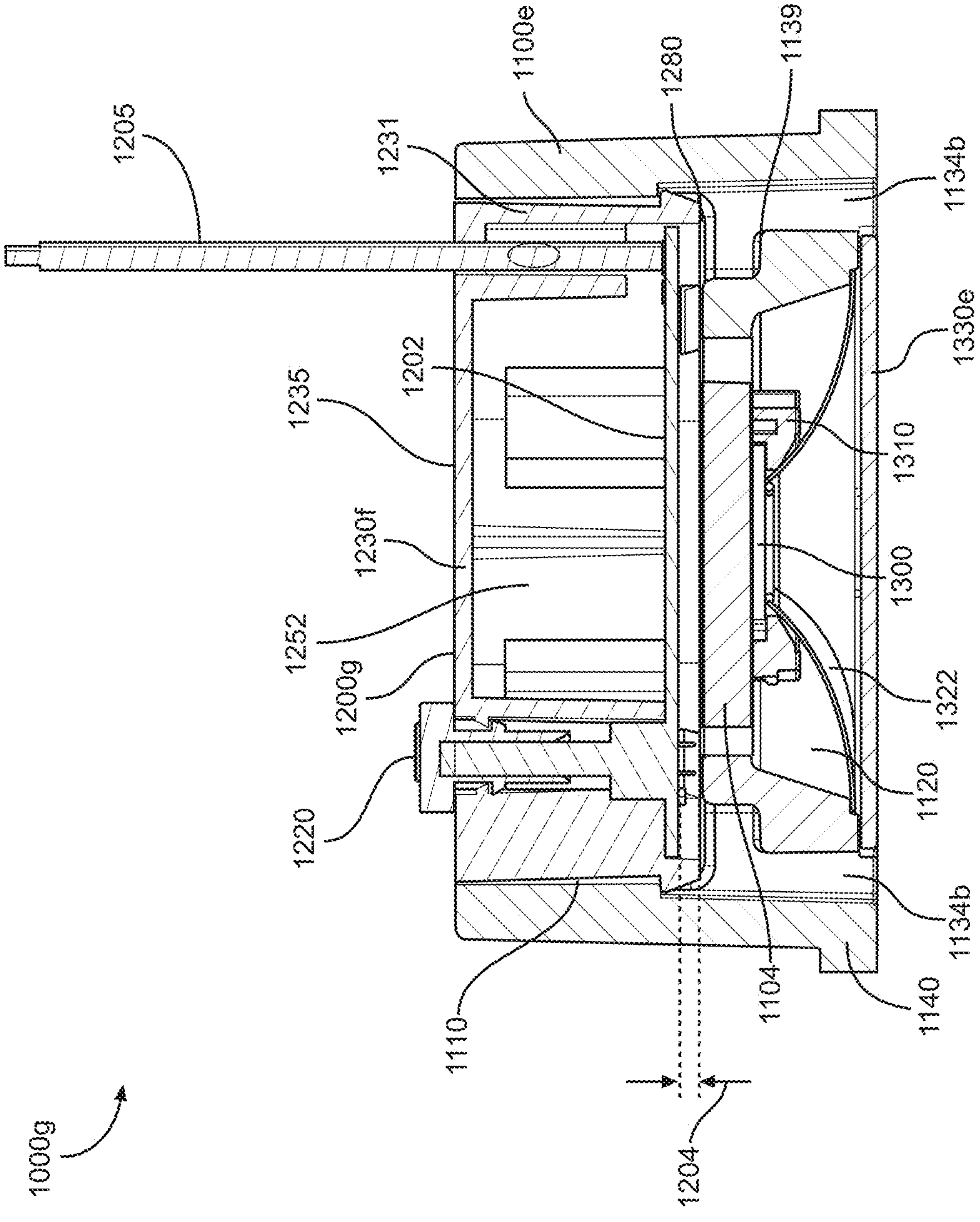

FIG. 27C shows a cross-sectional view of the lighting module corresponding to the plane A-A of FIG. 27B.

Figure 27D:
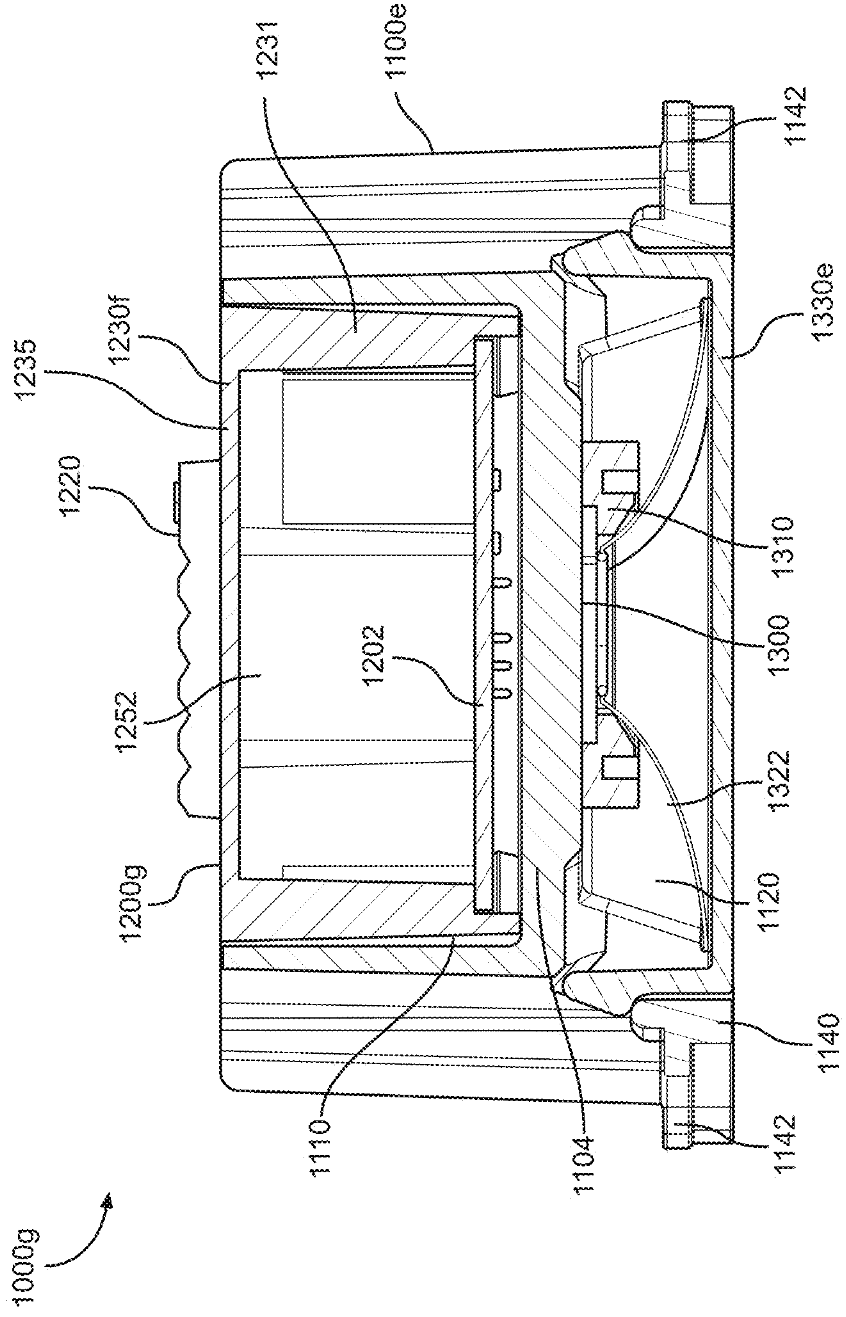

FIG. 27D shows a cross-sectional view of the lighting module corresponding to the plane B-B of FIG. 27B.

Figure 28A:
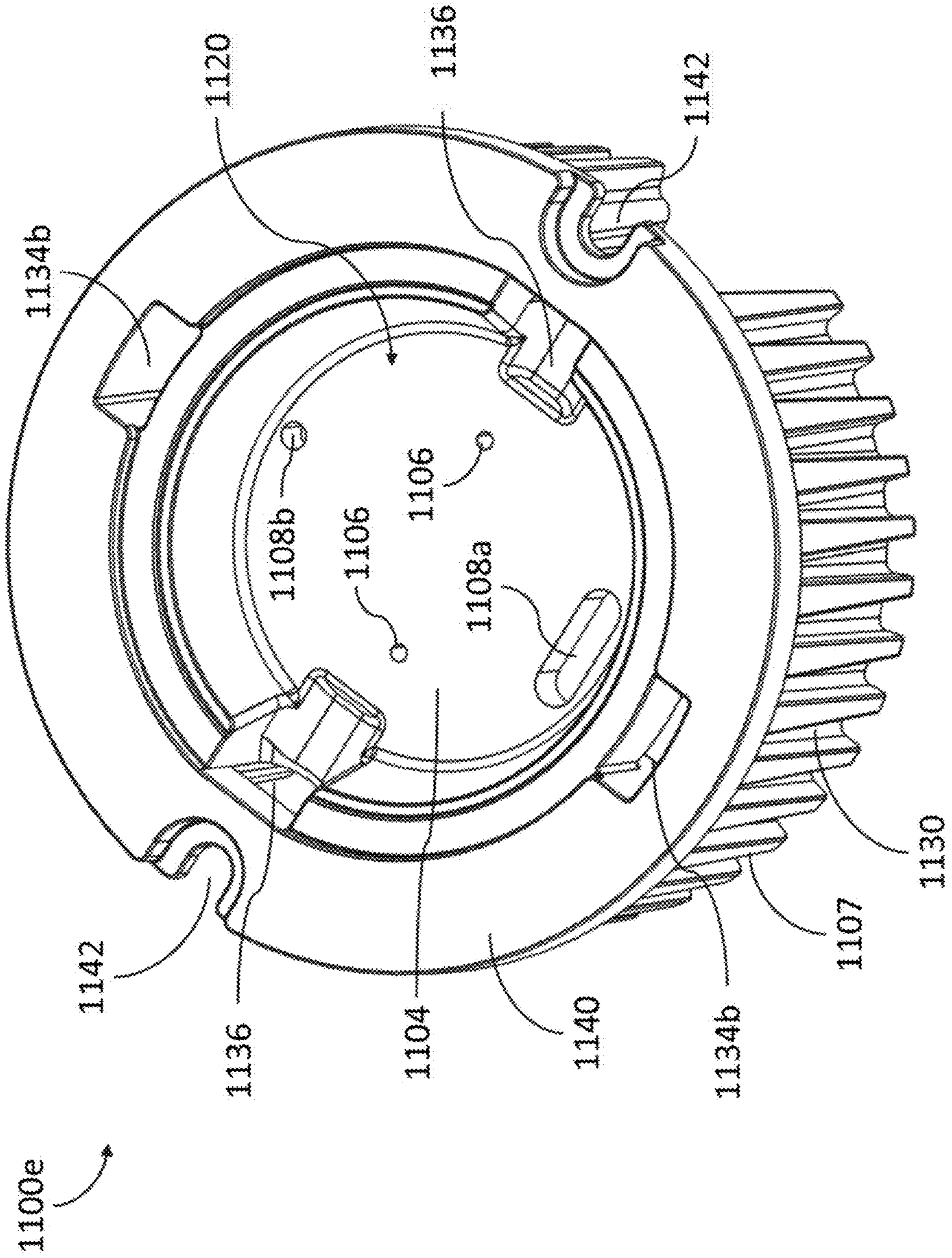

FIG. 28A shows a bottom perspective view of a heat sink in the lighting module of FIG. 27A.

Figure 28B:
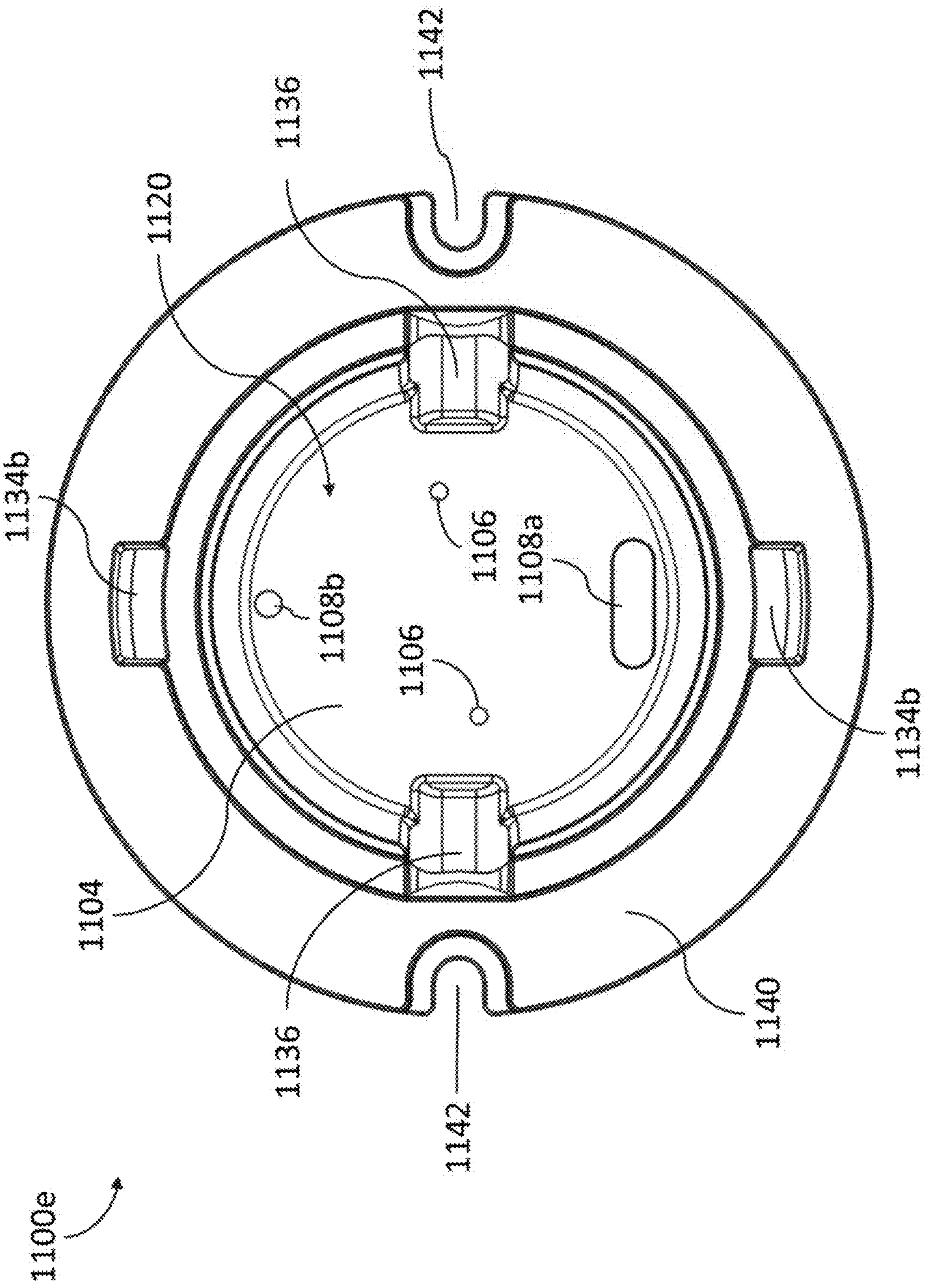

FIG. 28B shows a bottom view of the heat sink of FIG. 28A.

DETAILED DESCRIPTION

Following below are more detailed descriptions of various concepts related to, and implementations of, lighting modules with compact dimensions to facilitate installation into ceiling, wall, or floor spaces and/or enclosures with limited interior space and exemplary lighting fixtures incorporating one or more lighting modules. It should be appreciated that various concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive lighting modules are provided, wherein a given example or set of examples showcases one or more particular features of a heat sink, a driver enclosure, a light source, a driver, an optical element (e.g., a reflector, an optical lens), a retaining ring, a trim. It should be appreciated that one or more features discussed in connection with a given example of a driver enclosure, a heat sink, a light source, a reflector, an optic, and a retaining ring may be employed in other examples of lighting modules according to the present disclosure, such that the various features disclosed herein may be readily combined in a given lighting module according to the present disclosure (provided that respective features are not mutually inconsistent).

A Lighting Module with an Integrated Connector and a Reflector

FIGS. 1A-1J show several views of an exemplary lighting module 1000*a*. As shown, the lighting module 1000*a* may include a heat sink 1100*a* with a sidewall 1130, a partition 1104, and a flange 1140 defining a first cavity 1110 and a second cavity 1120. The lighting module 1000*a* may include a driver enclosure 1200*a* disposed in the first cavity 1110 to enclose a driver 1202 and an electrical connector 1210. A light source 1300 may be disposed in the second cavity 1120 and electrically coupled to the driver 1202. The lighting module 1000*a* may also include a reflector 1322 and/or an optic 1320 to redirect light emitted by the light source 1300. In some implementations, the lighting module 1000*a* may only include the optic 1320 to redirect light. The lighting module 1000*a* may also include a retaining ring 1330*a* to enclose the second cavity 1120 of the heat sink 1100*a*. In some implementations, the retaining ring 1330*a* may also support the optic 1320 and/or the reflector 1322. For example, the retaining ring 1330*a* may press the reflector 1322 against the partition 1104 to hold the reflector 1322 in place. In another example, the optic 1320 may be directly coupled to the retaining ring 1330*a* via a snap fit mechanism. In some implementations, the optic 1320 may be directly coupled to the heat sink 1100*a* using various coupling mechanisms including, but not limited to snap features, a press fit, and an ultrasonic weld. Additionally, the optic 1320 may be coupled to the retaining ring 1330*a*.

The lighting module 1000*a* may be compact in size to facilitate installation into lighting systems of various types and sizes. For example, the overall width of the lighting module 1000*a* (e.g., the outer diameter w of the heat sink 1100*a*) may be less than about 3 inches. The overall height of the lighting module 1000*a* (e.g., the height h of the heat sink 1100*a*) may be less than about 1.6 inches. In some implementations, the lighting module 1000*a* may fit into a space having a height dimension less than about 2.25 inches and a width dimension of about 4 inches. The enclosure may further include one or more posts within a cavity separated by a distance of about 2.4 inches (see, for example, the enclosure 2100*b* of FIG. 20I).

FIGS. 2A-2F show several views of the driver enclosure 1200*a*. As shown, the driver enclosure 1200*a* may include a driver housing 1250*a* and a driver cover 1230*a* that together form an enclosed cavity 1252 to contain both the driver 1202 and the electrical connector 1210. It should be appreciated, however, that in other inventive implementations, the driver enclosure 1200*a* may include only the driver 1202 or only the electrical connector 1210. One end of the electrical connector 1210 may be disposed in an opening 1234 of the driver cover 1230*a* to facilitate connection with a second electrical connector (not shown) supplying electrical power (e.g., alternating current (AC) power or direct current (DC) power) to the lighting module 1000*a*.

As shown in FIGS. 2A-2F, the electrical connector 1210 may be placed such that the exposed end of the electrical connector 1210 is substantially flush with the driver cover 1230*a*. In this manner, the electrical connector 1210 may be integrated into the driver enclosure 1200*a* without a wire tail. The exclusion of a wire tail may enable the driver 1202 to be qualified as a class II power unit according to, for example, the standards set forth by the International Electrotechnical Commission (IEC). However, it should be appreciated the electrical connector 1210 may protrude from the driver cover 1230*a* or may be recessed with respect to the driver cover 1230*a* in other implementations.

The driver 1202 may include electronic circuitry to convert an electrical input from an external power source (e.g., an AC power supply in a building) into a desired form (e.g., a DC current) with a desired voltage and/or current to power the light source 1300. The driver 1202 may receive AC and/or DC currents to enable deployment of the lighting module 1000*a* in indoor and/or outdoor settings, respectively. For example, the lighting module 1000*a* may be used in an indoor lighting system (e.g., a recessed light, a cylinder light, a downlight), which typically uses AC current. In another example, the lighting module 1000*a* may be used in an outdoor lighting system (e.g., a landscape light, a flood light, an in-ground light), which typically uses DC current. Additionally, the driver 1202 may also be compatible with a range of operating voltages including, but not limited to low operating voltages (e.g., voltages less than 50V) and high operating voltages (e.g., voltages greater than 50V). The broad range of operating voltages supported by the driver 1202 may enable deployment of the lighting module 1000*a* in low voltage lighting systems (e.g., household lighting, landscape lighting, office lighting, and/or hospitality lighting using a 12V input) and/or high voltage lighting systems (e.g., security lighting, public lighting using a 120V line voltage input).

In some implementations, the driver 1202 may output DC current at voltages ranging between about 0V to about 10V. The light module 1000*a* may also generally support different arrangements of circuitry so long as the circuitry fits within the size constraints (e.g., the diameter, the height) imposed by the driver housing 1230 and/or the heat sink 1100. Various types of driver circuitry 1210 may be incorporated including, but not limited to a triode for alternating current (TRIAC) type driver, a digital addressable lighting interface (DALI) type driver, and a pulse width modulated (PWM) type driver.

The driver 1202 may also provide other functions for the lighting module 1000*a* including, but not limited to dimming the light source 1300 to control the light intensity, tuning the color of the light (e.g., changing a color temperature, switching between different preset colors of the light), and providing wireless communications (e.g., communicating with a remote device that controls the various settings of the lighting module 1000*a*).

The light source 1300 may be various types of electro-optical devices including, but not limited to, a light emitting diode (LED), an organic light emitting diode (OLED), and a polymer light emitting diode (PLED). In some implementations, the light source 160 may include one or more light emitting elements, e.g. multiple LEDs, OLEDs, or PLEDs, to increase light output and/or to alter the spectral characteristics of light emitted into the surrounding environment. For example, the light source 1300 may include LEDs with different wavelengths spanning the visible spectrum. The color of the light outputted by the lighting module 1000*a* may be tuned to have different color temperatures (e.g., white, yellow, orange).

The driver enclosure 1200*a* may be formed of an electrically insulating material to electrically isolate both the driver 1202 and the electrical connector 1210 from electrically conductive components, such as the heat sink 1100*a*. The electrical isolation of both the driver 1202 and the electrical connector 1210 enables the installation and operation of the lighting module 1000*a* without a separate ground wire.

FIGS. 3A-3G show several views of the driver housing 1250*a* and FIGS. 4A-4F show several views of the driver cover 1230*a*. The driver housing 1250*a* may include a sidewall 1251 with platforms 1258 to support the driver 1202. The driver cover 1230*a* may include a base 1235 with platforms 1238 offset from the base 1235 that align with the platforms 1258 of the driver housing 1250*a*. When the driver housing 1250*a* and the driver cover 1230*a* are assembled, the platforms 1238 and 1258 may abut the driver 1202 from opposite sides to mechanically constrain the driver 1202 in the driver enclosure 1200*a*. Said in another way, the platforms 1238 and 1258 reduce unwanted movement of the driver 1202 when disposed in the driver enclosure 1200*a*.

The driver housing 1250*a* may also include a support structure 1254 and the driver cover 1230*a* may also include a tab 1232. The support structure 1254 and the tab 1232 together mechanically support the electrical connector 1210 to mechanically constrain the electrical connector 1210 after assembly of the driver enclosure 1200*a*.

Figure 3A:
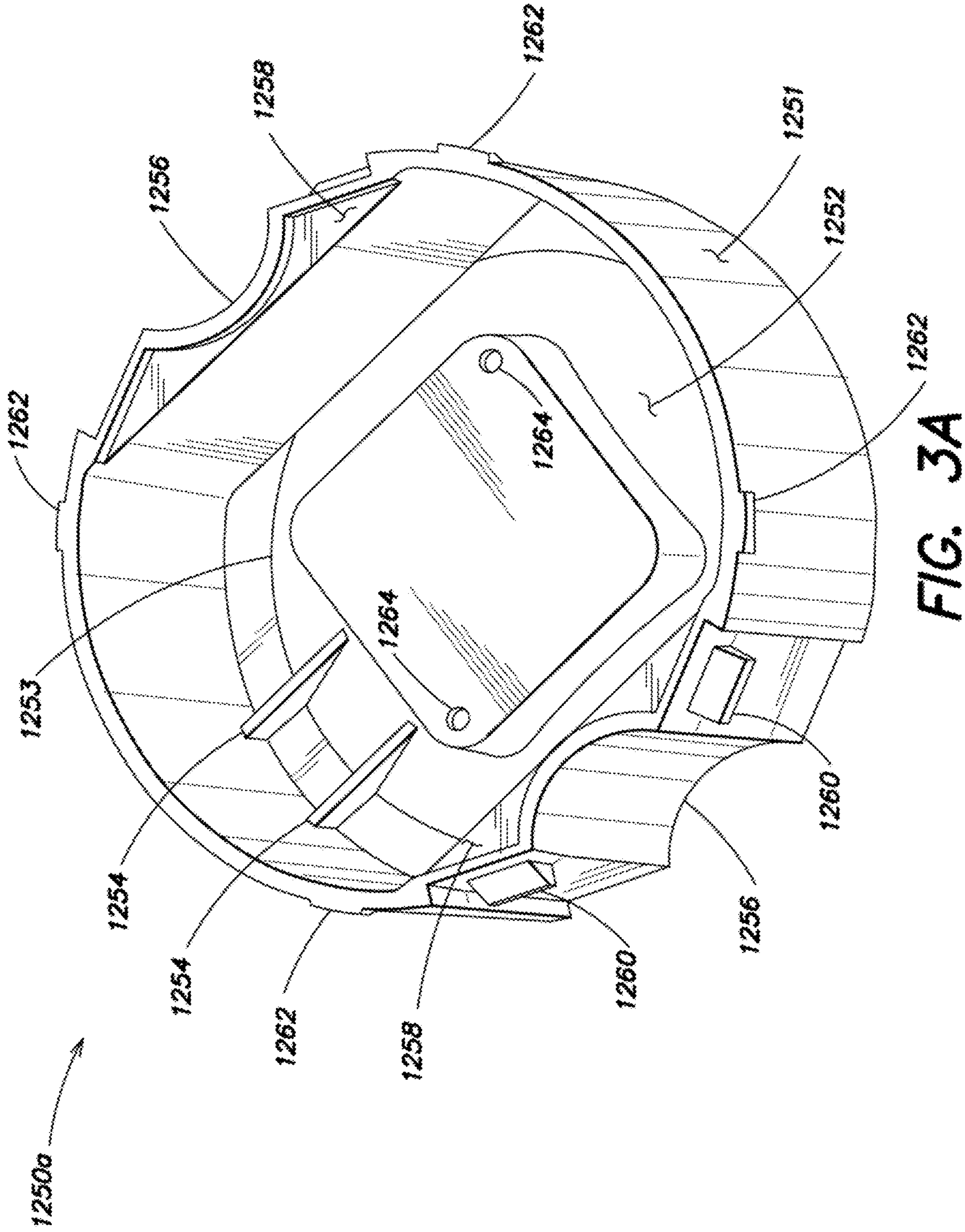
FIG. 3A shows a top perspective view of a driver housing in the driver enclosure of FIG. 2A.
Figure 3B:
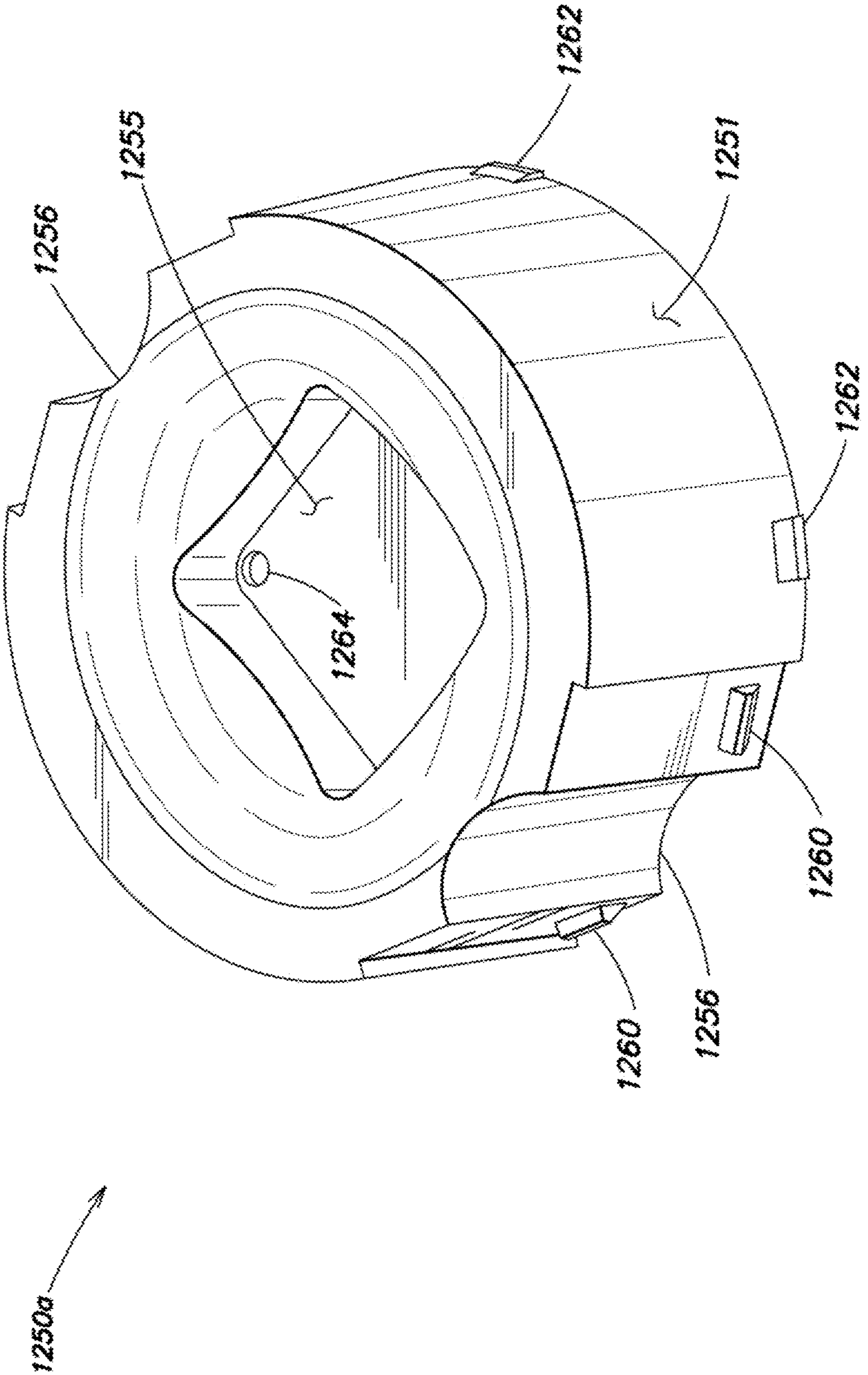
FIG. 3B shows a bottom perspective view of the driver housing of FIG. 3A.
Figure 3C:
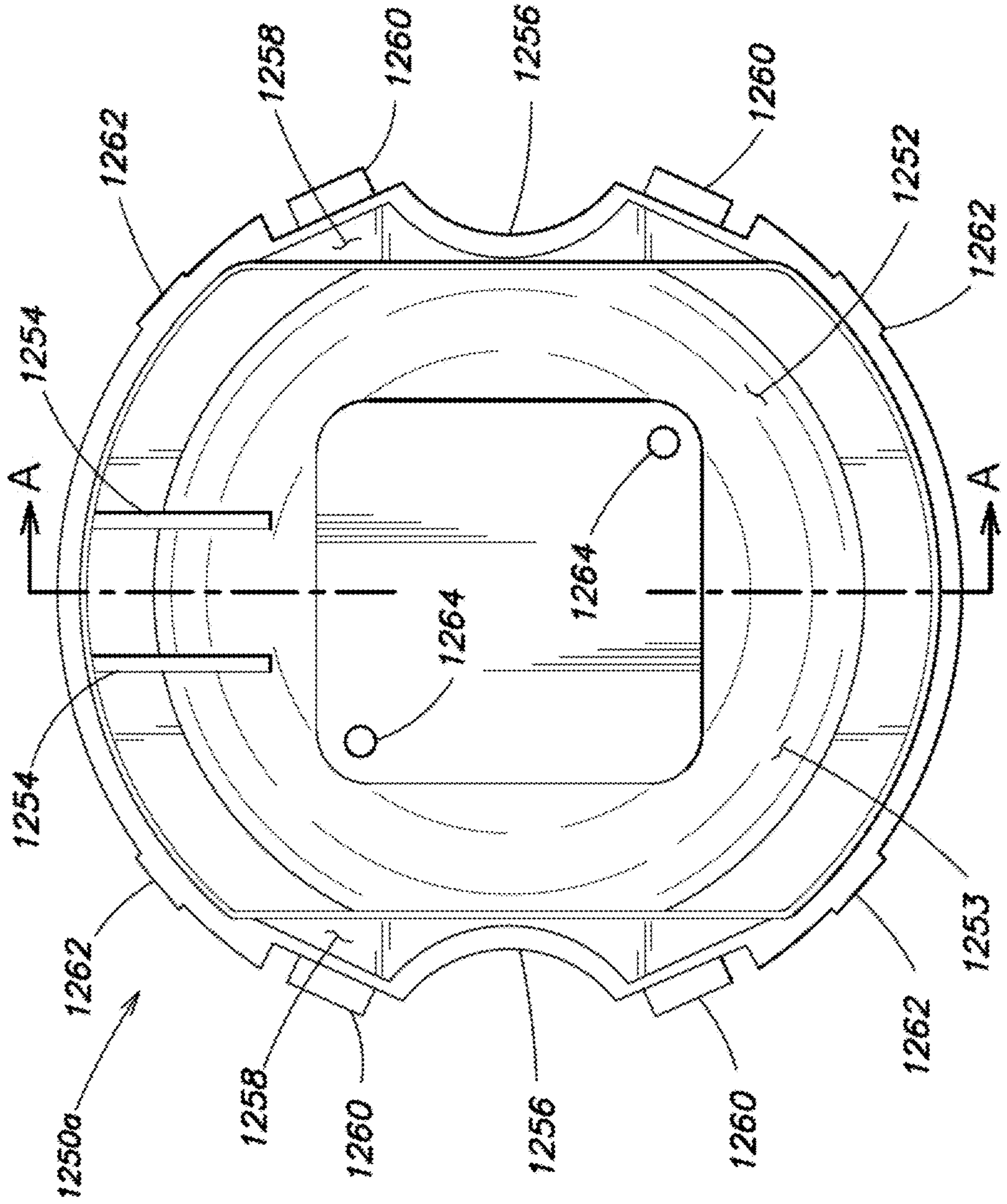
FIG. 3C shows a top view of the driver housing of FIG. 3A.
Figure 3D:
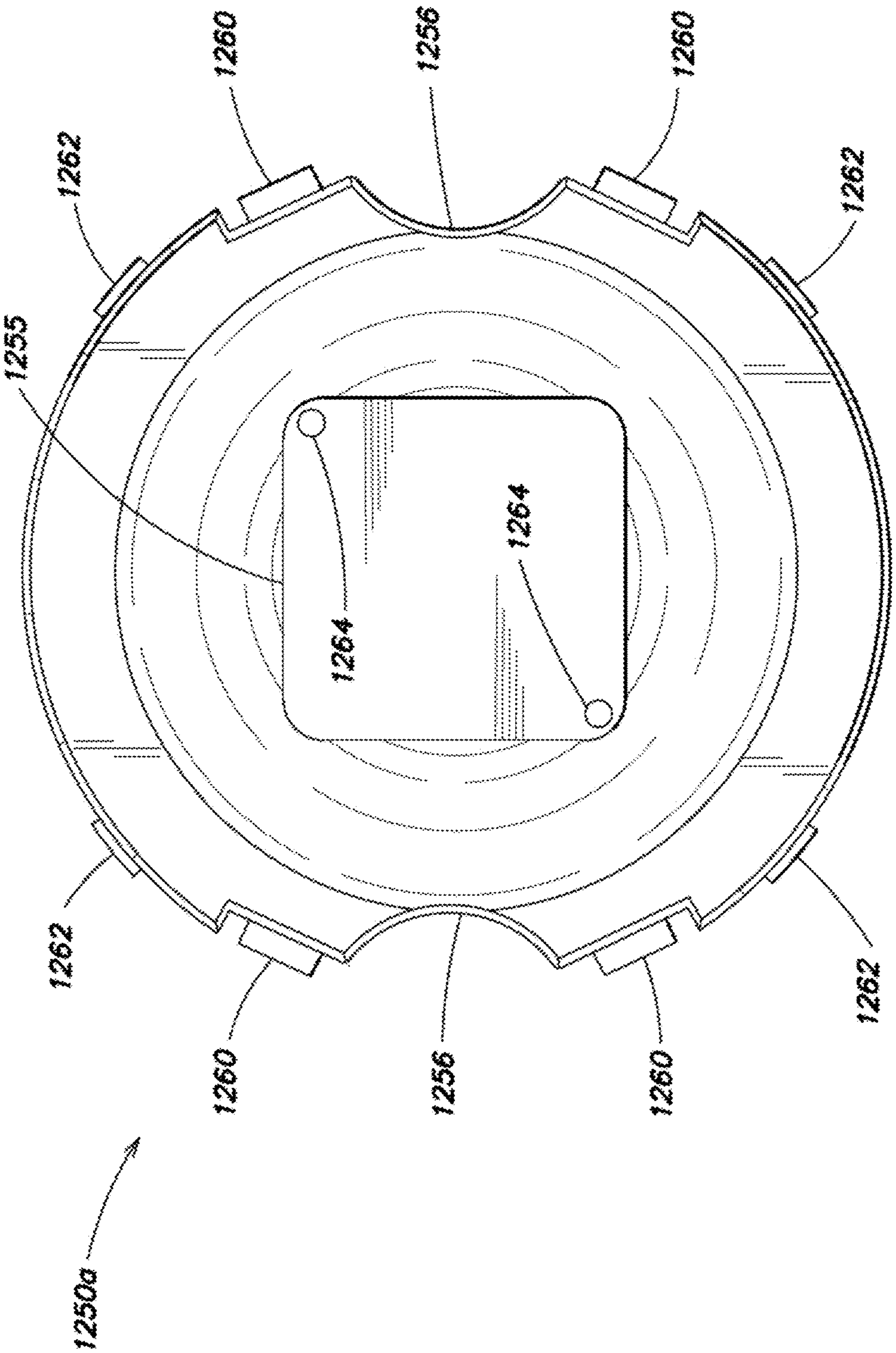
FIG. 3D shows a bottom view of the driver housing of FIG. 3A.
Figure 3E:
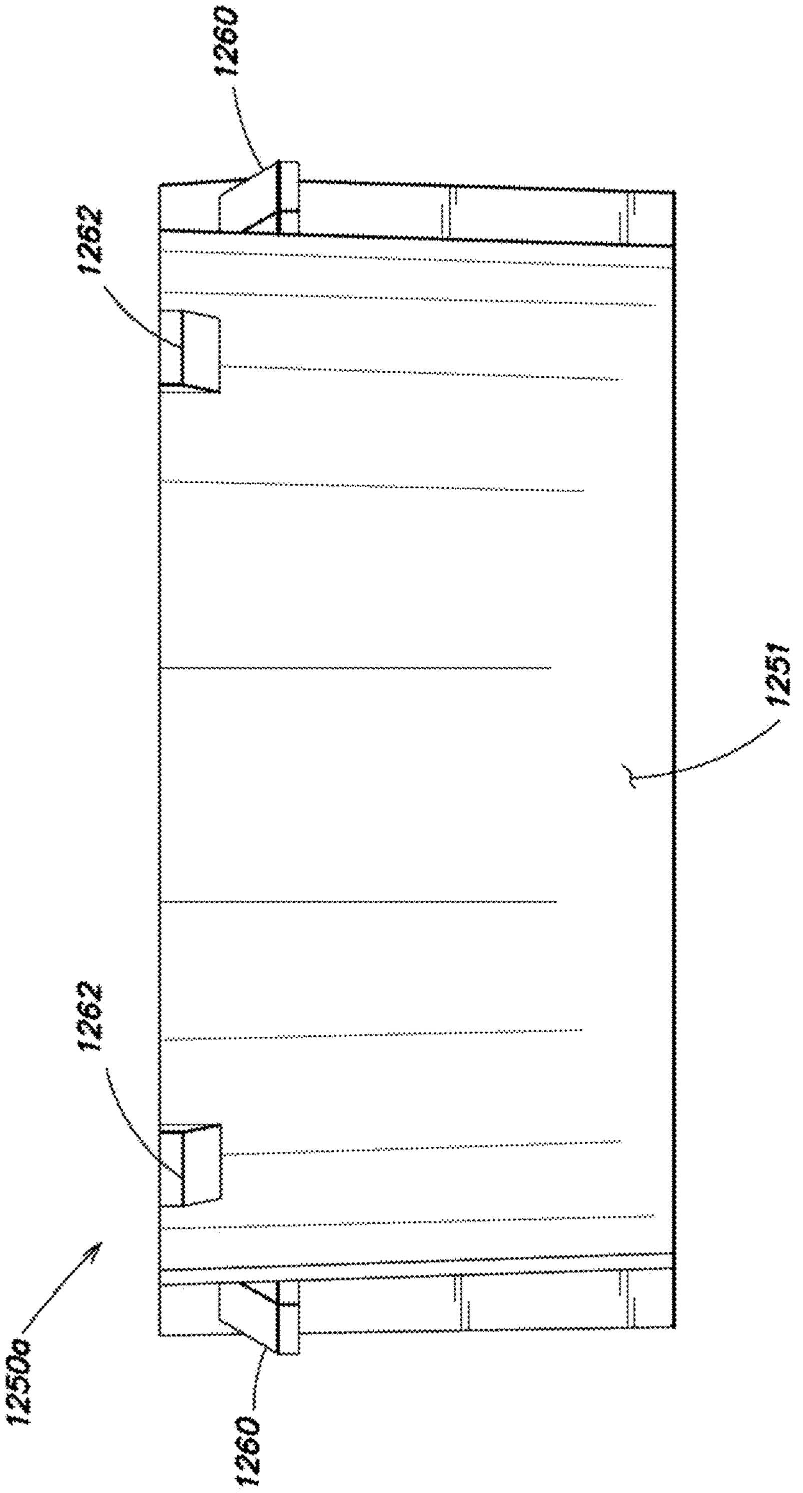
FIG. 3E shows a front view of the driver housing of FIG. 3A.
Figure 3F:
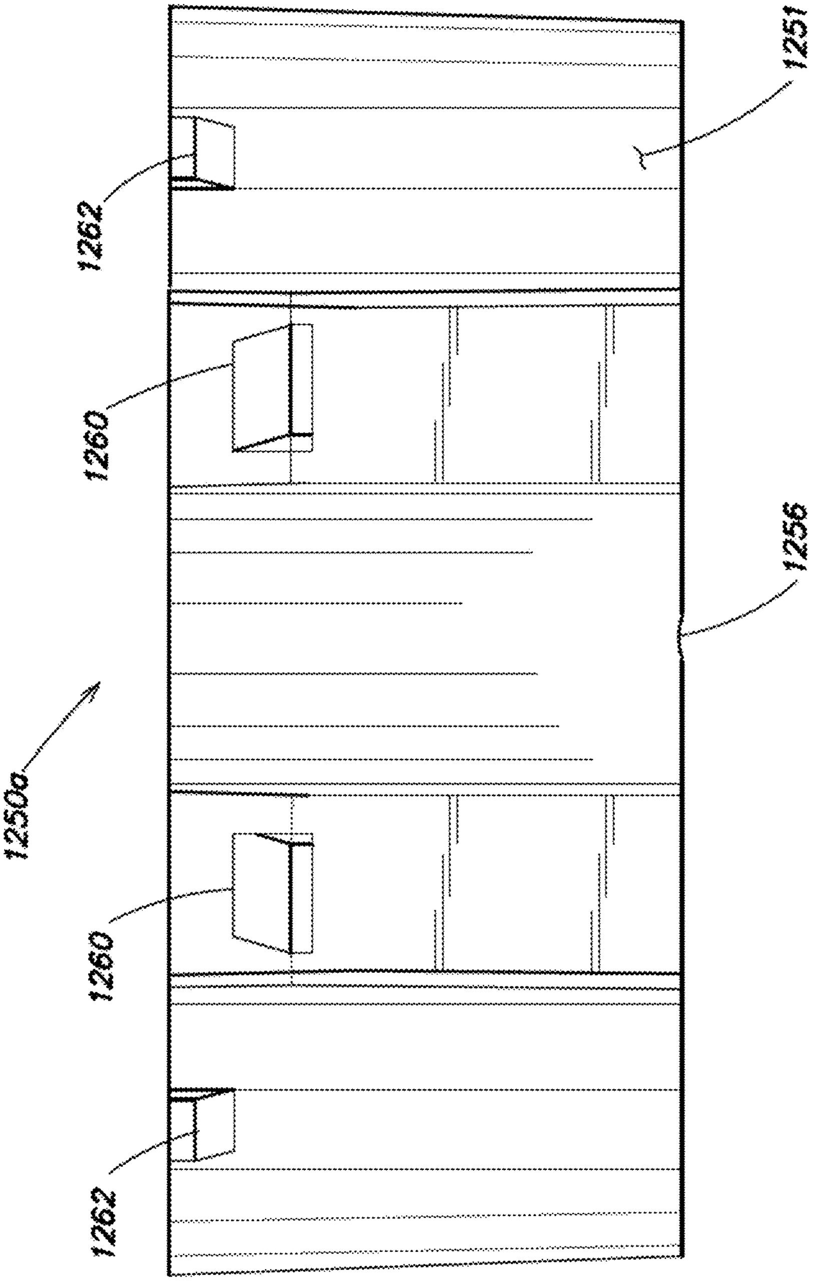
FIG. 3F shows a left-side view of the driver housing of FIG. 3A.
Figure 3G:
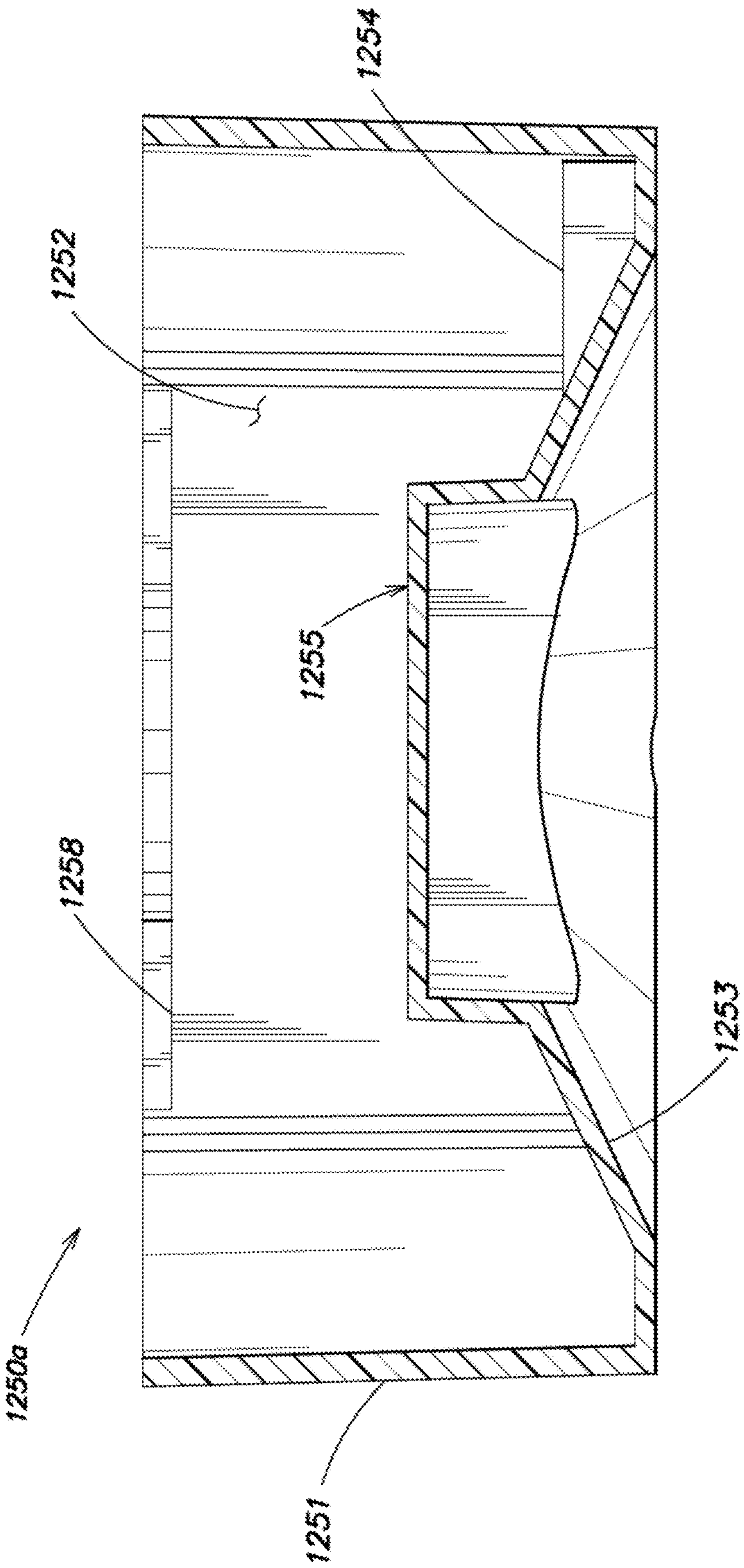
FIG. 3G shows a cross-sectional left-side view of the driver housing corresponding to the plane A-A of FIG. 3C.
Figure 4A:
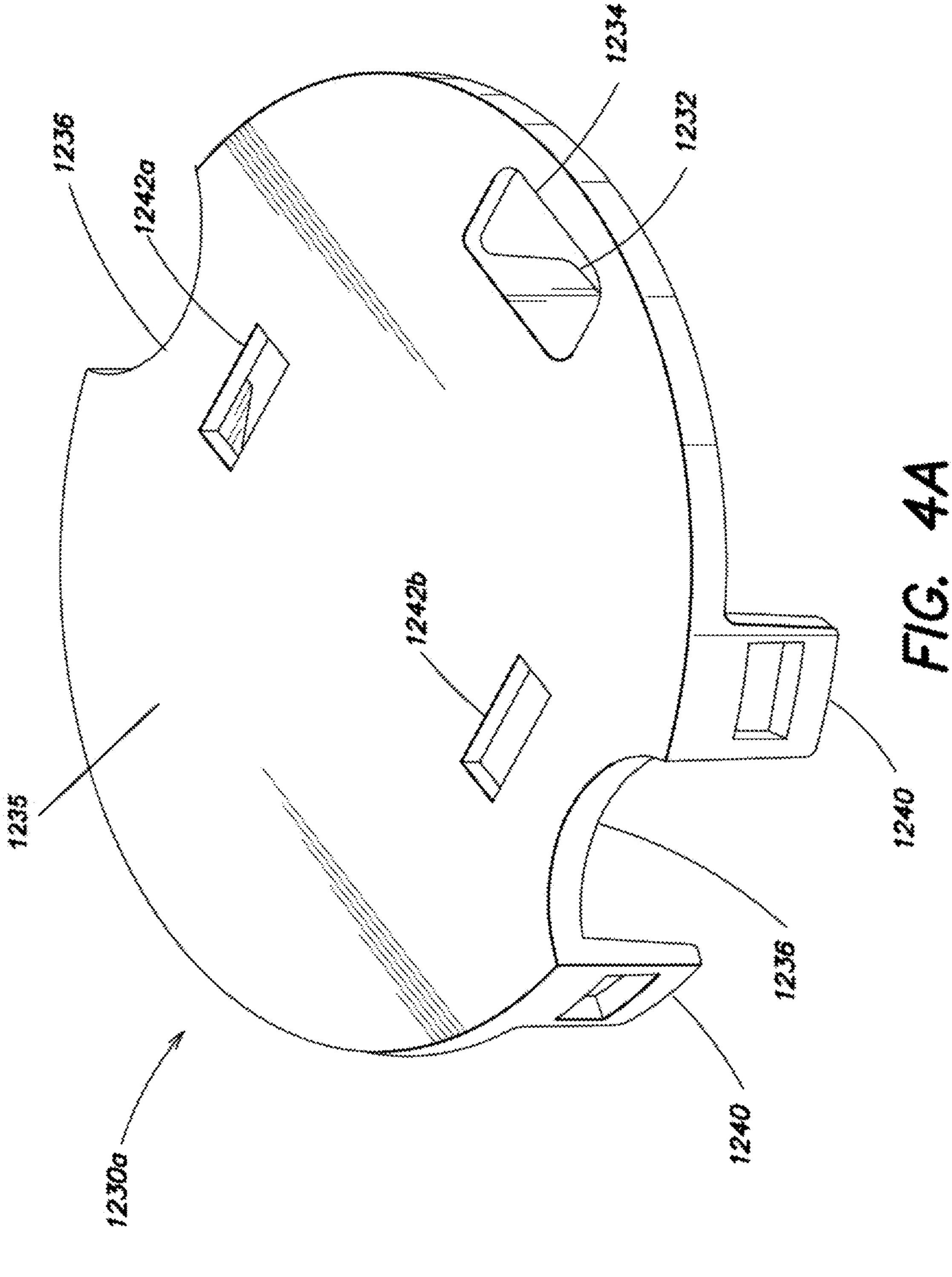
FIG. 4A shows a top perspective view of a driver cover in the driver enclosure of FIG. 2A.
Figure 4B:
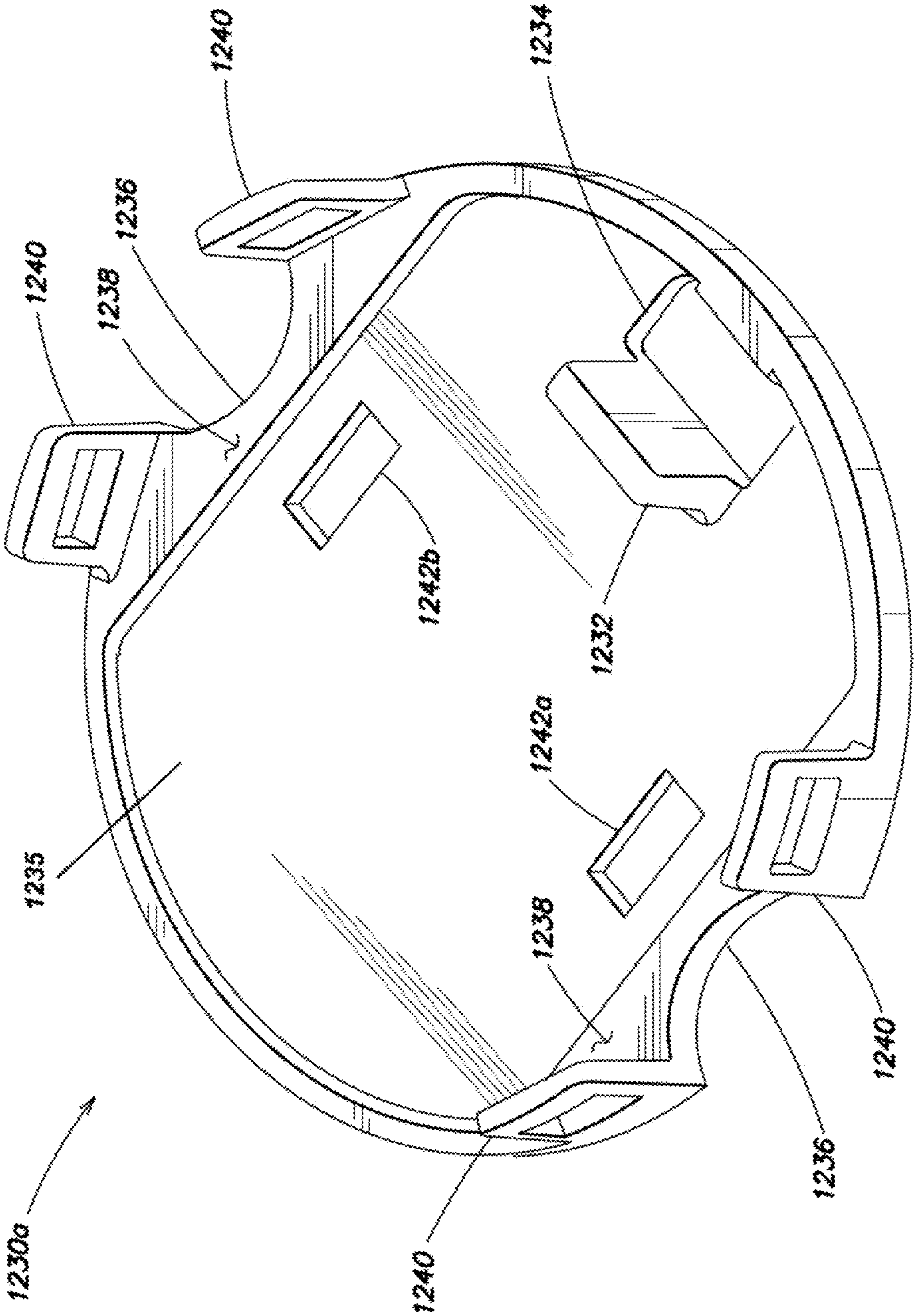
FIG. 4B shows a bottom perspective view of the driver cover of FIG. 4A.
Figure 4C:
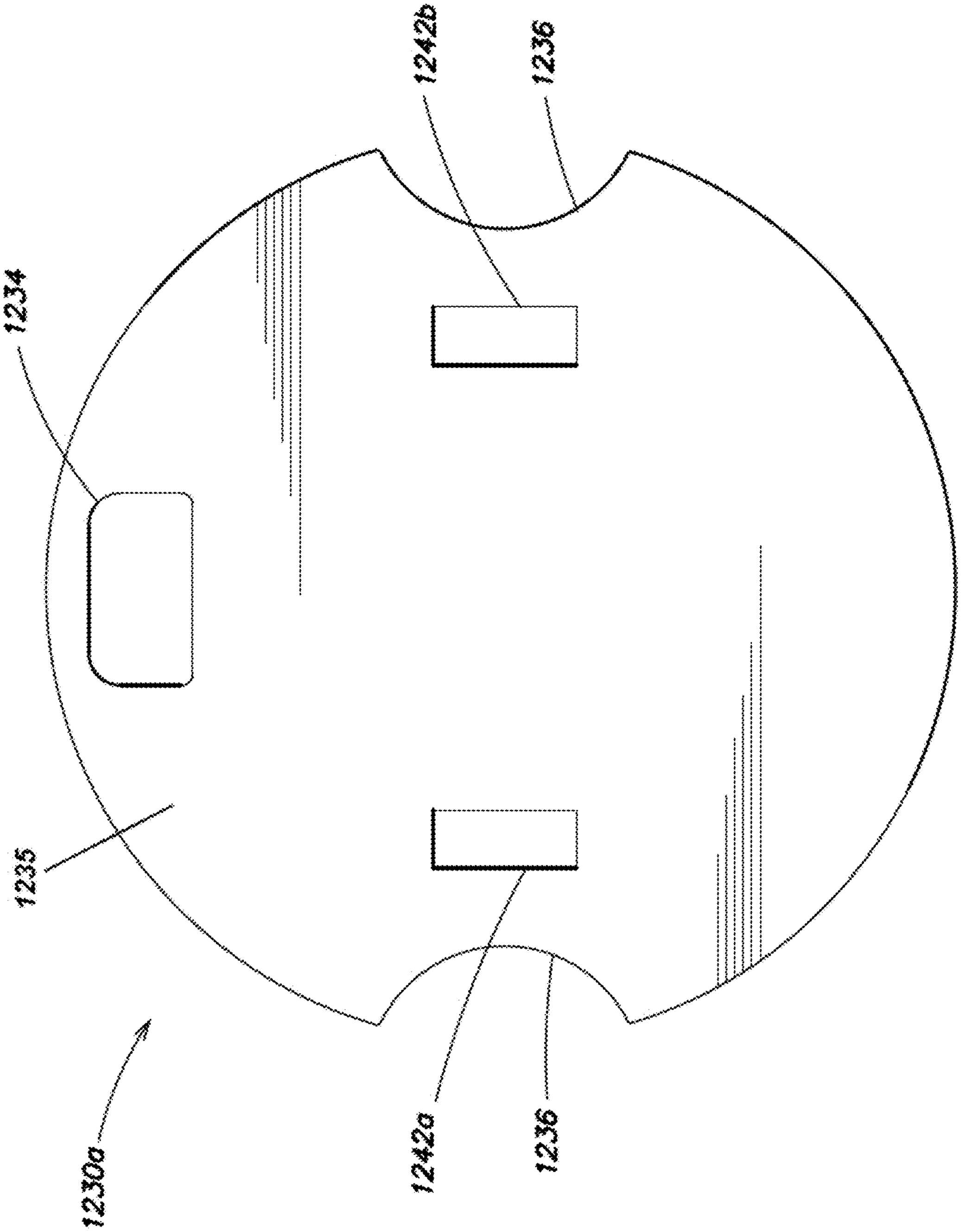
FIG. 4C shows a top view of the driver cover of FIG. 4A.
Figure 4D:
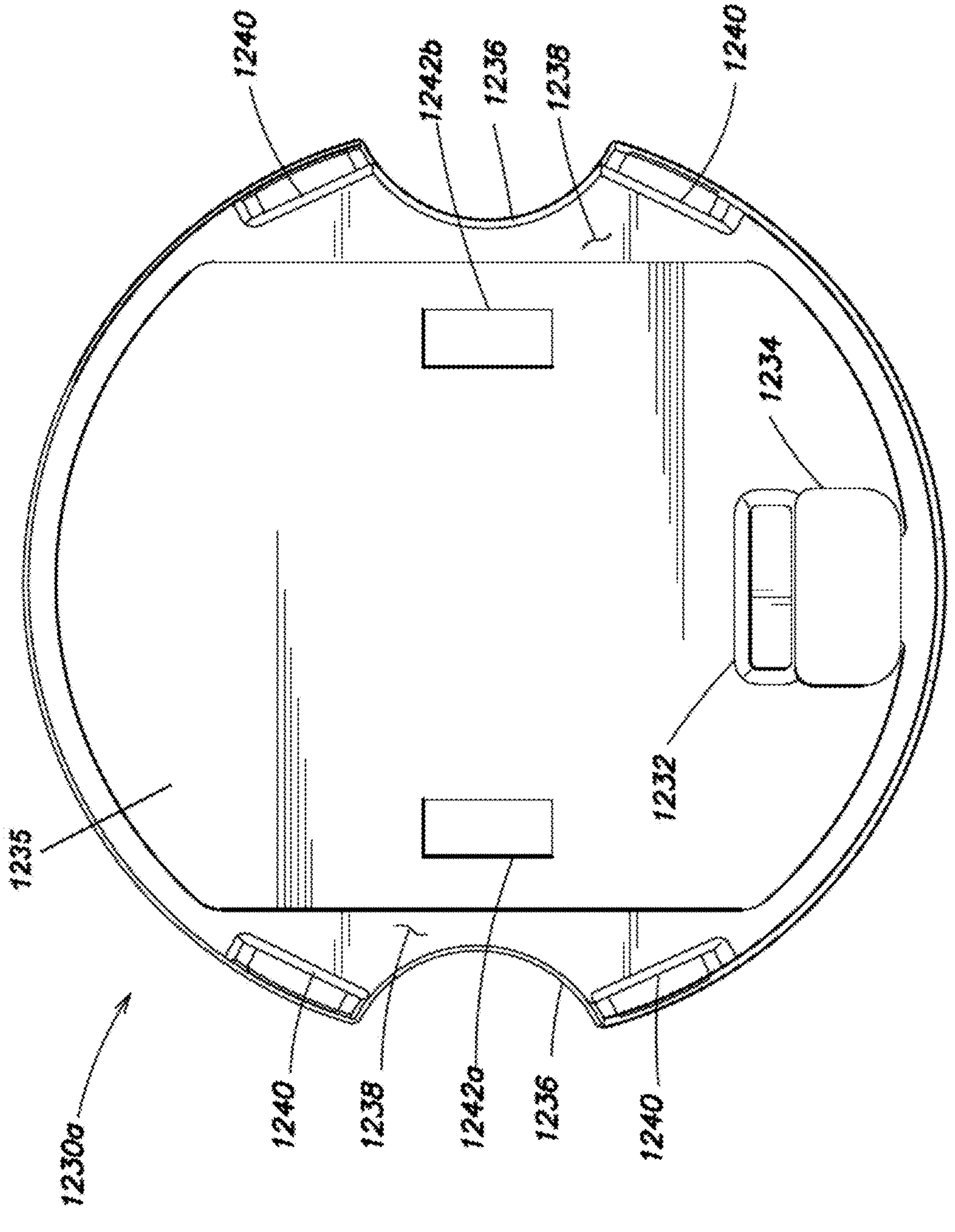
FIG. 4D shows a bottom view of the driver cover of FIG. 4A.
Figure 4E:
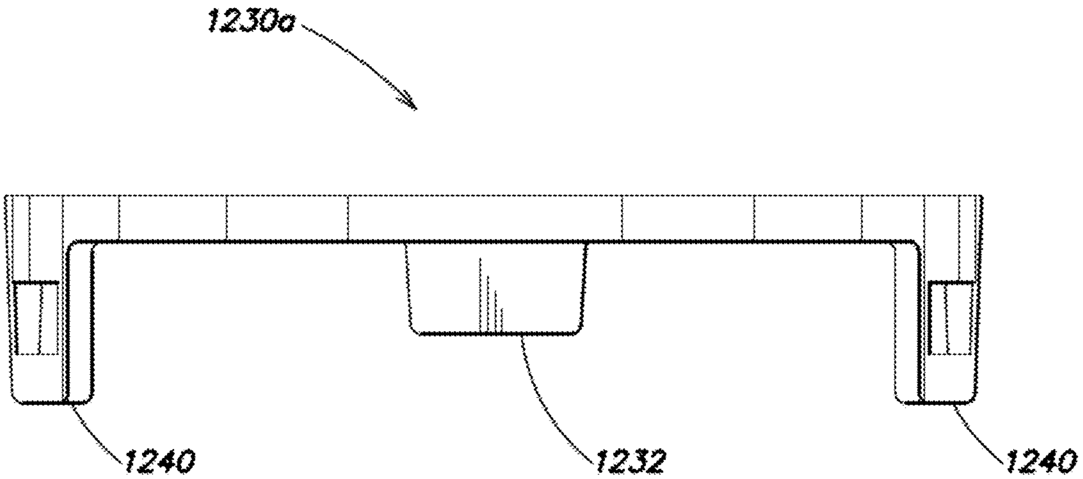
FIG. 4E shows a front view of the driver cover of FIG. 4A.
Figure 4F:
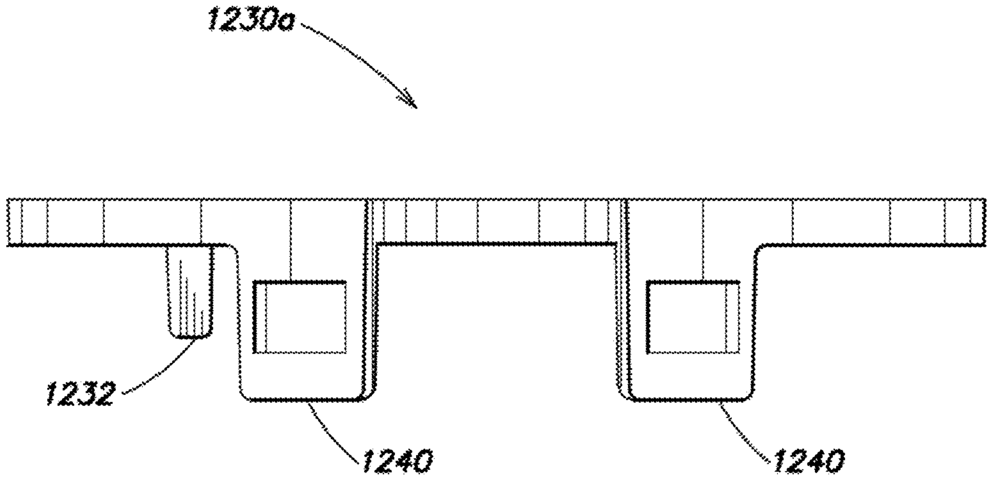
FIG. 4F shows a left-side view of the driver cover of FIG. 4A.

The driver housing 1250*a* may be coupled to the driver cover 1230*a* via a snap-fit connection. For example, FIG. 3A shows the driver housing 1250*a* may have one or more male snap-fit connectors 1260 disposed on the sidewall 1251, which couple to corresponding female snap-fit receptacles 1240 on the driver cover 1230*a*. In this manner, the driver enclosure 1200*a* may be assembled without the use of any tools. However, it should be appreciated that in other implementations, the snap-fit connectors 1260 and 1240 may be substituted for other coupling mechanisms that involve use of a tool, such as a screw fastener or a bolt fastener.

Figure 1A:
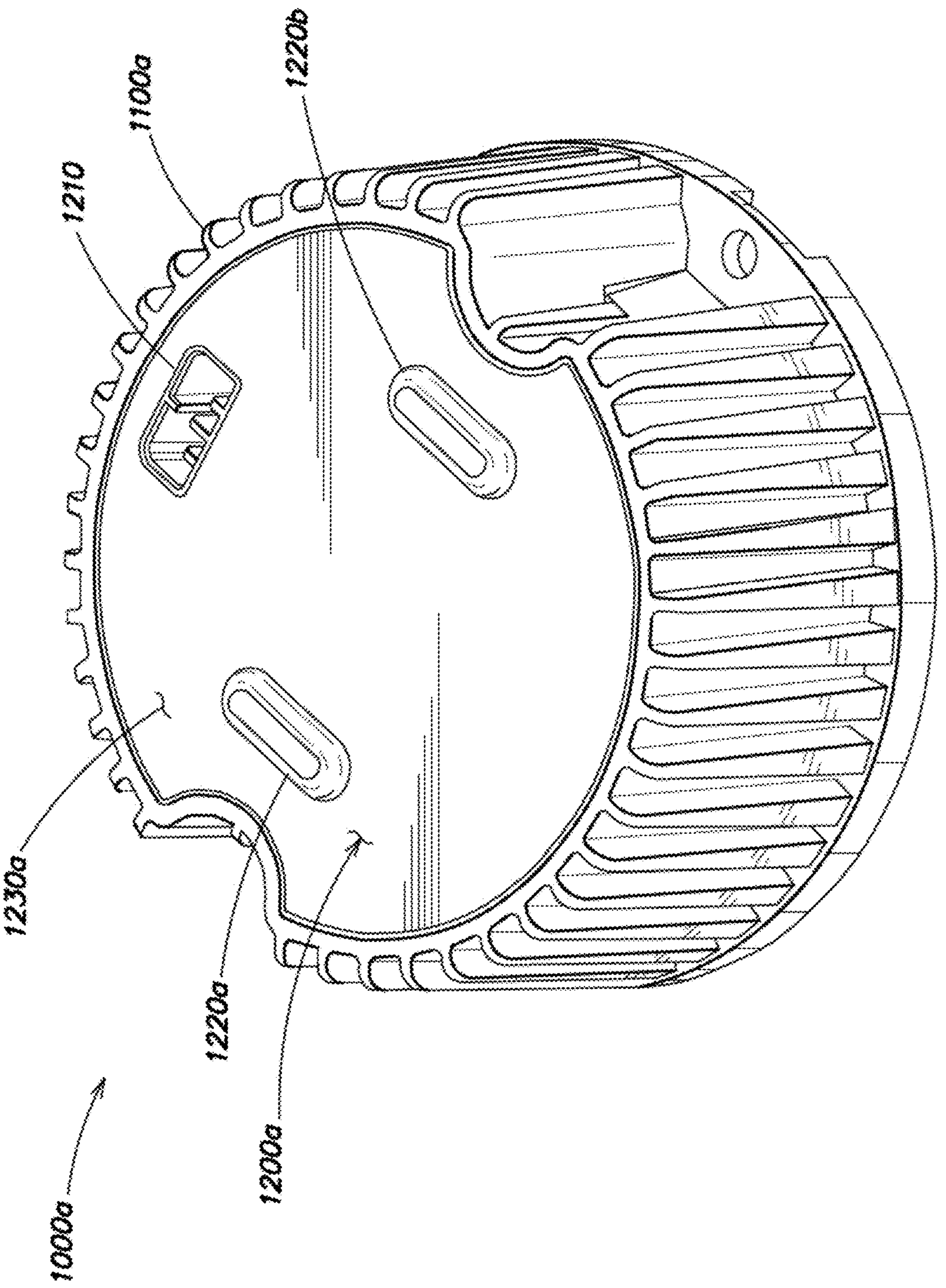
FIG. 1A shows a top perspective view of an exemplary lighting module with a reflector.
Figure 1B:
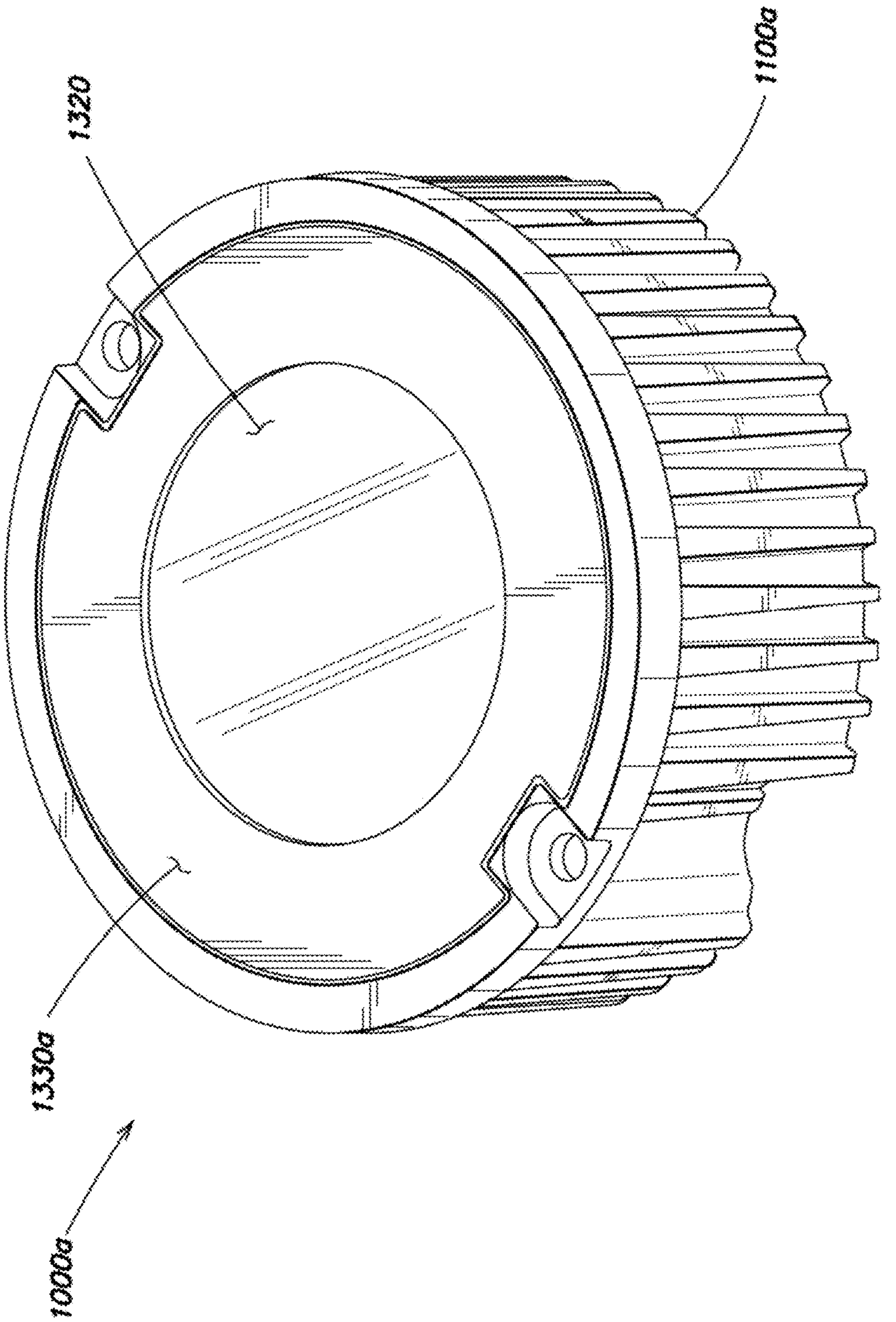
FIG. 1B shows a bottom perspective view of the lighting module of FIG. 1A.
Figure 1C:
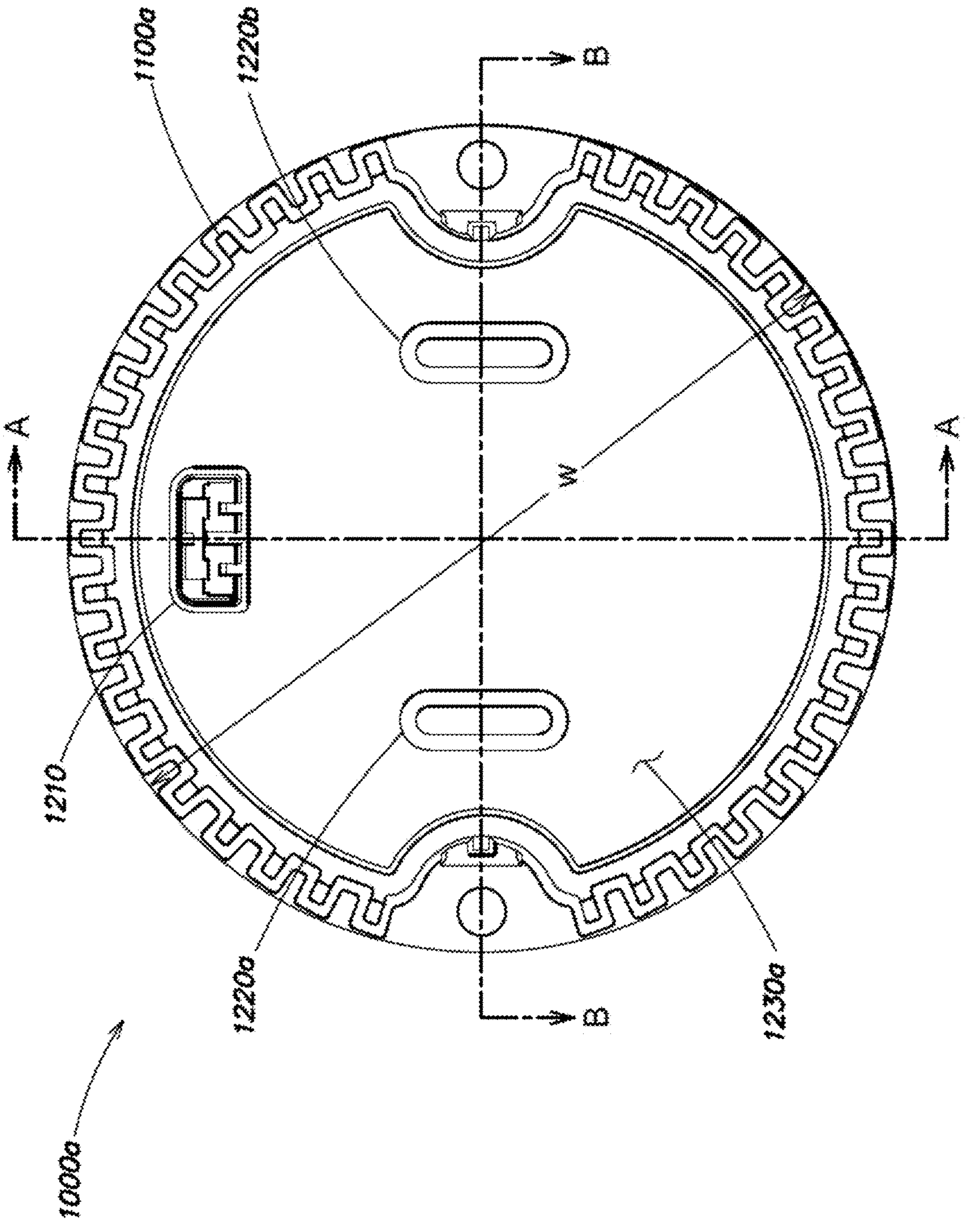
FIG. 1C shows a top view of the lighting module of FIG. 1A.
Figure 1D:
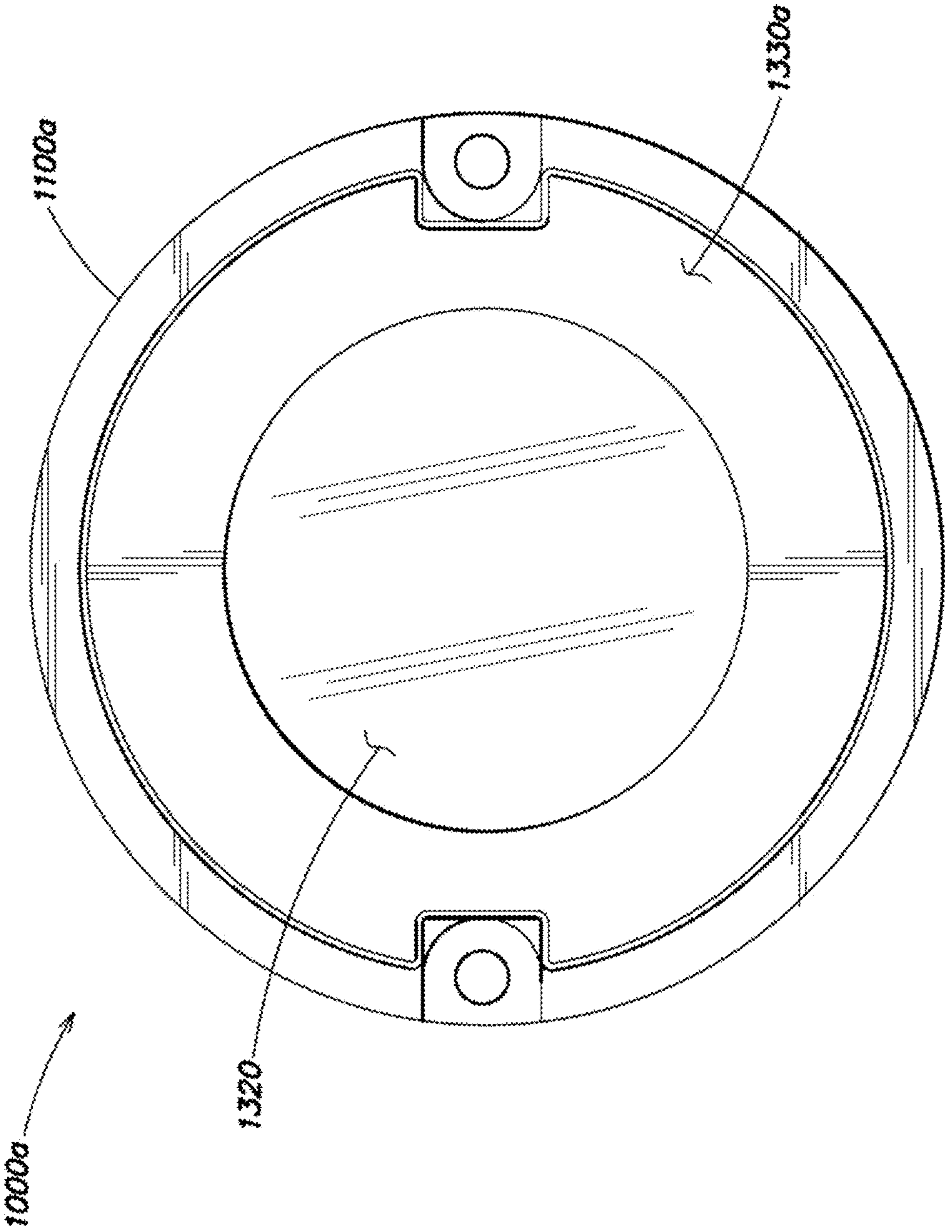
FIG. 1D shows a bottom view of the lighting module of FIG. 1A.
Figure 1E:
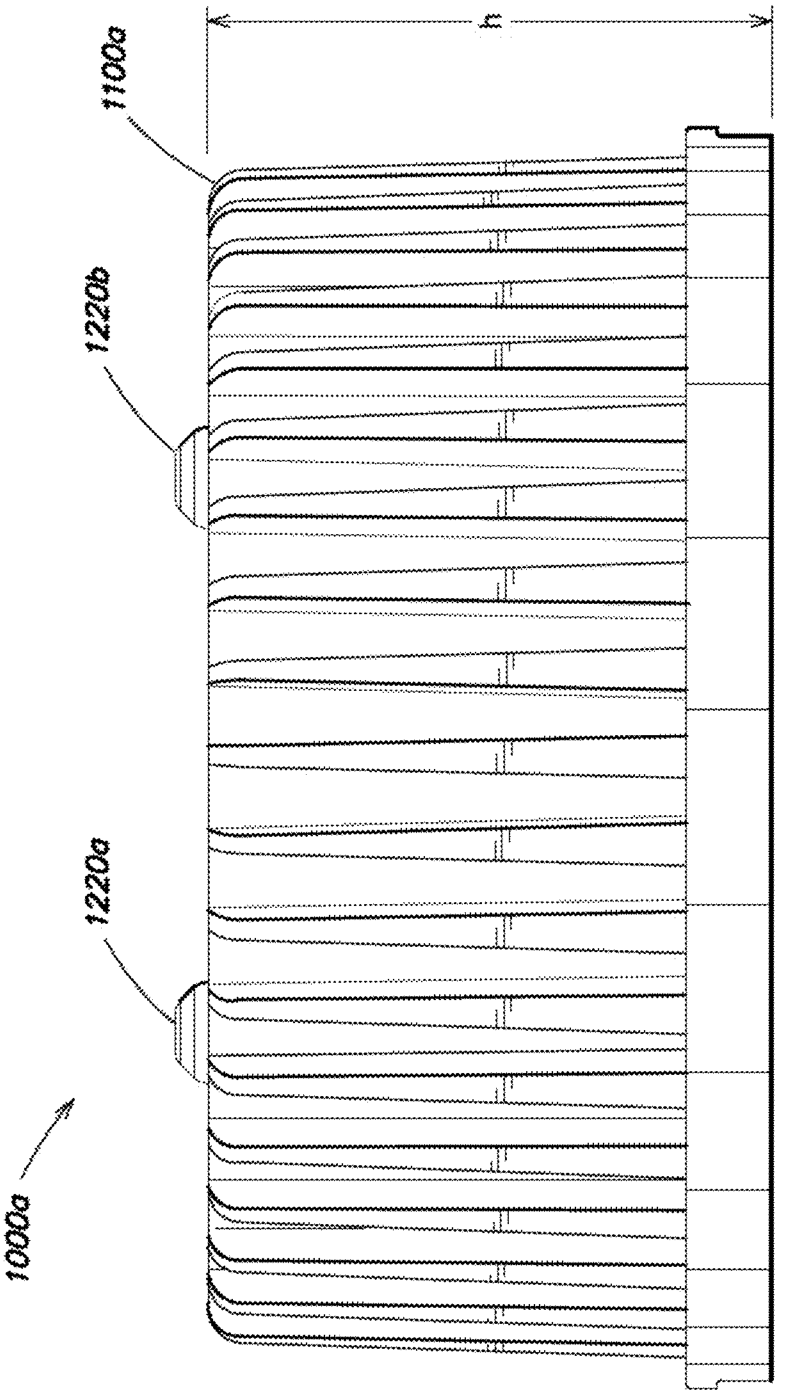
FIG. 1E shows a front view of the lighting module of FIG. 1A.
Figure 1F:
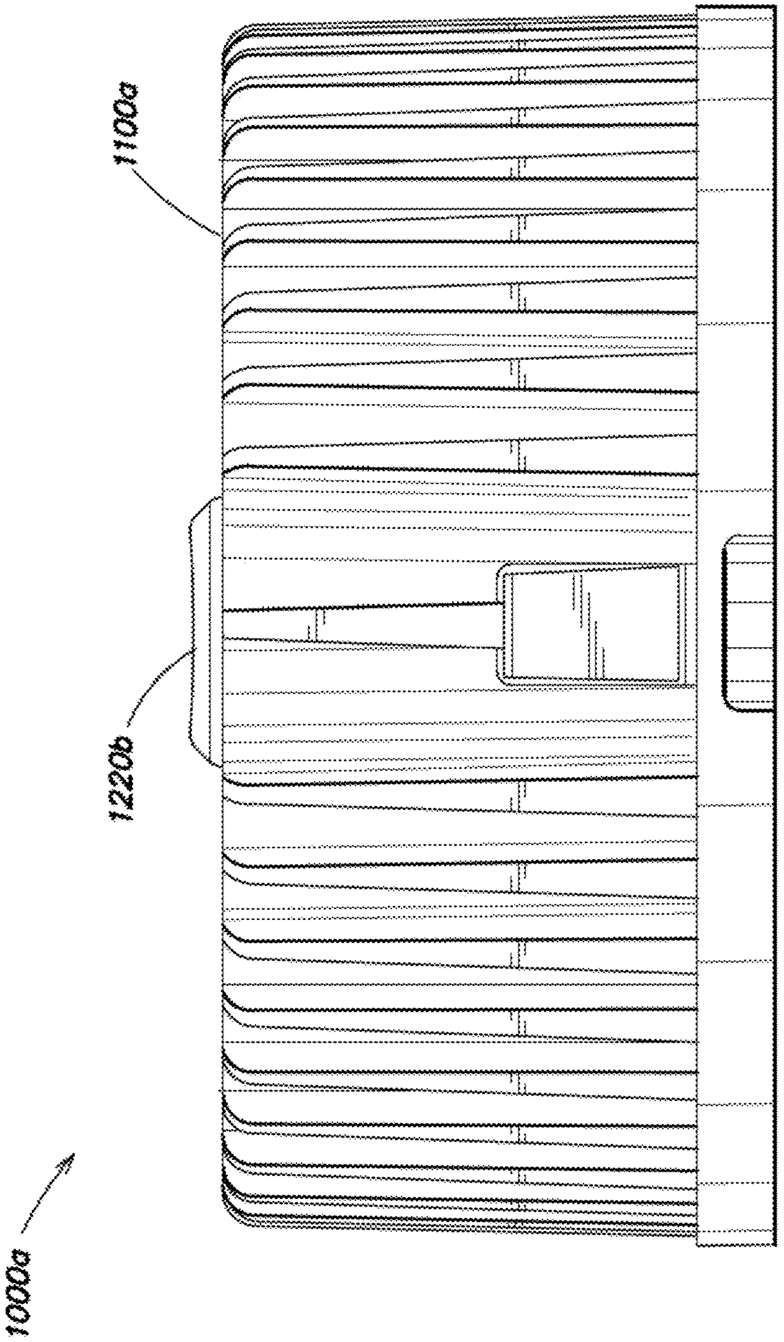
FIG. 1F shows a left-side view of the lighting module of FIG. 1A.
Figure 1G:
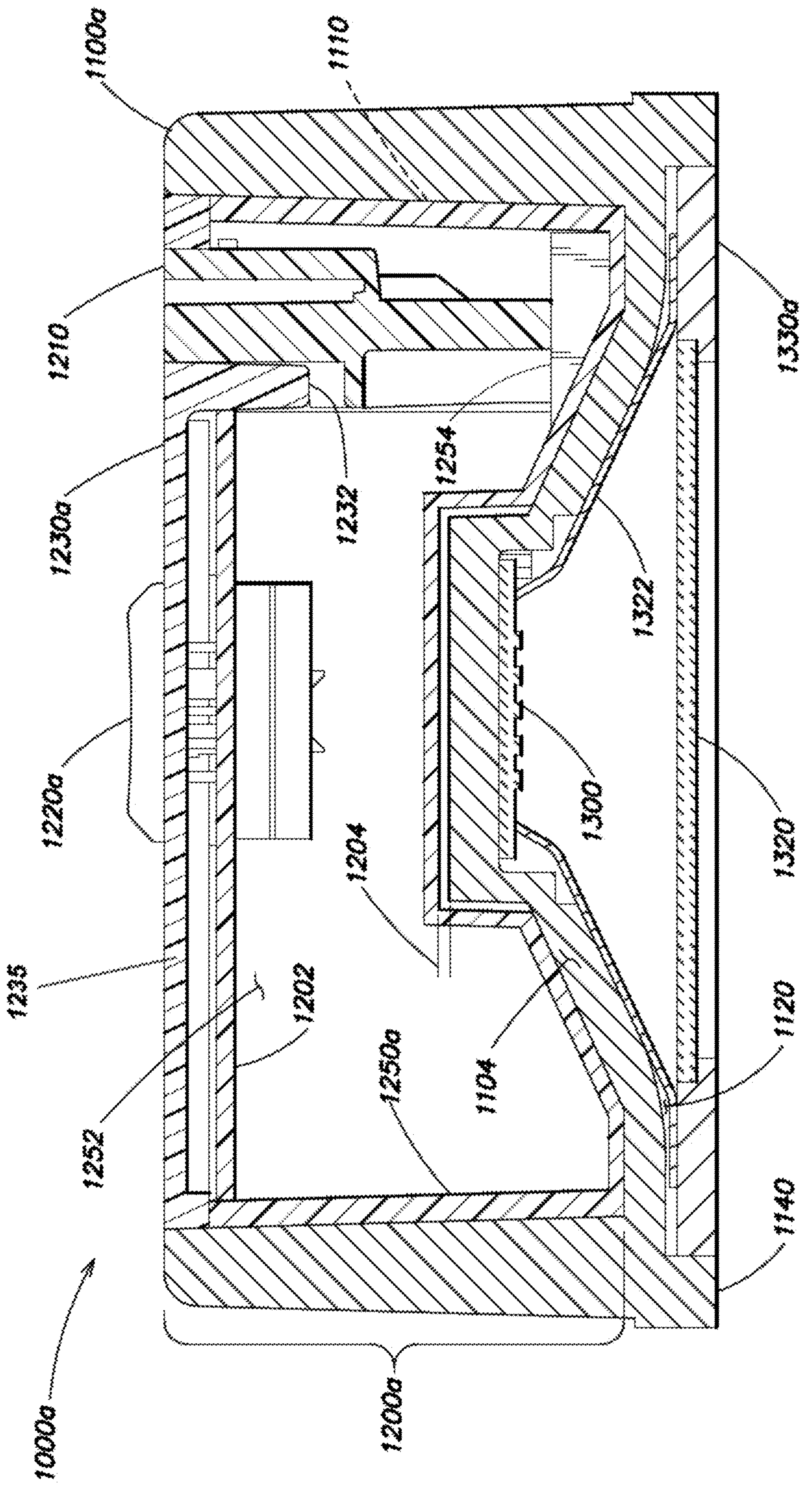
FIG. 1G shows a cross-sectional view of the lighting module corresponding to the plane A-A of FIG. 1C.
Figure 1H:
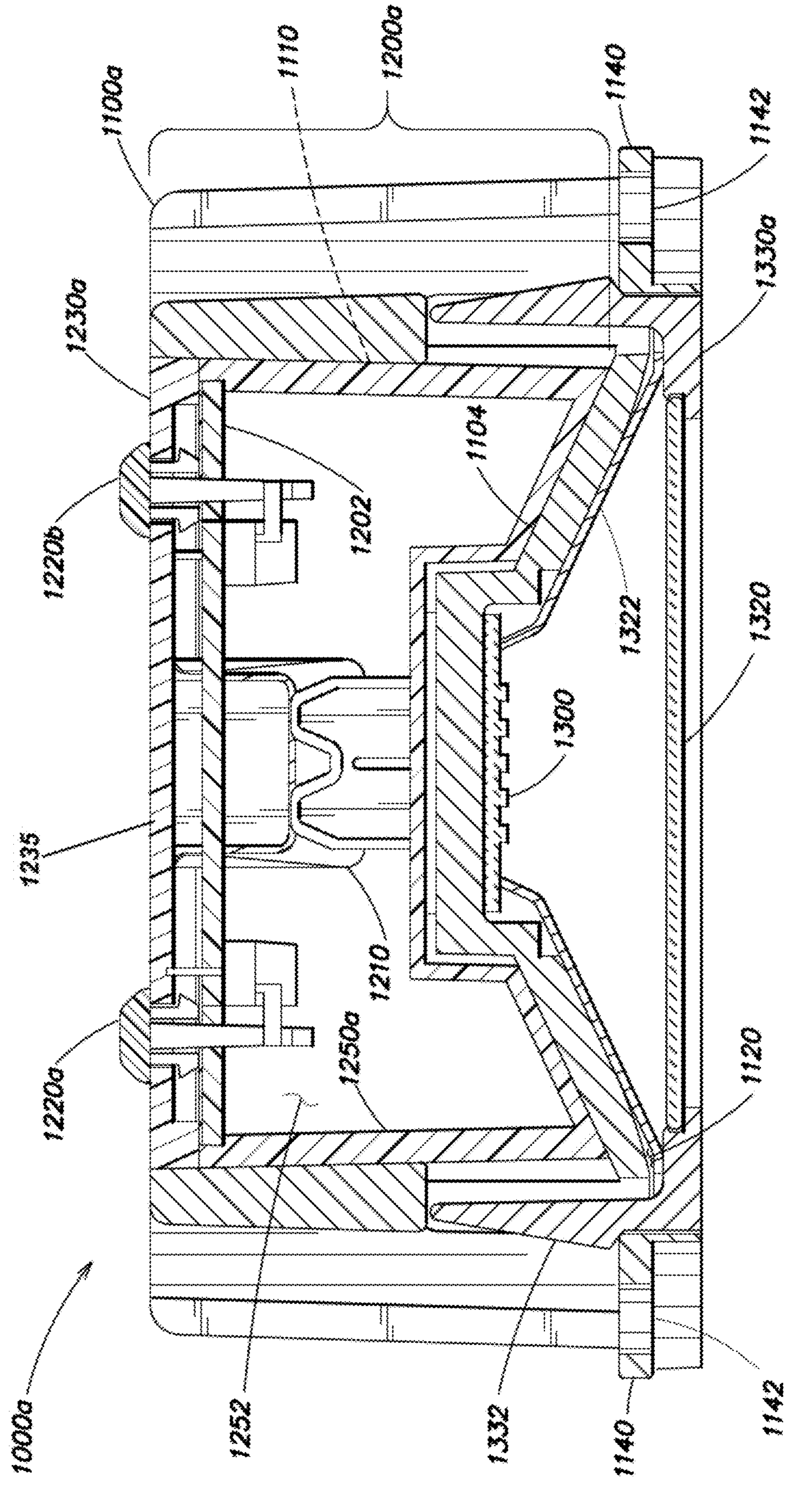
FIG. 1H shows a cross-sectional view of the lighting module corresponding to the plane B-B of FIG. 1C.
Figure 11:
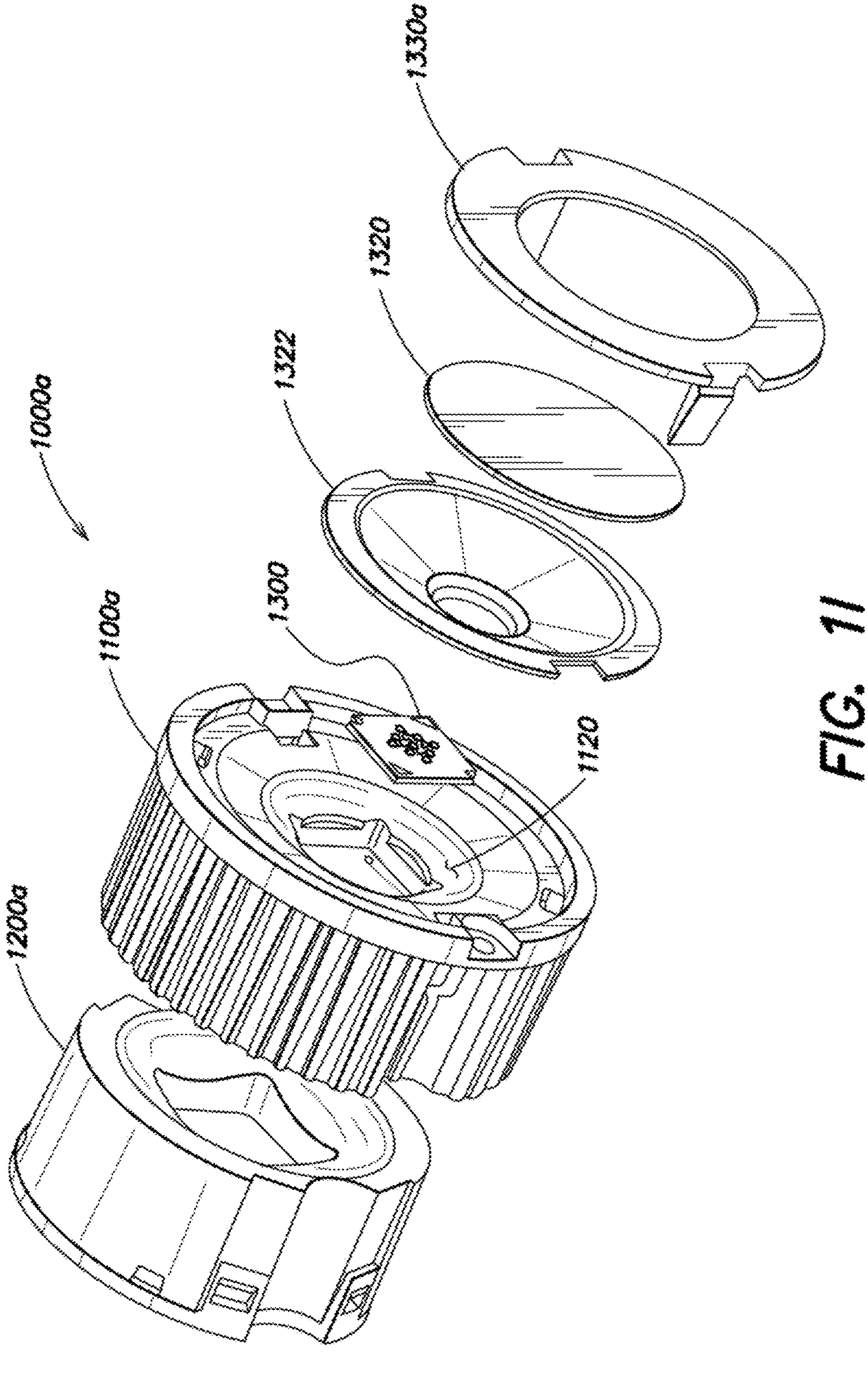
FIG. 11A shows a top perspective view of a driver housing in the driver enclosure of FIG. 10A.
FIG. 11B shows a bottom perspective view of the driver housing of FIG. 11A.
FIG. 11C shows a top view of the driver housing of FIG. 11A.
FIG. 11D shows a bottom view of the driver housing of FIG. 11A.
FIG. 11E shows a front view of the driver housing of FIG. 11A.
FIG. 11F shows a left-side view of the driver housing of FIG. 11A.
FIG. 11G shows a cross-sectional left-side view of the driver housing corresponding to the plane A-A of FIG. 11C.

The driver enclosure 1200*a* may be inserted into the first cavity 1110 of the heat sink 1100*a* as shown in FIGS. 1G and 1H. The driver housing 1250*a* may also include one or more male snap-fit connectors 1262 formed on the sidewall 1251 that couple to corresponding female snap-fit receptacles 1134 disposed along the sidewall 1130 of the heat sink 1100*a* to secure the driver enclosure 1200*a* to the heat sink 1100*a*. Again, the use of the snap-fit connectors 1262 and 1134 enable assembly of the driver enclosure 1200*a* and the heat sink 1100*a* without the use of any tools. In some implementations, the driver enclosure 1200*a*, once inserted into the first cavity 1110, may be intentionally difficult to remove from the heat sink 1100*a*. For example, the snap-fit connectors 1262 and 1134 may be disposed within the first cavity 1110 of the heat sink 1100*a* such that a user is unable to physically access the snap-fit connectors 1262 and 1134.

In some implementations, the snap-fit features (i.e., the snap-fit connectors 1240, 1260, 1262 and 1134) may be shaped and/or positioned to provide more space for the various components of the driver 1202 located in the cavity 1252. For example, FIG. 3A shows the male snap-fit connectors 1260 on the driver housing 1250*a* are recessed with respect to the exterior sidewall 1251 in order to accommodate the shape and/or dimensions of the tabs forming the female snap-fit receptacles 1240 on the driver cover 1230*a* in FIG. 4A. FIGS. 2A-2F show the female snap-fit receptacles 1240 do not protrude outwards from the sidewall 1251 of the driver housing 1250*a* after assembly. Instead, the tabs forming the female snap-fit receptacles 1240 are substantially flush with the sidewall 1251. Furthermore, the male snap-fit connectors 1260 do not intrude into the cavity 1252.

The sidewall 1251 of the driver housing 1250*a* may also include one or more keyed features 1256. The keyed feature 1256 may be a structural feature that breaks the radial symmetry of the sidewall 1251. The keyed feature 1256 may be shaped to align with corresponding keyed features 1132 of the heat sink 1100*a*, which allow the lighting module 1000*a* to fit inside an enclosure with tabs and/or posts, as discussed in more detail below. The keyed features 1256 and 1132 may align the driver enclosure 1200*a* to the heat sink 1100*a* and/or prevent unwanted rotation between the driver enclosure 1200*a* and the heat sink 1100*a*. The keyed feature 1256 may be a curved portion of the sidewall 1251 forming a concave surface with respect to the exterior of the sidewall 1251 that protrudes into the cavity 1252. The driver cover 1230*a* may also include keyed features 1236 that align with the keyed features 1256. During assembly, the keyed features 1236 and 1256 may align with corresponding keyed features 1132 on the heat sink 1100*a* to guide the insertion of the driver enclosure 1200*a* into the first cavity 1110 of the heat sink 1100*a*. In some implementations, the keyed features 1236 and 1256 of the driver enclosure 1200*a* may slide along an interior surface of the keyed features 1132 of the heat sink 1100*a*.

The driver housing 1250*a* may also include a base 1253 shaped to substantially conform with the shape of the partition 1104. For example, the base 1253 may include a recess 1255 that surrounds an island 1105 on the partition 1104 of the heat sink 1100*a*. In this manner, the base 1253 may also facilitate alignment between the driver enclosure 1200*a* and the heat sink 1100*a* (see FIGS. 1G and 1H) during assembly. The base 1253 may also include openings 1264 to feed conductors from the driver 1202 to the light source 1300.

The recess 1255 may also be shaped to form a gap 1204 (also referred to herein as cavity 1204) between the driver enclosure 1200*a* and the island 1105 of the partition 1104 near the light source 1300. In other words, a portion of the bottom surface of the driver housing 1250*a* that includes the recess 1255 may not abut the partition 1104 of the heat sink 1100*a*, thus dividing the first cavity 1110 of the heat sink 1100*a* into a region occupied by the driver enclosure 1200*a* and the gap 1204. The gap 1204 may provide a higher thermal resistance between the driver enclosure 1200*a* and the partition 1104 so that the heat generated by the light source 1300 is primarily transported along the partition 1104 to a flange 1140 of the heat sink 1100*a*.

It should be appreciated, however, that in some implementations, the driver enclosure 1200*a* may not form the gap 1204 with the partition 1104. Instead, the driver enclosure 1200*a* may substantially conform with the partition 1104 after assembly. For example, at least a portion of the driver enclosure 1200*a* (e.g., the driver housing 1250*a*) may be formed as an overmold that covers the heat sink 1100*a*.

The driver 1202 may also generate heat during operation of the lighting module 1000*a*. The heat generated by the driver 1202 may be dissipated in several ways. In some implementations, the driver 1202 may be thermally coupled to the heat sink 1100*a* such that the heat generated by the driver 1202 is transferred to the heat sink 1100*a*. For example, the driver enclosure 1200*a* may be formed of a thermally conductive material to provide a heat conduction path between the driver 1202 and the heat sink 1100*a*. In some implementations, the driver 1202 may be thermally insulated from the heat sink 1100*a* (e.g., the driver enclosure 1200*a* is formed of a thermally insulating material) thus limiting the transfer of heat from the driver 1202 to the heat sink 1100*a*. For such cases, the driver 1202 may instead dissipate heat to the surrounding environment (e.g., the ceiling or wall space, the space within a cavity of a lighting fixture enclosure) via convection and/or radiation particularly if the surrounding environment is sufficiently large.

The driver enclosure 1200*a* may also include one or more selectable switches, such as switches 1220*a* and 1220*b* (collectively referred to herein as selectable switch 1220) electrically coupled to the driver 1202 and disposed along the top surface of the driver cover 1230*a*. The selectable switches 1220 may be various types of switches including, but not limited to linear, rotary, and dip switches. It should also be appreciated the positioning of the selectable switch 1220 is not limited to the driver cover 1230*a*, but instead may be disposed on other portions of the lighting module 1000*a* so long as the selectable switch 1220 is readily accessible by a user. The selectable switch 1220 may be partially inserted through openings in the driver cover 1230*a* (e.g., openings 1242*a* and 1242*b*) formed on the base 1235 to allow a user to manually select desired operating parameters of the lighting module 1000*a*. For example, the user may use the selectable switch 1220 to reconfigure the properties of the light outputted by the lighting module 1000*a* including, but not limited to a color temperature, a lumen output, and a power output of the light emitted by the light source 1300.

FIGS. 5A-5F show several views of the heat sink 1100*a*. As shown, the heat sink 1100*a* may include the sidewall 1130 and the partition 1104 defining the first cavity 1110 and the second cavity 1120. The partition 1104 may include openings 1108 to feed conductors from the driver 1202 to the light source 1300 and openings 1106 to couple the light source 1300 to the partition 1104. The sidewall 1130 may include a flange 1140 with openings 1142 to couple the lighting module 1000*a* to an enclosure (e.g., a can housing, a junction box). The heat sink 1100*a* may include multiple fins 1107 disposed along the exterior of the sidewall 1130 to facilitate cooling of the lighting module 1000*a*. The heat sink 1100*a* may be formed of a thermally conductive material, such as aluminum.

As shown in FIGS. 1G and 1H, the driver enclosure 1200*a* may substantially fill the first cavity 1110 such that the driver cover 1230*a* and, in particular, the base 1235 is substantially flush with a top edge of the sidewall 1130 after assembly. In other implementations, the driver cover 1230*a* may not be flush with the sidewall 1130 of the heat sink 1100*a*. For example, the driver cover 1230*a* may be recessed with respect to the sidewall 1130 such that the sidewall 1130 extends above the driver cover 1230*a*.

The heat sink 1100*a* may include one or more keyed features 1132 to provide sufficient clearance for the lighting module 1000*a* to be inserted through an opening of an enclosure or a housing (not shown) that includes one or more tabs and/or posts disposed along the opening. For example, the enclosure may be a standard sized electrical junction box (e.g., a 3" junction box, a 4" junction box, a 3"/4" combo junction box) with two tabs or posts that each include an opening (see, for example, the posts 2120*a* and 2120*b* and openings 2122*a* and 2122*b* in the enclosure 2100*b* of FIG. 20I). The openings 1142 on the flange 1140 may be positioned to align with the openings of the tabs on the junction box. The keyed features 1132 may also guide the insertion of the driver enclosure 1200*a* into the first cavity 1110 during assembly via the keyed features 1236 and 1256 in the driver enclosure 1200*a*.

The keyed feature 1132 may be a curved portion of the sidewall 1130 forming a concave surface with respect to the exterior of the sidewall 1130 and a convex surface with respect to the interior of the sidewall 1130. In some implementations, each keyed feature 1132 may be located along the sidewall 1130 proximate to one of the opening 1142 on the flange 1140. In this manner, the keyed feature 1132 may provide clearance for a corresponding tab) on an enclosure to slide along the length of the sidewall 1130 until contact is made with the flange 1140 when the lighting module 1000*a* is inserted into the enclosure. As described above, the tab may include an opening that aligns with the opening 1142. A fastener may be inserted through the respective openings 1142 of the lighting module 1000*a* and the openings of the enclosure for attachment. The keyed feature 1132 may further include different sized fins 1107 or no fins to ensure sufficient clearance for the tab/post of the enclosure.

Figure 1J:
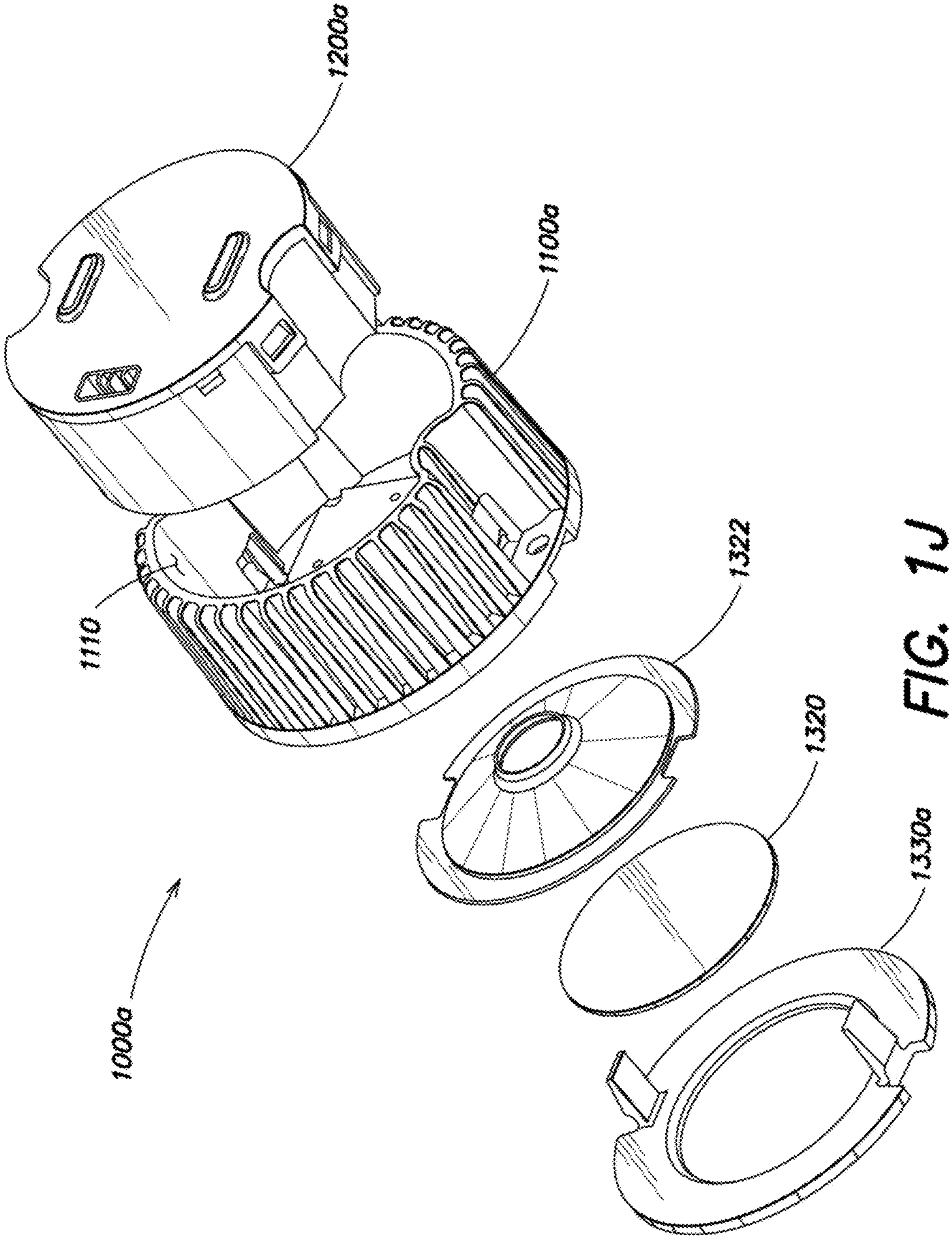
FIG. 1J shows an exploded top perspective view of the lighting module of FIG. 1A.
Figure 2A:
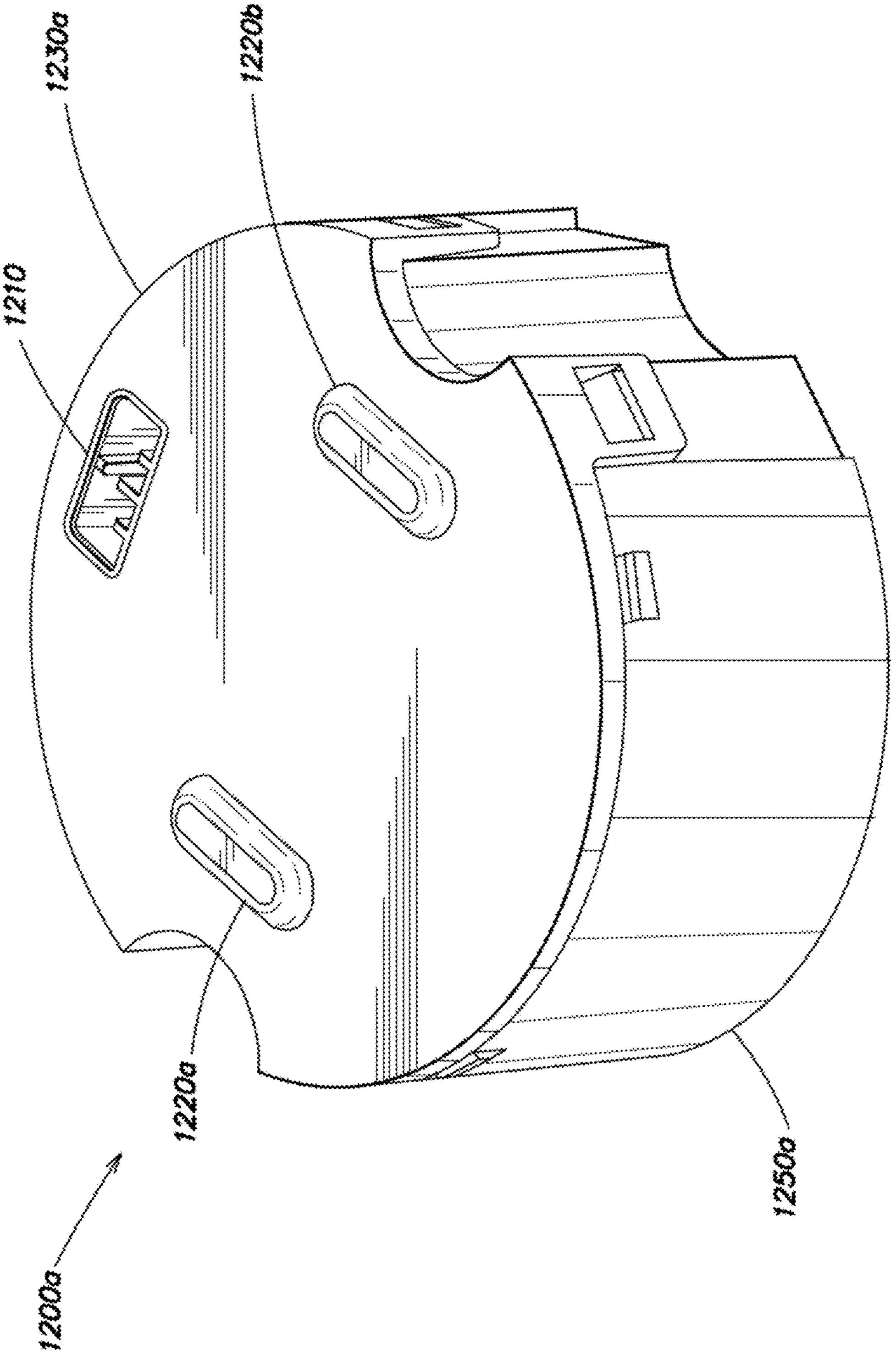
FIG. 2A shows a top perspective view of a driver enclosure in the lighting module of FIG. 1A.
Figure 2B:
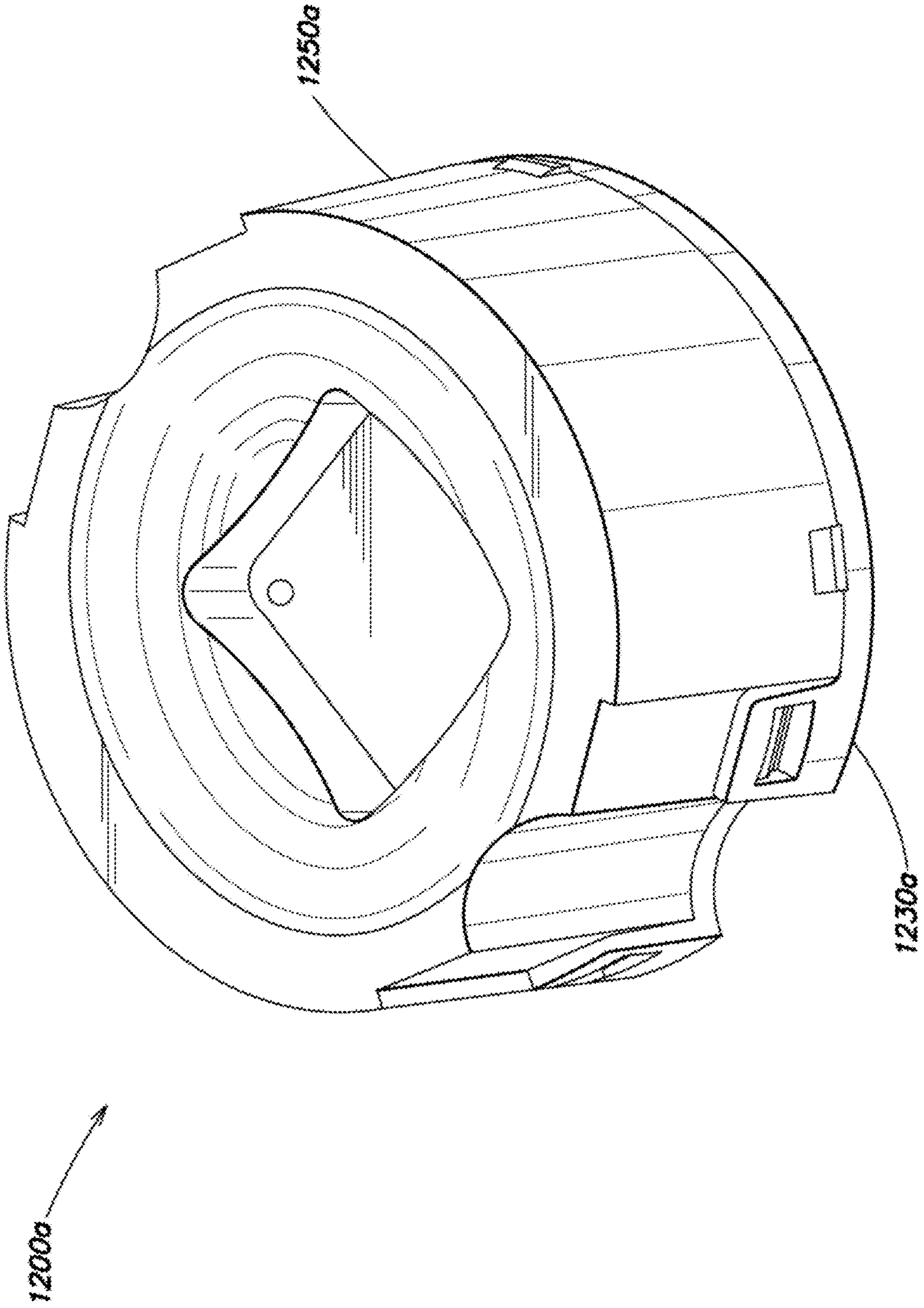
FIG. 2B shows a bottom perspective view of the driver enclosure of FIG. 2A.
Figure 2C:
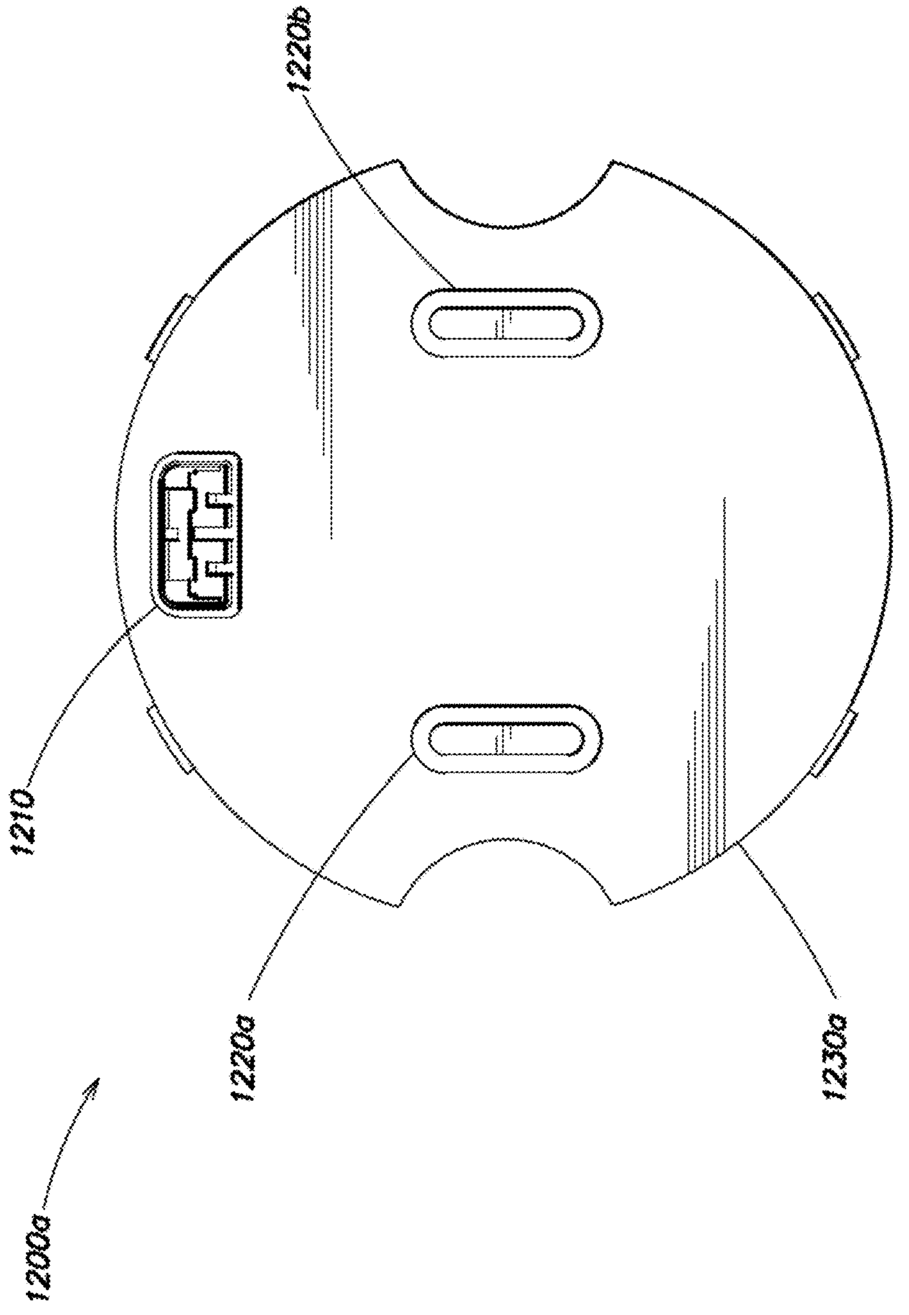
FIG. 2C shows a top view of the driver enclosure of FIG. 2A.
Figure 2D:
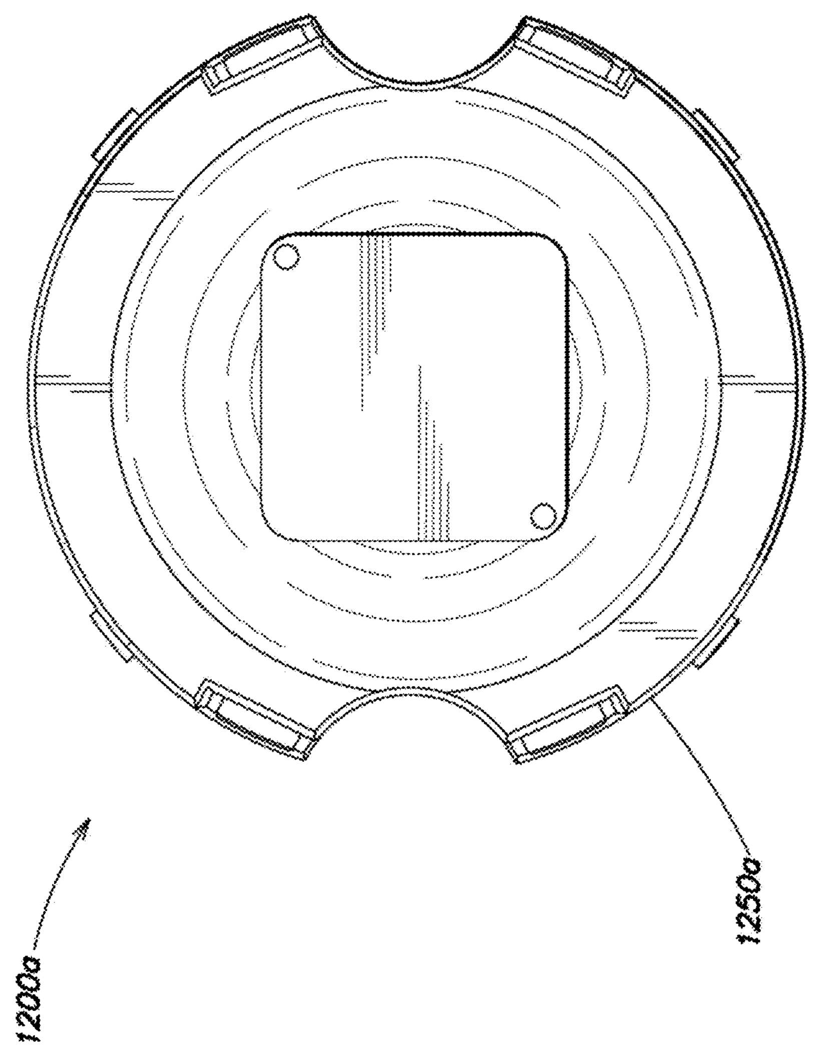
FIG. 2D shows a bottom view of the driver enclosure of FIG. 2A.
Figure 2E:
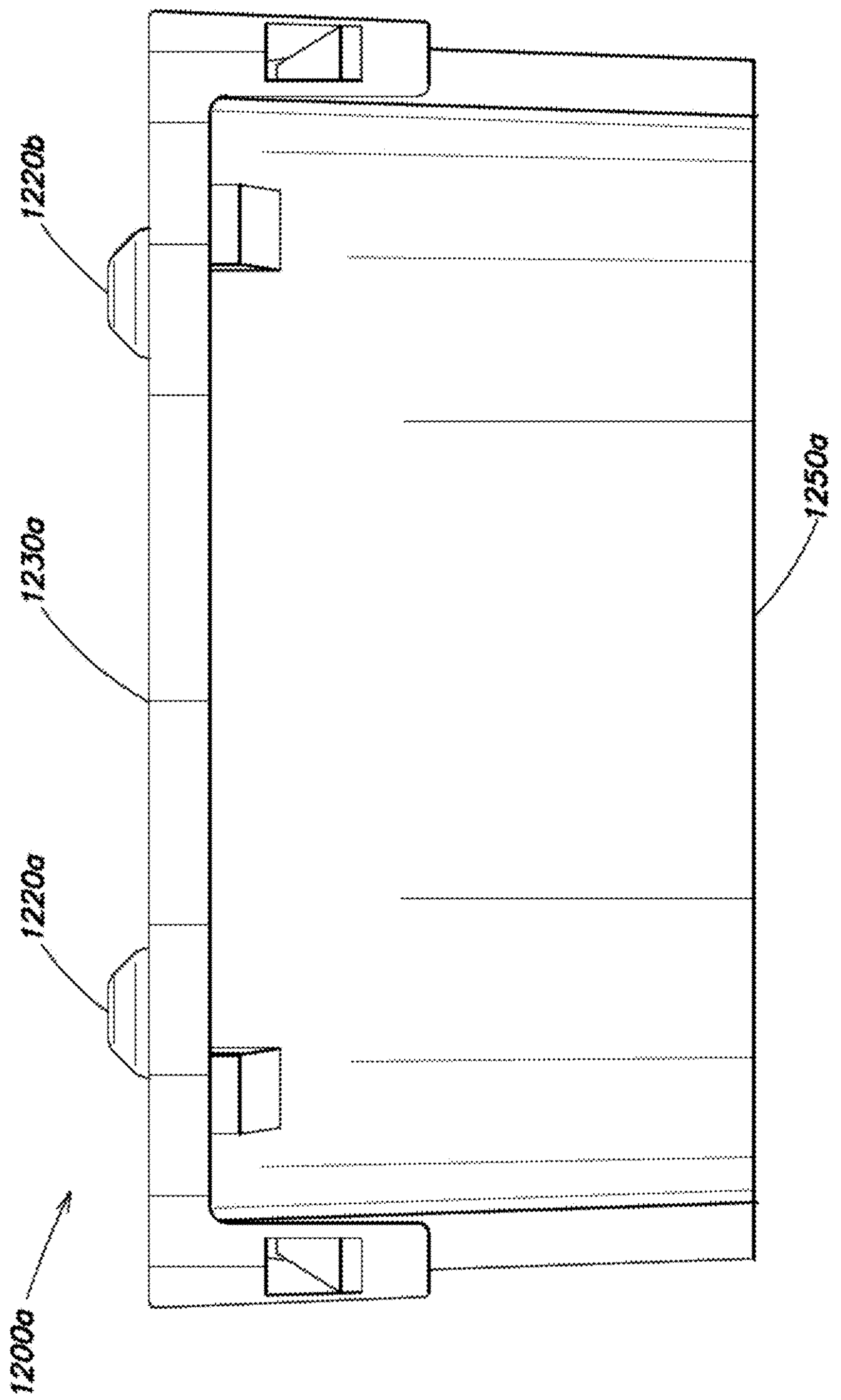
FIG. 2E shows a front view of the driver enclosure of FIG. 2A.
Figure 2F:
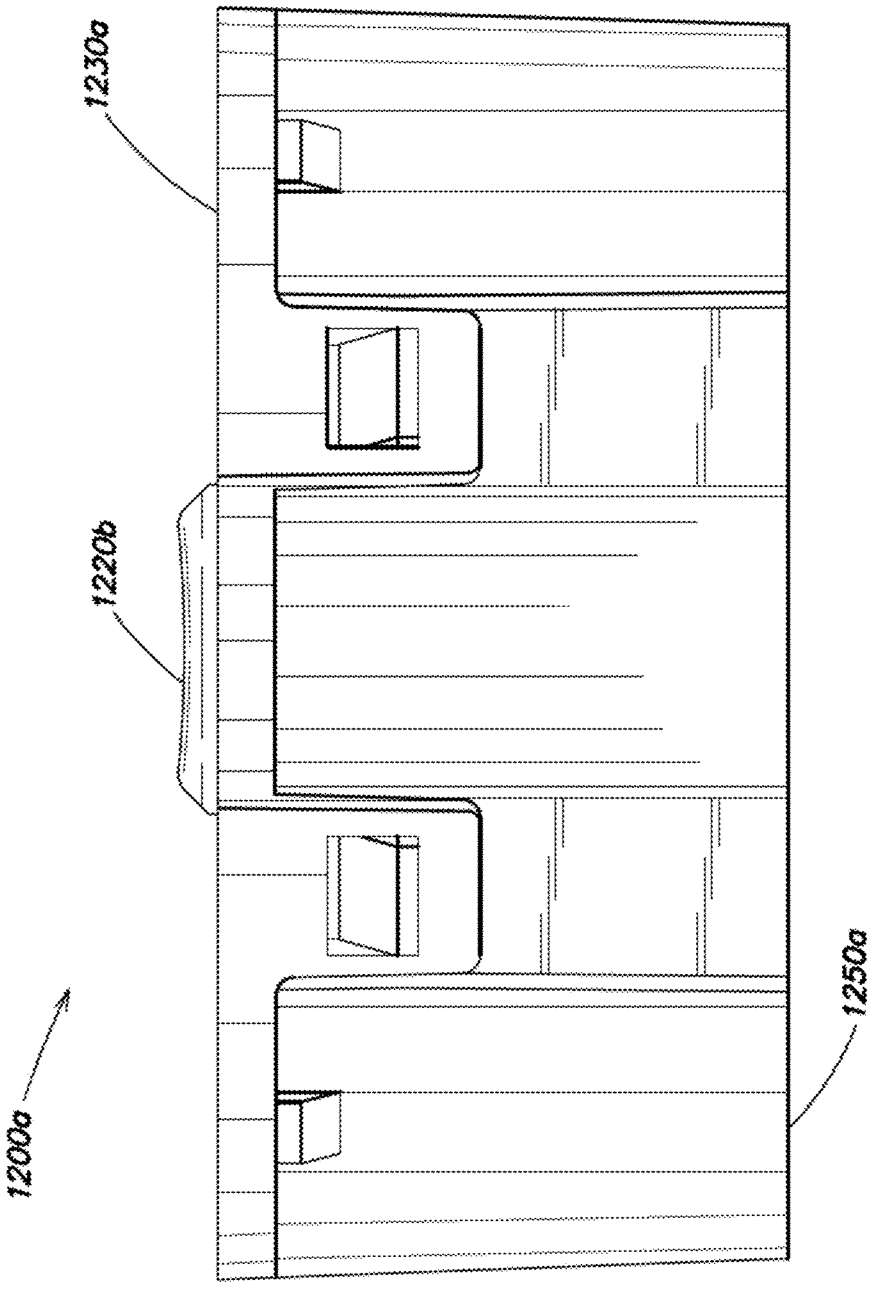
FIG. 2F shows a left-side view of the driver enclosure of FIG. 2A.

As shown in FIGS. 1H-1J, the lighting module 1000*a* may also include a reflector 1322 and/or an optic 1320 to redirect the light emitted by the light source 1300. In some implementations, the light may be redirected for the purposes of modifying the spatial and/or angular distribution of light (e.g., focusing the light, orienting the light along a desired direction, reducing undesirable non-uniformities in the light distribution such as bright spots or dark spots). The reflector 1322 may be a component disposed in the second cavity 1120. A retaining ring 1330*a* may be used, in part, to enclose the second cavity 1120 of the heat sink 1100*a*. In some implementations, the retaining ring 1330*a* may also securely position the reflector 1322 in the second cavity 1120. For example, a portion of the retaining ring 1330*a* may press against the reflector 1322 resulting in a sufficiently large frictional or normal force between the reflector 1322, the partition 1320, and the retaining ring 1330*a* to hold the reflector 1322 in place within the second cavity 1120. For example, FIG. 1H shows a flange 1334 of the retaining ring 1330*a* may abut a portion of the reflector 1322.

The reflector 1322 may be shaped to reflect light emitted by the light source 1300 with a desired angular and/or spatial distribution. For example, the reflector 1322 may be shaped to substantially collimate the light from the light source 1300. In another example, the reflector 1322 may be shaped such that the intensity of the light outputted by the lighting module 1000*a* is substantially uniform (i.e., there are no observable spots, rings, scalloping in the light). The reflector

1322 may reflect light specularly (e.g., the reflector 1322 has a mirrored surface) or diffusely (e.g., the reflector 1322 has a white, matte surface).

In some implementations, the lighting module 1000*a* may not include the reflector 1322. Instead, the interior surfaces of the second cavity 1120 of the heat sink 1100*a* may be configured to reflect the light from the light source 1300. In this manner, the number of parts in the lighting module 1000*a* may be reduced, thus simplifying assembly and/or decreasing costs. Additionally, the overall dimensions of the lighting module 1000*a* may also be reduced since the second cavity 1120 does not have to accommodate the reflector 1322.

In some implementations, the portion of the sidewall 1130, partition 1104, and/or flange 1140 forming the second cavity 1120 may be coated with a reflective coating. The reflective coating may be applied to at least a portion of the surfaces forming the second cavity 1120 so long as the portion of the surfaces with the reflective coating substantially surrounds the light source 1300. The reflective coating may provide a reflectance of at least about 75% within at least a desired wavelength range of interest. For example, the desired wavelength range of interest may correspond to the wavelength(s) of light emitted by the light source 1300. In another example, the desired wavelength range of interest may span the visible spectrum of light (e.g., about 400 nm to about 700 nm).

The reflective coating may be a paint that reflects light diffusely (e.g., a white matte paint), specularly (e.g., a mirror-finish paint), or some combination thereof. The reflective coating may also be applied using powder coating. In some implementations, a reflective film or sheet may be applied to the interior surfaces of the second cavity 1120. For example, a reflective film, such as a metallized mylar sheet or a white polymeric film, may be shaped to lie against and/or adhered to the various surfaces of the second cavity 1120. In some implementations, the respective surfaces of the second cavity 1120 may be polished to increase the reflectance of the second cavity 1120. For example, the heat sink 1100 may be formed of a metal, such as aluminum, which may be polished to have a sufficiently smooth surface (i.e., low surface roughness) to specularly reflect light from the light source 1300.

In some implementations, the various surfaces defining the second cavity 1120 may also be shaped to reflect the light with a desired intensity distribution along a desired direction. For example, the partition 1104 may be shaped to have a tapered and/or a curved wall and/or surface. The light emitted by the light source 1300 at large emission angles may reflect off the partition 1104 and towards the opening 1336 of the retaining ring 1330*a* where the emission angle is defined with respect to an optical axis of the light source 1300. It should be appreciated, however, that in other implementations the partition 1104 may be substantially flat with respect to one or both of the cavities 1110 and 1120.

The optic 1320 may be various types of optics including, but not limited to a diffusive element, a focusing optic, and a diverging optic. In some implementations, the optic 1320 may also filter a portion of the light such that a desired spectrum of light (e.g., a desired color) is outputted by the lighting module 1000*a*. In some implementations, the optic 1320 may be directly coupled to the retaining ring 1330*a* using various coupling mechanisms including, but not limited to a snap fit, a press fit, and an ultrasonic weld. In some implementations, the optic 1320 may be integrated together with the retaining ring 1330*a*. For example, the retaining ring 1330*a* may be formed of a transparent material without the opening 1336. The central portion of the retaining ring 1330*a* through which the light exits the lighting module 1000*a* may be shaped as a lens. Additionally, the surface finish of the central portion of the retaining ring 1330*a* may be configured to specularly or diffusely transmit light.

The reflector 1322 and/or the optic 1320 may generally be field replaceable. For example, a user wanting to modify the light output may remove the retaining ring 1330*a* by pressing respective snap-fit connectors (e.g., snap-fit connectors 1332) in order to swap out the reflector 1322 and/or the optic 1320. In another example, the snap-fit connectors 1332 may be sufficiently compliant such that a tool (e.g. a flat head screwdriver) can pry the retaining ring 1330*a* off the heat sink 1100*a*. In implementations where the retaining ring 1330*a* and the optic 1320 are integrated together as a single part, the user may replace the retaining ring 1330*a* for another retaining ring 1330*a*. In this manner, the retaining ring 1330*a* may function as a vehicle for mounting different optics 1320 into the lighting module 1000*a*.

FIGS. 6A-6F show several views of the retaining ring 1330*a*. As shown, the flange 1334 of the retaining ring 1330*a* may define an opening 1336 through which light from the light source 1300 exits the lighting module 1000*a*. The flange 1334 may further include a ledge 1338 disposed along the interior portion of the flange 1334 defining the opening 1336. The ledge 1338 may be recessed with respect to the flange 1334 to contain the optic 1320. The ledge 1338 may also include tabs 1340 that provide a snap-fit connection to secure the optic 1320 to the retaining ring 1330*a*.

The retaining ring 1330*a* may also include male snap-fit connectors 1332 that couple to corresponding female snap-fit receptacles 1136 in the heat sink 1100*a*. The female snap-fit receptacles 1136 may be collocated with the keyed feature 1132 and/or the opening 1142 on the flange 1140. As shown in FIGS. 1G and 1H, the flange 1334 of the retaining ring 1330*a* may be substantially flush with the flange 1140 of the heat sink 1100*a* after assembly. However, it should be appreciated the retaining ring 1330*a* in other implementations may not be flush with the flange 1140 of the heat sink 1100*a*. For example, the retaining ring 1330*a* may include hex louver features that protrude from the flange 1140 and/or are recessed with respect to the flange 1140. In another example, the retaining ring 1330*a* may lie on the flange 1140.

Figure 5A:
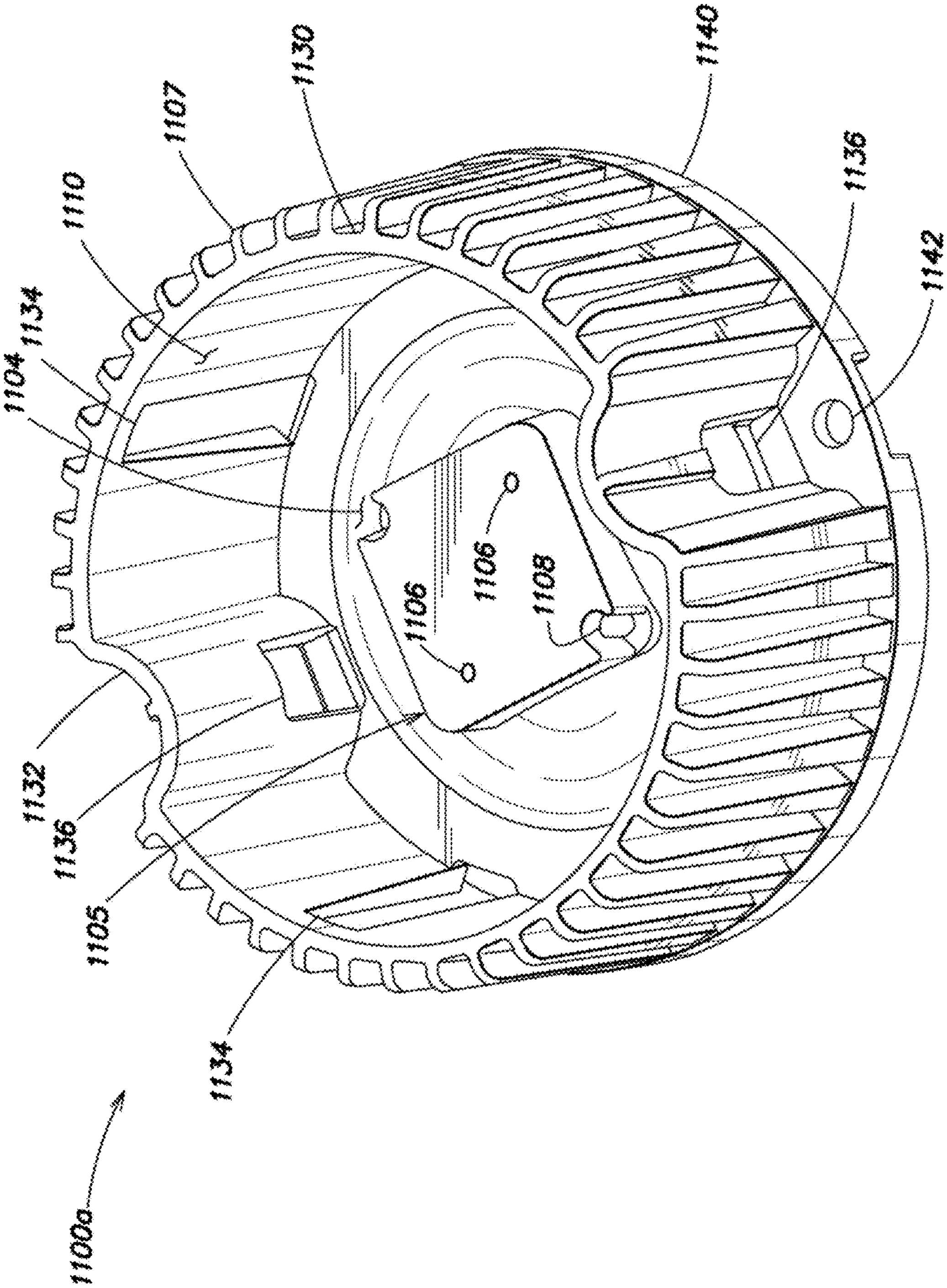
FIG. 5A shows a top perspective view of a heat sink in the lighting module of FIG. 1A.
Figure 5B:
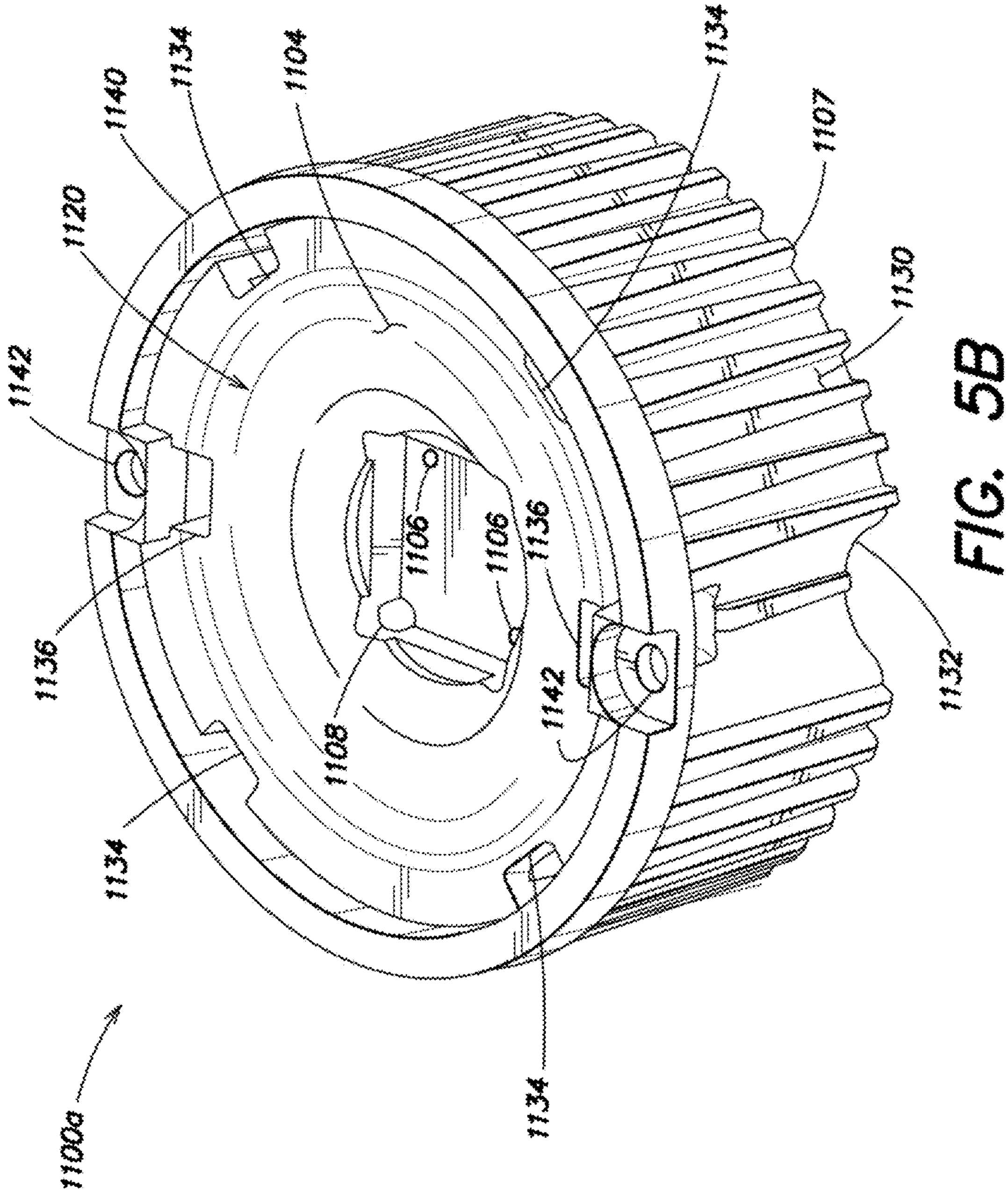
FIG. 5B shows a bottom perspective view of the heat sink of FIG. 5A.
Figure 5C:
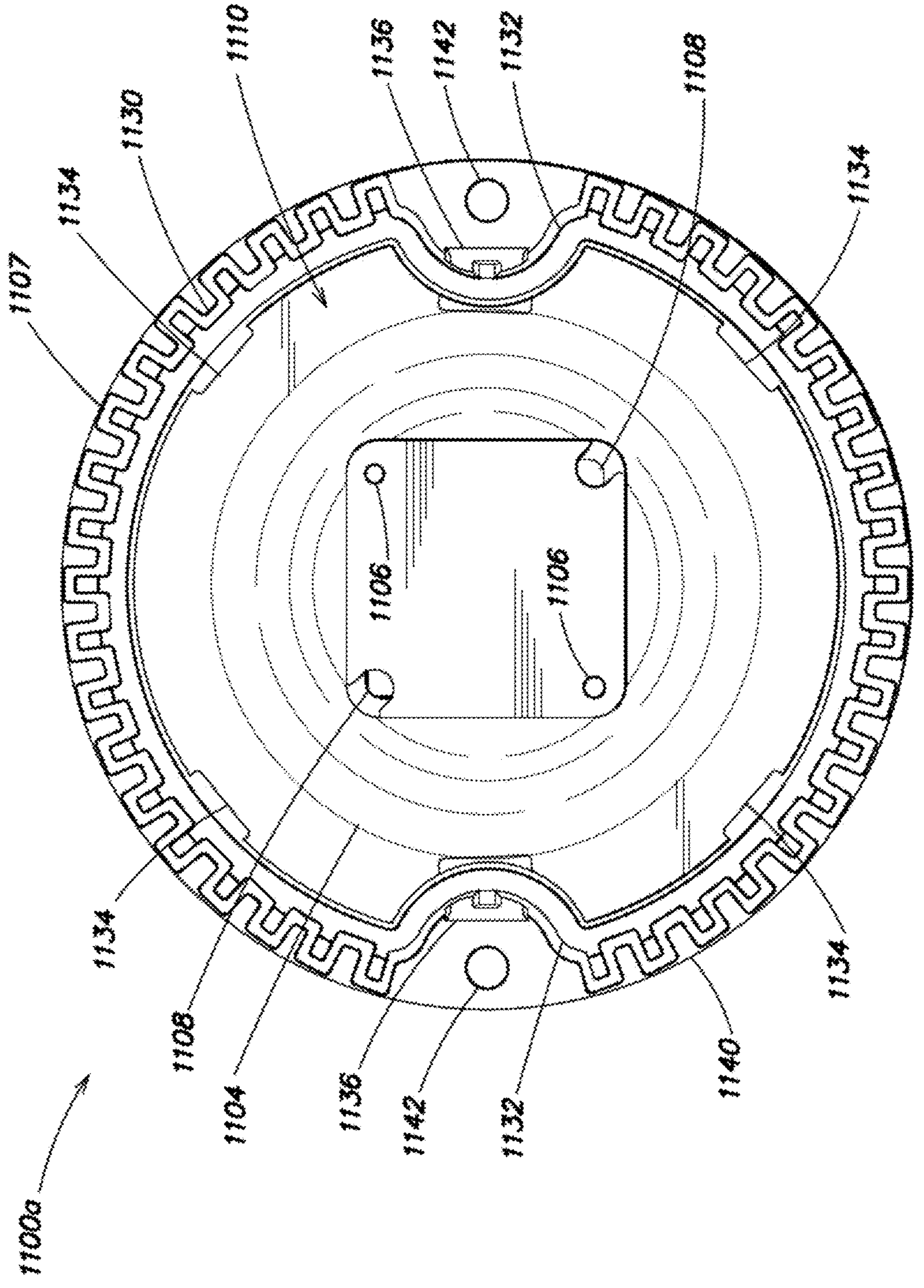
FIG. 5C shows a top view of the heat sink of FIG. 5A.
Figure 5D:
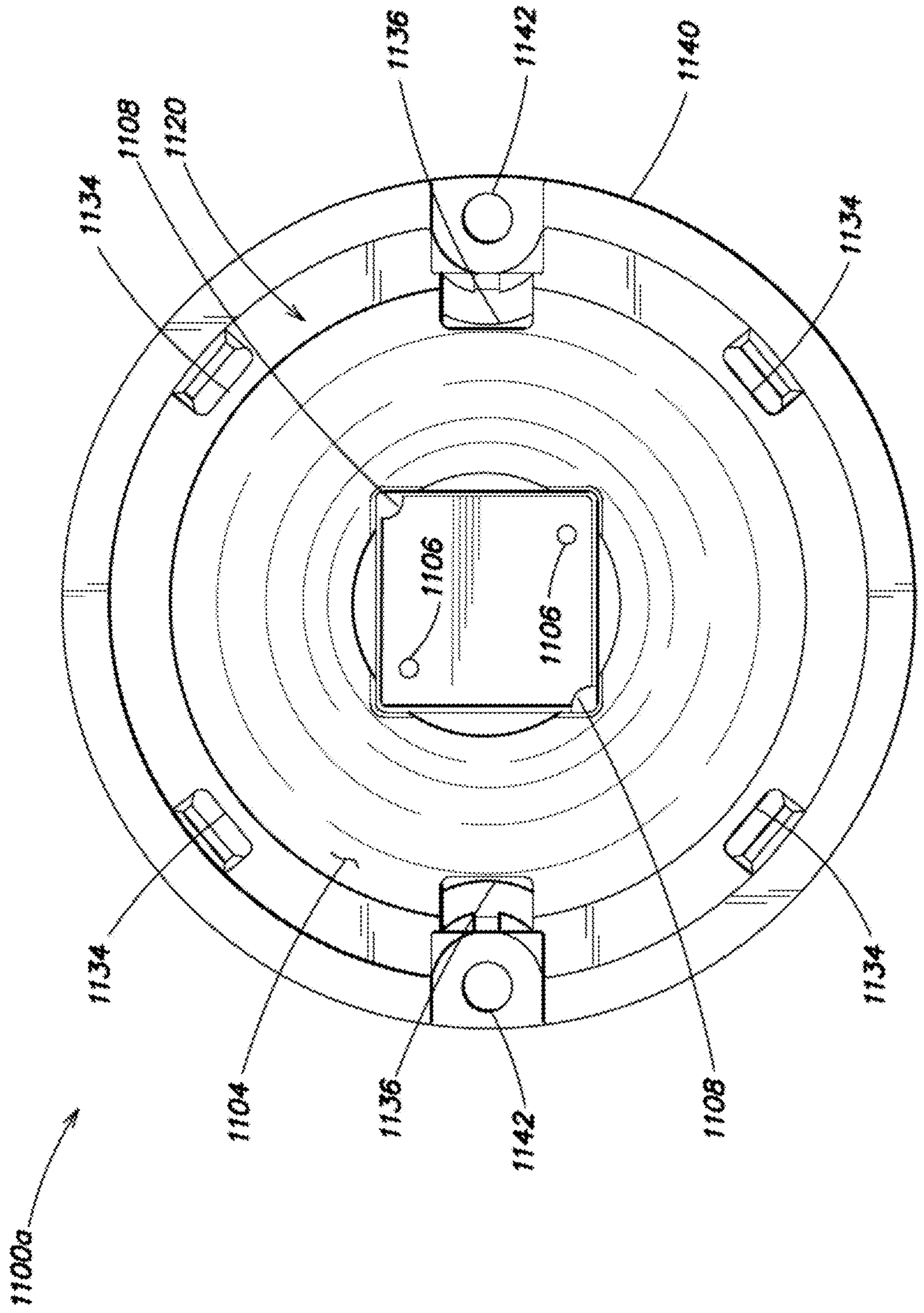
FIG. 5D shows a bottom view of the heat sink of FIG. 5A.
Figure 5E:
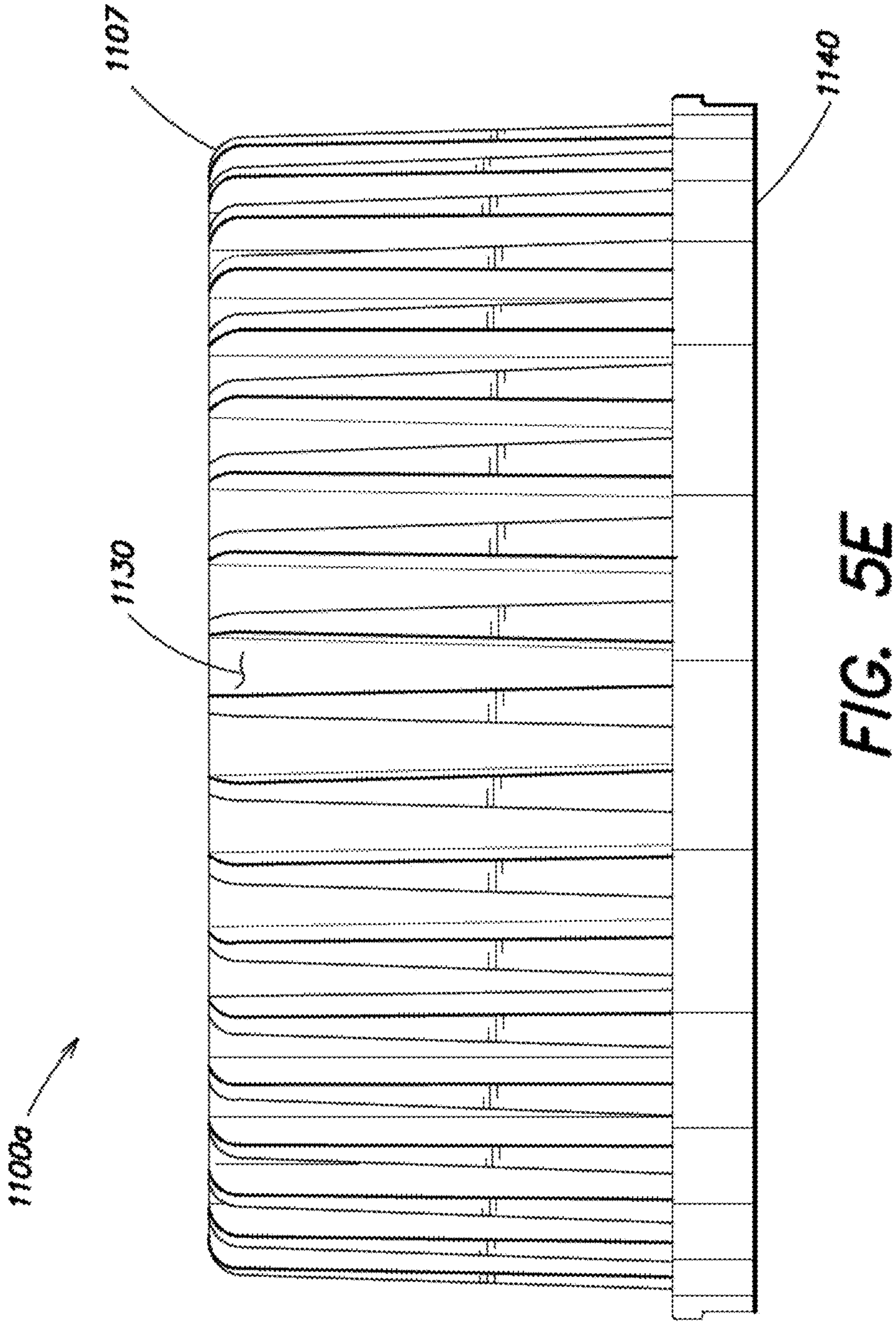
FIG. 5E shows a front view of the heat sink of FIG. 5A.
Figure 5F:
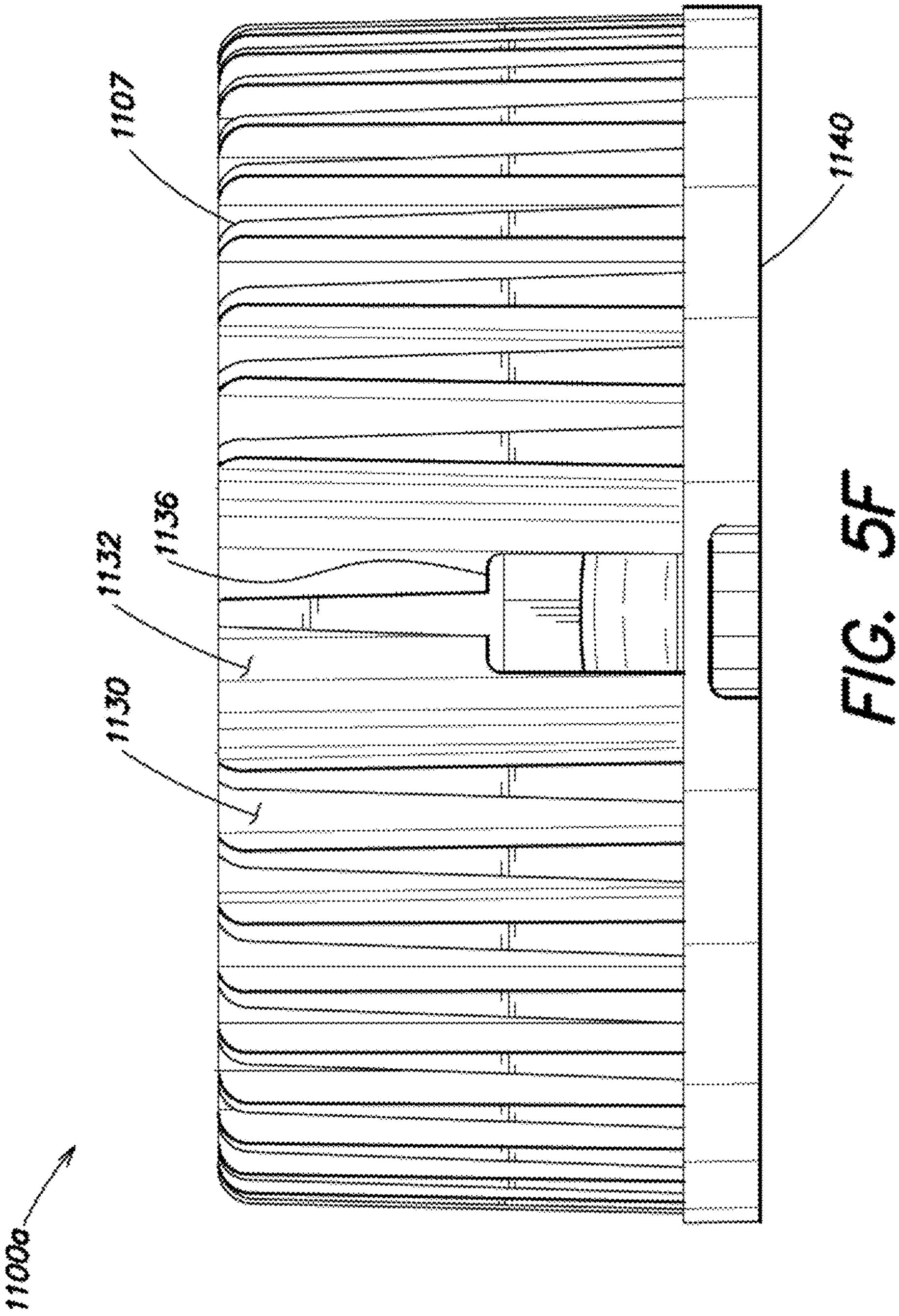
FIG. 5F shows a left-side view of the heat sink of FIG. 5A.
Figure 6A:
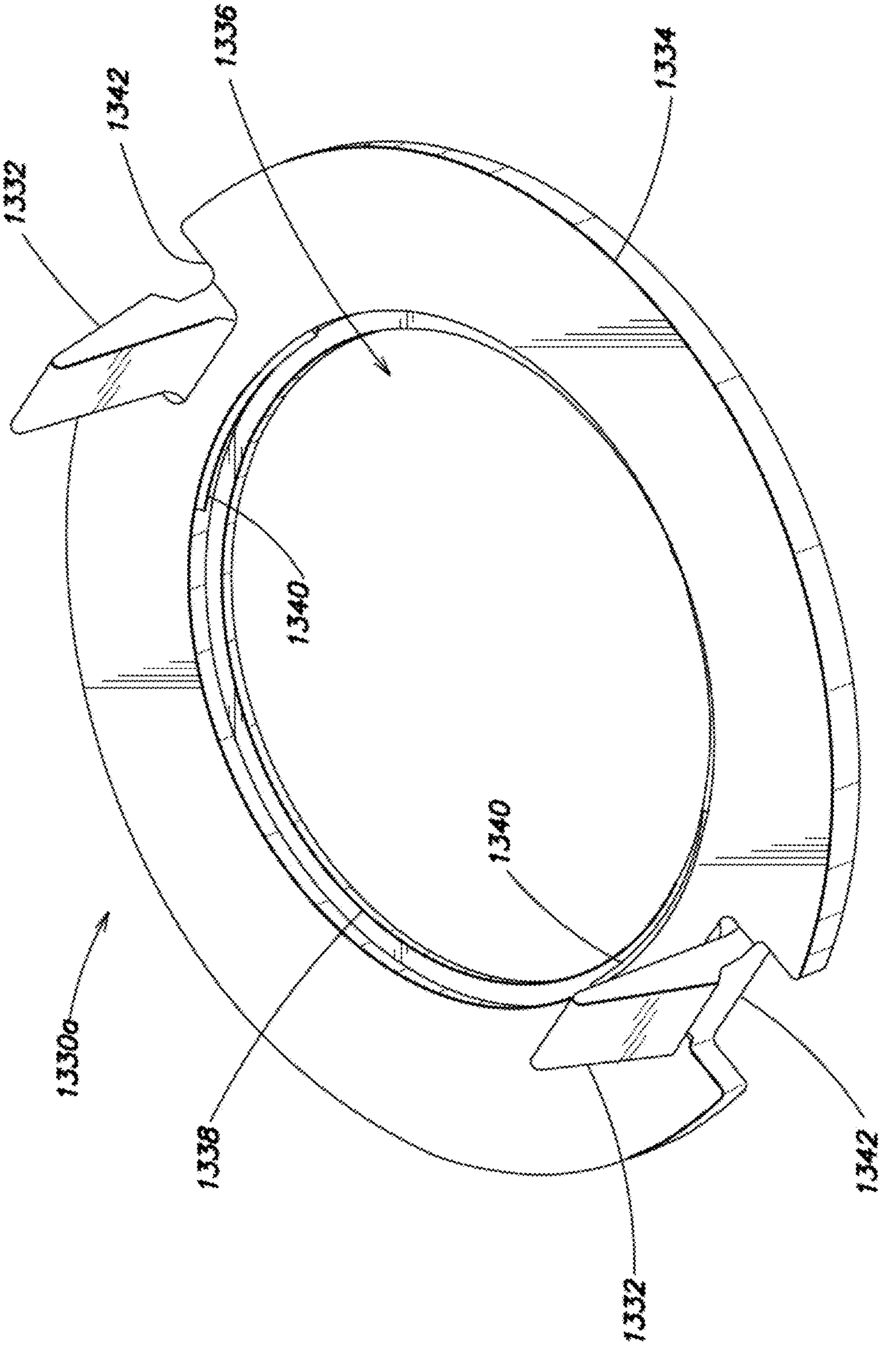
FIG. 6A shows a top perspective view of a retaining ring in the lighting module of FIG. 1A.
Figure 6B:
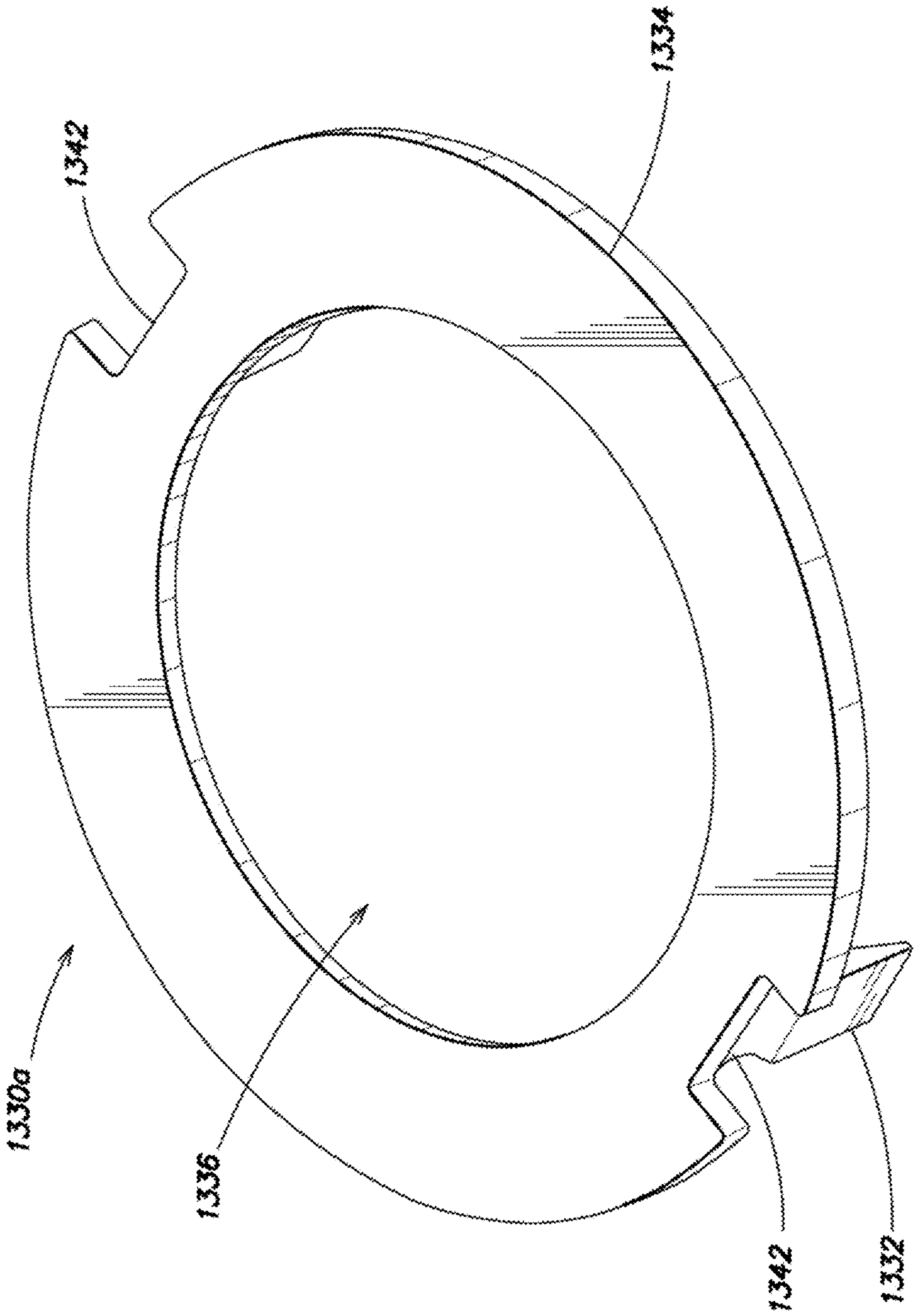
FIG. 6B shows a bottom perspective view of the retaining ring of FIG. 6A.
Figure 6C:
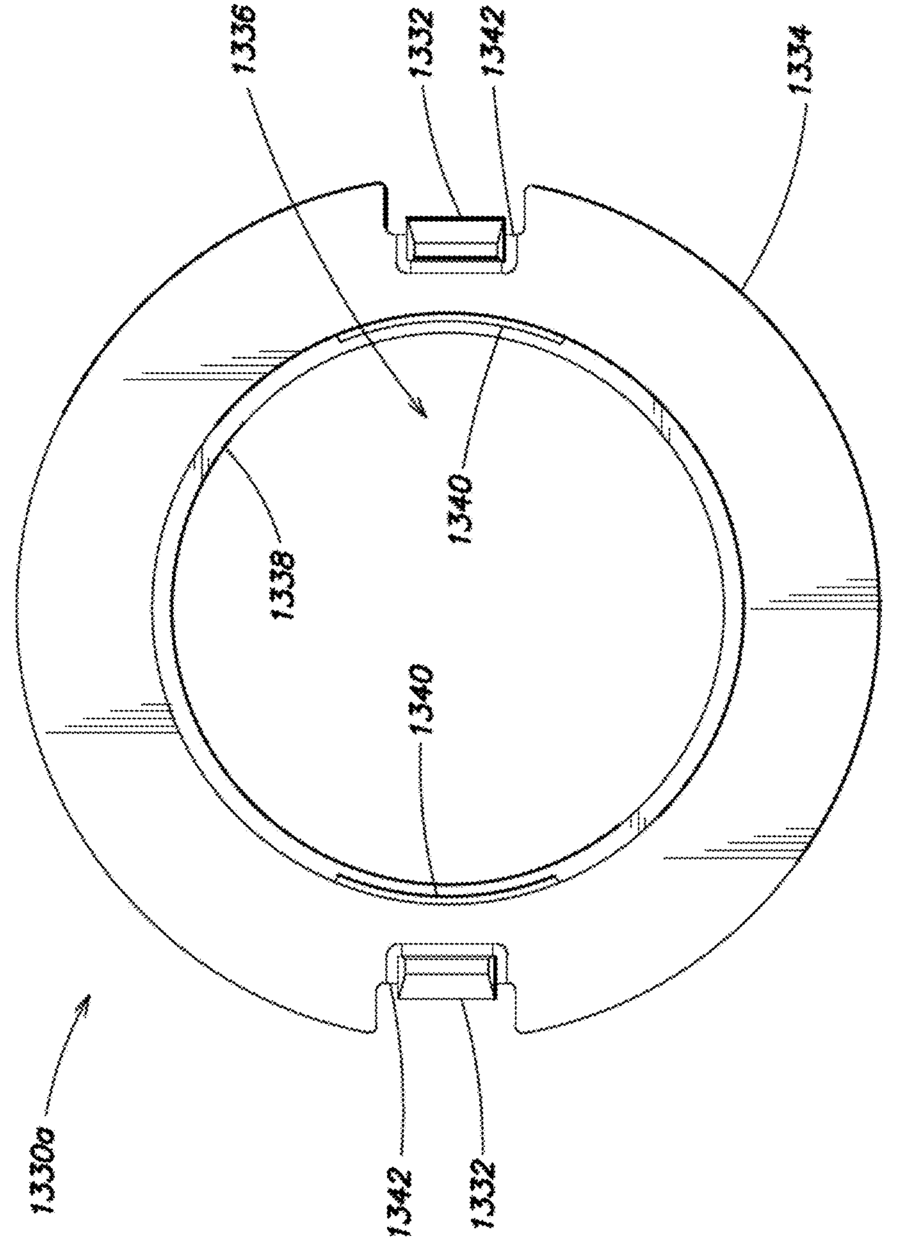
FIG. 6C shows a top view of the retaining ring of FIG. 6A.
Figure 6D:
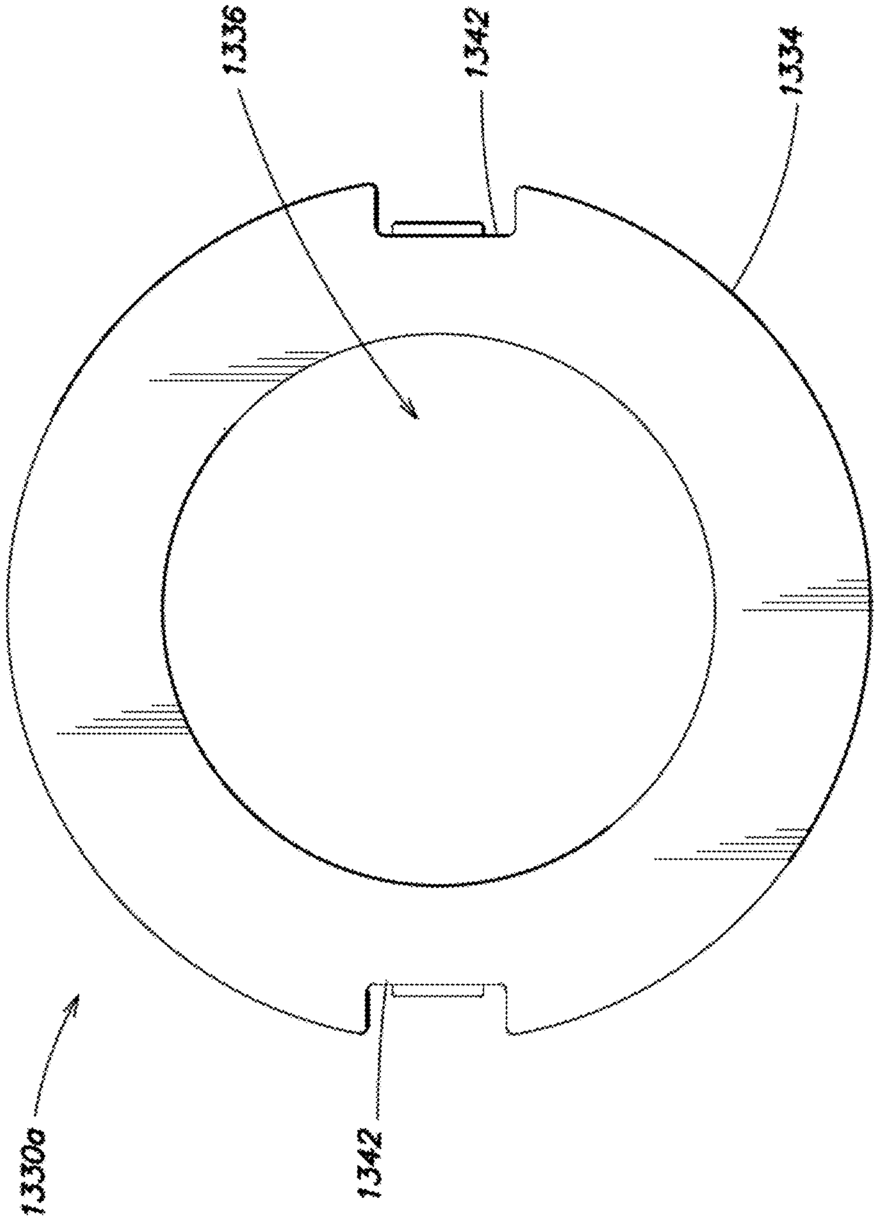
FIG. 6D shows a bottom view of the retaining ring of FIG. 6A.
Figure 6E:
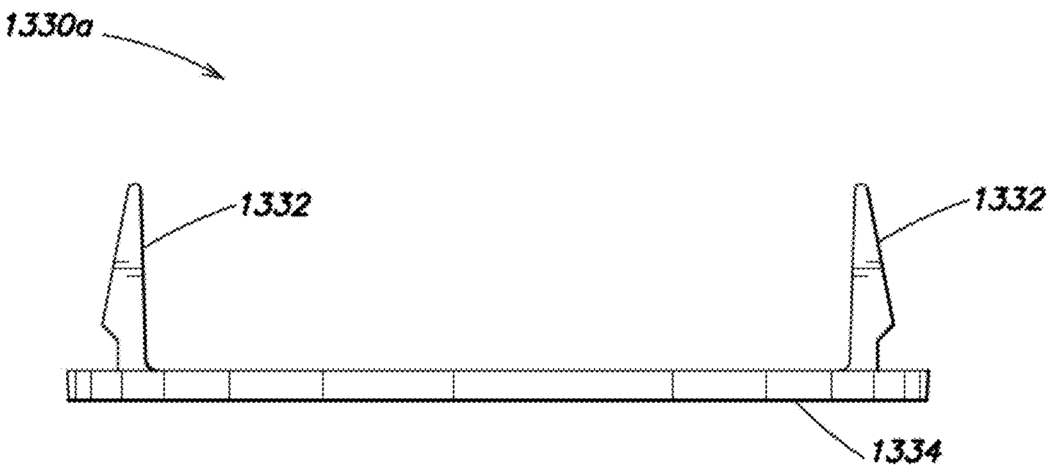
FIG. 6E shows a front view of the retaining ring of FIG. 6A.
Figure 6F:
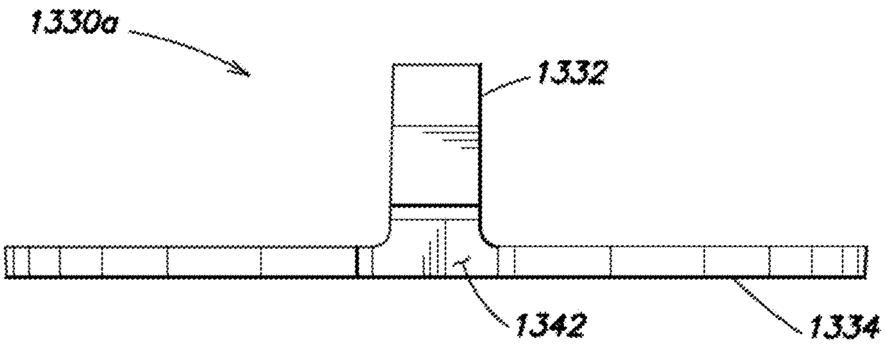
FIG. 6F shows a left-side view of the retaining ring of FIG. 6A.

In some implementations, the female snap-fit receptacles 1136 on the heat sink 1100*a* may be disposed proximate to the openings 1142 on the flange 1140 as shown in FIG. 5D. The retaining ring 1330*a* may include notches 1342 disposed on the flange 1334 near the male snap-fit connectors 1332 to provide clearance for the openings 1142 on the flange 1140. Said in another way, the notches 1342 ensure the retaining ring 1330*a* do not obscure and/or block the openings 1142.

Figure 7A:
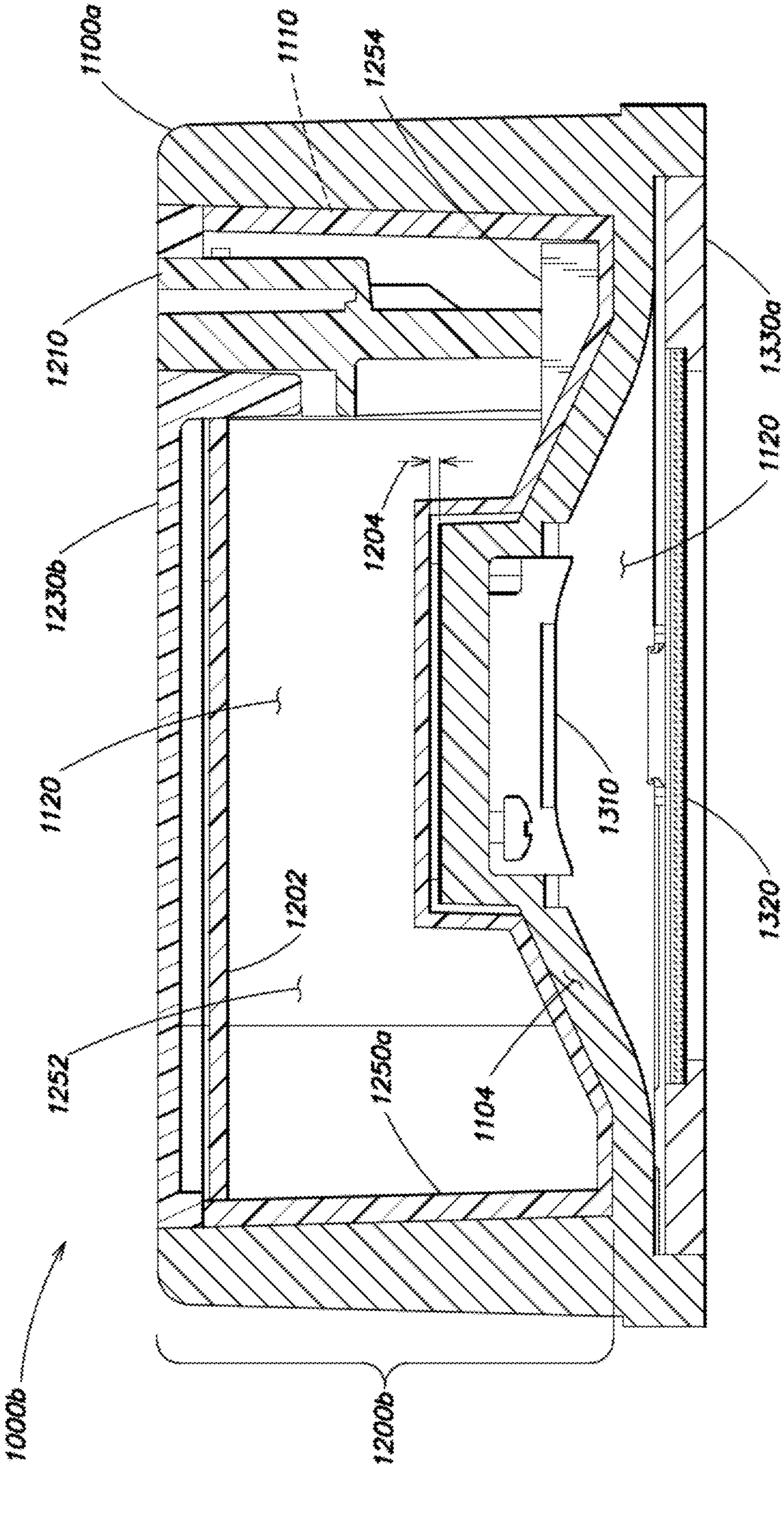
FIG. 7A shows a cross-sectional view of another exemplary lighting module.
Figure 7B:
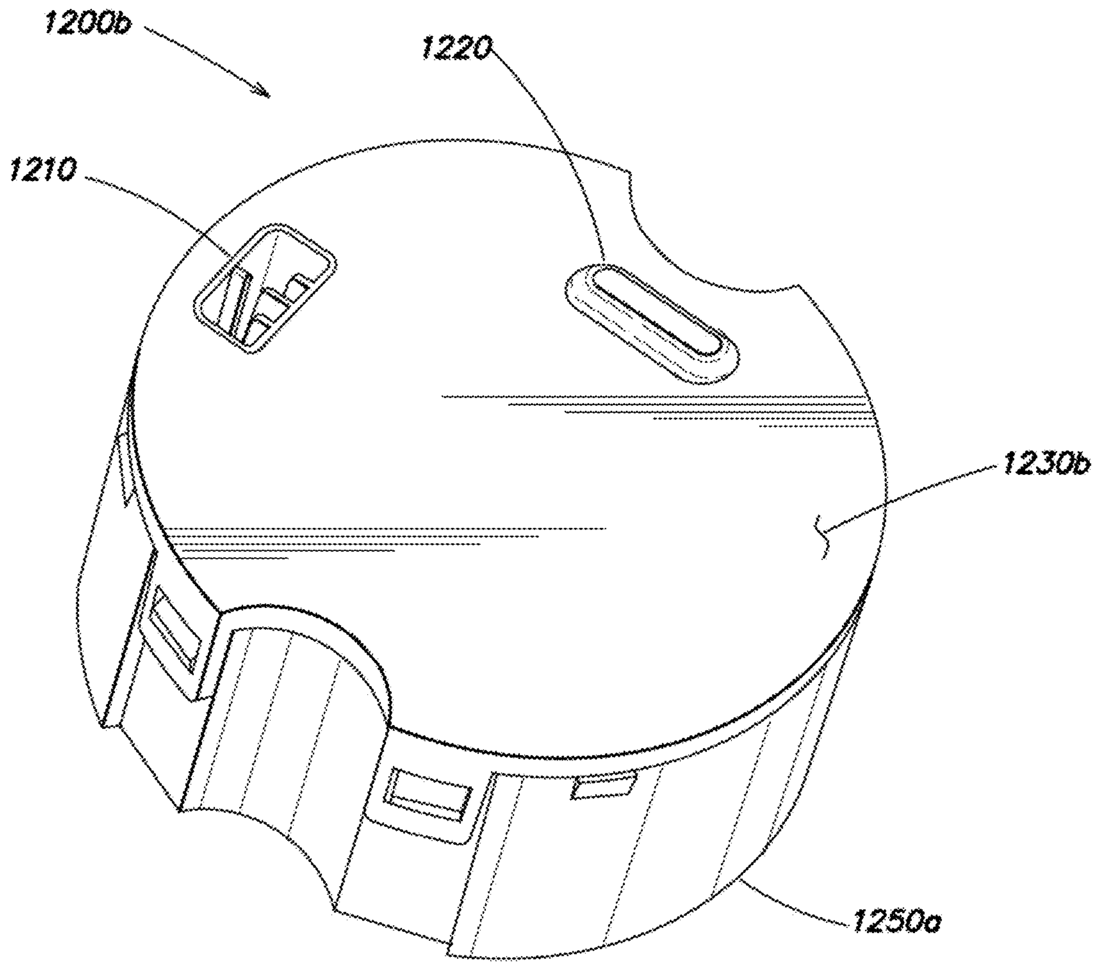
FIG. 7B shows a top perspective view of a driver enclosure in the lighting module of FIG. 7A.
Figure 7C:
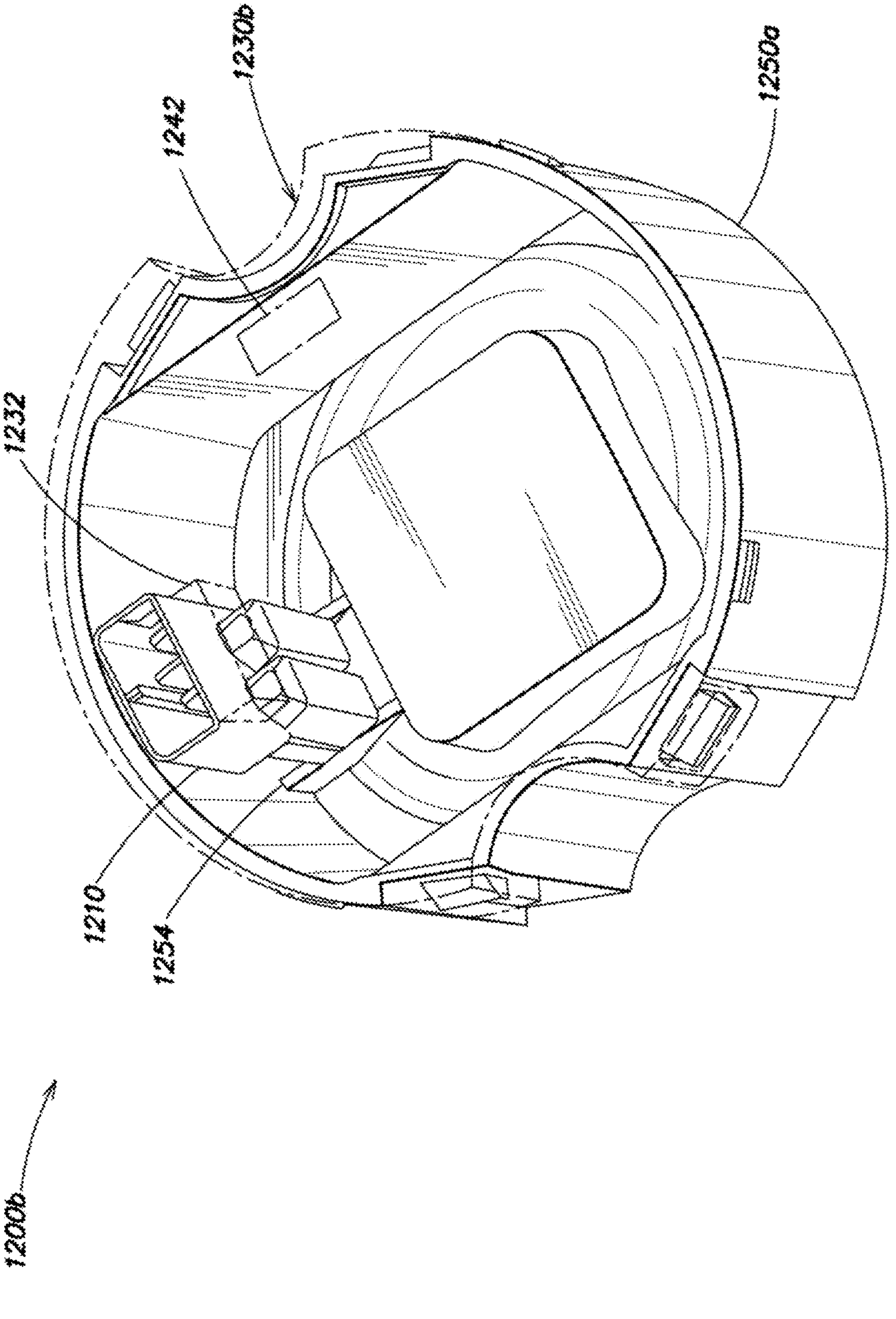
FIG. 7C shows a top perspective view of a driver enclosure in the lighting module of FIG. 7A where a driver cover is transparent for the purposes of viewing the interior of the lighting module.

FIG. 7A shows a cross-sectional view of an exemplary lighting module 1000*b* with a single selectable switch 1220. The lighting module 1000*b* may further include a light source holder 1310 to hold the light source 1300 and to facilitate installation to a heat sink 1100*a*. FIG. 7B shows a top perspective view of the driver enclosure 1200*b*, which incorporates several of the same features as the driver enclosure 1200*a*. FIG. 7C shows a top perspective view of the driver enclosure 1200*b* where the driver cover 1230*b* is transparent for the purposes of showing the cavity 1252 and the respective locations of the tab 1232 and the support structure 1254 supporting the electrical connector 1210.

Other Examples of Driver Enclosures

Figure 8A:
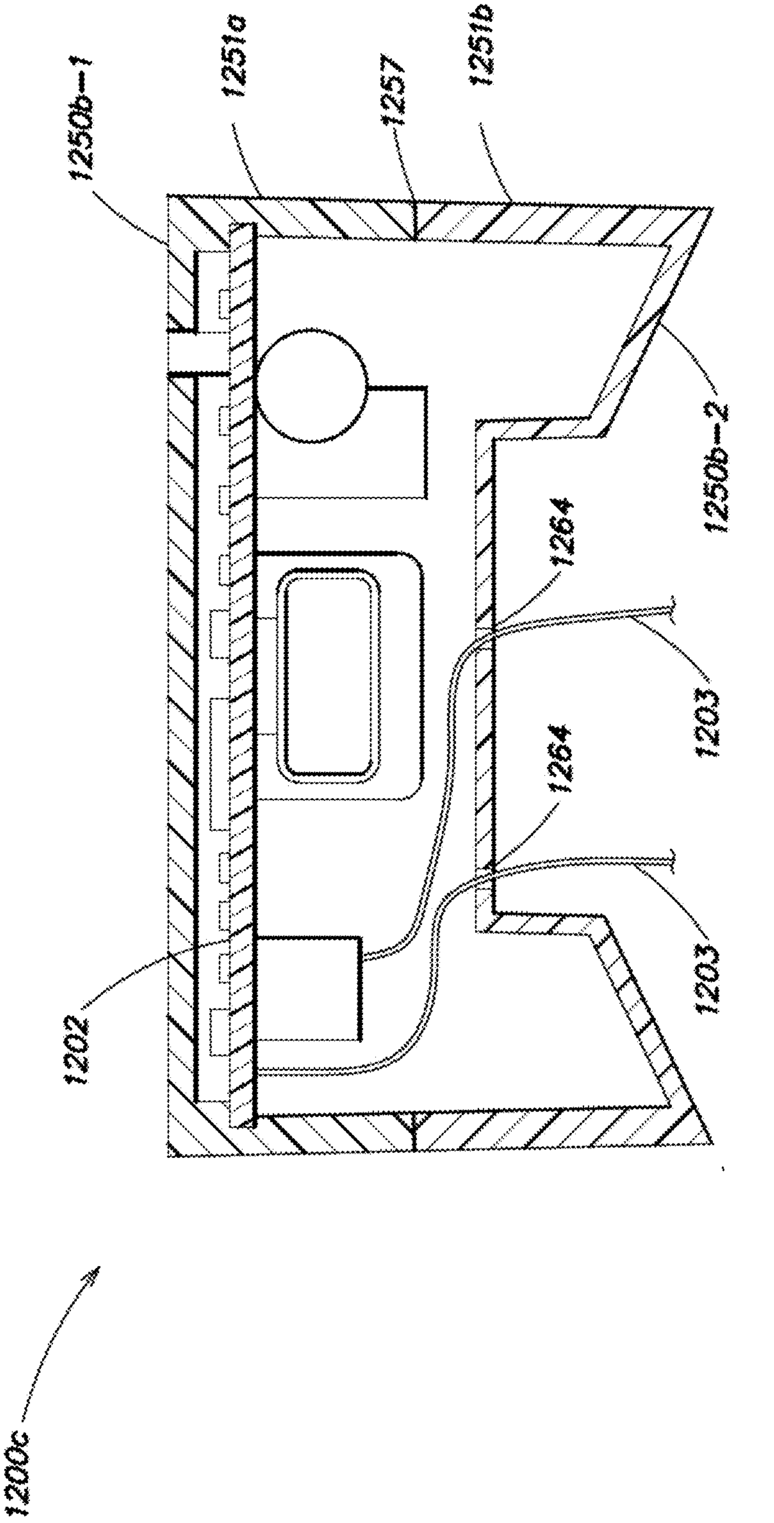
FIG. 8A shows a cross-sectional view of another exemplary driver enclosure formed from a first driver housing and a second driver housing.

FIG. 8A shows an exemplary driver enclosure 1200*c* that is formed from driver casings 1250*b*-1 and 1250*b*-2. The driver casings 1250*b*-1 and 1250*b*-2 may have sidewalls 1251*a* and 1251*b*, respectively. As shown, the sidewalls 1251*a* and 1251*b* may engage with one another after assembly to form a parting line 1257. In some implementations, the height of the sidewalls 1251*a* and 1251*b* may be dimensioned to be substantially the same, thus the parting line 1257 may bisect the driver enclosure 1200*c*. It should be appreciated, however, that the height of the sidewalls 1251*a* and 1251*b* may be different such that the parting line 1257 may be located anywhere along the side of the driver enclosure 1200*c*. As before, the driver enclosure 1200*c* may include the driver 1202. The driver enclosure 1200*c* may also include conductors 1203 to supply electrical power to the light source 1300. As shown, the conductors 1203 may be electrically coupled to the driver 1202 and fed through openings 1264 formed onto the driver casing 1250*b*-2 for connection to the light source 1300.

Figure 8B:
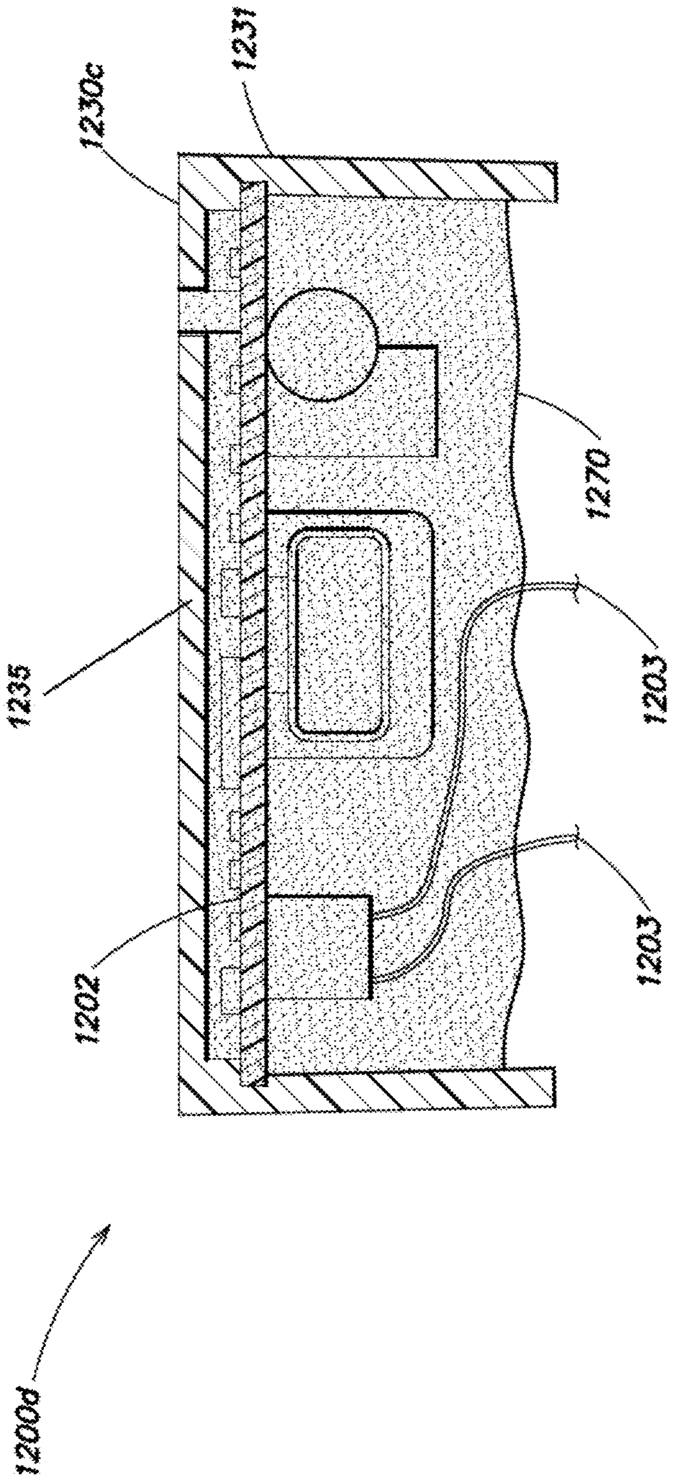
FIG. 8B shows a cross-sectional view of another exemplary driver enclosure that includes a potting material to electrically isolate the driver.

FIG. 8B shows an exemplary driver enclosure 1200*d* that is formed, in part, using a potting material 1270. As shown, the driver enclosure 1200*d* may include a driver cover 1230*c* with a sidewall 1231 that defines a cavity to contain the driver 1202 and at least a portion of the conductors 1203. Once the driver 1202 is placed into the driver cover 1230*c*, the potting material 1270 may be added to seal the driver 1202 in the driver cover 1230*c*. The output conductors 1203, which are electrically coupled to the driver 1202, may extend through the potting material 1270 for connection with the light source 1300.

The potting material 1270 may generally be an electrically insulating material that electrically insulates the driver 1202 from its surroundings. In some implementations, the potting material 1270 may conformally coat the driver 1202. For example, the potting material 1270 may be applied as a liquid that then cures into a solid. The potting material 1270 may be formed from various materials including, but not limited to a thermosetting polymer, a silicone rubber, and epoxy resins.

A Lighting Module with an Integrated Connector and an Optical Lens

Figure 9A:
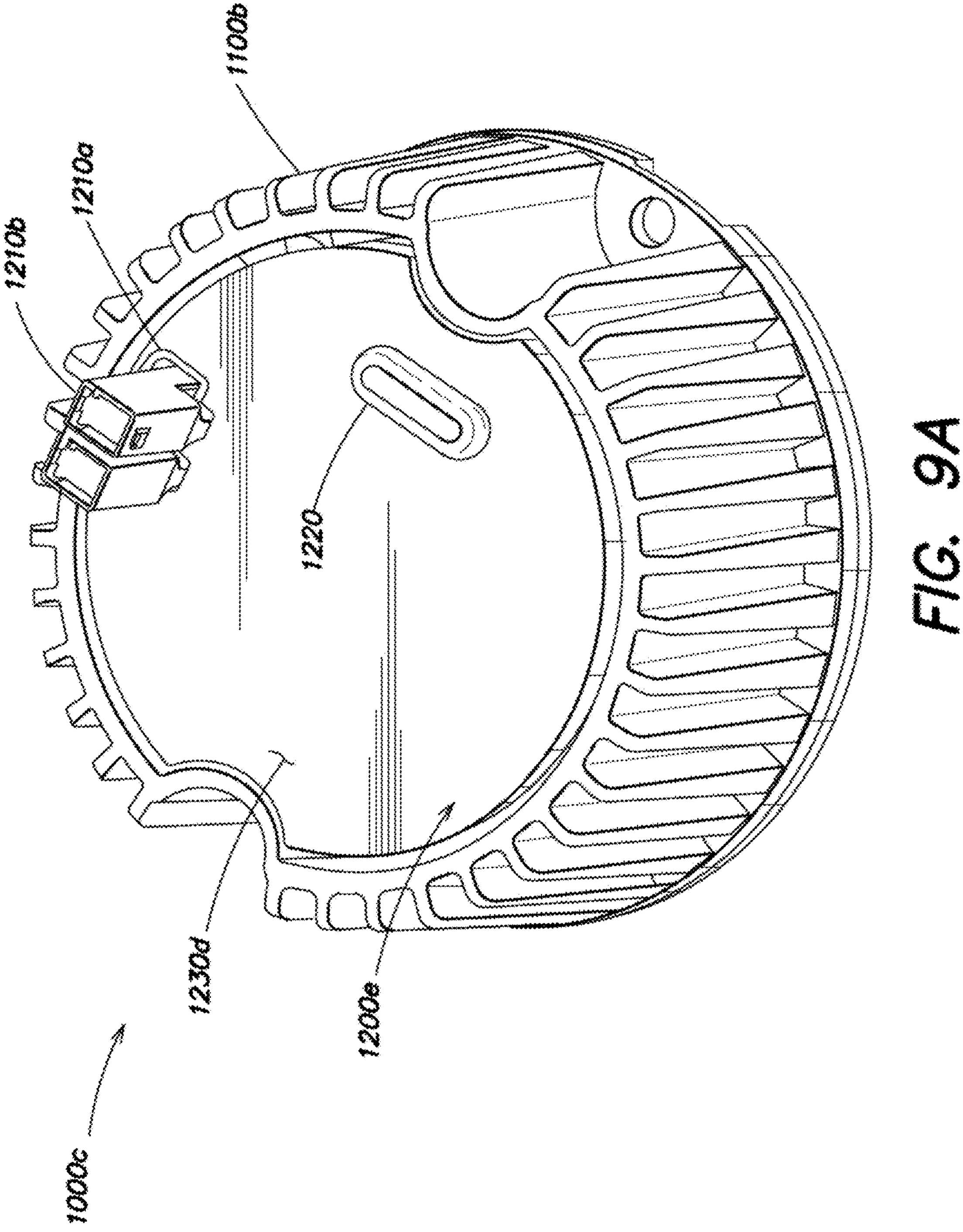
FIG. 9A shows a top perspective view of an exemplary lighting module with an optic and an external electrical connector coupled to the lighting module.
Figure 9B:
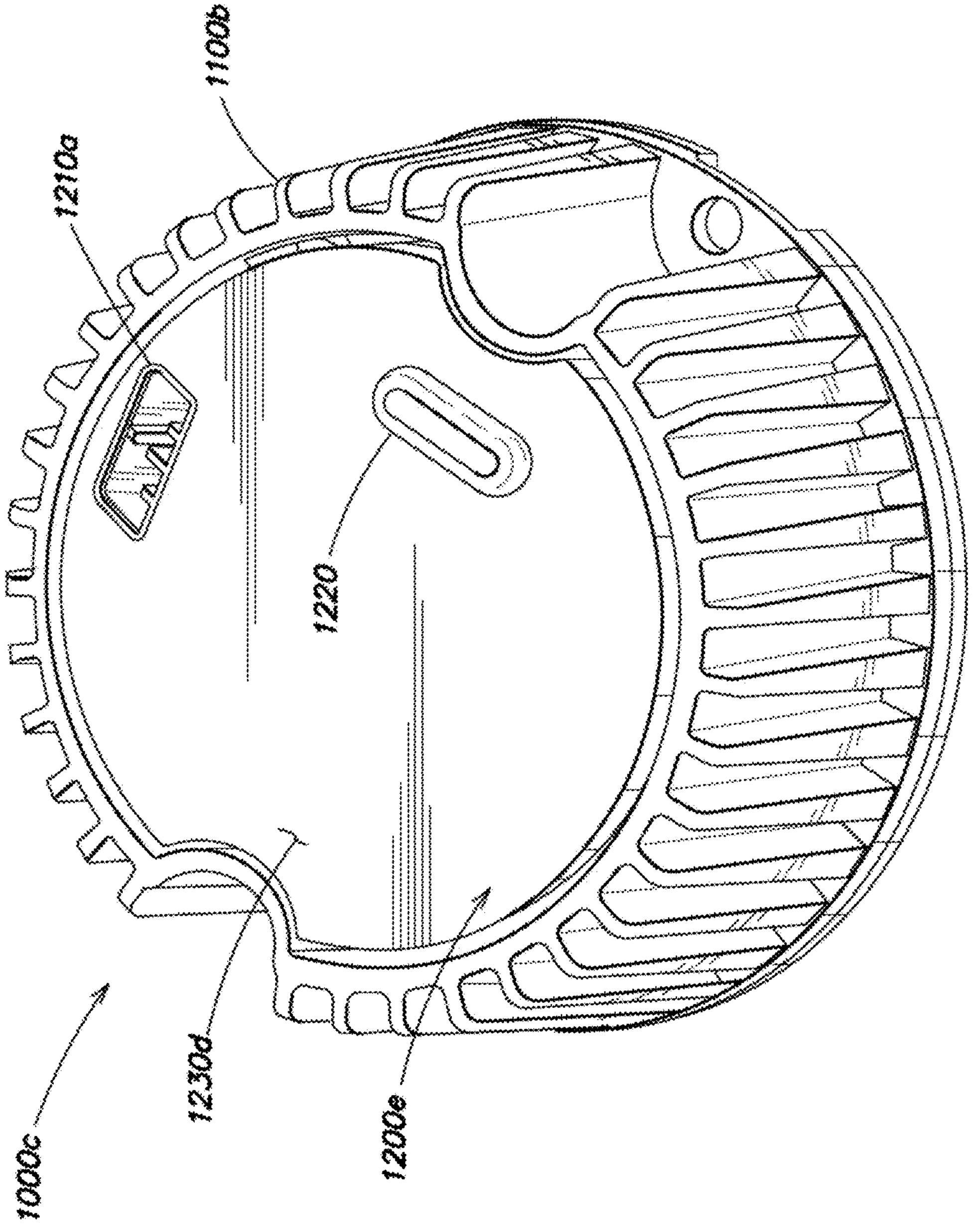
FIG. 9B shows a top perspective view of the lighting module of FIG. 9A without the external electrical connector.
Figure 9C:
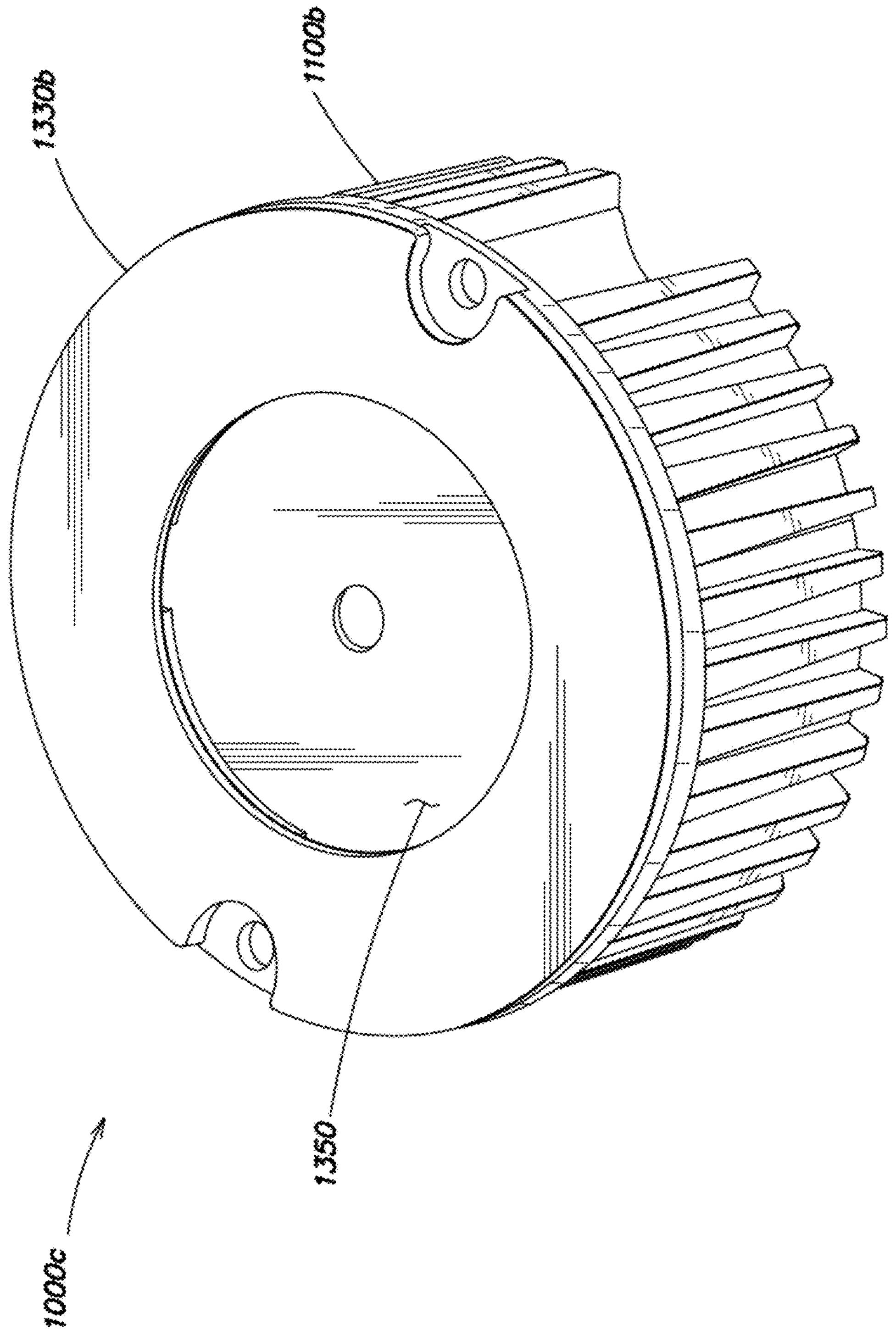
FIG. 9C shows a bottom perspective view of the lighting module of FIG. 9A.

FIGS. 9A-9K show several views of an exemplary lighting module 1000*c* with an optical lens 1350 (also referred to herein as an "optic 1350"). Similar to the lighting module 1000*a*, the lighting module 1000*c* may include a heat sink 1100*b* with a sidewall 1130, a partition 1104, and a flange 1140 defining a first cavity 1110 and a second cavity 1120. As before, a driver enclosure 1200*e* disposed in the first cavity 1110 may enclose a driver (not shown) and/or an electrical connector 1210*a*. FIG. 9A shows an electrical connector 1210*b* connected, for example, to wires from an external power source (e.g., a DC or AC power source in a building) to the electrical connector 1210*a*. A light source 1300 may be disposed in the second cavity 1120 and electrically coupled to the driver. The optical lens 1350 may be disposed in the second cavity 1120 to redirect light emitted by the light source 1300. The optical lens 1350 may be securely positioned in the second cavity 1120 by a retaining ring 1330*b* coupled to the flange 1140 of the heat sink 1100*b*. It should be appreciated the various features, structures, and materials described with respect to the lighting module 1000*a* shown in FIGS. 1A-1J or the lighting module 1000*b* shown in FIG. 7A may also be applied and/or implemented into the lighting module 1000*c* shown in FIGS. 9A-9K.

FIGS. 10A-10F shows several views of the driver enclosure 1200*e*. As before, the driver enclosure 1200*e* may include a driver housing 1250*c* with a sidewall 1251 and a base 1253 that define a cavity 1252. The cavity 1252 may contain the driver and/or the electrical connector 1210*a*. The driver enclosure 1200*e* may also include a driver cover 1250*c* to enclose the cavity 1252. The driver cover 1230*d* may support the electrical connector 1210*a* and a selectable switch 1220 to adjust an operating parameter (e.g., brightness, color) of the lighting module 1000*c*.

FIGS. 11A-11G shows several views of the driver housing 1250*c* and FIGS. 12A-12F show several views of the driver cover 1230*d*. As shown, the driver housing 1250*c* may include male snap-fit connectors 1260 disposed along the exterior surface of the sidewall 1251 for connection with female snap-fit receptacles 1240 on the driver cover 1230*d*. The driver housing 1250*c* may also include male snap-fit connectors 1262 for connection with female snap-fit receptacles 1134 of the heat sink 1100*b*. The driver housing 1250*c* and the driver cover 1230*d* may include platforms 1258 and 1238, respectively, to mechanically support and constrain a driver in the driver enclosure 1200*e*. The driver housing 1250*c* and the driver cover 1230*d* may also include keyed features 1256 and 1236, respectively, that align with keyed features 1132 in the heat sink 1100*b*.

The base 1253 of the driver housing 1250*c* may be shaped to have a recess 1255 that substantially conforms with the shape of the partition 1104. The base 1253 may further include openings 1264 through which electrical wires from the driver may be fed through for connection with the light source 1300. The driver cover 1230*d* may include an opening 1242 for the selectable switch 1220 and an opening 1234 for the electrical connector 1210*a* formed on a base 1235. The driver cover 1230*d* may also include a lip 1233 disposed along the periphery of the base 1235 and the driver housing 1250*c* may include a support structure 1254 that together mechanically support and constrain the electrical connector 1210*a*. In some implementations, the base 1235 may be substantially flat. The driver housing 1250*c* and the driver 1230*d* may be further shaped such that the base 1235 is substantially flush with a top edge of the heat sink 1100*b* and/or substantially fills the first cavity 1110.

FIGS. 13A-13F show several views of the heat sink 1100*b*. As before, the sidewall 1130 may include a plurality of fins 1107 disposed along an exterior surface of the sidewall 1130 to facilitate convective cooling of the lighting module 1000*c*, particularly if the lighting module 1000*c* is disposed within a sufficiently large ceiling, wall, or floor space and/or enclosure. The partition 1104 may include an island 1105 to support the light source 1300. The island 1105 may include openings 1106 to receive fasteners that mechanically couple the light source 1300 to the heat sink 1100*b*. The partition 1104 may also include openings 1108 disposed, in part, on the island 1105 that allow the electrical wires to pass through the partition 1104 from first cavity 1110 where the driver enclosure 1200*e* is located to the second cavity 1120 where the light source 1300 and the optical lens 1350 are located. The partition 1104 may also include a recess 1144 to accommodate the protruding section 1272 of the driver enclosure 1200*e*.

The heat sink 1100*b* may also include keyed features 1132 disposed along the sidewall 1130 that align with the keyed features 1256 and 1236 of the driver enclosure 1200*e*. As shown, the keyed features 1132 may also provide clearance for openings 1142 on the flange 1140 that are used to couple the lighting module 1000*c* to an external enclosure or housing (e.g., tabs on an electrical junction box). The female snap-fit receptacles 1136 may be formed as slots that extend along the interior surface of the sidewall 1130 through the partition 1104 and the flange 1140. In this manner, the female snap-fit receptacles 1136 may couple to the driver enclosure 1200*e* and respective male snap-fit connectors 1332 in the retaining ring 1330*b*.

In some implementations, the driver enclosure 1200*e* and the heat sink 1100*b* may be sized and shaped to enhance the heat dissipating characteristics of the lighting module 1000*c*. For example, the driver enclosure 1200*e* and the heat sink 1100*b* may be shaped such that the driver enclosure 1200*e* only physically contacts the heat sink 1100*b* where the driver enclosure 1200*e* is at a higher temperature than the heat sink 1100*b* during normal operating conditions of the lighting module 1000*c* (e.g., the lighting module 1000*c* is operating at steady-state and outputs light with a desired color temperature, lumen output, and/or power). For instance, the portion(s) of the driver enclosure 1200*e* that physically contact the heat sink 1100*b* may be located near portion(s) and/or element(s) of the driver 1202 that generate heat, such as a transformer or a diode. In this manner, the heat sink 1100*b* may more effectively dissipate heat generated by the driver 1202.

Figure 9D:
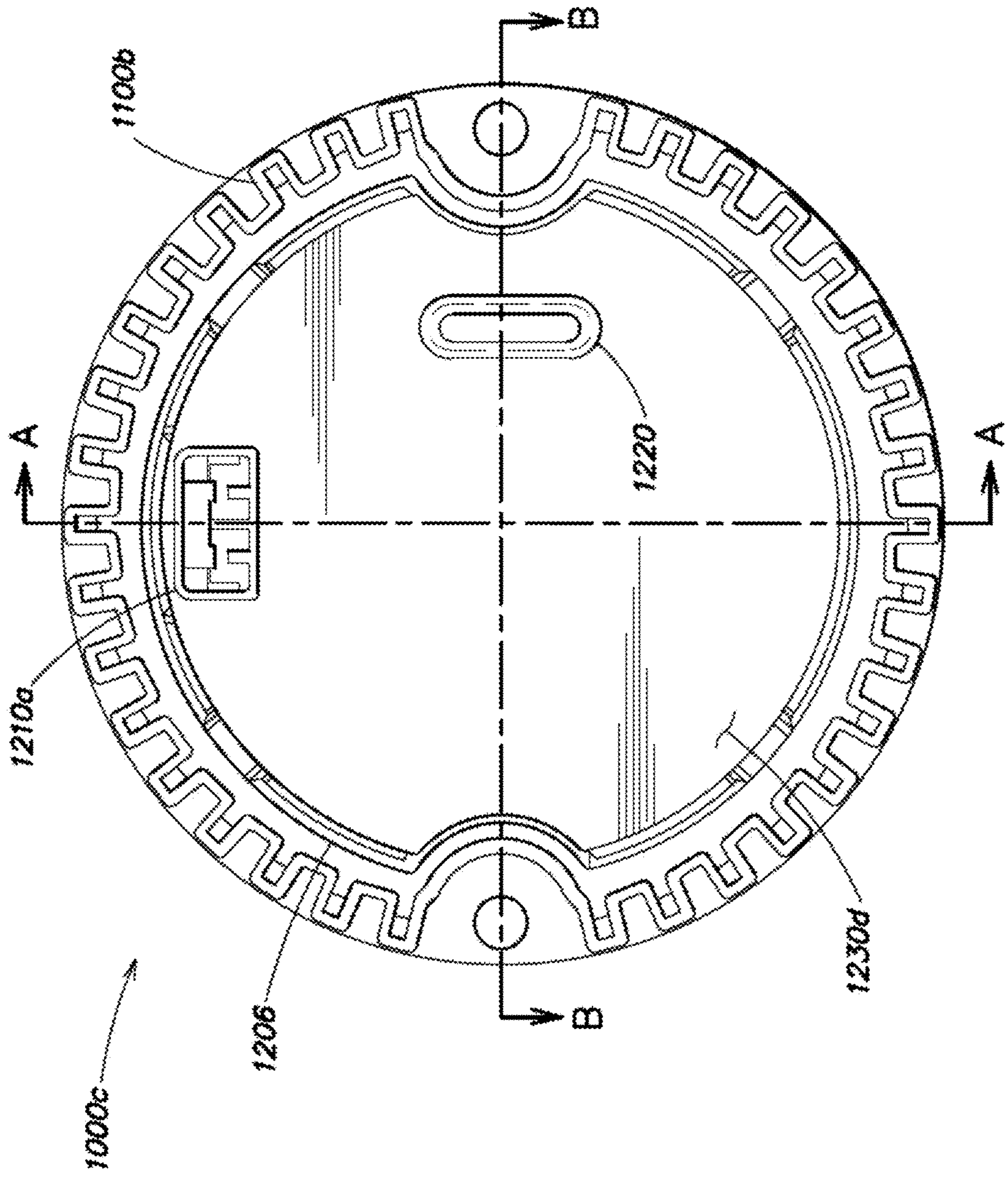
FIG. 9D shows a top view of the lighting module of FIG. 9A.
Figure 9E:
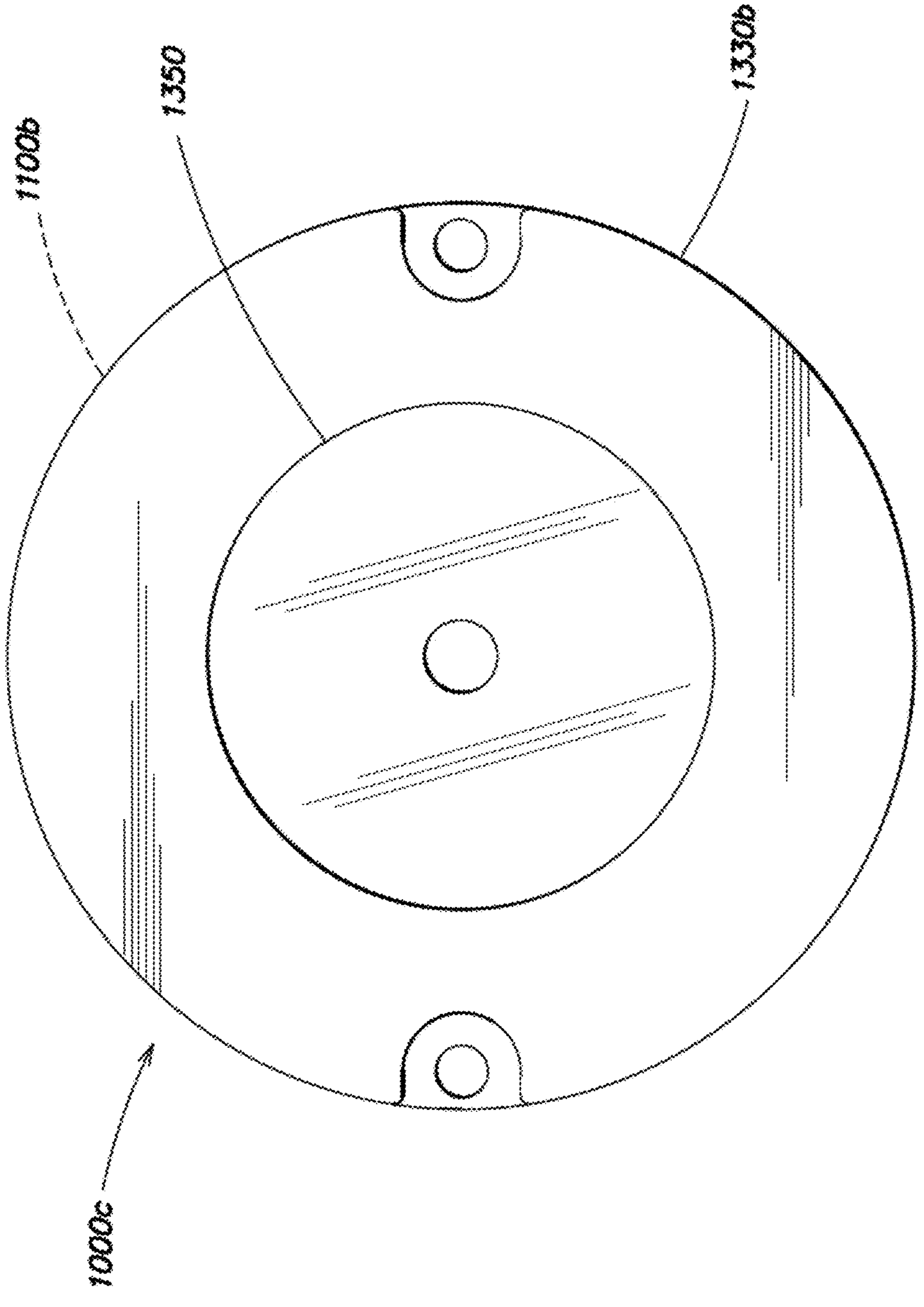
FIG. 9E shows a bottom view of the lighting module of FIG. 9A.
Figure 9F:
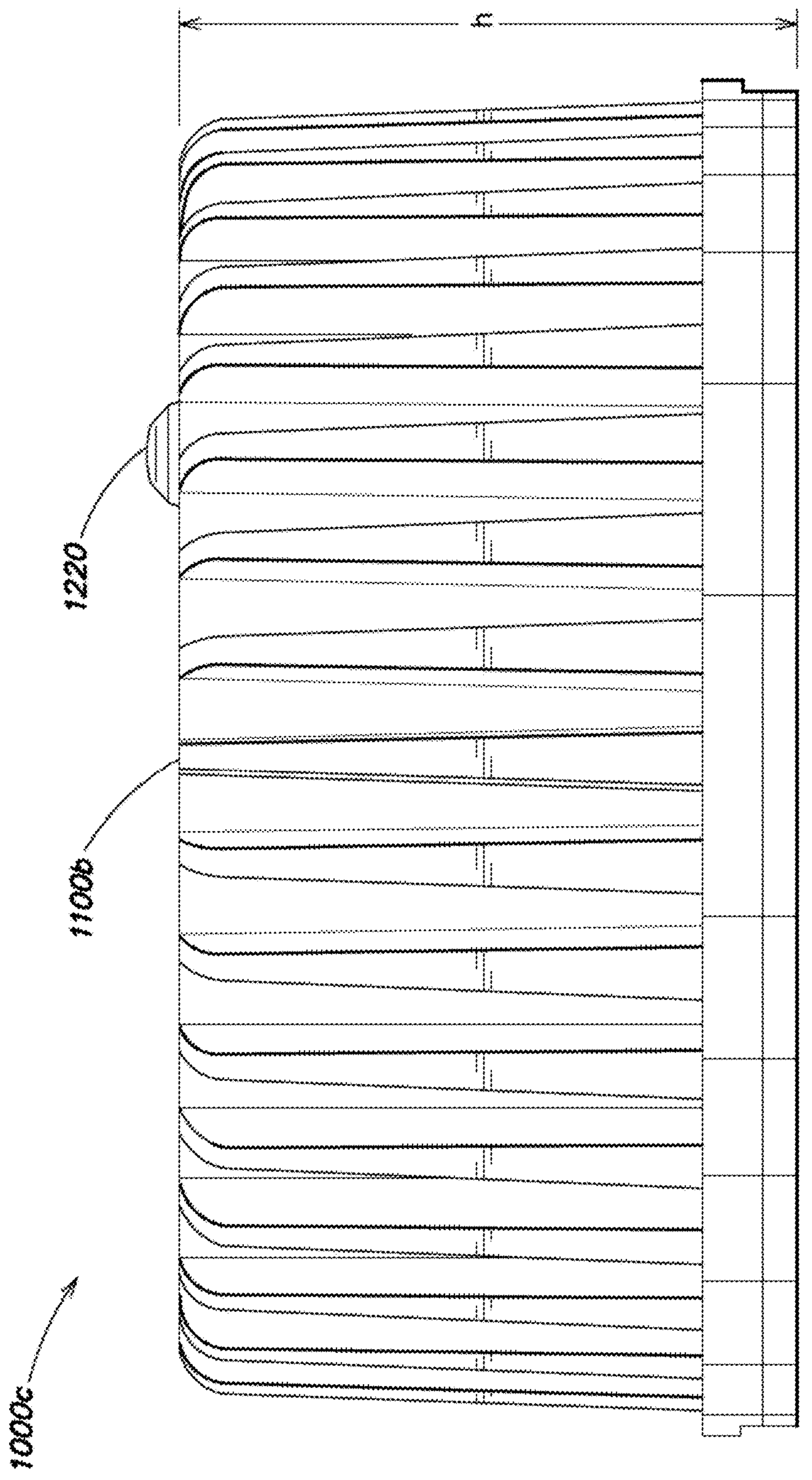
FIG. 9F shows a front view of the lighting module of FIG. 9A.
Figure 9G:
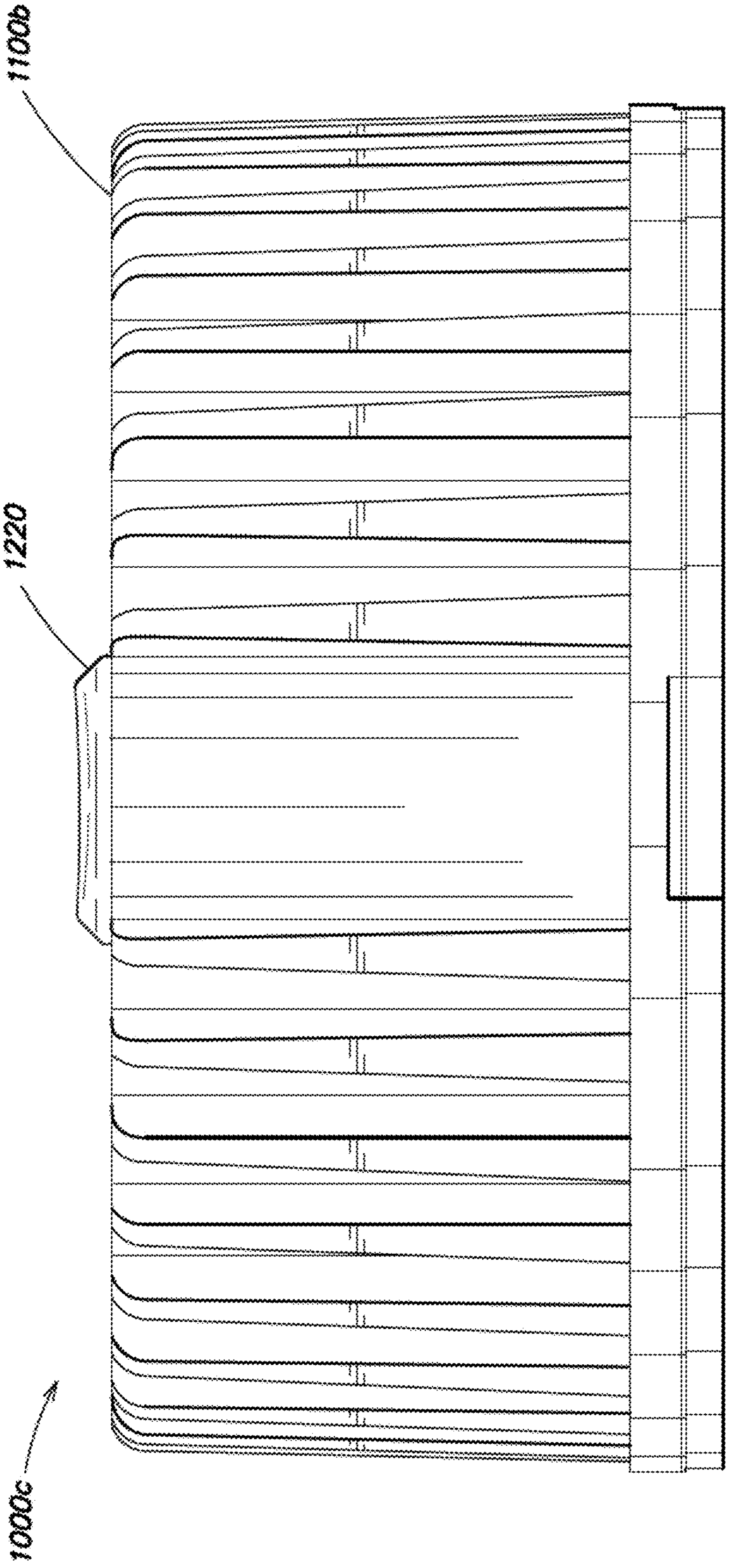
FIG. 9G shows a left-side view of the lighting module of FIG. 9A.

On the other hand, the driver enclosure 1200*e* and the heat sink 1100*b* may be shaped such that a gap is formed between the driver enclosure 1200*e* and the heat sink 1100*b* where the heat sink 1100*b* is at a higher temperature than the driver enclosure 1200*e*. The gaps may be filled with air, thus providing a thermally insulating barrier. In this manner, the heat sink 1100*b* may receive heat from other components of the lighting module 1000*c*, such as the light source 1300, and subsequently dissipate the heat to the surrounding environment instead of the driver enclosure 1200*e* to avoid raising the temperature of the components of the driver 1202 (e.g., a capacitor). For example, FIGS. 9D and 9I show the driver enclosure 1200*e* and the heat sink 1100*b* may form the gap 1204 located proximate to the portion of the partition 1104 supporting the light source 1300. As described above, the gap 1204 may provide a higher thermal resistance than the partition 1104 so that the heat generated by the light source 1300 is dissipated primarily along the partition 1104 instead of being transferred to the driver enclosure 1200*e*.

Additionally, the driver enclosure 1200*e* and the heat sink 1100*b* may form a gap 1206 between a portion of the sidewall 1251 of the driver housing 1250*c* and a portion of the sidewall 1130 of the heat sink 1100*b*. As shown, the gap 1206 may extend from the top of the heat sink 1100*b* and/or the driver enclosure 1200*e* to the partition 1104 of the heat sink 1100*b* within the first cavity 1110 along certain portions of the first cavity 1110. The gap 1206 may similarly provide a higher thermal resistance compared to, for example, the thermal resistance associated with convective or radiative heat transfer from the heat sink 1100*b* to the environment in order for heat to be primarily dissipated to the environment.

The dimensions of the driver enclosure 1200*e* may also be reduced such that portions of the heat sink 1130*e* may be made thicker, which reduces the thermal resistance of the heat sink 1130*e* thereby enabling greater conductive heat transfer. For example, the overall height of the driver enclosure 1200*e* may be reduced allowing for a thicker partition 1104 without changing the overall dimensions of the lighting module 1000*c*. The driver housing 1250*c*, however, may still accommodate the electrical connector 1210*a*. This may be accomplished by including a protruding section 1272 in the driver housing 1250*c* to provide sufficient interior space to fully enclose the support structures 1254 and the electrical connector 1210*a* in the cavity 1252 (see FIG. 9I). The height of the cavity 1252 for the remaining portions of the driver housing 1250*c* may be reduced.

Furthermore, the overall size of the second cavity 1120 of the heat sink 1100*b* may be reduced in order to increase the size of the flange 1140. Similar to the improvements gained by a thicker partition 1104, a larger flange 1140 may also provide greater heat conduction further improving the heat dissipation characteristics of the lighting module 1000*c*.

As described above, the optical lens 1350 may be shaped and/or dimensioned to fit within the second cavity 1120 of the heat sink 1100*b*. For example, the optical lens 1350 may have a diameter that ranges between about 20 mm and about 60 mm. The optical lens 1350 may also have a height that is at least about 2 mm. In some implementations, the optical lens 1350 may substantially collimate the light such that the divergence angle of the light leaving the lighting module 1000*c* is less than about 10 degrees. In some implementations, the optical lens 1350 may output light having an angular distribution characterized by a full width half maximum (FWHM) that ranges between about 10 degrees and about 60 degrees. In some implementations, the optical lens 1350 may have a light coupling efficiency (i.e., the ratio of the luminous flux coupled out of the optical lens 1350 and into the environment and the luminous flux coupled into the optical lens 1350 from the light source 1300) that is at least about 70%.

In some implementations, the optical lens 1350 may redirect light at different wavelengths of interest in a substantially similar manner (i.e., the optical lens 1350 has low chromatic aberration). For example, the light source 1300 may include multiple light emitting elements that emit light at different wavelengths. The optical lens 1350 may be tailored to redirect the light at each wavelength such that the resulting spatial and angular distributions of light at each wavelength are substantially the same.

The optical lens 1350 may be various types of optics including, but not limited to a folded optical element (e.g., a total internal reflection (TIR) optic), a Fresnel lens, and a lens array (e.g., a substantially flat, transparent substrate with multiple lenses formed onto the substrate). The optical lens 1350 may be formed of various hard plastics and glasses including, but not limited to as polycarbonate, acrylic polymer, cyclo olefin polymer (Zeonex), polystyrene, silicate-based glasses.

In some implementations, the optical lens 1350 may be a TIR optic that redirects and outputs light from the light source 1300 with a desired angular and spatial distribution. The TIR optic may include surfaces configured to total internally reflect light in order to redirect light emitted over a broad range of emission angles (e.g., a 2π solid angle or a hemisphere) while maintaining a compact size. For example, the TIR optic may receive light from the light source 1300 and subsequently redirect the light via refraction, reflection, and transmission such that the light is outputted along a preferred direction without interacting with the interior surfaces of the second cavity 1120. In some implementations, the lighting module 1000*c* may not include the reflector 1322 in the lighting module 1000*a*.

In some implementations, the TIR optic may include a hollow core to receive light and subsequently redirect the light along a desired trajectory via refraction. The TIR optic may also include V-shaped grooves disposed along an outer surface to reflect light via total internal reflection. The TIR optic may be circular in shape and the V-shaped grooves may be oriented radially with respect to the center of the TIR optic.

In general, the lighting module 1000*c* may support various TIR optics so long as the dimensions of the TIR optic are suitable for the lighting module 1000*c* (i.e., the TIR optic fits in the second cavity 1120. For example, the TIR optic may have a diameter that ranges between about 20 mm and about 60 mm and a height less than about 20 mm.

In some implementations, the TIR optic may be a hybrid TIR optic that includes an integrated reflector to increase the light coupling efficiency of the optic (i.e., the luminous flux coupled out of the TIR optic divided by the luminous flux generated by the light source 1300). The integrated reflector may be coupled to a folded optic element to redirect light emitted at large emission angles that may otherwise be absorbed and/or scattered along an undesirable direction in the second cavity 1120. Examples of hybrid TIR optics may be found in U.S. application Ser. No. 16/831,322 (hereafter the '322 application), filed on Mar. 26, 2020, entitled, "FOLDED OPTICS METHODS AND APPARATUS FOR IMPROVING EFFICIENCY OF LED-BASED LUMINAIRES," and International Application No. PCT/US20/39728 (hereafter the '728 application), filed on Jun. 26, 2020, entitled, "OPTICAL ELEMENT FOR IMPROVING BEAM QUALITY AND LIGHT COUPLING EFFICIENCY". In some implementations, the TIR optic may be a smaller variant of the hybrid TIR optic in the '322 application or the '728 application that leverages the same operating principles.

Figure 9H:
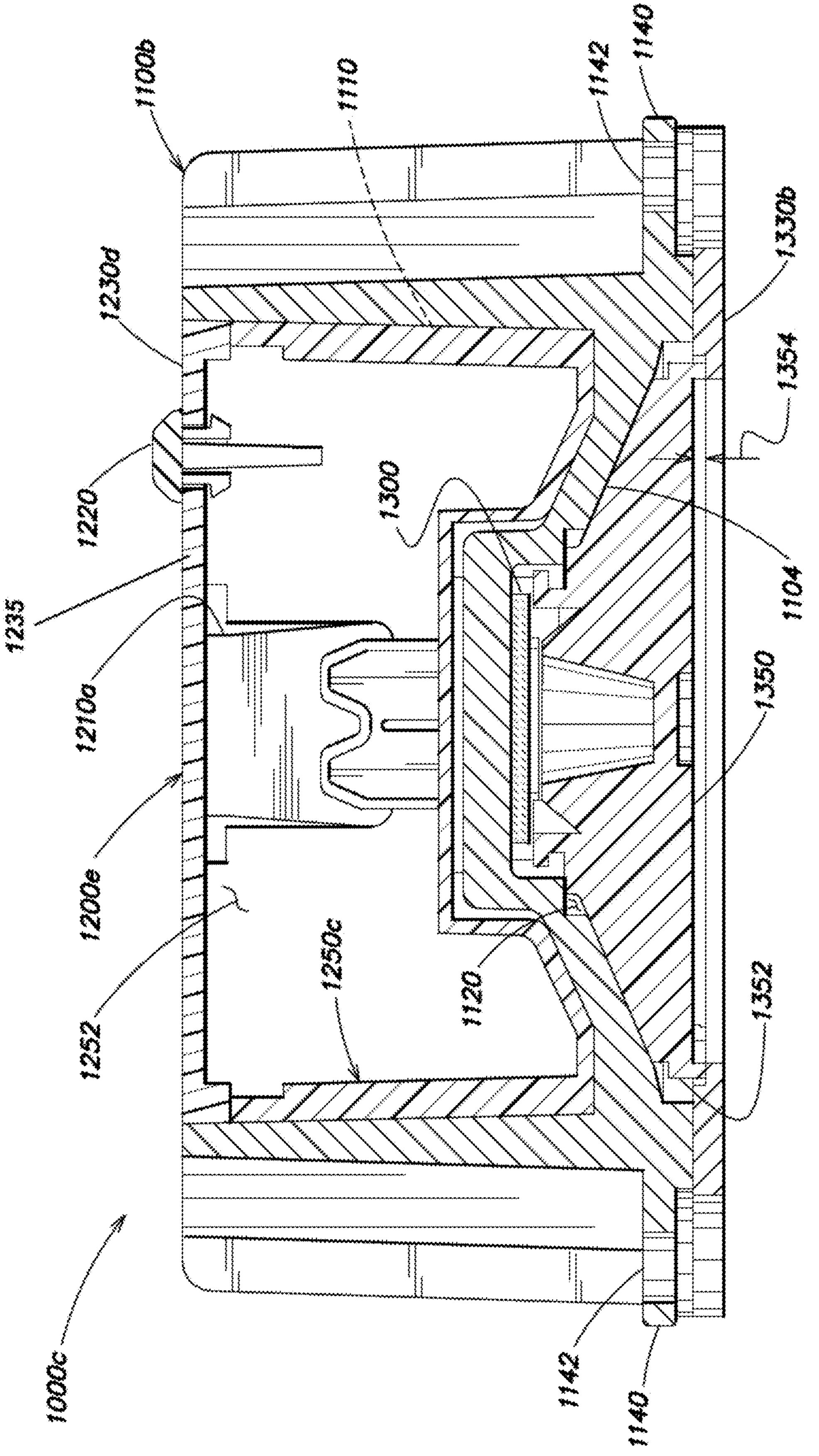
FIG. 9H shows a cross-sectional view of the lighting module corresponding to the plane B-B of FIG. 9C.
Figure 9I:
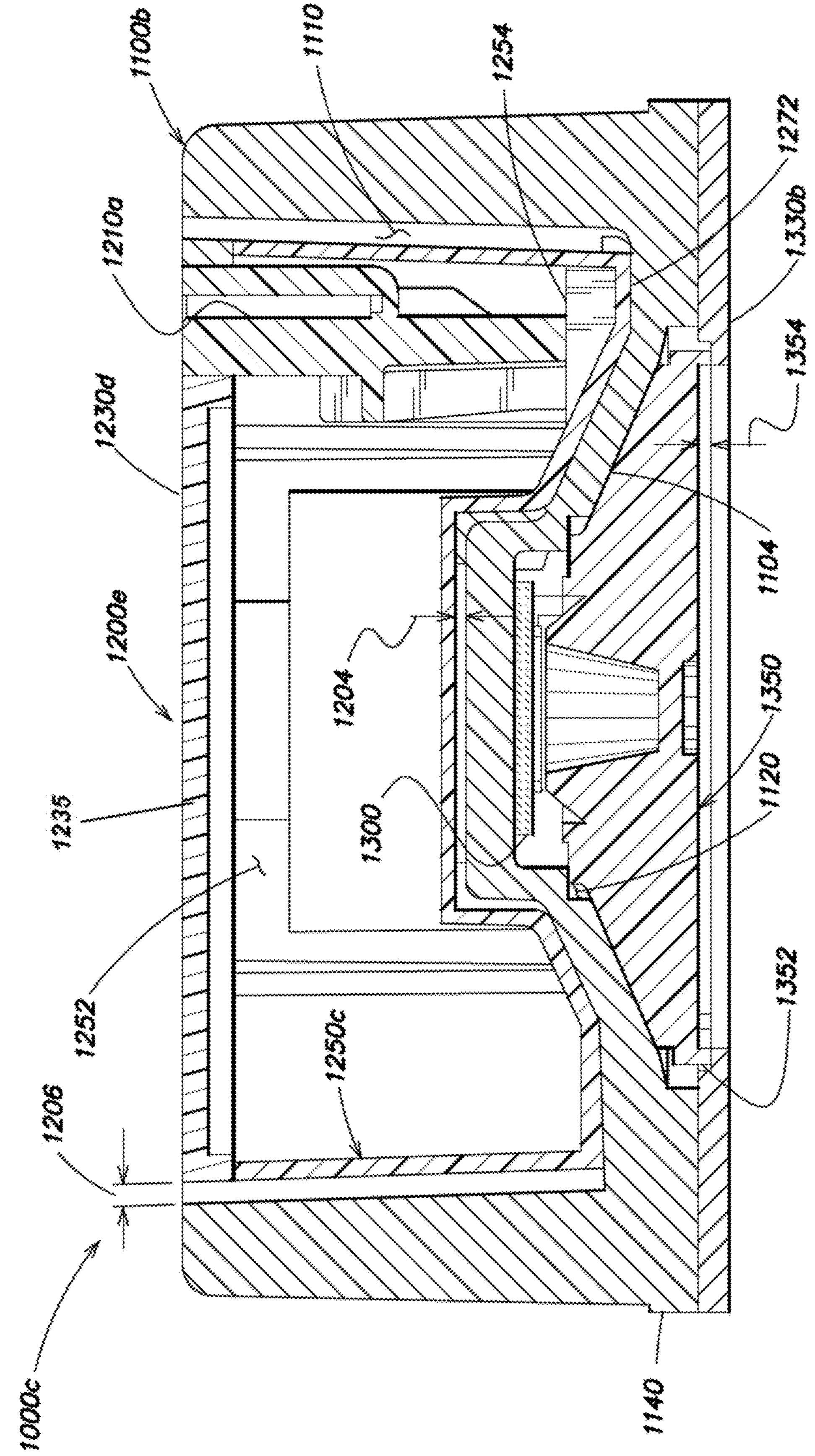
FIG. 9I shows a cross-sectional view of the lighting module corresponding to the plane A-A of FIG. 9C.
Figure 9J:
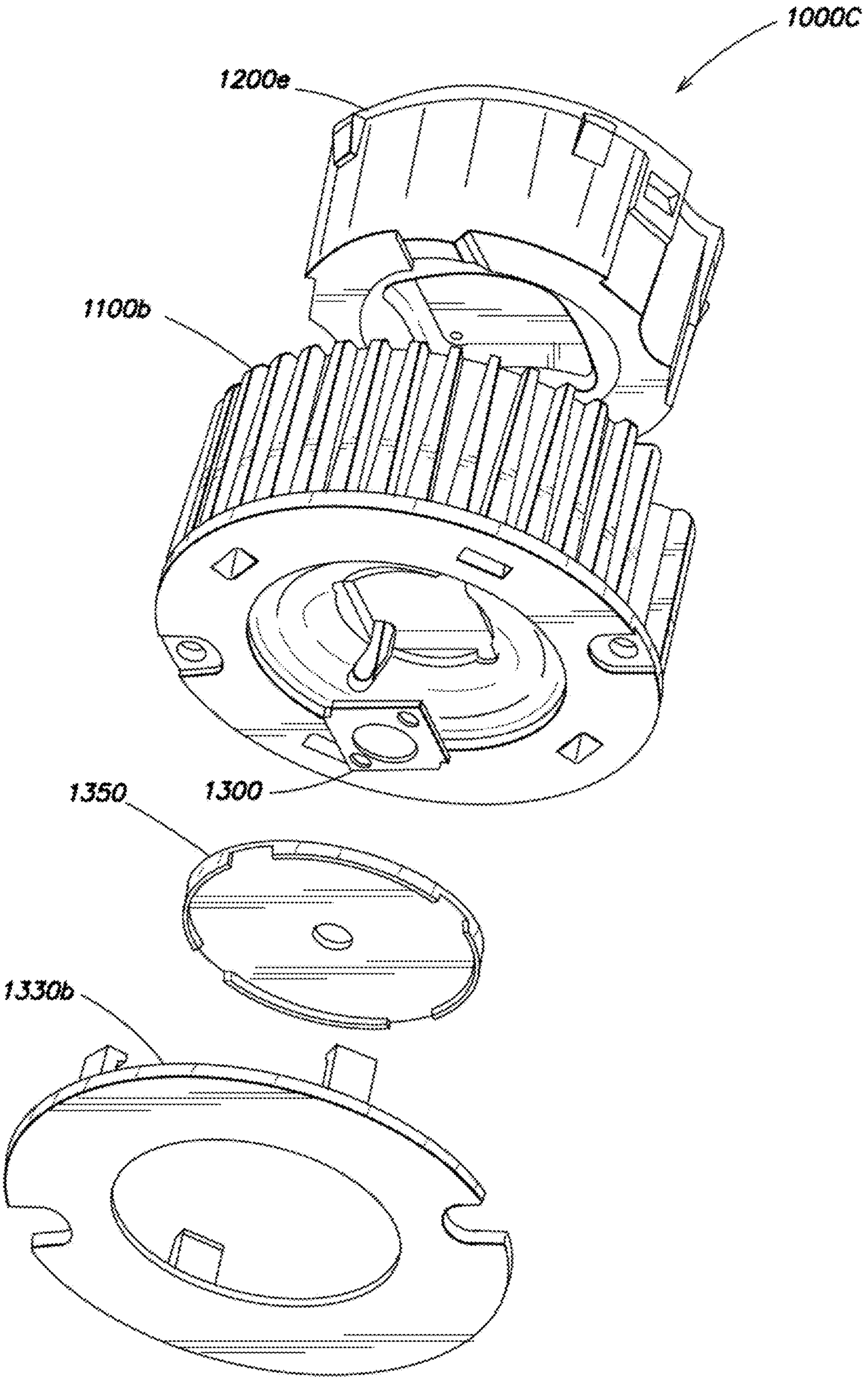
FIG. 9J shows an exploded bottom perspective view of the lighting module of FIG. 9A.
Figure 9K:
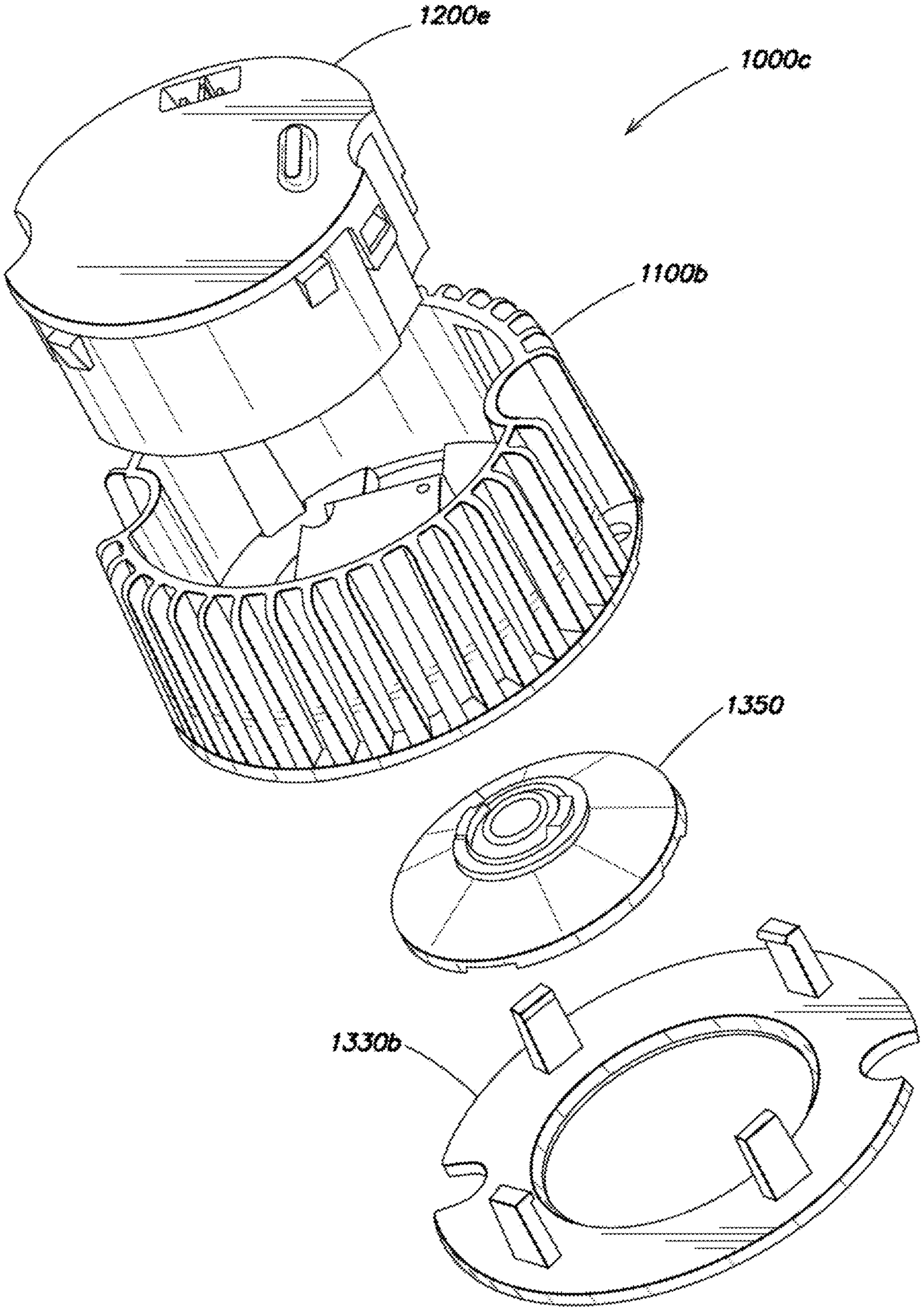
FIG. 9K shows an exploded top perspective view of the lighting module of FIG. 9A.
Figure 10A:
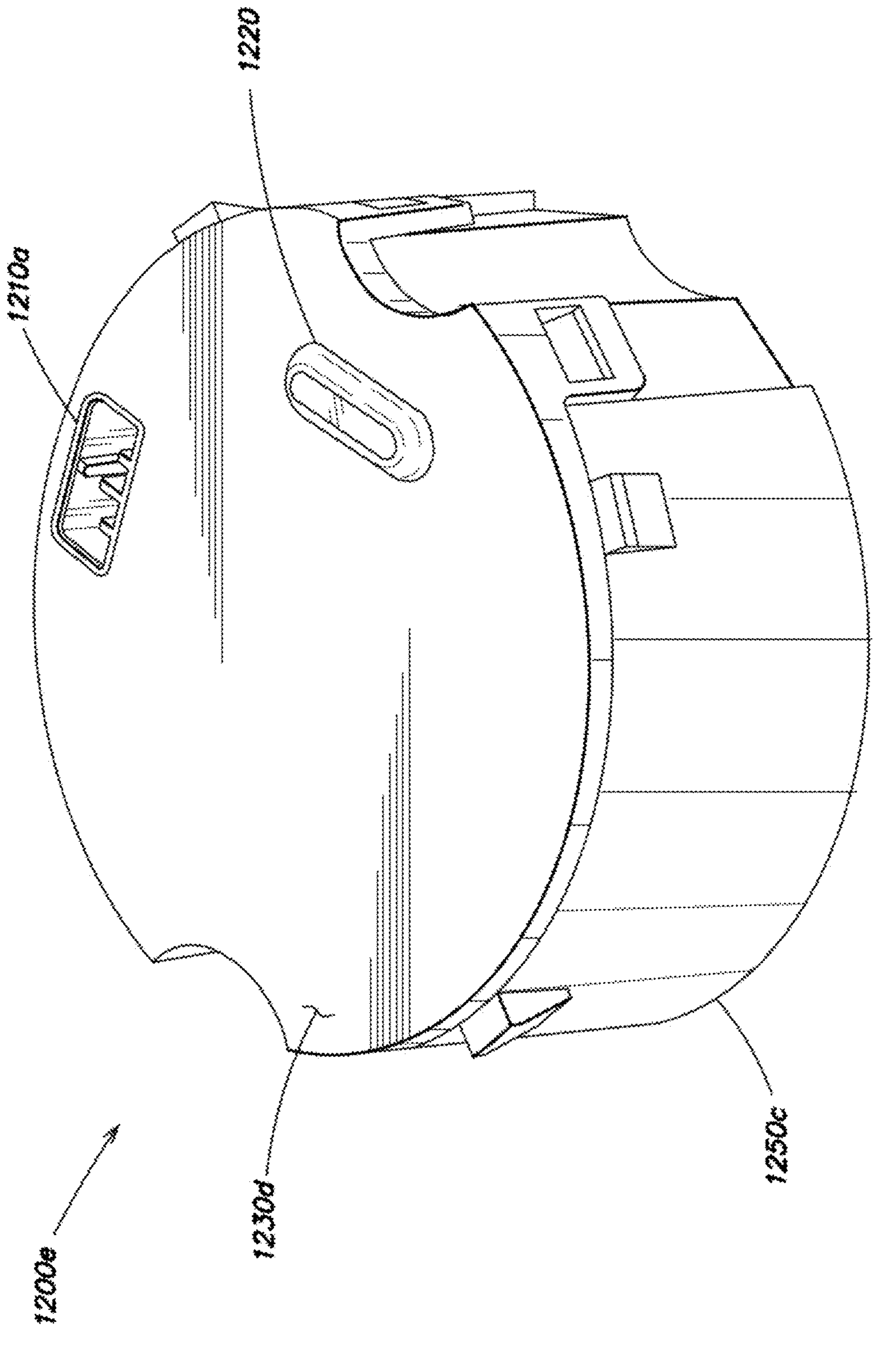
FIG. 10A shows a top perspective view of a driver enclosure in the lighting module of FIG. 9A.
Figure 10B:
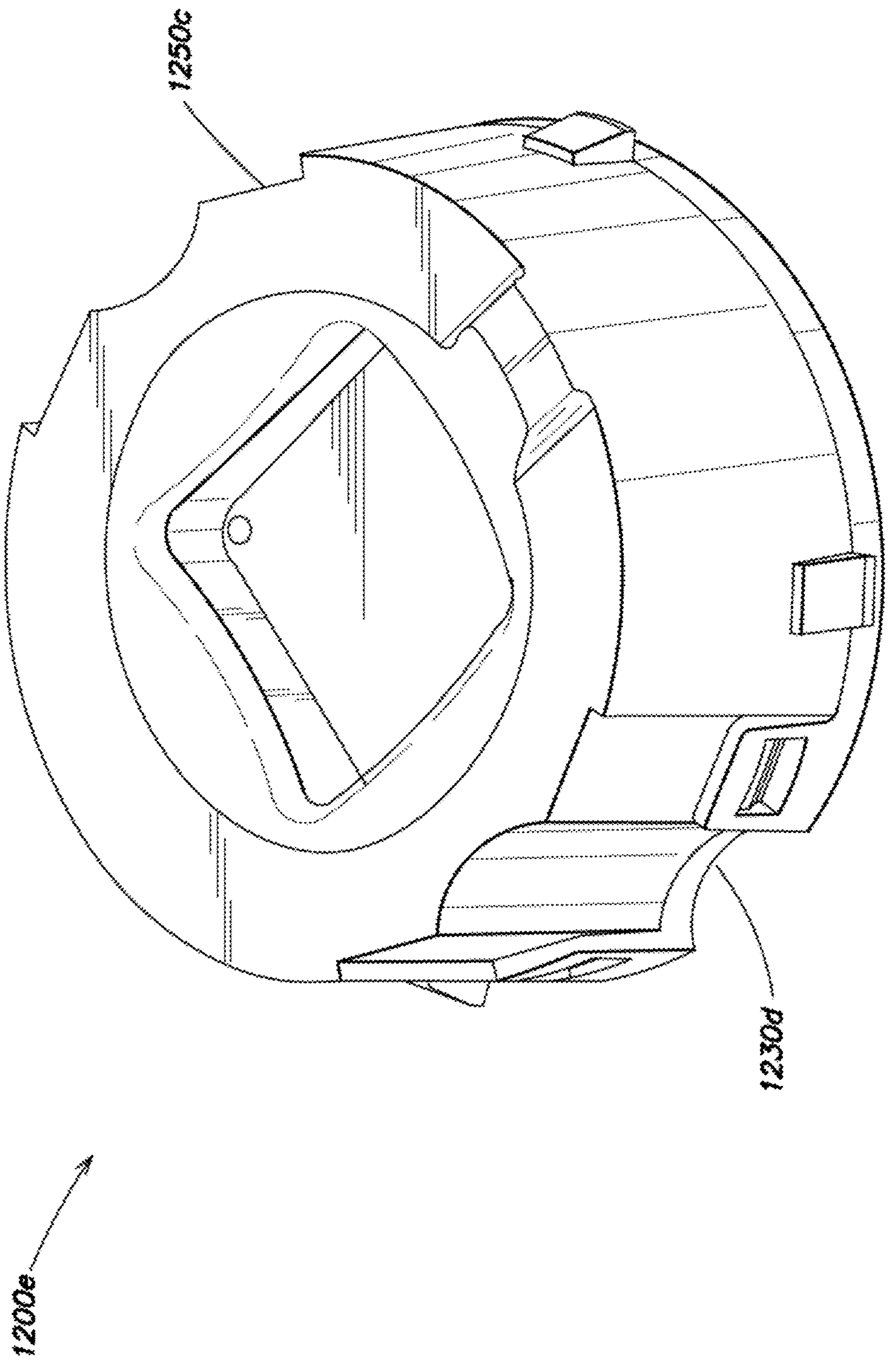
FIG. 10B shows a bottom perspective view of the driver enclosure of FIG. 10A.
Figure 10C:
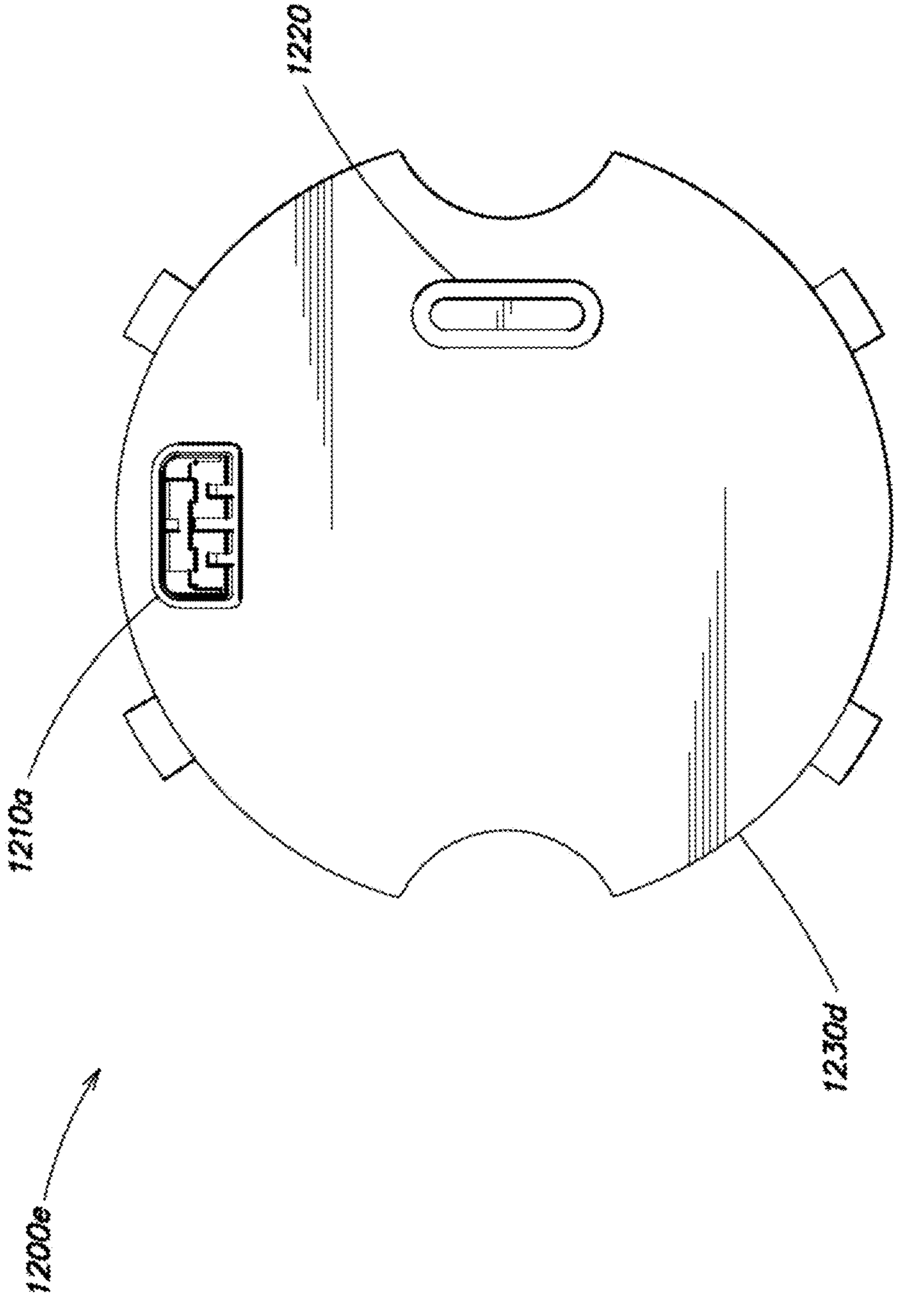
FIG. 10C shows a top view of the driver enclosure of FIG. 10A.
Figure 10D:
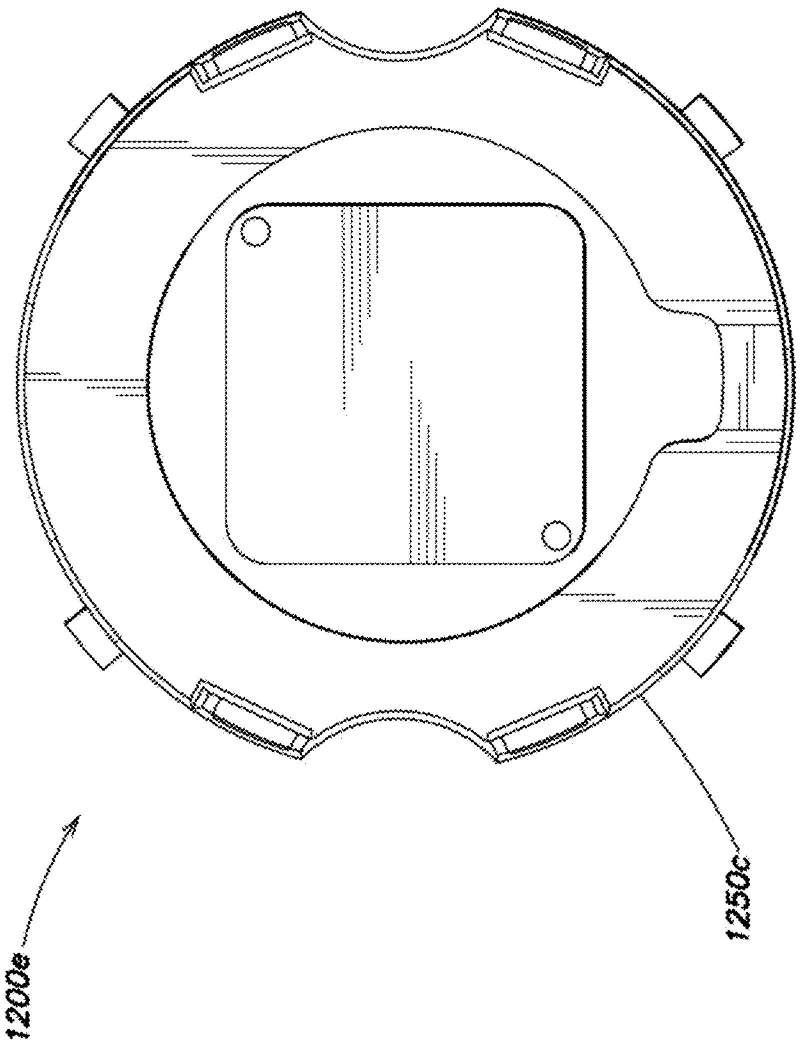
FIG. 10D shows a bottom view of the driver enclosure of FIG. 10A.
Figure 10E:
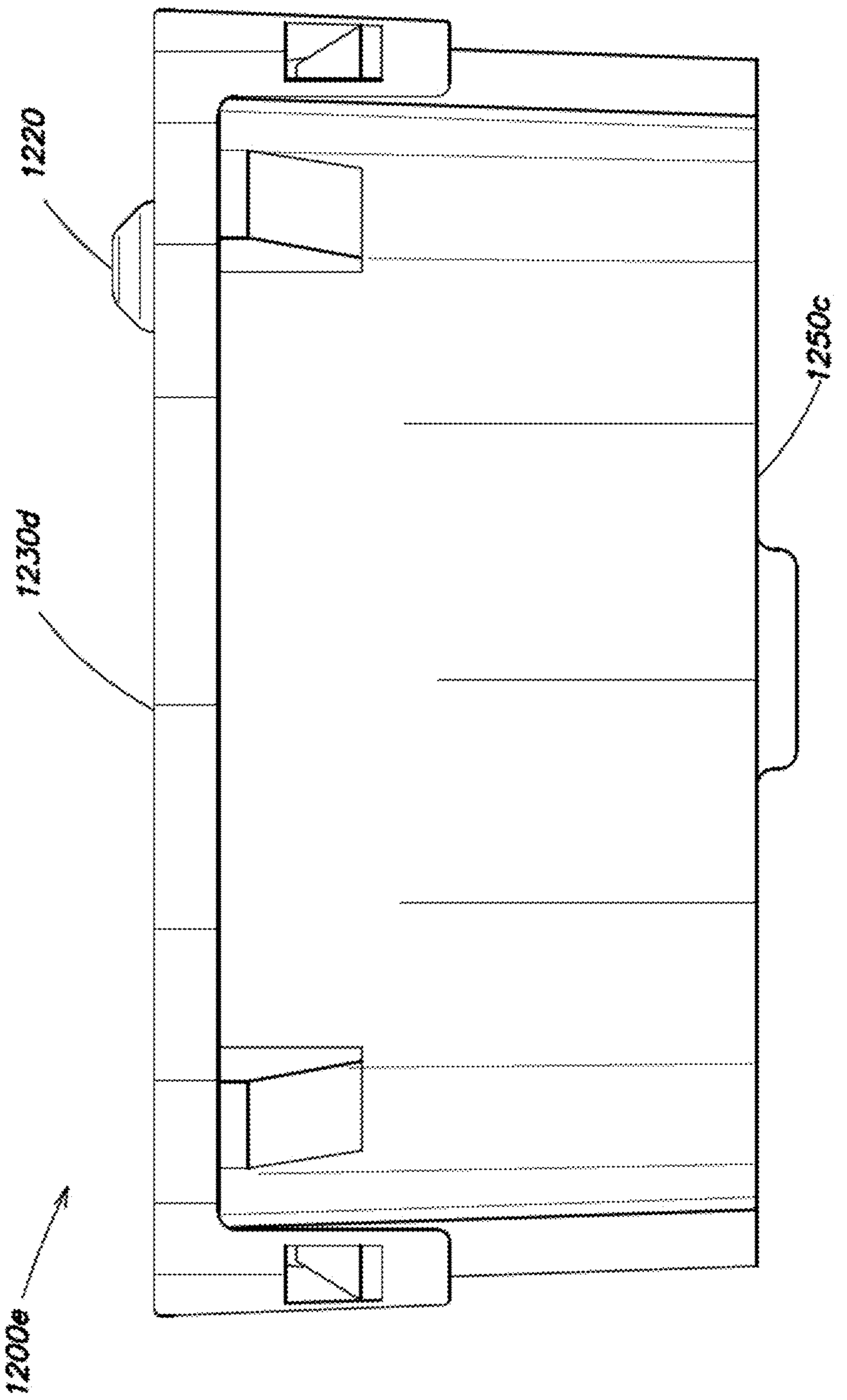
FIG. 10E shows a front view of the driver enclosure of FIG. 10A.
Figure 10F:
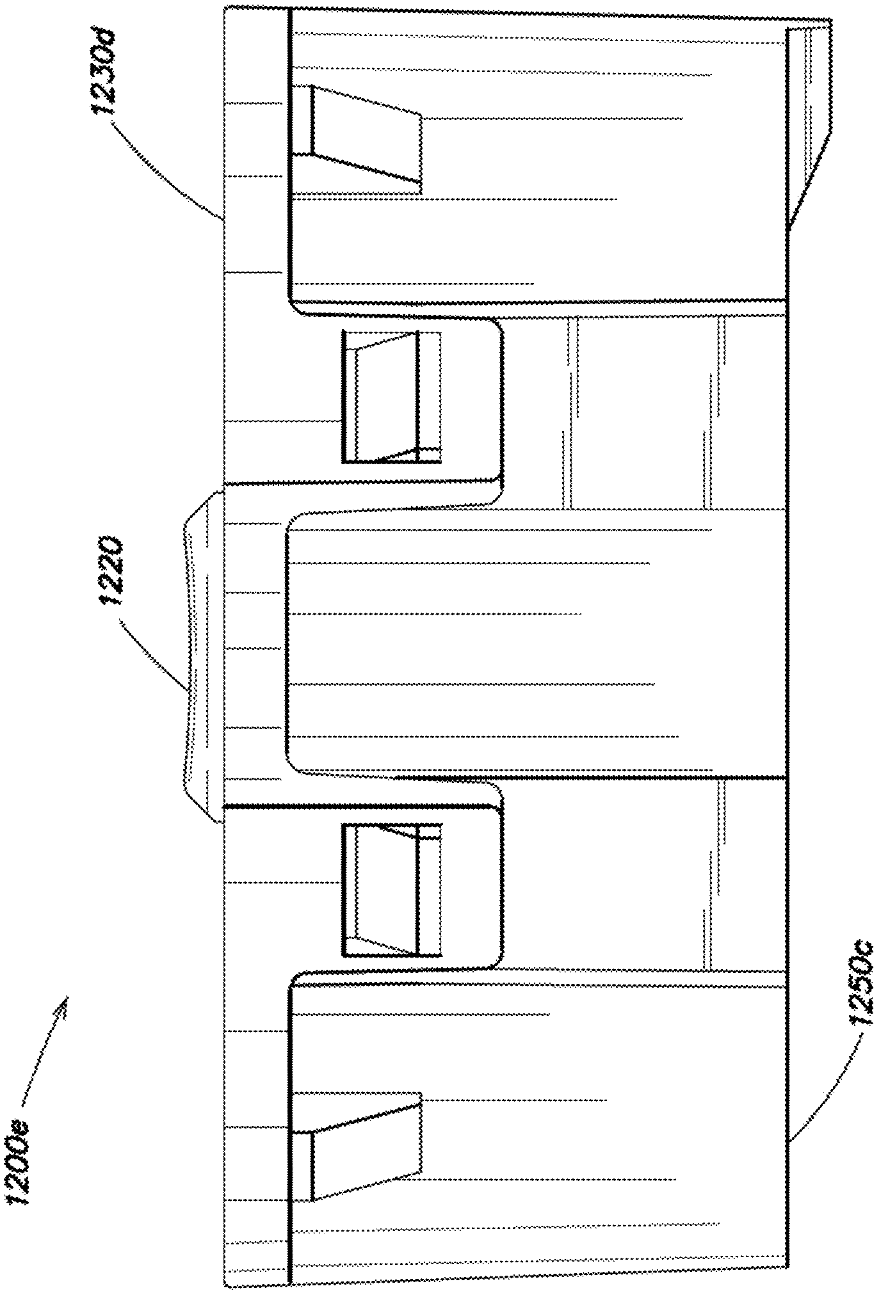
FIG. 10F shows a left-side view of the driver enclosure of FIG. 10A.
Figure 11A:
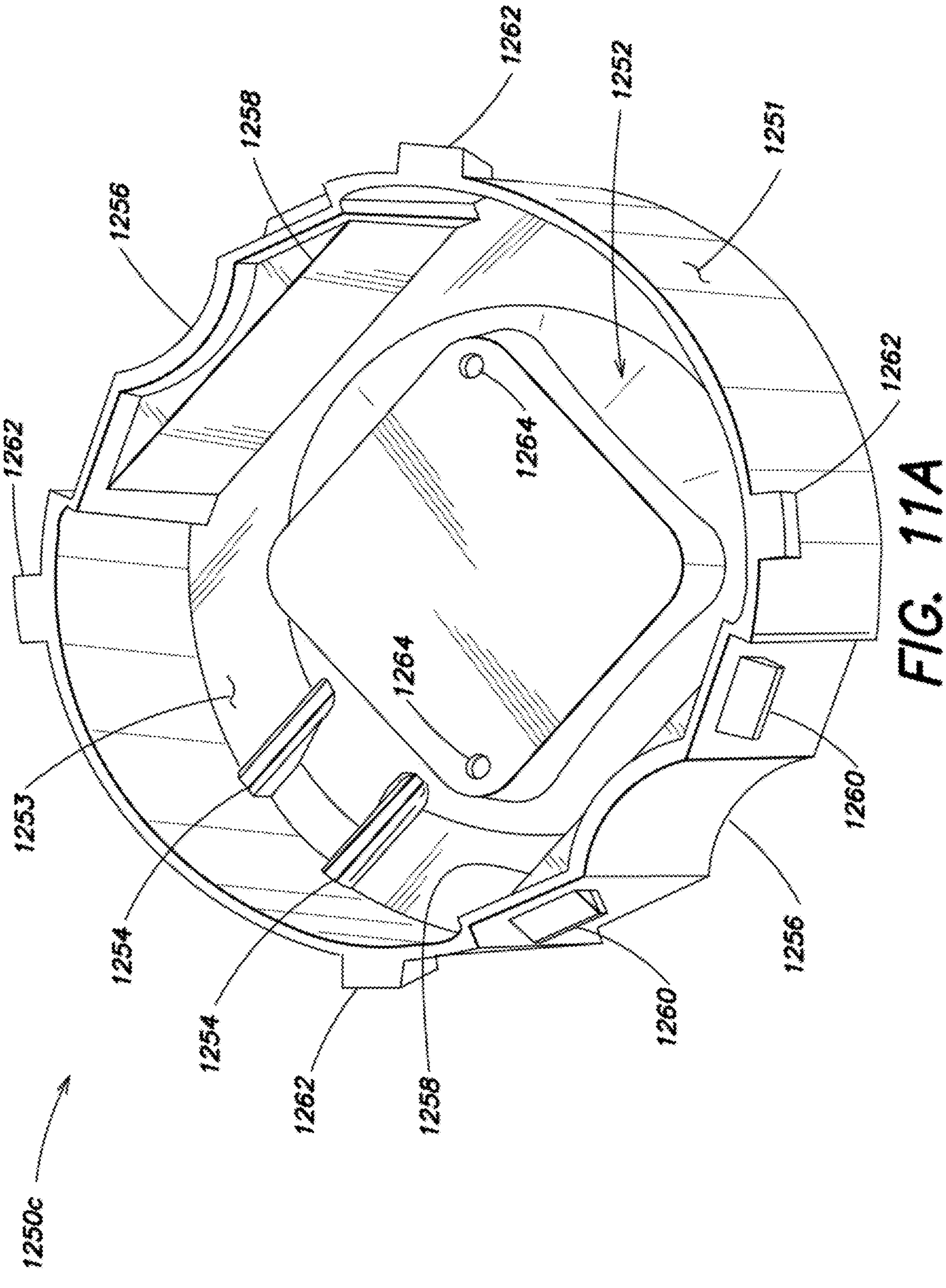
Figure 11B:
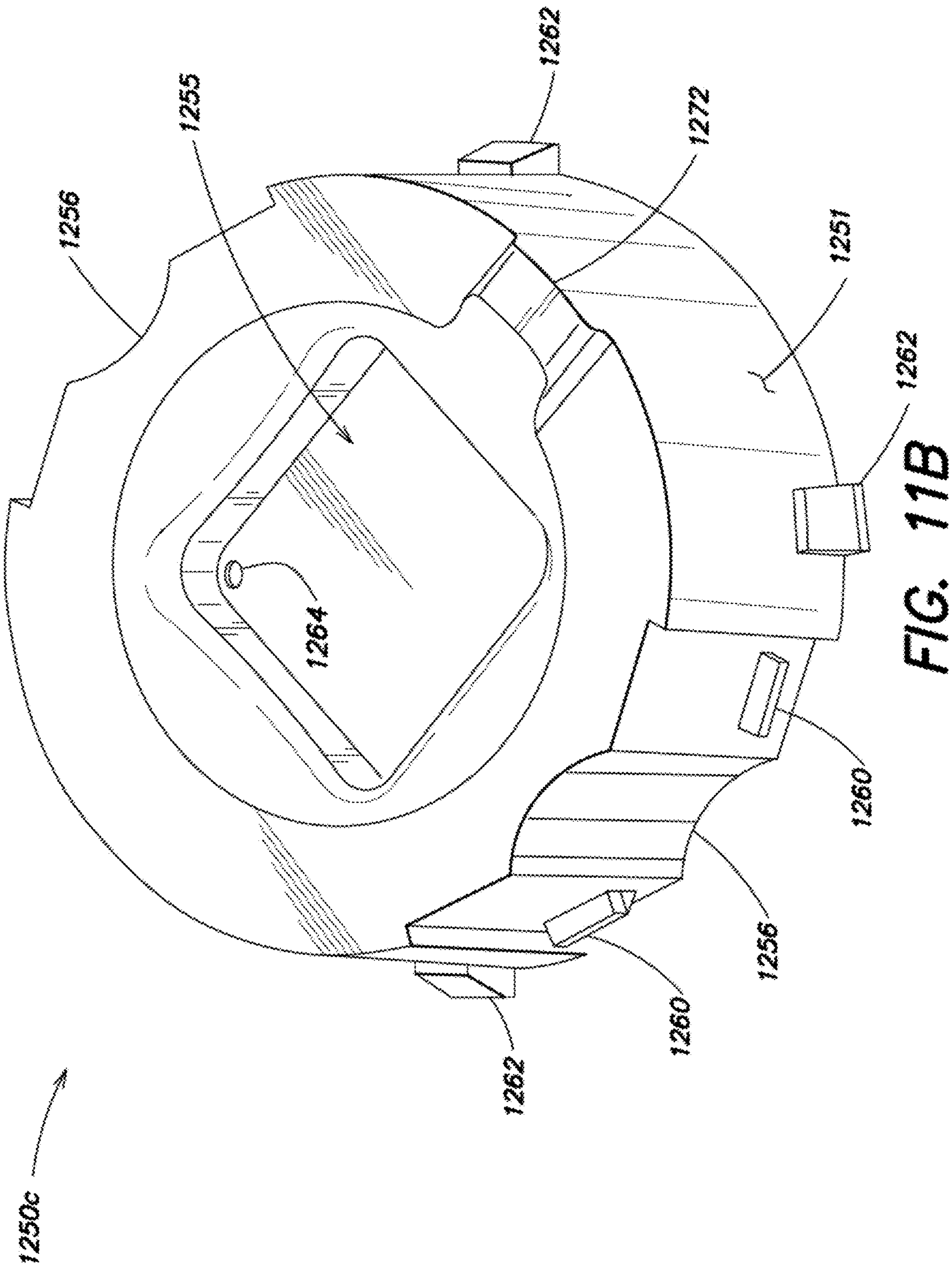
Figure 11C:
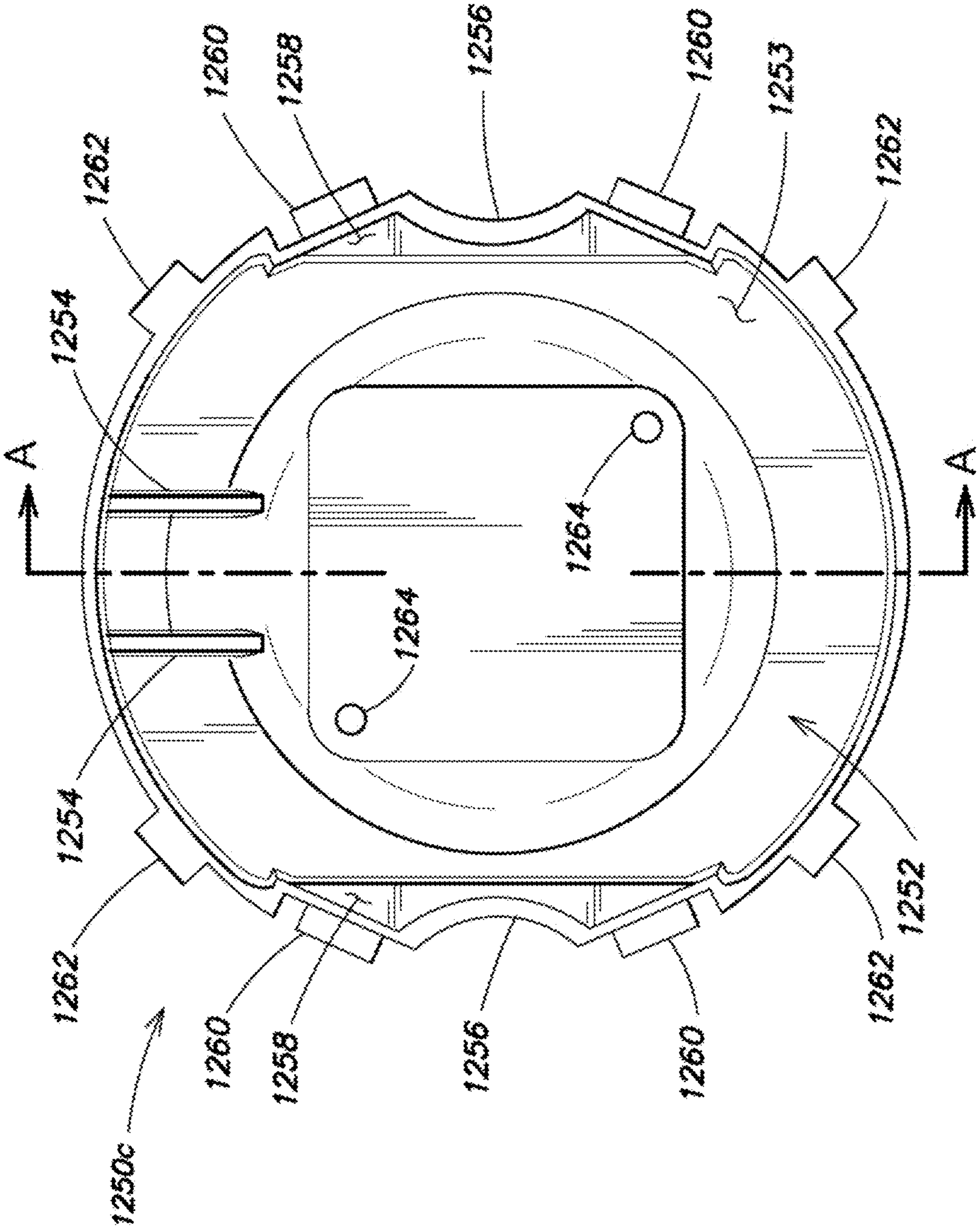
Figure 11D:
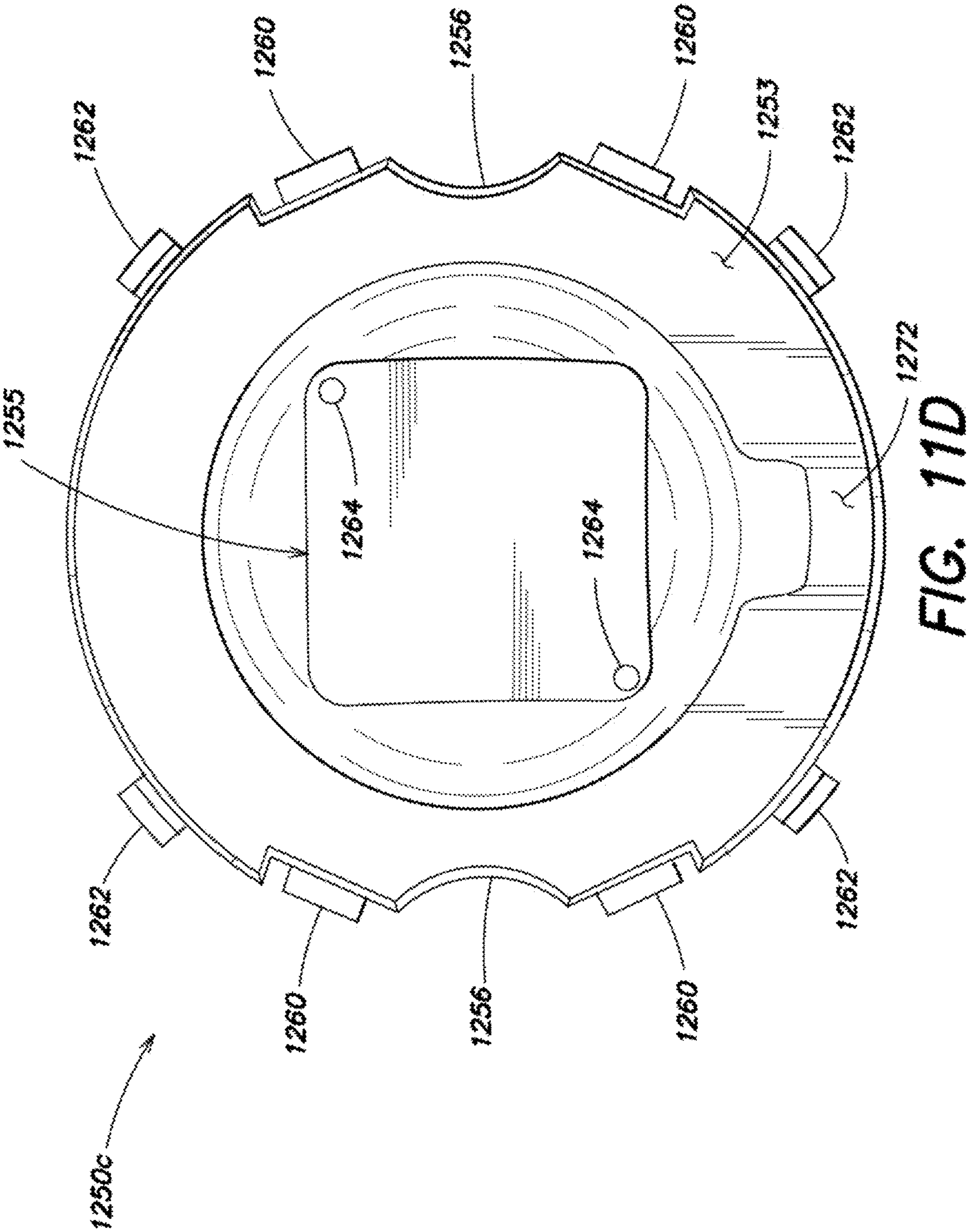
Figure 11E:
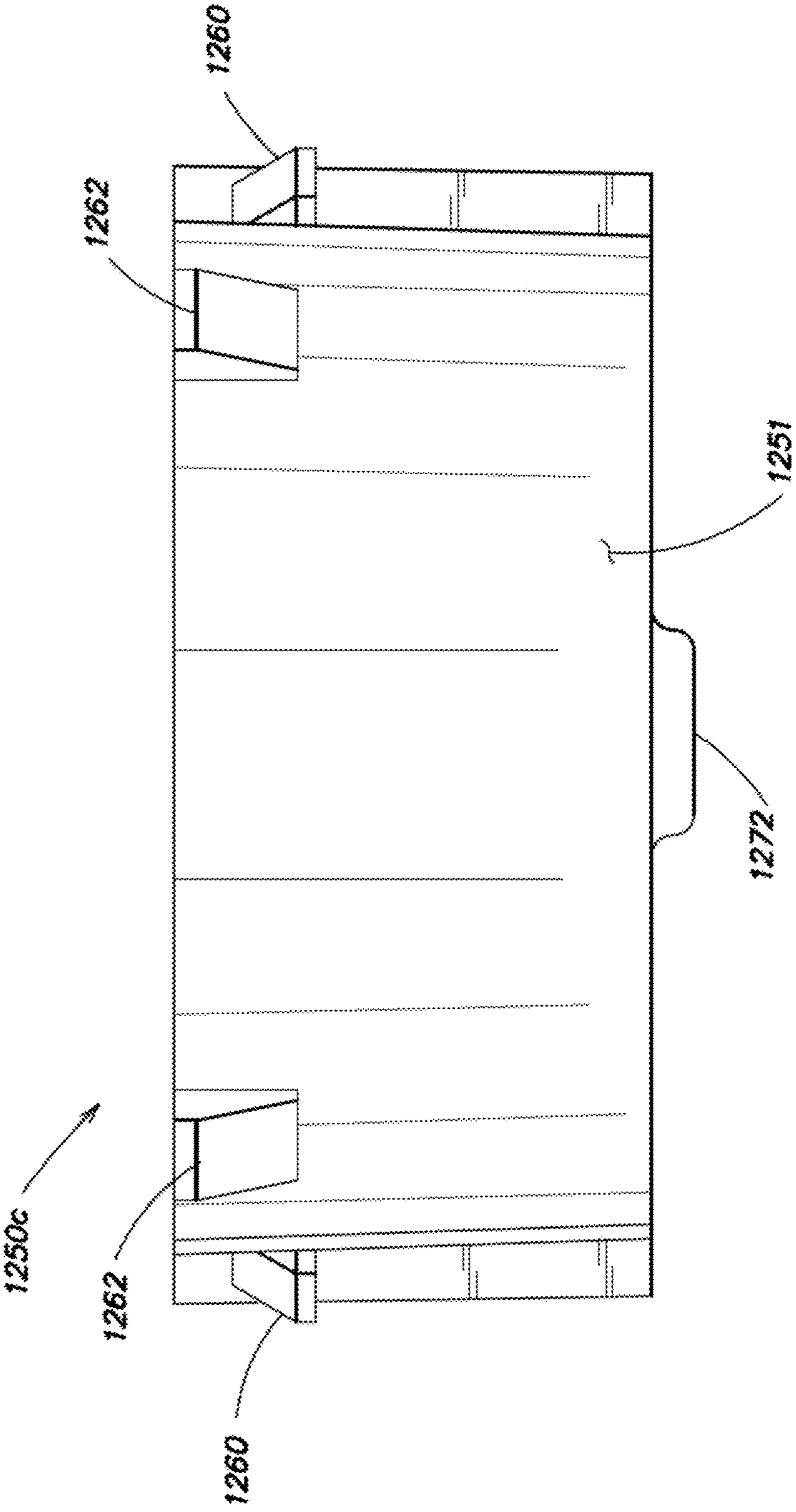
Figure 11F:
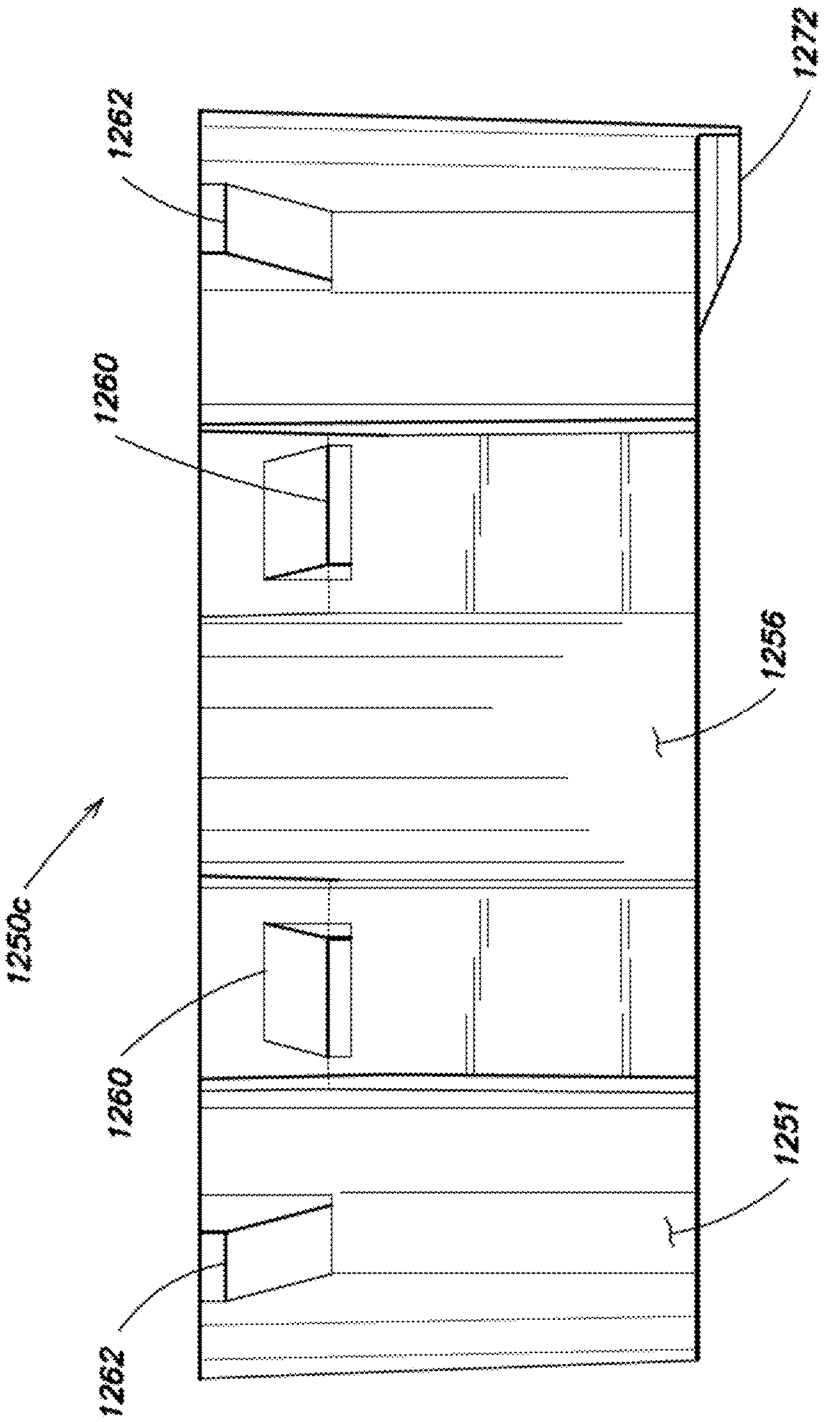
Figure 11G:
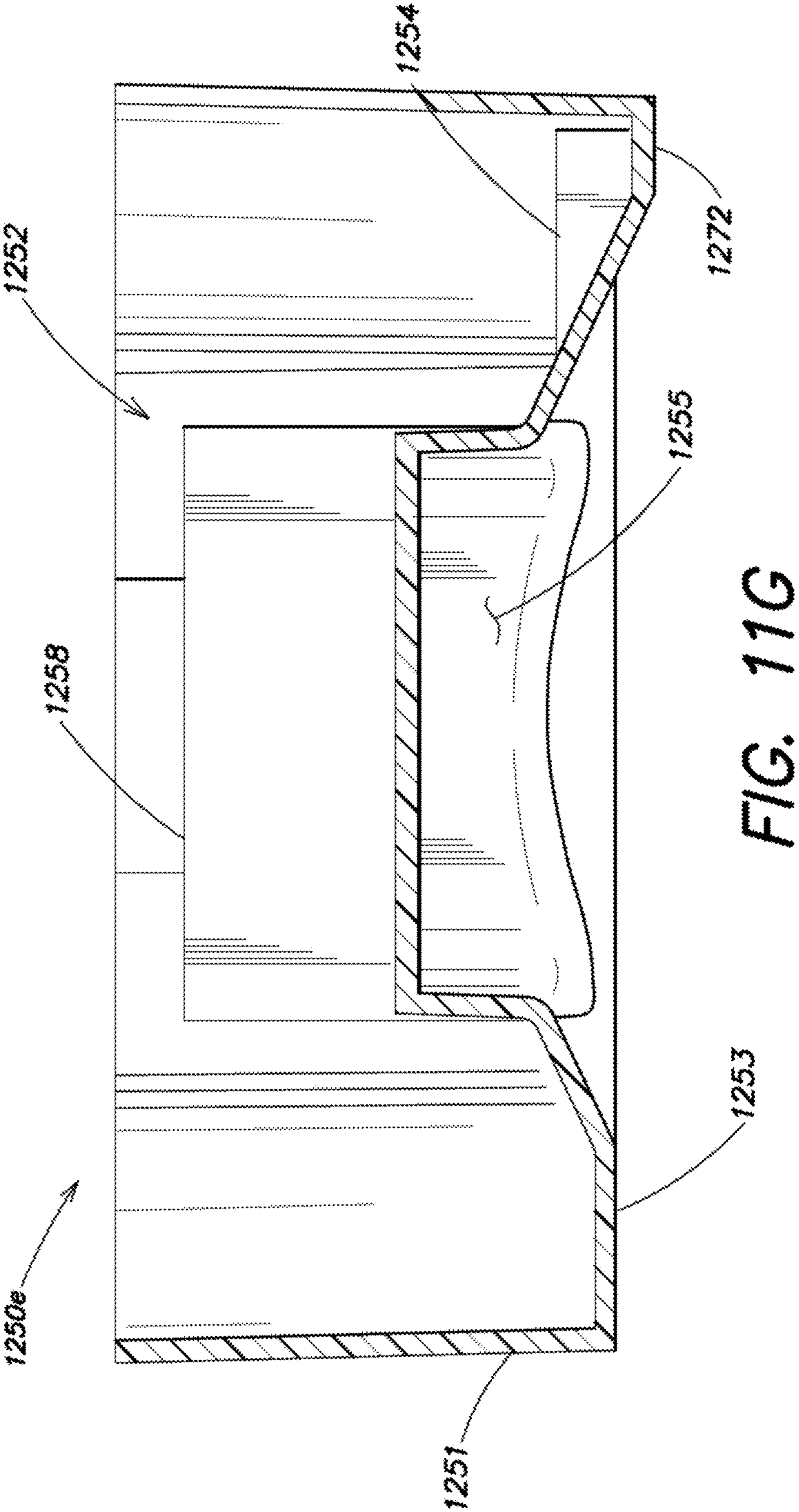
Figure 12A:
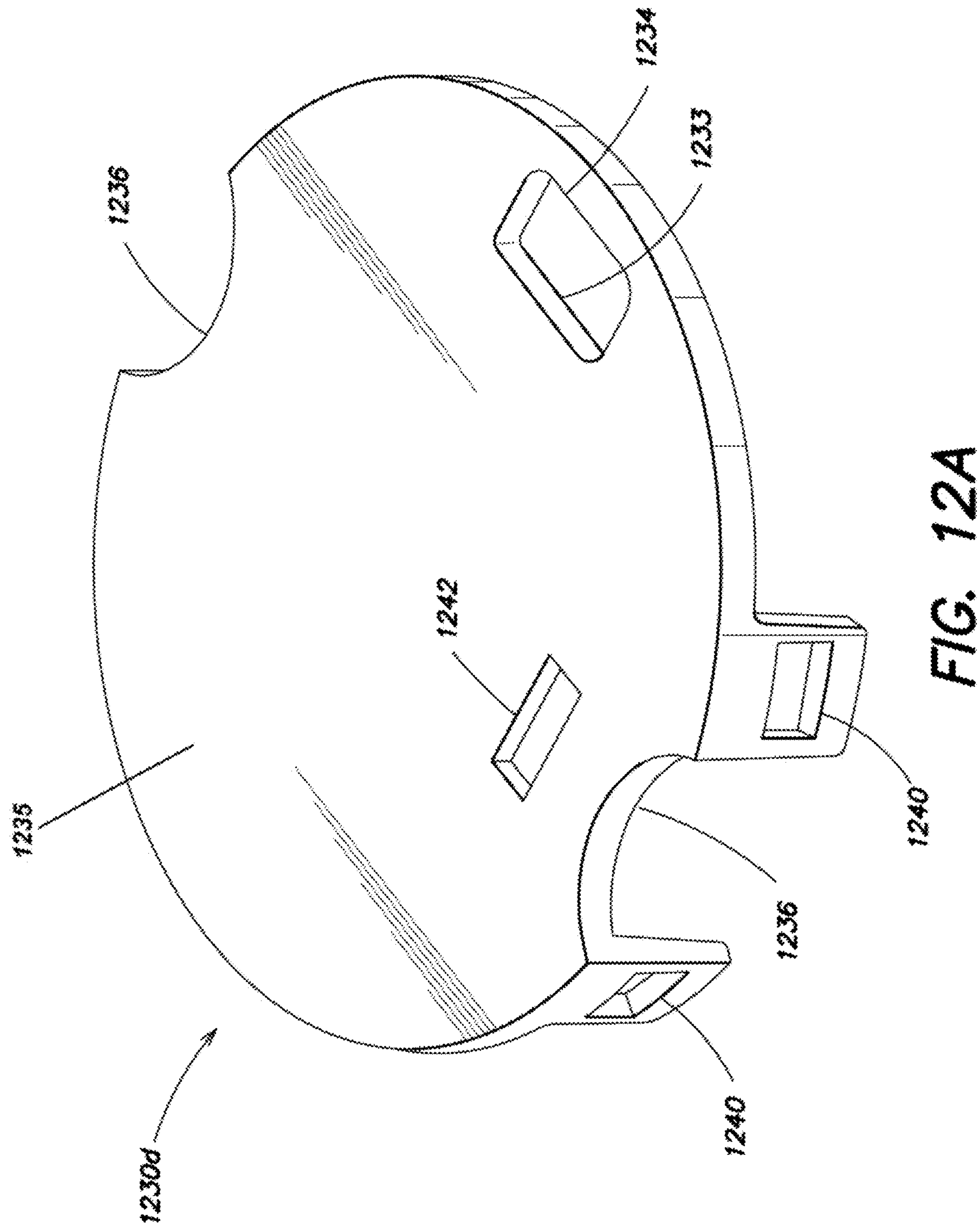
FIG. 12A shows a top perspective view of a driver cover in the driver enclosure of FIG. 10A.
Figure 12B:
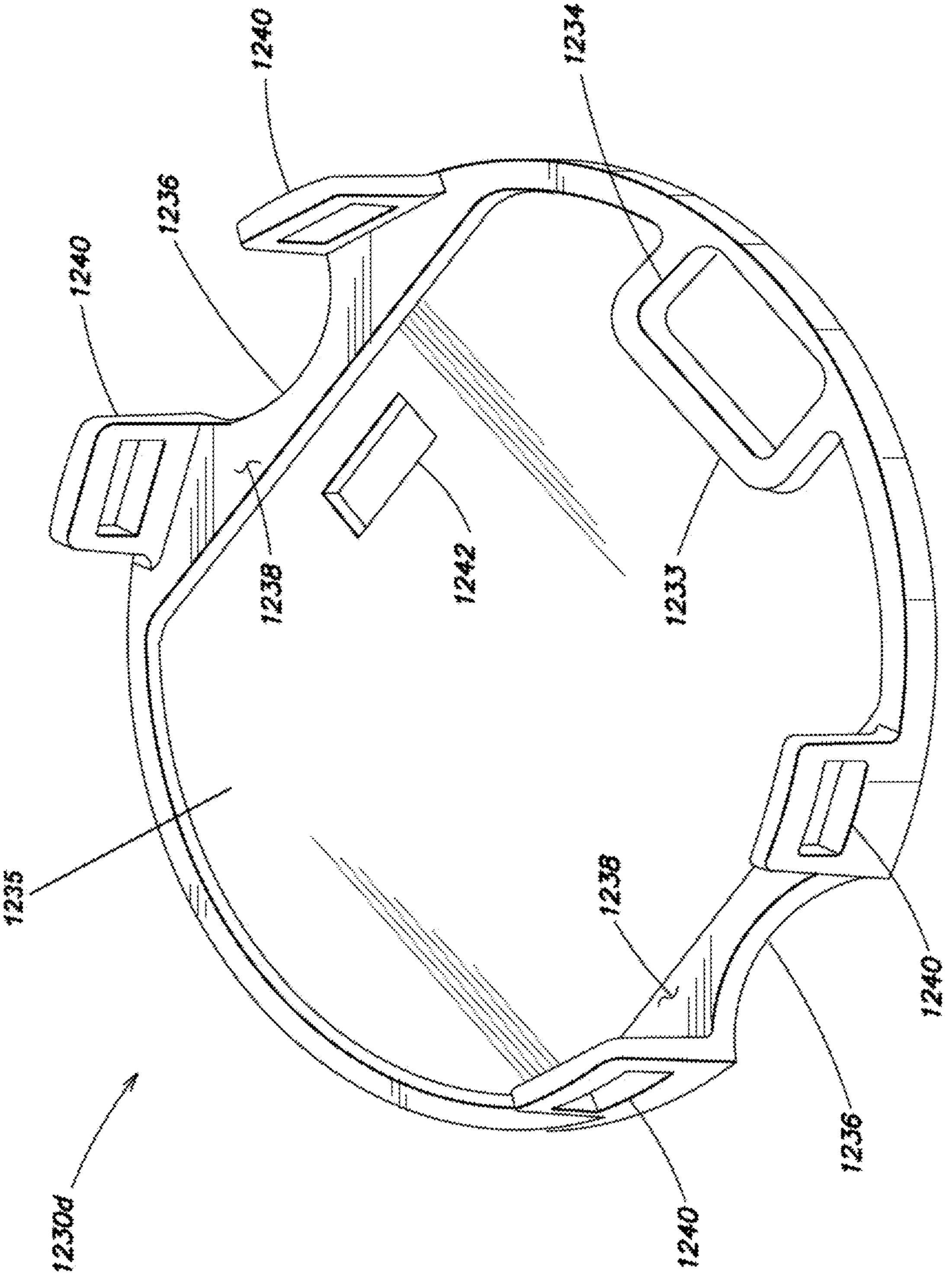
FIG. 12B shows a bottom perspective view of the driver cover of FIG. 12A.
Figure 12C:
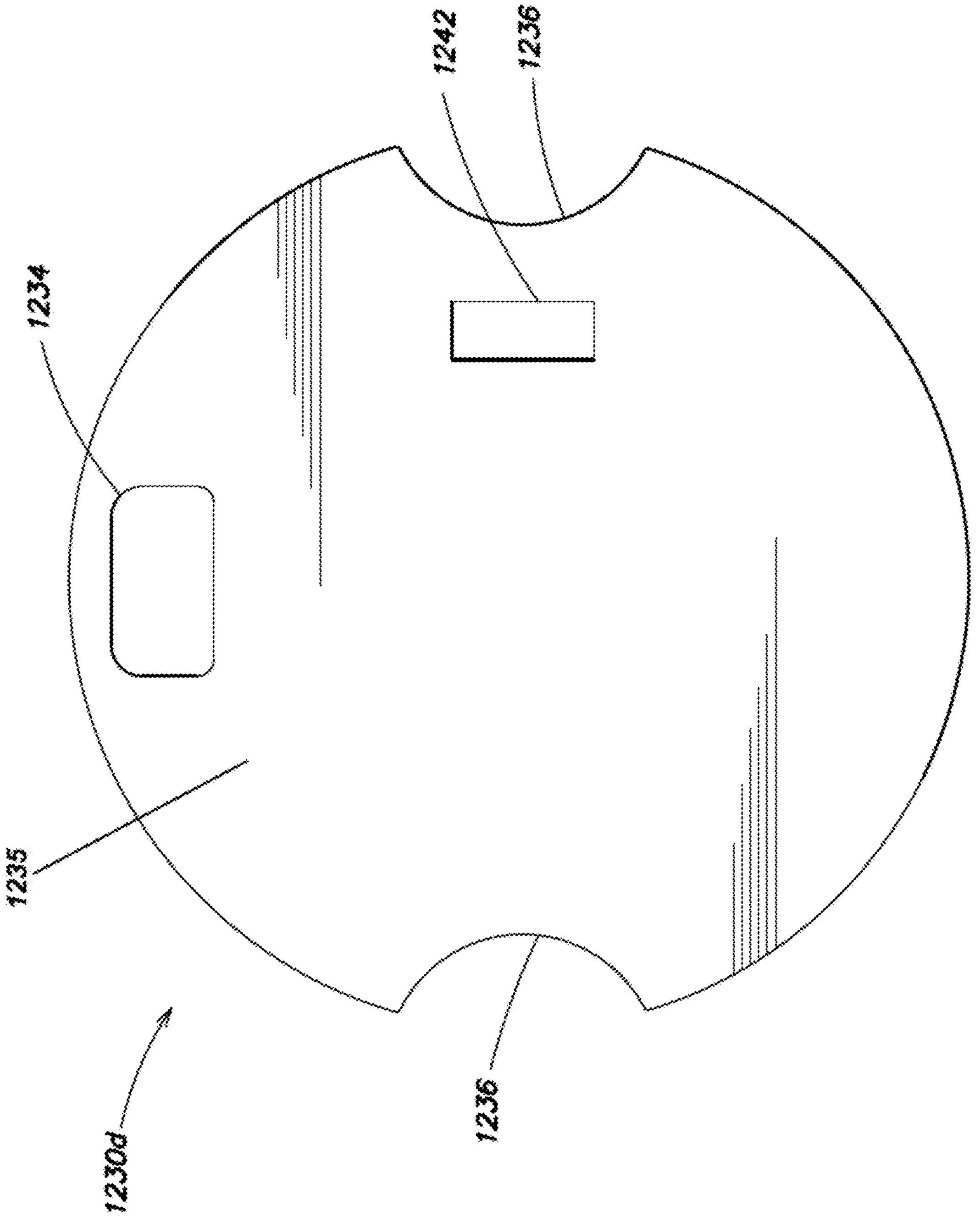
FIG. 12C shows a top view of the driver cover of FIG. 12A.
Figure 12D:
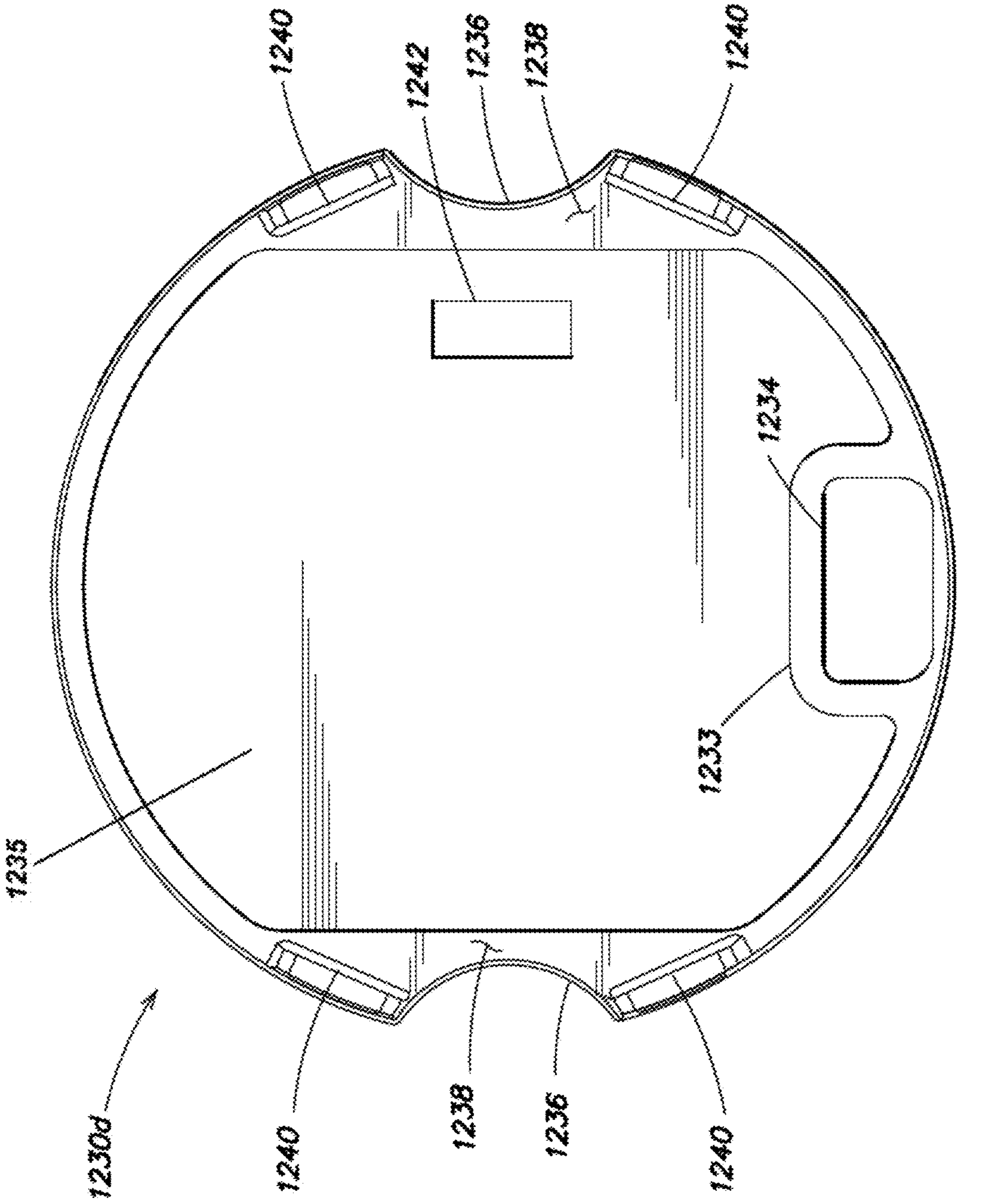
FIG. 12D shows a bottom view of the driver cover of FIG. 12A.
Figure 12E:
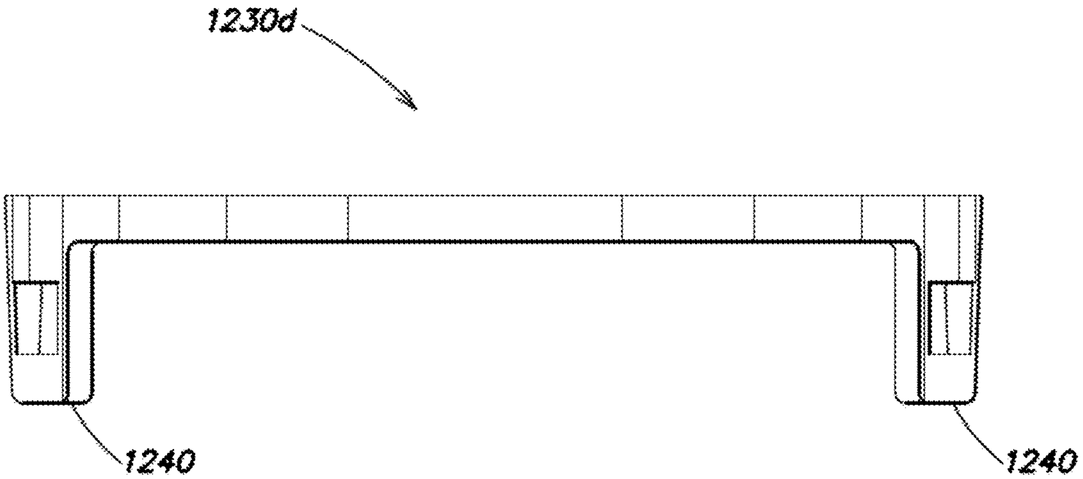
FIG. 12E shows a front view of the driver cover of FIG. 12A.
Figure 12F:
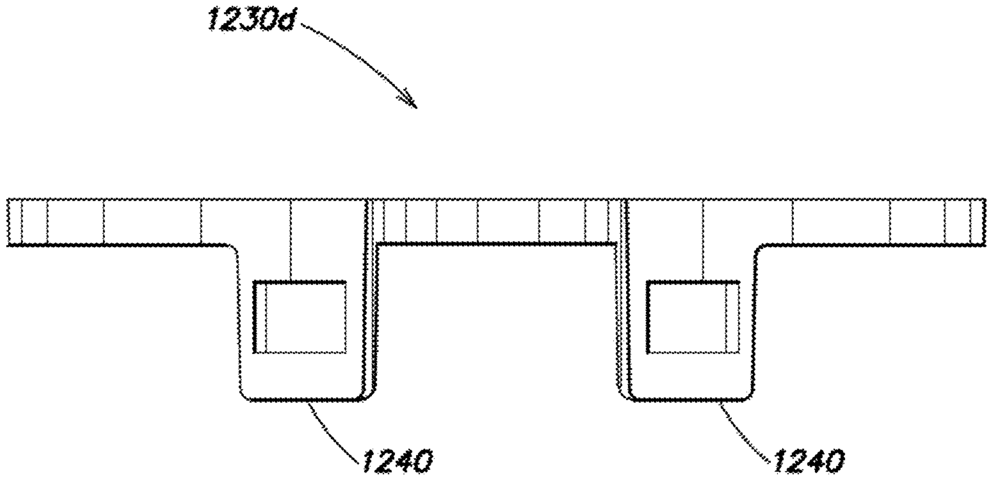
FIG. 12F shows a left-side view of the driver cover of FIG. 12A.
Figure 13A:
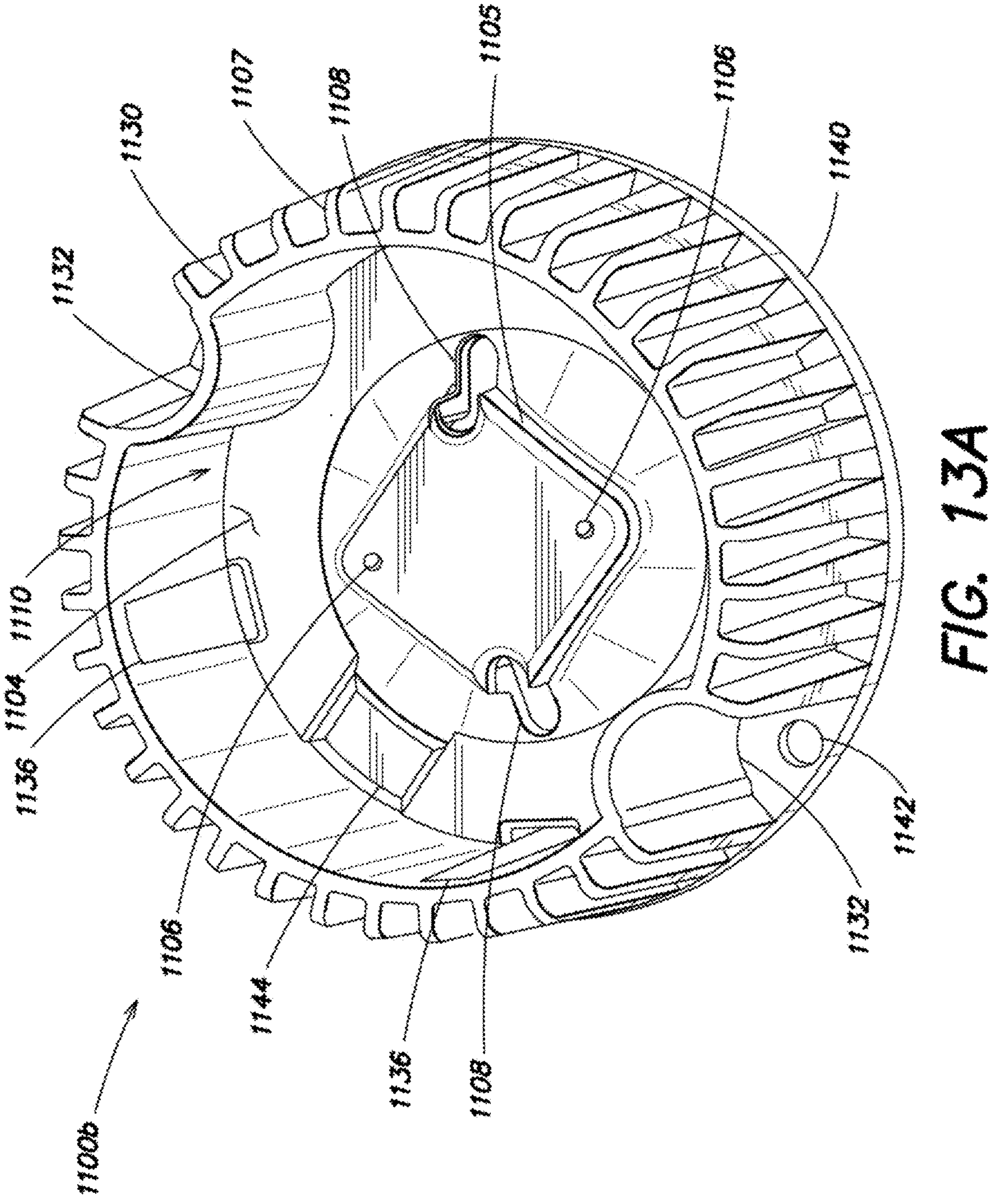
FIG. 13A shows a top perspective view of a heat sink in the lighting module of FIG. 9A.
Figure 13B:
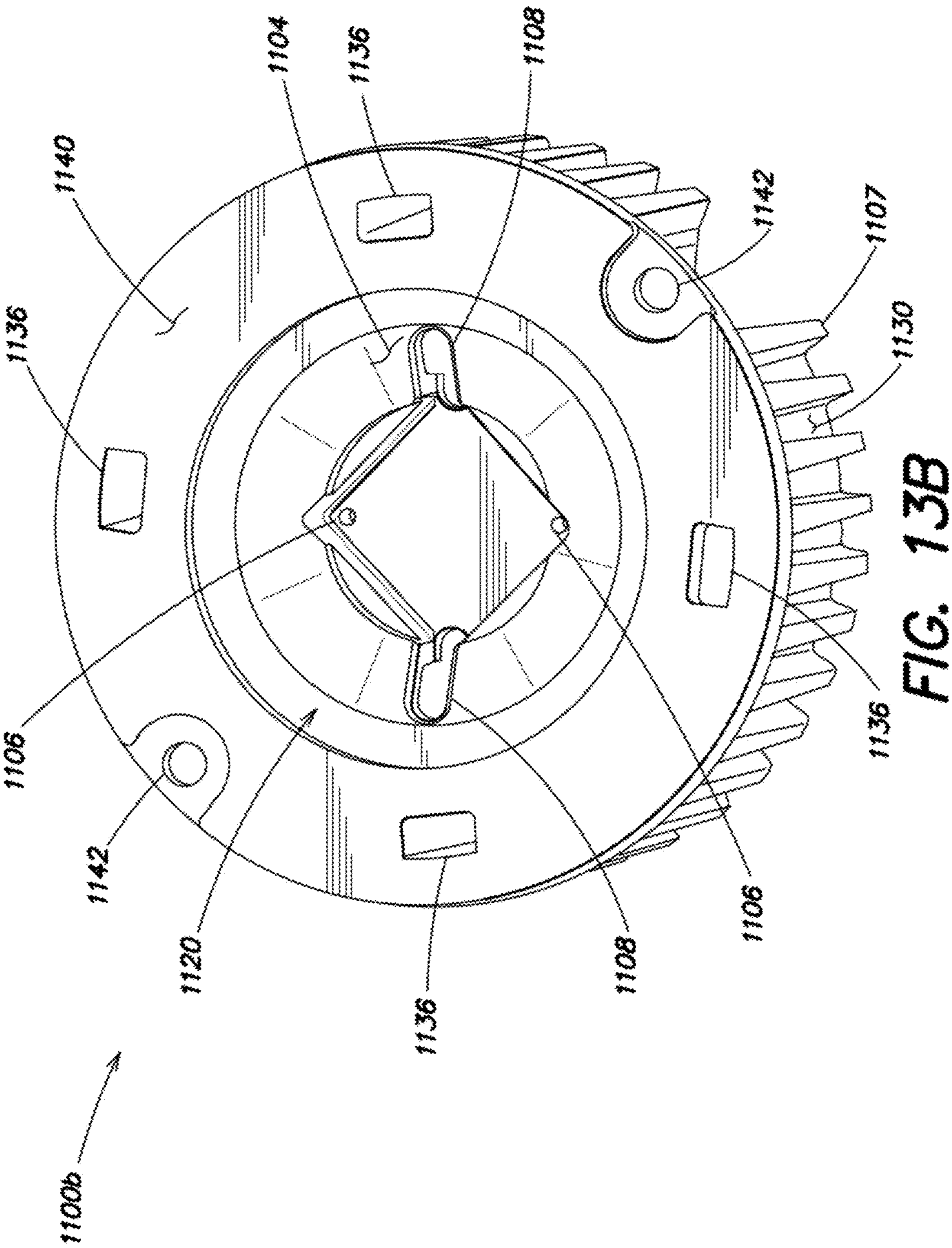
FIG. 13B shows a bottom perspective view of the heat sink of FIG. 13A.
Figure 13C:
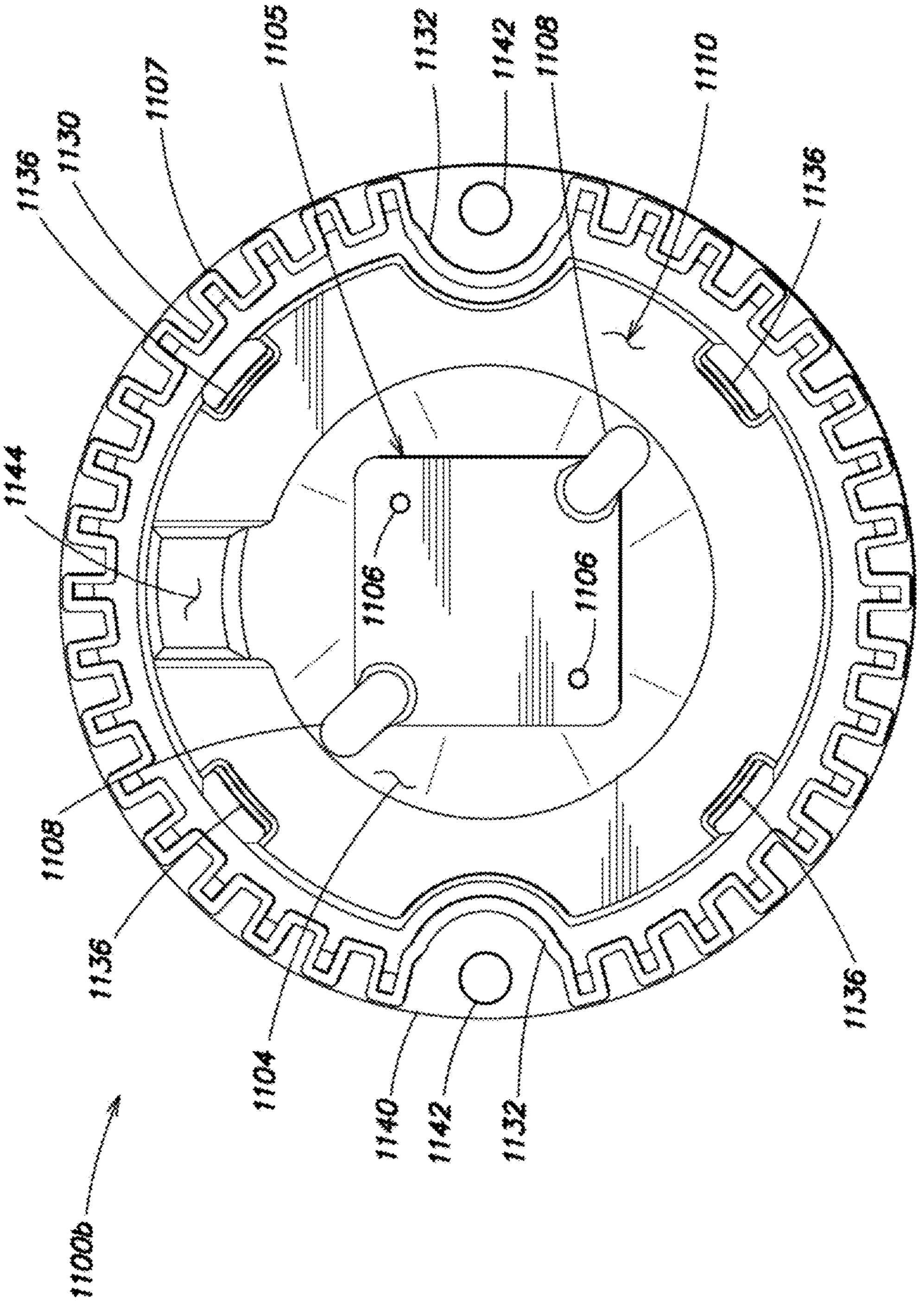
FIG. 13C shows a top view of the heat sink of FIG. 13A.
Figure 13D:
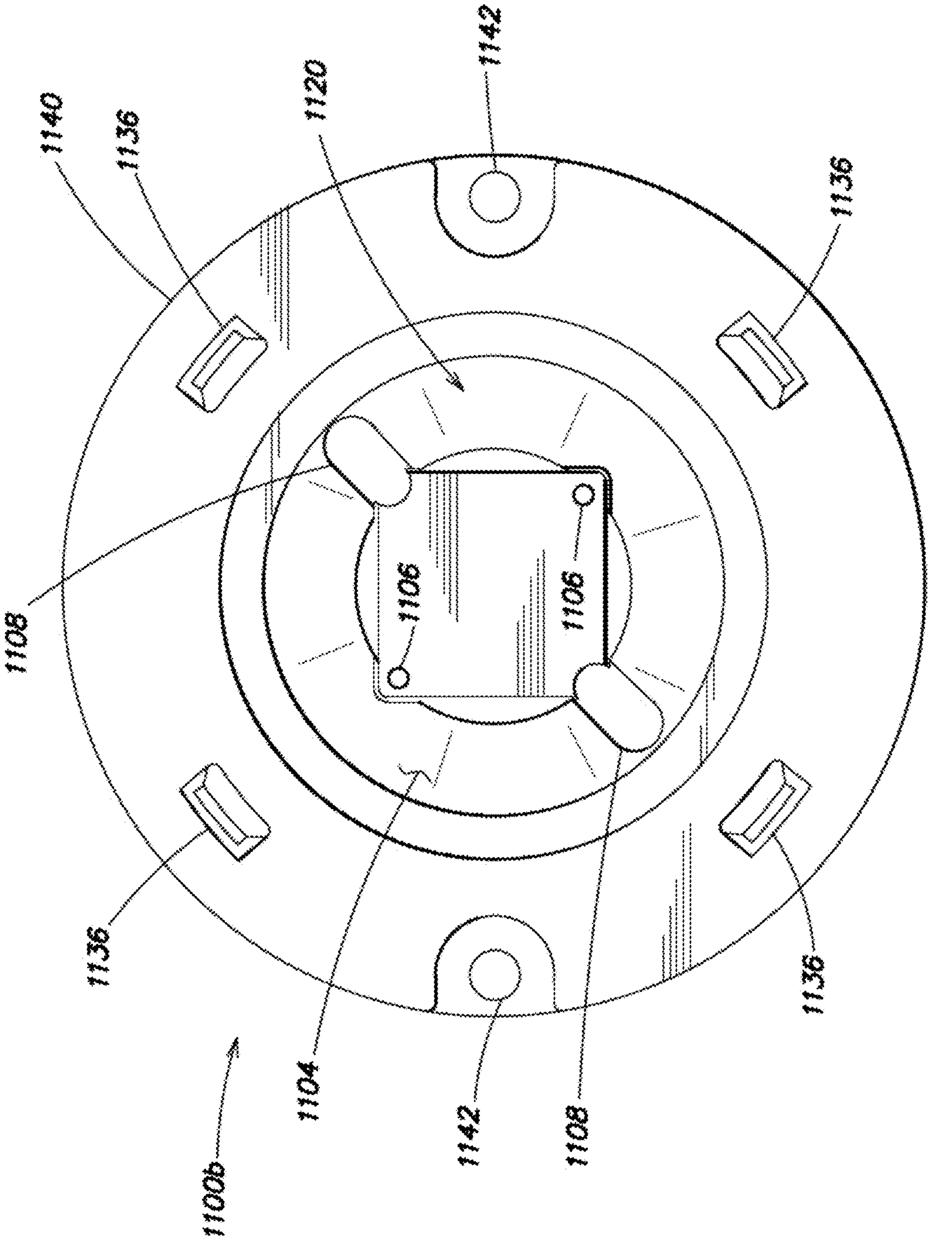
FIG. 13D shows a bottom view of the heat sink of FIG. 13A.
Figure 13E:
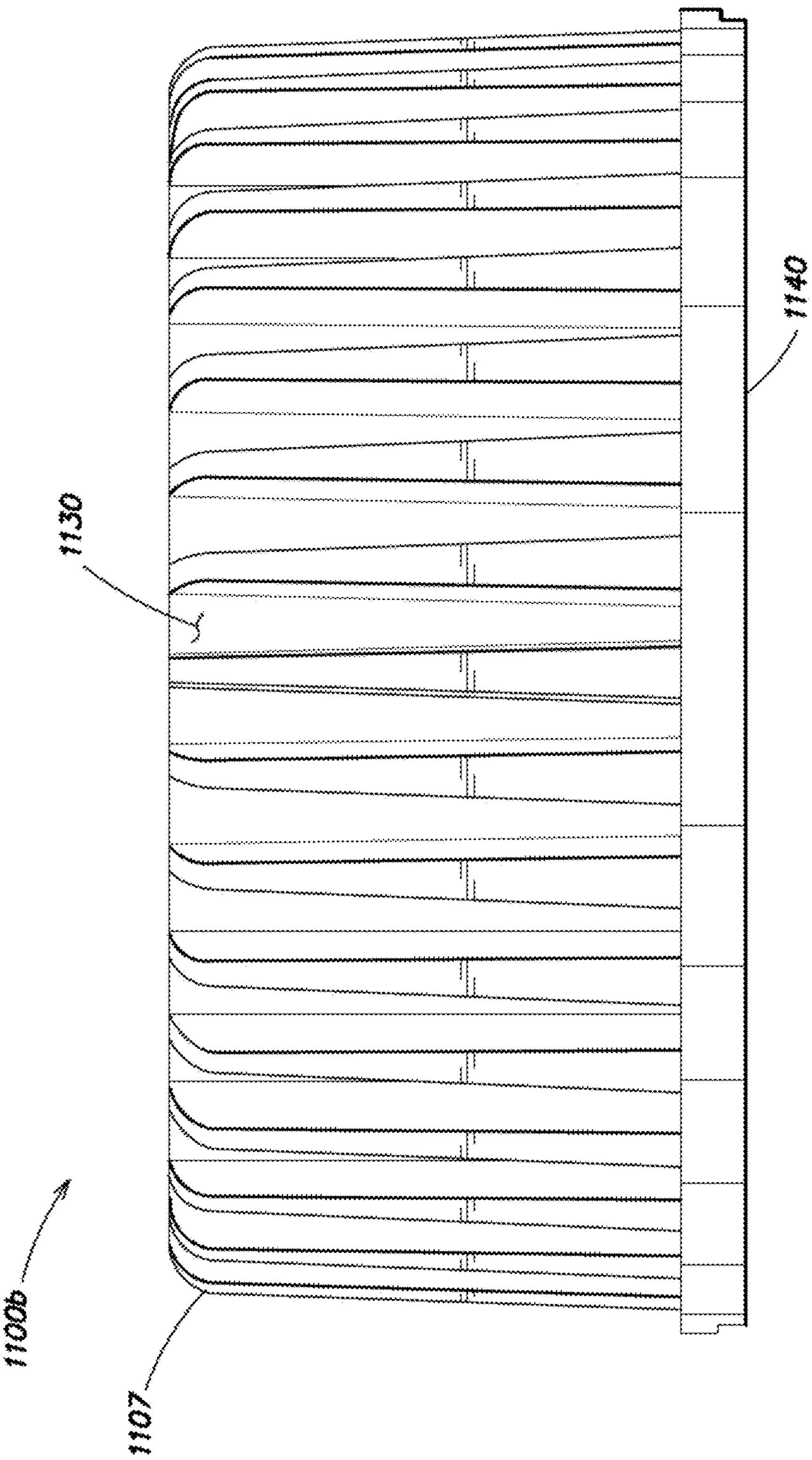
FIG. 13E shows a front view of the heat sink of FIG. 13A.
Figure 13F:
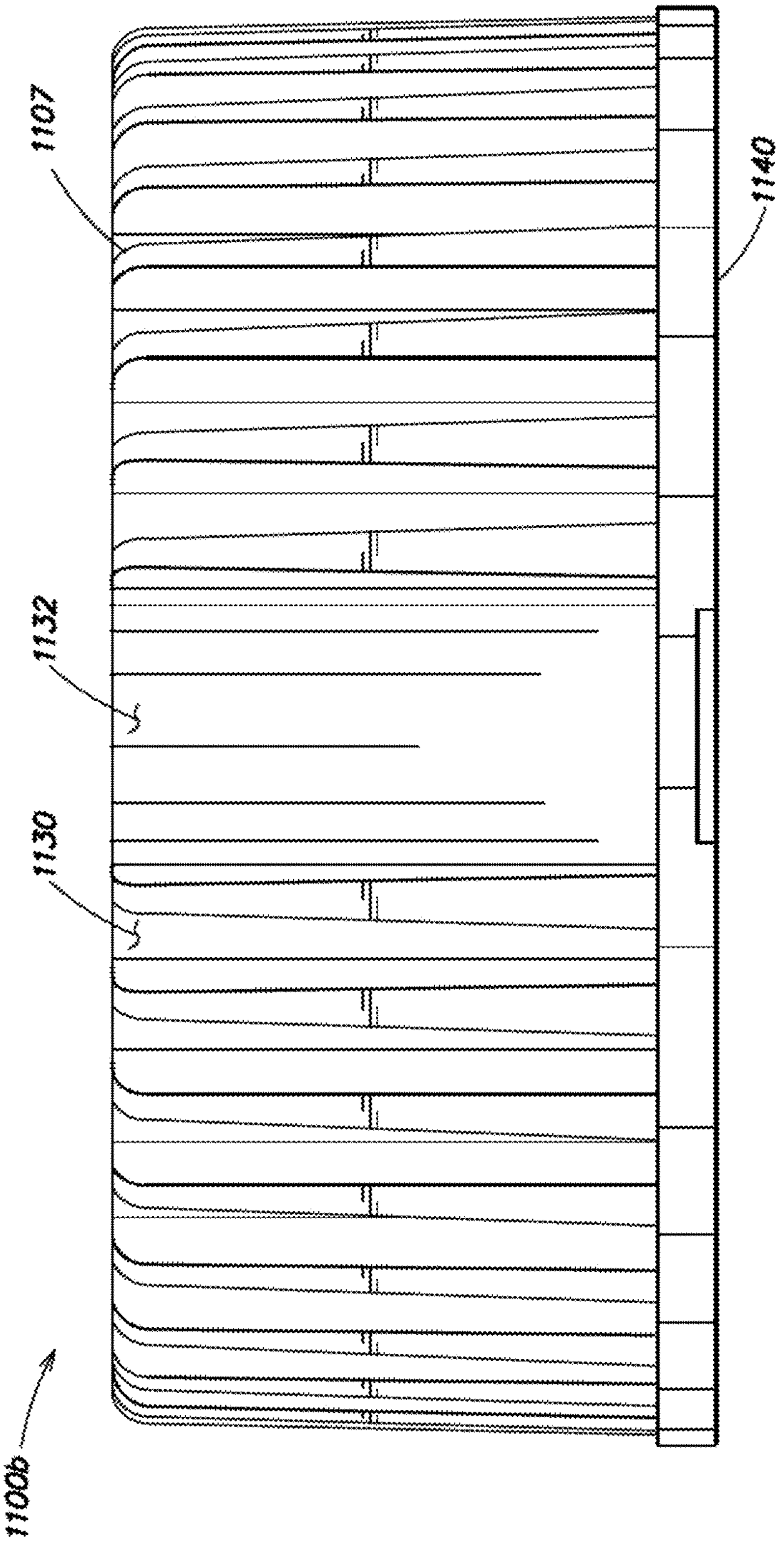
FIG. 13F shows a left-side view of the heat sink of FIG. 13A.
Figure 14A:
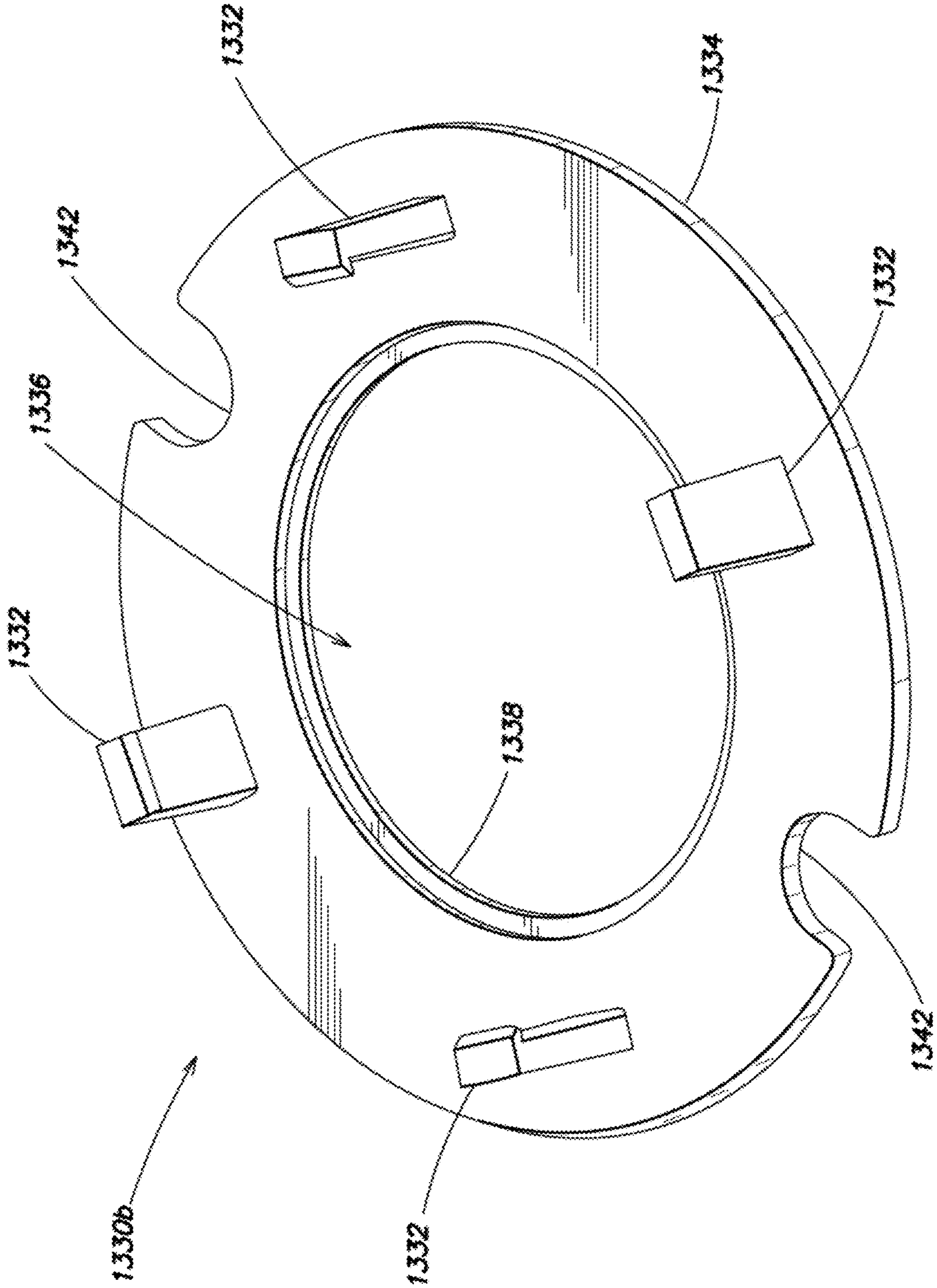
FIG. 14A shows a top perspective view of a retaining ring in the lighting module of FIG. 9A.
Figure 14B:
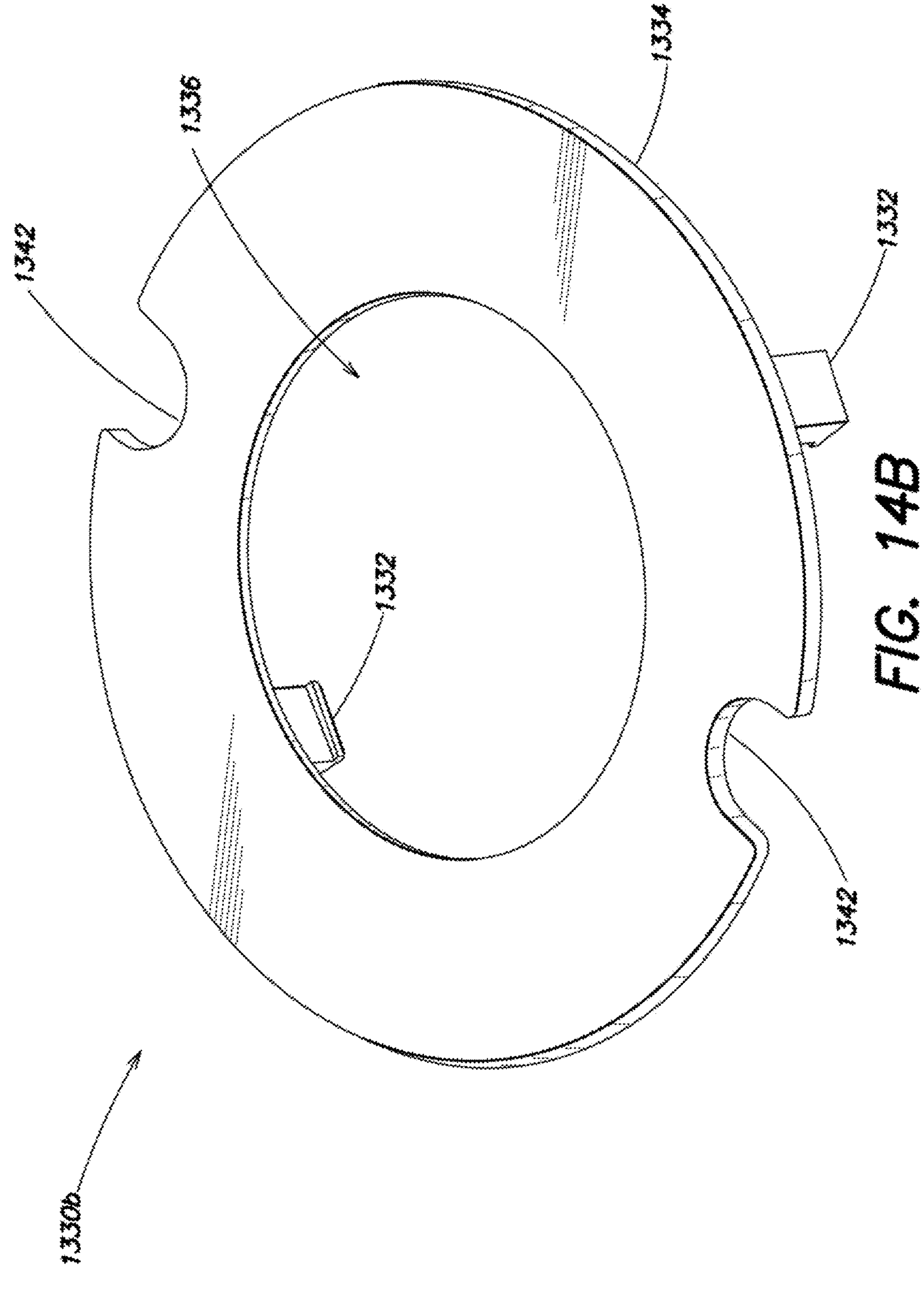
FIG. 14B shows a bottom perspective view of the retaining ring of FIG. 14A.
Figure 14C:
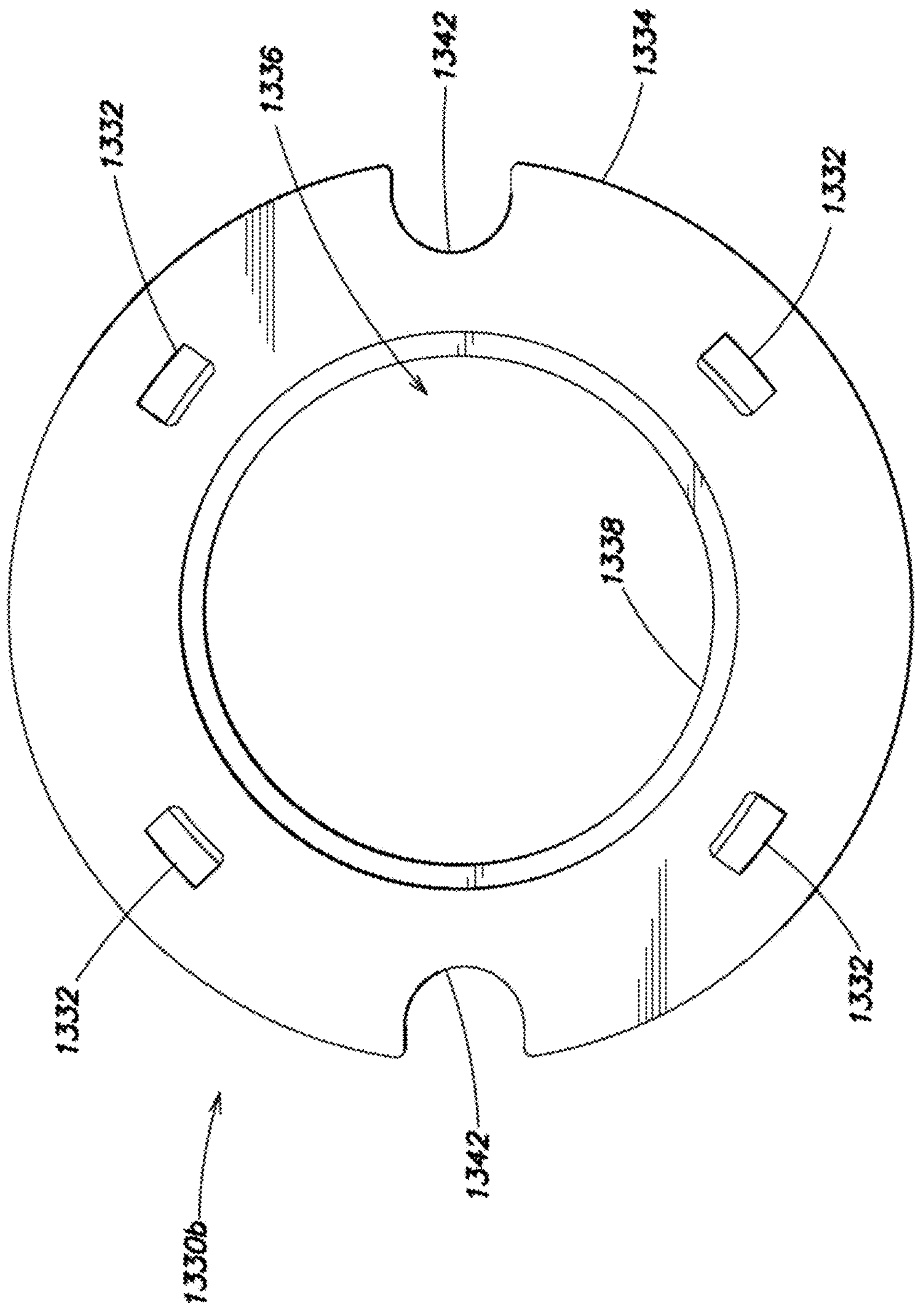
FIG. 14C shows a top view of the retaining ring of FIG. 14A.
Figure 14D:
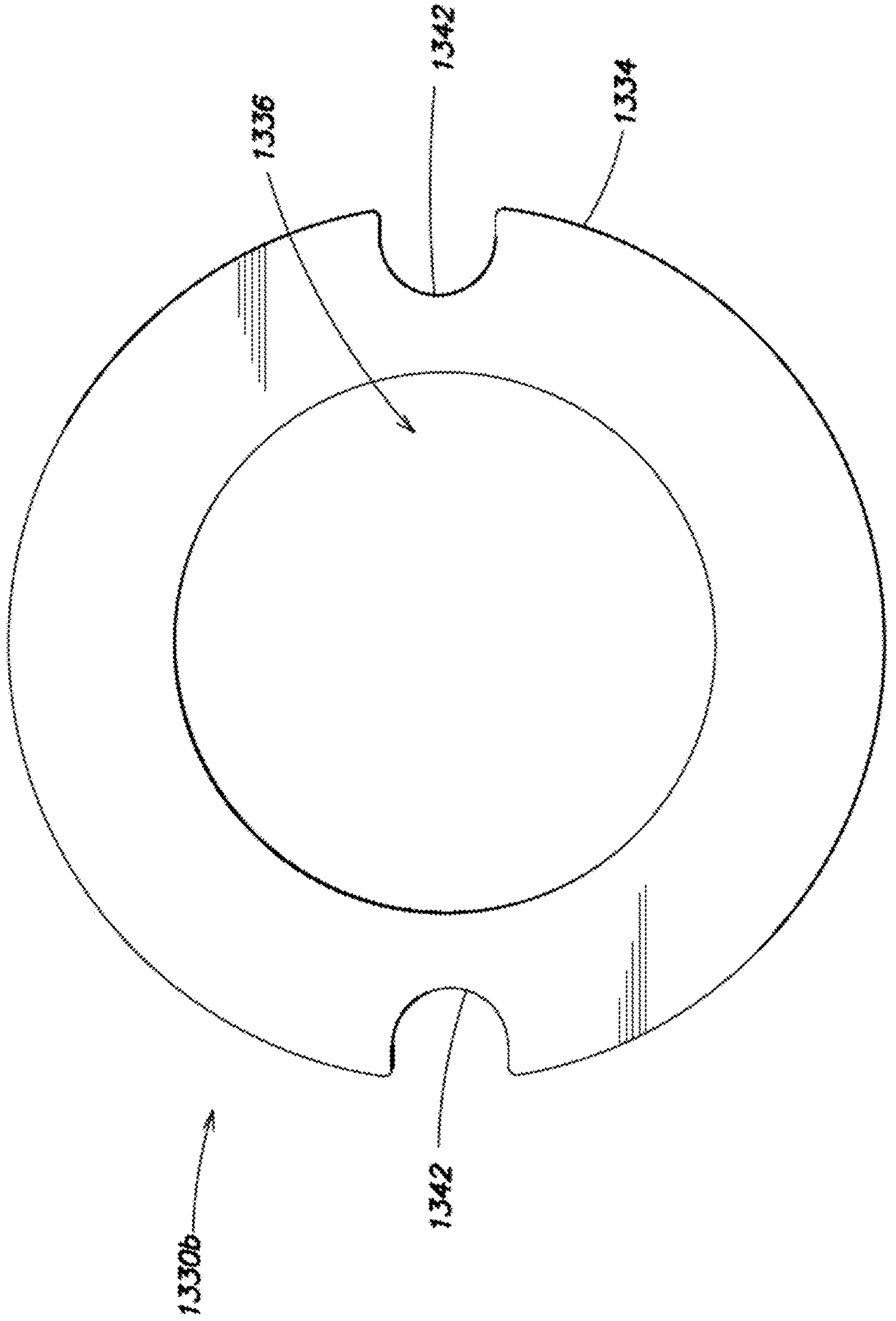
FIG. 14D shows a bottom view of the retaining ring of FIG. 14A.
Figure 14E:
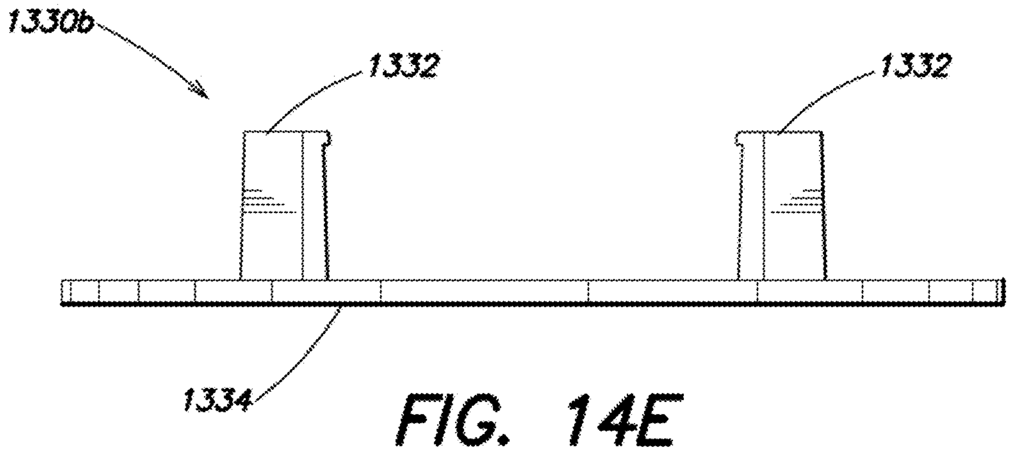
FIG. 14E shows a front view of the retaining ring of FIG. 14A.
Figure 14F:
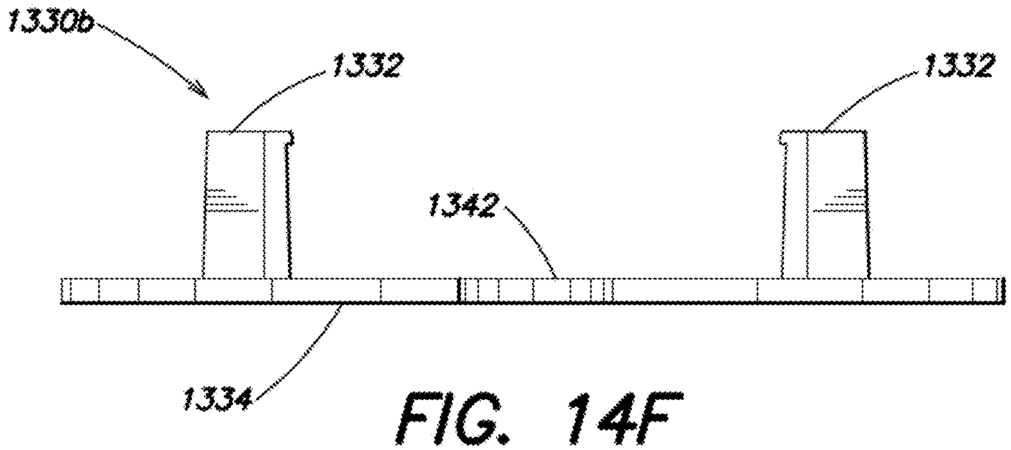
FIG. 14F shows a left-side view of the retaining ring of FIG. 14A.

As shown in FIGS. 9I and 9H, the optical lens 1350 may be retained within the second cavity 1120 by the retaining ring 1330*b*. In some implementations, the retaining ring 1330*b* may physically contact the optical lens 1350 such that the optical lens 1350 is pressed against the partition 1104 in order to prevent unwanted movement of the optical lens 1350 after assembly. For example, the retaining ring 1330*b* may contact a lip 1352 located along the outer edge of the optical lens 1350. The lip 1352 may form a gap 1354 between a flange 1334 of the retaining ring 1330*b* and the optical lens 1350 to ensure the retaining ring 1330*b* does not alter and/or otherwise adversely affect the light guiding properties of the optical lens 1350.

FIGS. 14A-14F show several views of the retaining ring 1330*b*. For the lighting module 1000*c*, the flange 1334 may be shaped to abut the flange 1140 of the heat sink 1100*b* instead of being recessed within the flange 1140 as shown above for the retaining ring 1330*a* in the lighting module 1000*a*. The flange 1334 may define an opening 1336 through which light coupled out of the optical lens 1350 passes through upon exiting the lighting module 1000*c*. Thus, a front face of the optical lens 1350 may be exposed.

Figure 15:
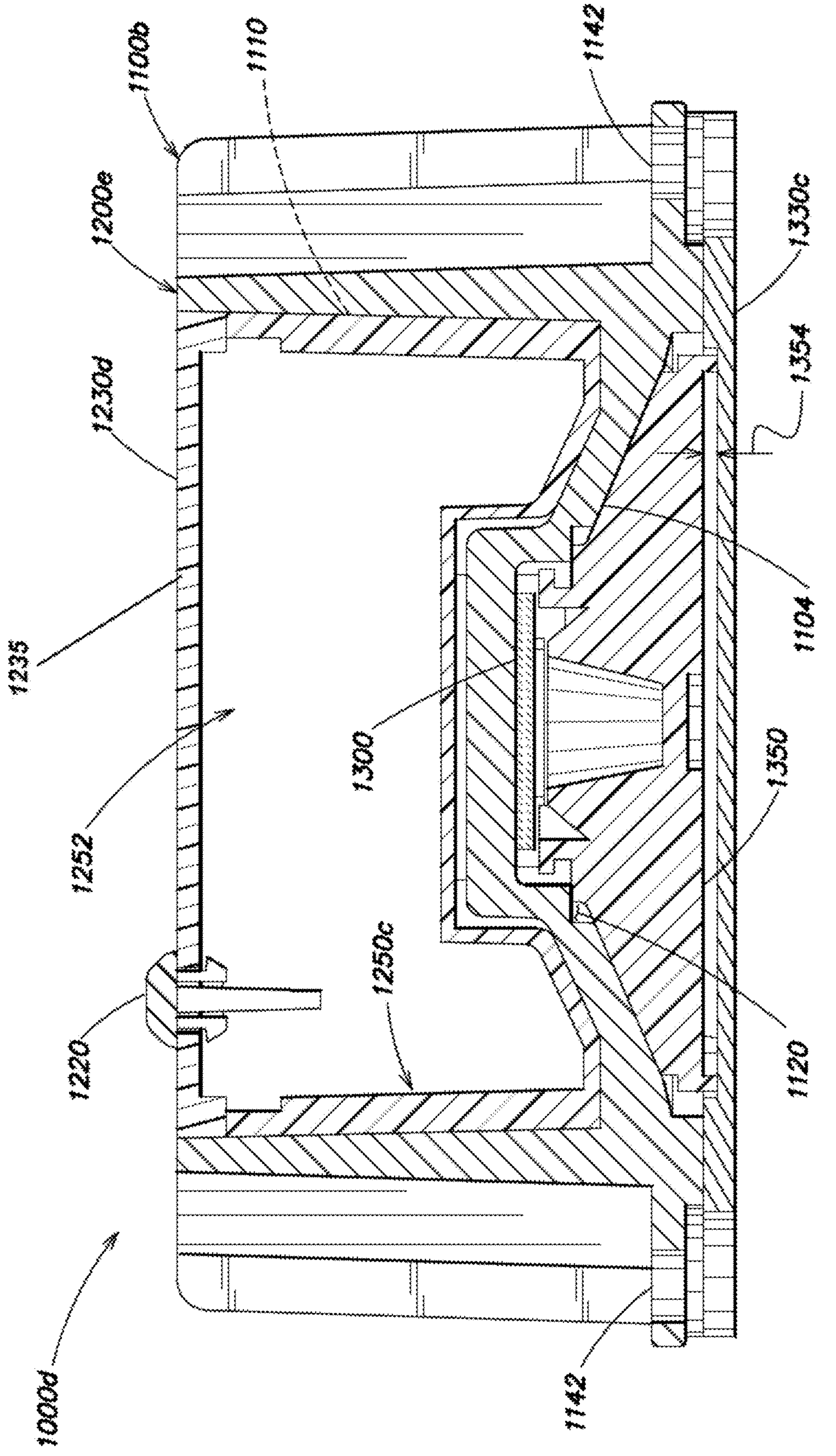
FIG. 15 shows a side view of another exemplary driver enclosure using a retaining ring with no central opening.

It should be appreciated, however, that in some implementations, the retaining ring 1330*b* may not include an opening 1336, but instead may be entirely solid. For such cases, the retaining ring 1330*b* may be formed of an optically transparent material that transmits light leaving the optical lens 1350 or directly from the light source 1300 if no optical lens 1350 is included. For example, FIG. 15 shows a cross-sectional view of a lighting module 1000*d* with a retaining ring 1330*c* that has no opening 1336 (also referred to as an "optic cover 1330*c*"). Instead, the retaining ring 1330*c* is entirely solid and fully encloses the second cavity 1120 and the optical lens 1350. As shown, the retaining ring 1330*c* may still form a gap 1354 with the optical lens 1350. In some implementations, the retaining ring 1330*b* may be further shaped to function as a secondary optic (e.g., the central portion of the retaining ring 1330*b* may be convex or concave in shape) that further redirects the light.

The flange 1334 may include a ledge 1338 so that the optical lens 1350 is recessed with respect to the retaining ring 1330*b*. The retaining ring 1330*b* may further include notches 1342 that align with and expose the openings 1142 of the heat sink 1100*b* when the retaining ring 1330*b* is coupled to the heat sink 1100*b*. The retaining ring 1330*b* may also include multiple male snap-fit connectors 1332 for insertion into the slots forming the female snap-fit receptacles 1136 in the heat sink 1100*b*. In some implementations, the male snap-fit connectors 1332 may be sufficiently compliant such that the retaining ring 1330*b* may be removed from the heat sink 1100*b* even if the male snap-fit connectors 1332 and/or the female snap-fit receptacles 1136 are not directly accessible. For example, a user may use a tool (e.g., a flat head screwdriver) to pry the retaining ring 1330*b* off the heat sink 1100*b* by pressing the tool against the flange 1334 of the retaining ring 1330*b* and/or the flange 1140 of the heat sink 1100*b*.

A Lighting Module with a Partially Enclosed Driver Enclosure

In some implementations, the lighting module may include a driver enclosure that does not fully enclose and/or encapsulate the driver. Said in another way, the driver enclosure may not provide a barrier that physically separates the driver from other electrically conducting materials in the lighting module, such as the heat sink. Instead, the driver enclosure may suspend the driver above a portion of the heat sink to prevent the driver from physically contacting the heat sink.

Figure 16A:
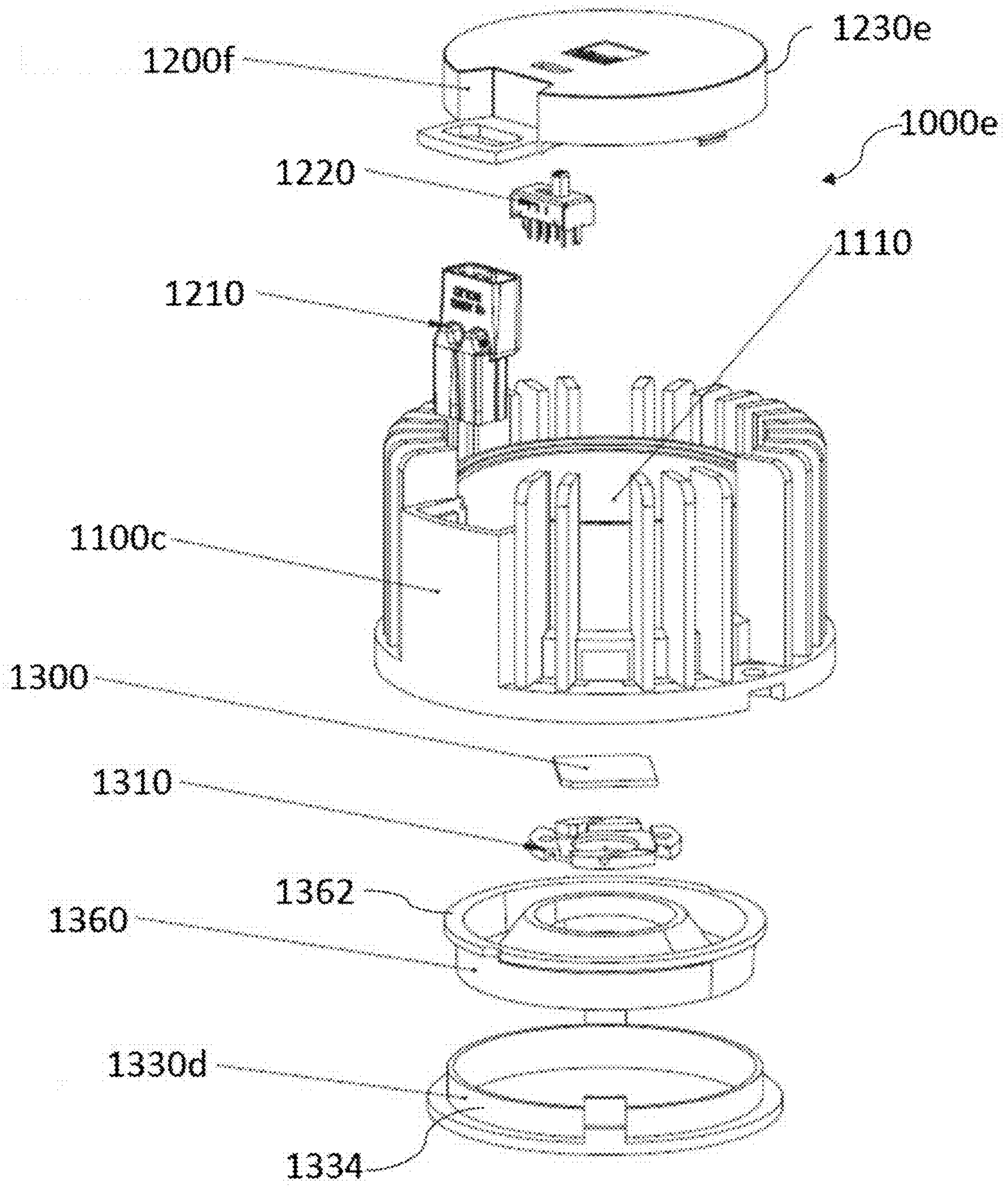
FIG. 16A shows an exploded view of another exemplary lighting module.
Figure 16B:
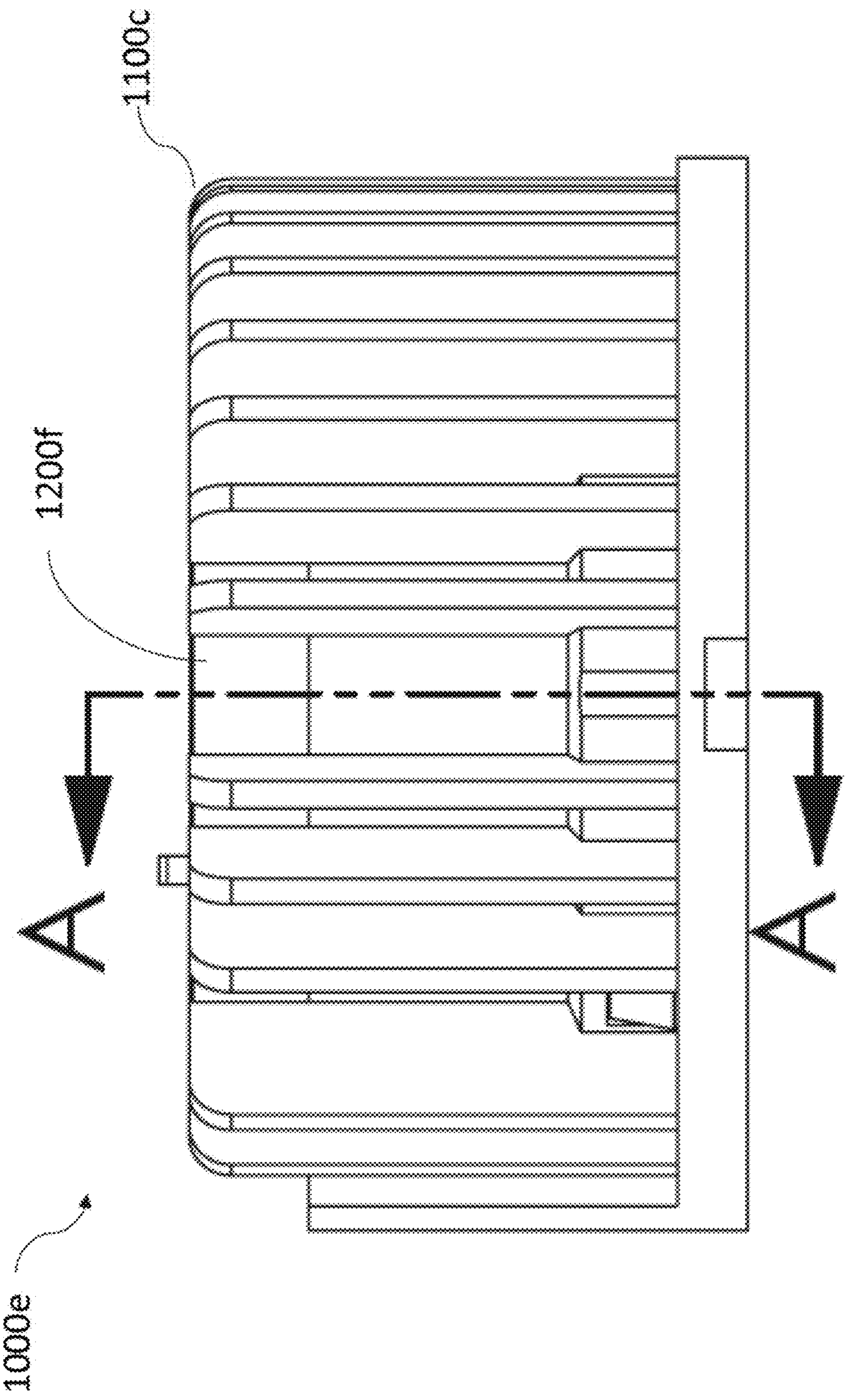
FIG. 16B shows a front view of the lighting module of FIG. 16A.
Figure 16C:
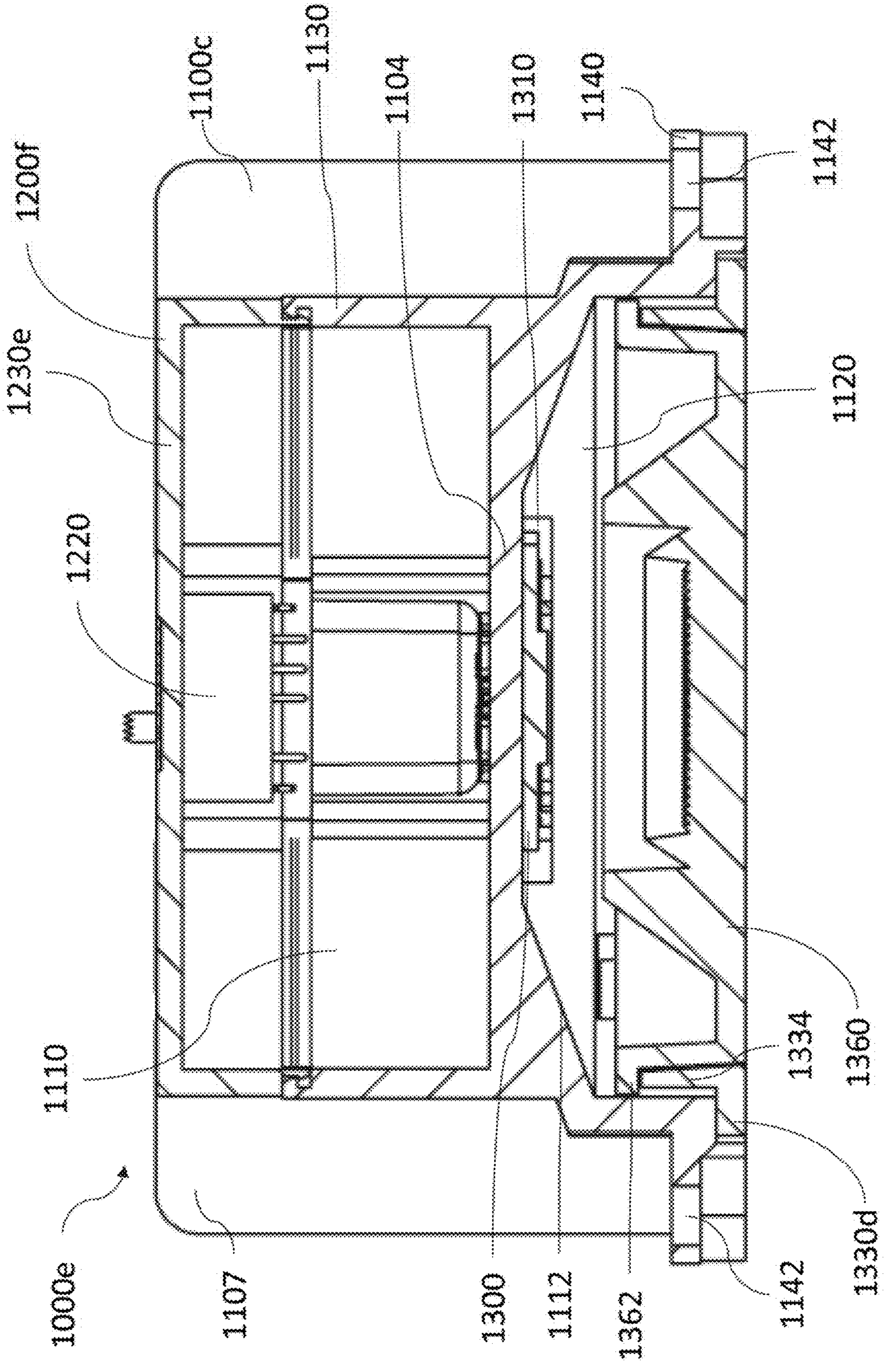
FIG. 16C shows a cross-sectional view of the lighting module of FIG. 16A.

For example, FIGS. 16A-16C show several views of an exemplary lighting module 1000*e*. As shown, the lighting module 1000*e* may include a module housing 1100*c* (also referred to as a heat sink 1100*c*) with a sidewall 1130 and a partition 1104 that defines two cavities: a first cavity 1110 to contain a driver (not shown) and a second cavity 1120 to contain a light source 1300.

The lighting module 1000*e* may include a driver enclosure 1200*f* having a driver cover 1230*e* shaped as a cup to contain the driver. As shown, the driver cover 1230*e* may have an open end that couples to a top edge of the module housing 1100*c* to enclose the first cavity 1110. The driver, which is disposed within the driver cover 1230*e*, may thus be suspended above the partition 1104 of the module housing 1100*c*. In some implementations, a connector 1210 may also be integrated into the lighting module 1000*e* and, in particular, supported by the driver cover 1230*e*. In some implementations, the connector 1210 may be substantially disposed in the first cavity 1110 such that only the receptacle of the connector 1210 is exposed to the surroundings. Said in another way, the connector 1210 may not protrude outwards from the driver cover 1230*e*. The connector 1210 may be electrically coupled to the driver to supply electrical power to the driver. In some implementations, the connector 1210 may be a standardized connector that couples to a corresponding connector originating from a building electrical supply system or another lighting module.

The lighting module 1000*e* may further include a light source holder 1310 disposed within the second cavity 1120 to mount and/or position the light source 1300 to the module housing 1100*c* for assembly. In some implementations, the lighting module 1000*e* may also include an optic 1360 to redirect the light emitted by the light source 1300 and an optic holder 1330*d* to retain the optic 1360 in the second cavity 1120 and/or to enclose the second cavity 1120. It should be appreciated the various features, structures, and materials described with respect to the lighting modules 1000*a*-1000*d* describes above may also be applied to the lighting module 1000*e* shown in FIGS. 16A-16C.

In some implementations, the lighting module 1000*e* may further include a switch 1220 disposed, in part, in the first cavity 1110 and supported by the driver cover 1230*e*. The switch 1220 may be electrically coupled to the driver and used to adjust the electric current supplied to the light source 1300, thus changing the power output and/or the lumen output of the light source 1300. The switch 1220 may also be used to adjust another property of the emitted light, such as the color temperature. In this manner, the power level of the lighting module 1000*e* and/or the spectral characteristics of the emitted light may be field changeable. In some implementations, the switch 1220 may allow a user to adjust the power output level of the light source 1300 without use of a tool. For example, the switch 1220 shown in FIGS. 19A and 19C is a toggle switch that may protrude through the back cover 1230*e*, which allows a user to flip between two or more current level settings (e.g., a three position slide switch).

In some implementations, the lighting module 1000*e* may allow a user to adjust current level settings using a remote device (e.g., a smart phone, a tablet, a computer, a remote) communicatively coupled to the lighting module 1000*e*. For such cases, the lighting module 1000*e* may not include the switch 1220, but instead may rely upon the remote device to adjust the power levels of the light source 1300.

As before, the driver of the lighting module 1000*e* may receive a direct current (DC) and/or an alternating current (AC) as the electrical input. By supporting both DC and AC inputs, the lighting module 1000*e* may be deployed in both indoor and outdoor settings. For example, indoor lighting fixtures (e.g., a downlight, a recessed light, a cylinder light) typically use an AC connection and outdoor lighting fixtures (e.g., a landscape light, a flood light, an in-ground light) typically use a DC connection. The driver of the lighting module 1000*e* may also be configured to use DC and/or AC currents to supply power to the light source 1300, allowing the lighting module 1000*e* to be used in said various settings without modification. In some implementations, the driver may be compatible with a range of operating voltages including, but not limited to low operating voltages (e.g., voltages less than 50V) and high operating voltages (e.g., voltages greater than 50V). In particular, the driver may be configured to provide DC current at voltages ranging between about 0V to about 10V for some lighting applications.

FIGS. 17A-17D show several views of the module housing 1100*c* in the lighting module 1000*e*. As shown, the module housing 1100*c* may include a sidewall 1130 and a partition 1104 that together define the first cavity 1110 and the second cavity 1120. The module housing 1100*c* may also include a plurality of fins 1107 disposed along the sidewall 1130 to convectively dissipate heat to the surrounding air, particularly when the lighting module 1000*e* is installed into a large ceiling or wall space or a large enclosure. The partition 1104 may include one or more openings 1106 to mount the light source holder 1310 to the module housing 1100*c*. The module housing 1100*c* may further include one or more female snap-fit receptacles 1136 disposed along the periphery of the second cavity 1120 for attachment with the optic holder 1330*d*.

Figure 17A:
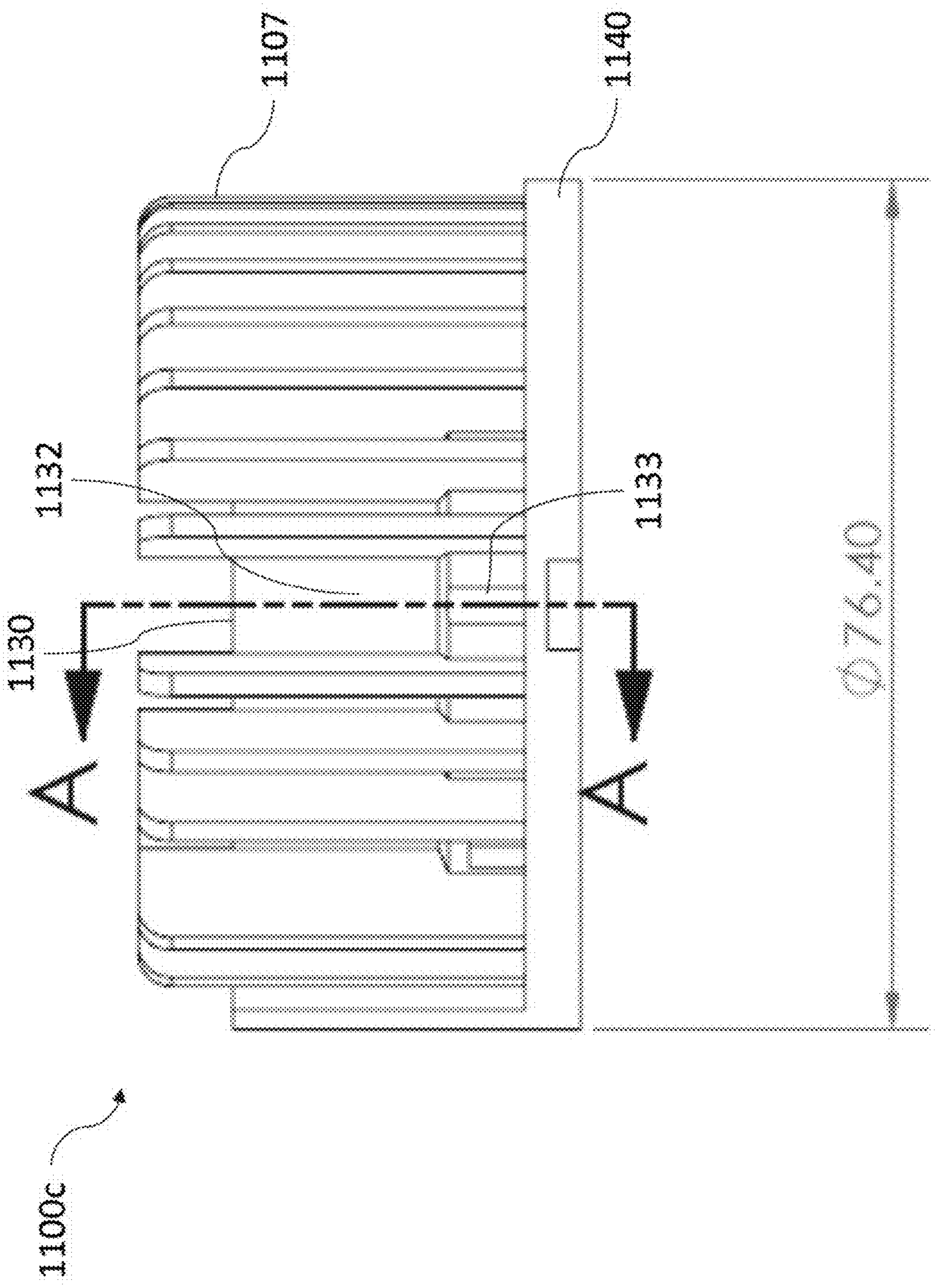
FIG. 17A shows a front view of an exemplary heat sink in the lighting module of FIG. 16A.
Figure 17B:
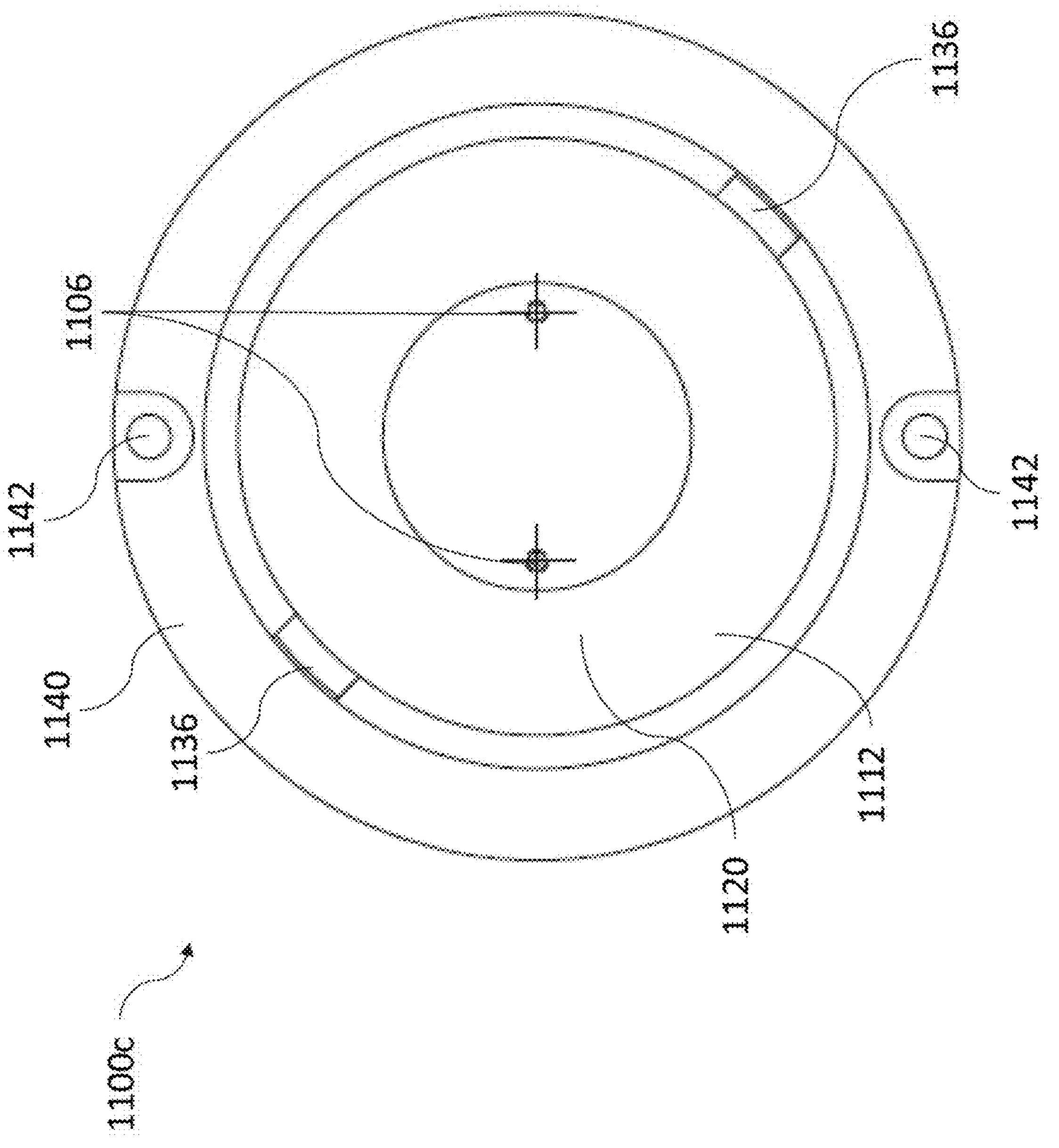
FIG. 17B shows a bottom view of the heat sink of FIG. 17A.
Figure 17C:
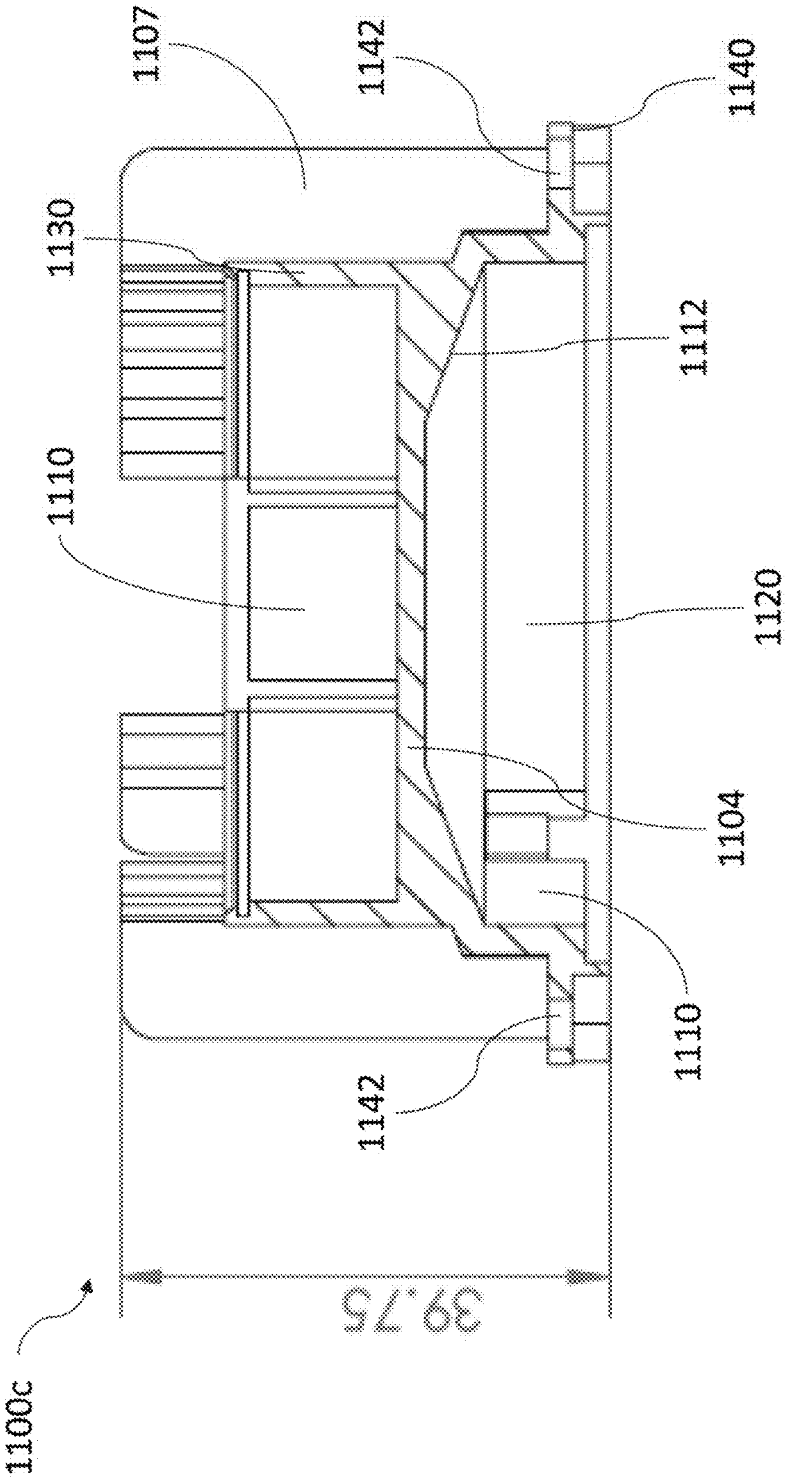
FIG. 17C shows a cross-sectional left-side view of the heat sink of FIG. 17A.
Figure 17D:
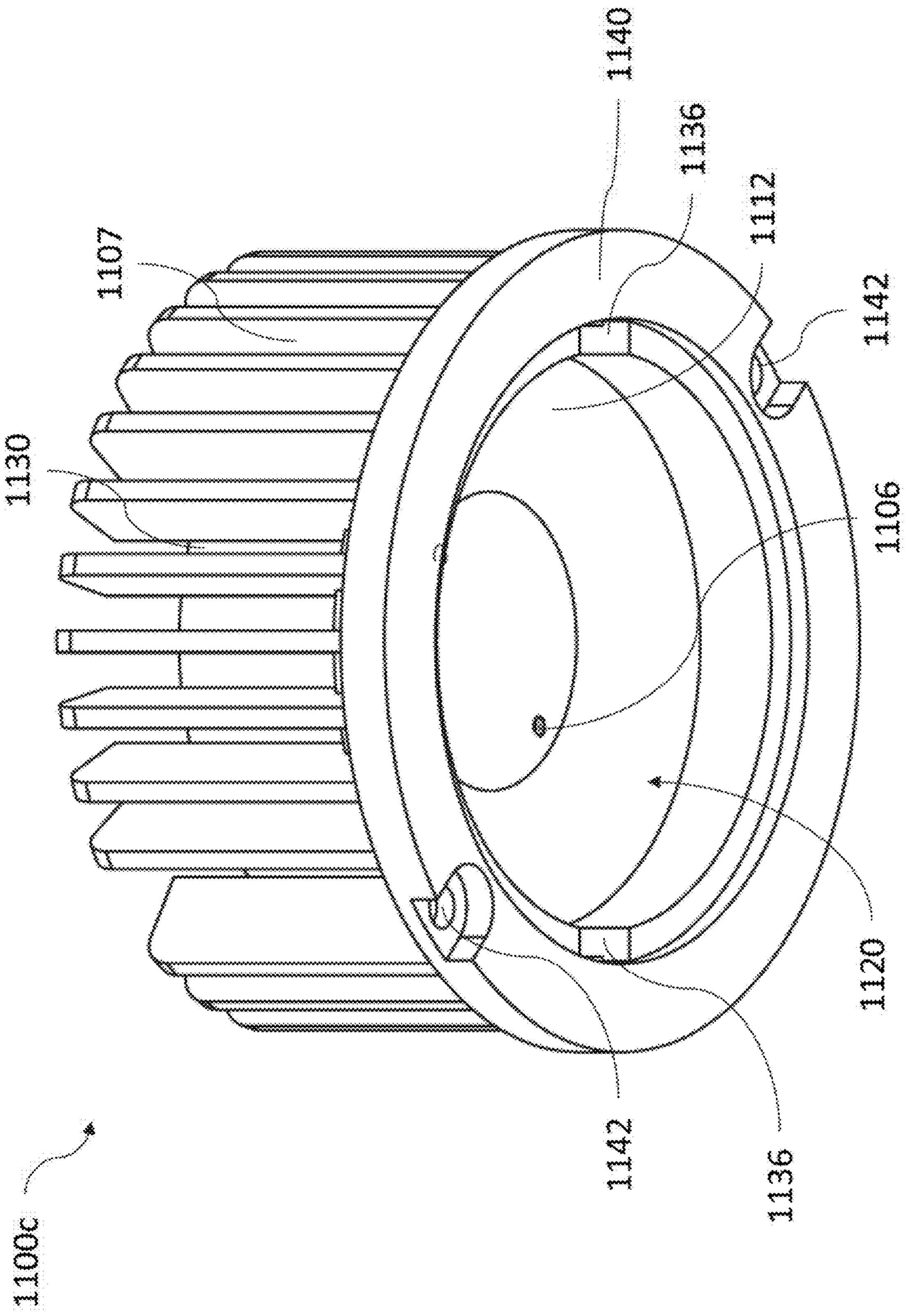
FIG. 17D shows a bottom perspective view of the heat sink of FIG. 17A.

In some implementations, the module housing 1100*c* may include a flange 1140 disposed at one end of the sidewall 1130 adjoining the second cavity 1120. The flange 1140 may provide an interface to mount a trim (not shown) to the module housing 1100*c* and/or to mount the lighting module 1000*e* to an enclosure. For instance, FIG. 17B shows the flange 1140 may include opening(s) 1142, which may align with corresponding opening(s) in an enclosure such that a fastener (not shown) may be inserted through the opening 1142 and the opening of the enclosure to couple the lighting module 1000*e* to the enclosure. In some implementations, the flange 1140 may include a pair of openings 1142 disposed diametrically opposite with respect to each other.

In some implementations, the lighting module 1000*e* may be installed into an enclosure having posts and/or tabs with opening(s) disposed within a cavity of the enclosure. To ensure the lighting module 1000*e* and, in particular, the module housing 1100*c* has sufficient clearance for insertion into the cavity of the enclosure, the sidewall 1130 may include keyed features 1132 disposed proximate to the openings 1142. In this example, the keyed features 1132 may be formed as a gap between the fins 1107 as opposed to changing the shape of the sidewall 1130 as described above.

The light source 1300 may be disposed in the second cavity 1120 and oriented to emit light out of the second cavity 1120 of the module housing 1100. In some implementations, the light source 1300 may be a single chip on board (COB) light source disposed onto a center portion of the partition 1104 adjoining the second cavity 1120. The light source 1300 may be secured to the module housing 1100 via a light source holder 1310, which will be described in more detail below in relation to the lighting module 1000*f*. For example, the COB light source may be placed into a recess on the light source holder 1310 that prevents lateral movement of the light source 1300. In another example, the light source holder 1310 may include at least one snap fit connector to secure couple the light source 1300. The light source holder 1310 may then be coupled to the module housing 1100 using various coupling mechanisms including, but not limited to a fastener, a twist and lock connector, and a snap fit connector.

The light source holder 1310 may thus be used to improve ease of handling and alignment of the light source 1300 during assembly. Additionally, the light source holder 1310 may be removable, allowing replacement or swapping of the light source 1300 after the lighting module 1000*e* is installed. However, it should be appreciated that the light source 1300 may also be directly coupled to the module housing 1100 using various coupling mechanisms including, but not limited to an adhesive, a fastener, and a snap fit connector integrated into the module housing 1100 and/or light source 1300.

The lighting module 1000*e* may also include an optic 1360 to modify various aspects of the light output of the light source 1300 including, but not limited to the power output, angular distribution, spatial distribution, and spectral distribution of light emitted into an environment. The manner in which the optic 1360 modifies light from the light source 1300 may depend, in part, on the geometry and the material used to form the optic 1360. Additionally, the optic 1360 may include a coating to further modify the light output form the light source 1300. For example, the optic 1360 may include a laminated, diffuse optical structure (e.g., a Lambertian film). The diffuse optical structure may disperse light such that the internal components of the lighting module 1000*e* (e.g., the light source 1300, the light source holder 1310) are not readily observable externally (e.g., when a user is looking through the optic 1360 and into the second cavity 1120) or within the emitted light beam (e.g., the output light has a substantially uniform spatial and angular distribution).

The optic 1360 may be disposed in the second cavity 1120 and aligned to the light source 1300. In some implementations, the optic 1360 may have an integrated coupling mechanism (e.g., a snap fit connector) to directly couple the optic 1360 to the module housing 1100. In some implementations, the optic 1360 may be secured to the module housing 1100 using an optic holder 1330*d* (also referred to as a retaining ring 1330*d*). The optic holder 1330*d* may be shaped to allow the optic 1360 to fit within a recess or opening. For example, the optic 1360 may be inserted through an opening of the optic holder 1330*d* such that a flange 1362 on the optic 1360 abuts a ridge 1334 of the optic holder 1330*d* as shown in FIGS. 16A and 16C. The optic holder 1330*d* may include a coupling mechanism to couple the optic holder 1330*d* and optic 1360 to the module housing 1100 including, but not limited to a snap fit connector.

In some implementations, the module housing 1100*c* and, in particular, the partition 1104 may include a tapered wall 1112 oriented at an oblique angle with respect to the center portion of the partition 1104 (or the surface of the partition 1104 abutting the first cavity 1110) and the side wall 1130 of the second cavity 1120. The angle of the tapered wall 1112 may be chosen to reflect light emitted by the light source 1300 along a preferred direction through the optic 1360. In some implementations, the tapered wall 1112, the back wall, and/or the sidewall of the second cavity 1120 may have a coating to increase the reflection of light emitted by the light source 1300. For example, the coating may be a diffuse reflective coating (e.g., white paint) or a specular reflective coating (e.g., a polished metallic coating).

Figure 18:
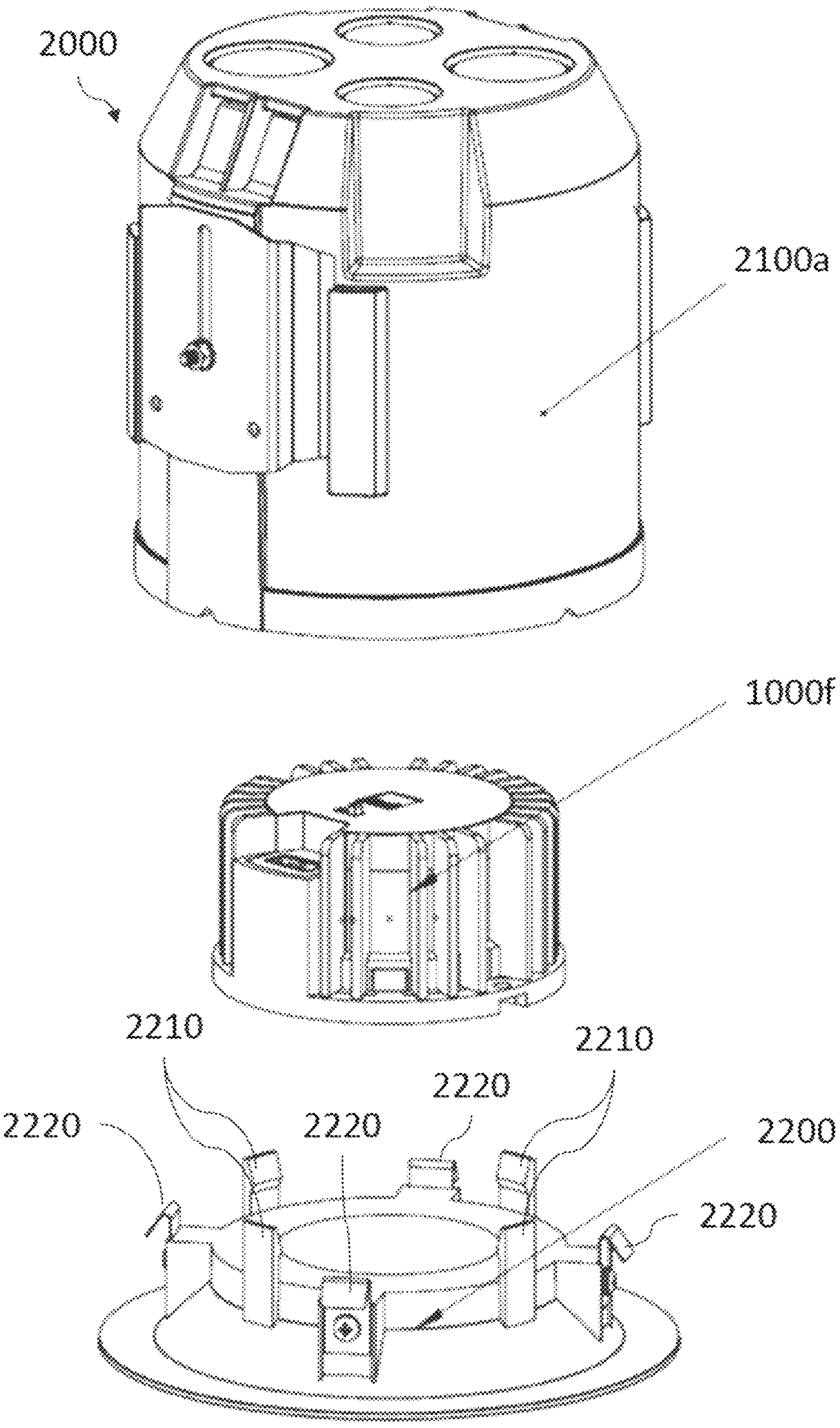
FIG. 18 shows an exploded view of an exemplary downlight system using the lighting module of FIG. 16A.

As described above, the lighting modules described herein may be installed in a variety of lighting fixtures. In one example, FIG. 18 shows the lighting module 1000*e* installed in an exemplary downlight fixture 2000. As shown, the downlight 2000 may include a luminaire housing 2100*a* (also referred to as an enclosure 2100*a*). The luminaire housing 2100*a* may be disposed inside an opening of a ceiling or a wall space in a building. The luminaire housing 2100*a* may further define a cavity to at least partially contain or, in some instances, fully contain the lighting module 1000*e*.

In some implementations, the luminaire housing 2100*a* may be used as an electrical junction box to contain one or more electrical wires and/or electrical wire splices. For example, the luminaire housing 2100*a* may include at least one knockout through which a wire from a building electrical supply system or another downlight (e.g., a second downlight fixture 2000) may be inserted to supply electrical power to the lighting module 1000*e*.

In some implementations, the luminaire housing 2100*a* may be mounted to a support structure of a building (e.g., a T-bar, a joist, a stud) via a mounting bracket or a set of adjustable hanger bars. In some implementations, the luminaire housing 2100*a* may be coupled to a substantially vertical surface and oriented to provide light onto a horizontal surface (e.g., a step light, a wall sconce). For example, a mounting bracket may be disposed on the side of the luminaire housing 2100*a* for connection to a vertical wall.

The luminaire housing 2100*a* may have various dimensions. For example, the cavity of the luminaire housing 2100*a* may have a diameter ranging from about 1 inch to about 8 inches. In another example, the cavity of the luminaire housing 2100*a* may have a volume ranging between about 15 cubic inches and about 50 cubic inches.

The downlight 2000 may also include a trim 2200 to cover the opening in the wall or ceiling of the building and/or the cavity of the luminaire housing 2100*a*. In some implementations, the trim 2200 may include a set of snap fit connectors 2210 to couple to the lighting module 1000*e* (e.g., via a ridge on the flange 1140 of the module housing 1100). The trim 2200 may be coupled to the luminaire housing 2100*a* using various coupling mechanisms including, but not limited to a torsion spring, a spring clip, a snap fit connector, and a fastener. For example, FIG. 18 shows the trim 2200 may include a plurality of spring clips 2220 to couple to the interior sidewall of the cavity of the luminaire housing 2100*a*. The trim 2200 may have various shapes (e.g., a square, a circle, a polygon). The trim 2200 may also be removable after assembly for greater ease of replacement and customization.

Figure 19:
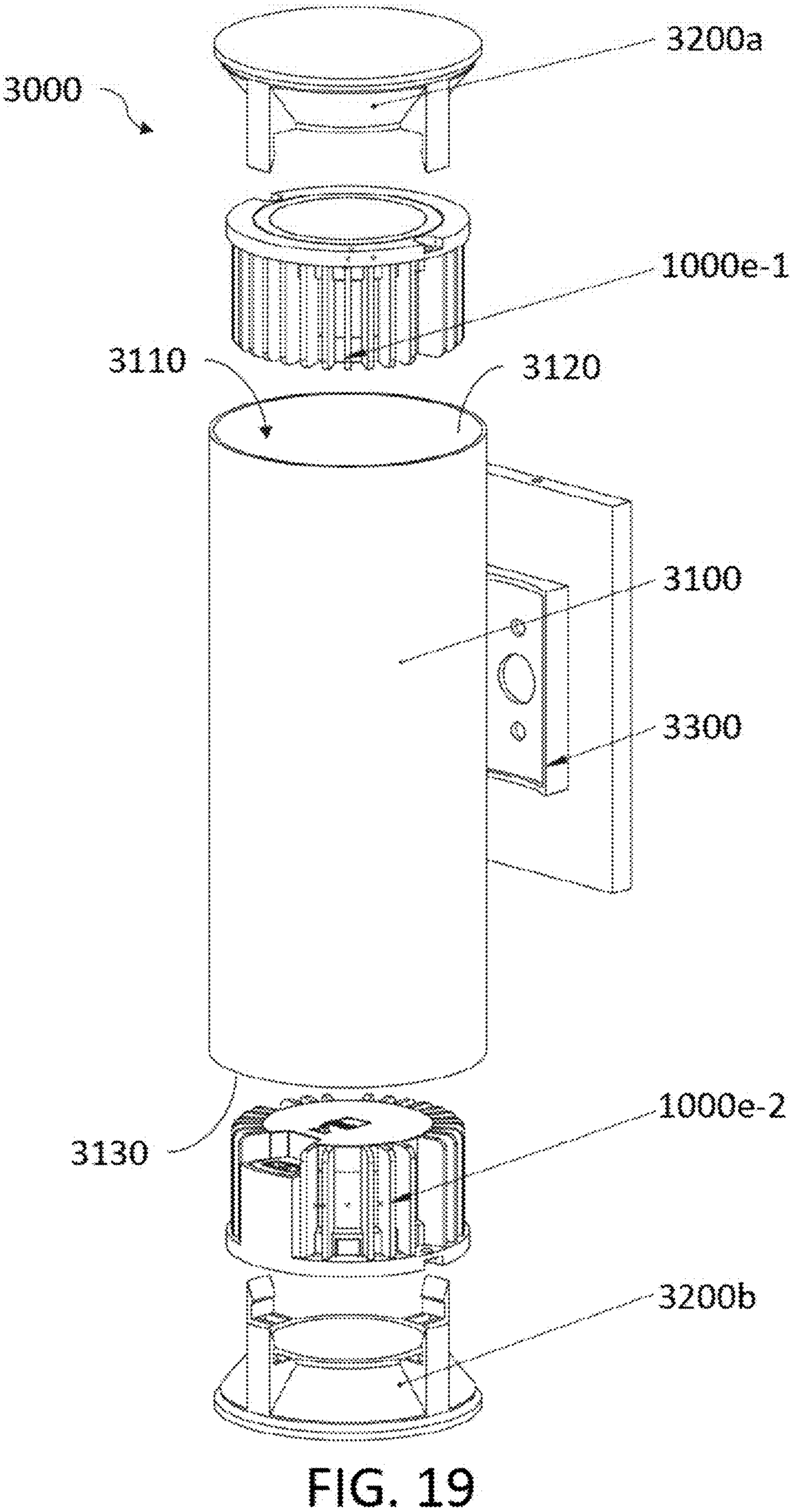
FIG. 19 shows an exploded view of an exemplary cylinder light system using the lighting module of FIG. 16A.

In another example, FIG. 19 shows an exploded view of an exemplary cylinder light 3000 that incorporates the lighting module 1000*e*. As shown, the cylinder light 3000 may include a housing 3100. The housing 3100 may have a cylindrical shape defining a cavity 3110 (e.g., a barrel) that extends from a first end 3120 to a second end 3130 of the cavity 3110 opposite to the first end 3120. The housing 3100 may have a length at least 3 inches long. The cavity 3110 may contain a lighting module 1000*e*-1 inserted through the first end 3120 of the cavity 3110 and a lighting module 1000*e*-2 inserted through the second end 3130 of the cavity 3110. The cylinder light 3000 may further include trims 3200*a* and 3200*b* to cover the first and second ends 3120 and 3130, respectively. In some implementations, the trims 3200*a* and 3200*b* may be secured using any of the coupling mechanisms described with respect the trim 2200. For example, FIG. 19 shows the trims 3200*a* and 3200*b* may couple only to the respective lighting modules 1000*e*-1 and 1000*e*-2 via a twist and lock connector.

The cylinder light 3000 may thus emit light along two directions (e.g., a downlight and an uplight). In some implementations, the light output (e.g., intensity, angular distribution, spatial distribution, spectral distribution) from the lighting modules 1000*e*-1 and 1000*e*-2 may be substantially similar. For example, the lighting modules 1000*e*-1 and 1000*e*-2 may both emit indirect, ambient light to light an interior space. In some implementations, however, the light output from the lighting modules 1000*e*-1 and 1000*e*-2 may be substantially different. For example, the lighting module 1000*e*-1 may emit indirect, ambient light (e.g., an uplight) and the lighting module 1000*e*-2 may emit direct, focused light (e.g., a downlight). Although the cylinder light 3000 is shown in FIG. 19 as having two lighting modules 1000*e*-1 and 1000*e*-2, it should be appreciated that in some implementations, the cylinder light 3000 may have only a single lighting module 1000*e* (e.g., a downlight or an uplight).

The cylinder light 3000 may be mounted in various configurations including, but not limited to a surface mount, a wall mount, and a pendant mount. For example, FIG. 19 shows the cylinder light 3000 mounted to a wall using a mounting bracket 3300 attached to the side of the housing 3100 to emit light in both a downward and upward direction, thus functioning as a wall sconce. Electrical power may be supplied to the cylinder light 3000 from an electrical junction box (not shown) or a wall box (not shown). For example, the mounting bracket 3300 may include an opening through which one or more wires may be routed to supply electrical power to the lighting modules 1000*e*-1 and 1000*e*-2.

It should be appreciated that the downlight fixture 2000 and the cylinder light 3000 represent two exemplary types of lighting fixtures that may incorporate the lighting module 1000*e*. Other types of lighting fixtures using various enclosures to house the lighting module 1000*e* may also be used with the lighting module 1000*e* including, but not limited to electrical junction boxes, a recessed lighting fixture (e.g., a "can" housing of a recessed lighting fixture), a wall sconce lighting fixture, under cabinet lighting, a surface mount lighting fixture, a pendant lighting fixture, a floodlight fixture, an outdoor lighting fixture (e.g., a tree lighting fixture, a step lighting fixture, a ground or pathway lighting fixture, a garden lighting fixture, a landscape lighting fixture), and a security lighting fixture. It should also be appreciated that the lighting module 1000*e* may be installed into a space without a separate enclosure. For example, the lighting module 1000*e* may be coupled to trim having one or more spring clips and/or friction clips that directly attach to an interior ceiling plane or wall plane.

A Lighting Module with an External Connector and a Ground Connection

In some implementations, the lighting module may forego integrating an electrical connector in order to further reduce the overall size of the lighting module. Instead, the lighting module may utilize an external electrical connector coupled to the lighting module via one or more wires and/or cables protruding out of the lighting module. The lighting module may also utilize a driver enclosure that is not double insulated (i.e., the driver enclosure does not electrically isolate the driver from the other electrically conductive materials in the lighting module, such as a heat sink) in order to further reduce the dimensions of the driver enclosure, which, in turn, allows for a smaller lighting module.

FIGS. 20A-20H show several views of an exemplary lighting module 1000*f* coupled to a trim 1600. FIGS. 21A-21H show several additional views of the lighting module 1000*f*. As shown, the lighting module 1000*f* may include a heat sink 1100*d* defining a first cavity 1110 and a second cavity 1120. As before, a driver 1202 may be disposed in the first cavity 1110 and a light source 1300 may be disposed within the second cavity 1120.

A driver enclosure 1200*g* and, in particular, a driver cover 1230*f* may be disposed within the first cavity 1110 to at least partially contain a driver 1202. The driver enclosure 1200*g* may further include an electrically insulating film 1280 disposed on a surface of the partition 1104 adjoining the first cavity 1110. In this manner, the driver cover 1230*f* and the film 1280 may provide an electrically insulating barrier that substantially surrounds the driver 1202. As shown in FIGS. 20F, 20G, 21E, and 21F, the driver 1202 may be suspended above the partition 1104 and the insulating film 1280. Specifically, the driver 1202 may include a printed circuit board (PCB) that is supported by one or more ledges 1244 disposed within the driver cover 1230*f*. This may result in a gap 1204 being formed between the PCB of the driver 1202 and the partition 1104. In some implementations, the gap 1204 may be dimensioned to provide sufficient clearance for any circuit elements disposed on a bottom side of the PCB of the driver 1202.

In some implementations, one or more wires/cables 1205 may be routed through the driver enclosure 1200*g* and into the first cavity 1110 to at least supply electrical power to the driver 1202. In some implementations, the wires/cables 1205 may also provide a dimmer signal (e.g., a 0-10V signal) to adjust the brightness of the light emitted by the light source 1300. The exposed ends of the wires/cables 1205 may be coupled to a standardized electrical connector (not shown) to facilitate connection to an external power source (e.g., a DC or AC electrical power supply in a building). In some implementations, the lighting module 1000*f* may further include a selectable switch 1220 supported by the driver enclosure 1200*g* and electrically coupled to the driver 1202 to adjust one of a power level or spectral properties of the light emitted the light source.

In some implementations, a light source holder 1310 may be included to position and securely mount the light source 1300 to the heat sink 1100*d*. The lighting module 1000*f* may further include an optical element, such as a reflector 1322 or an optical lens 1350, disposed within the second cavity 1120 to redirect light along a preferred direction (e.g., a desired angular and/or spatial distribution) and/or to increase the light coupling efficiency of the lighting module 1000*f*. The lighting module 1000*f* may further include an optic cover 1330*e* that substantially encloses the second cavity 1120 and, in some instances, securely retains the reflector 1322 within the second cavity 1120.

Figure 21A:
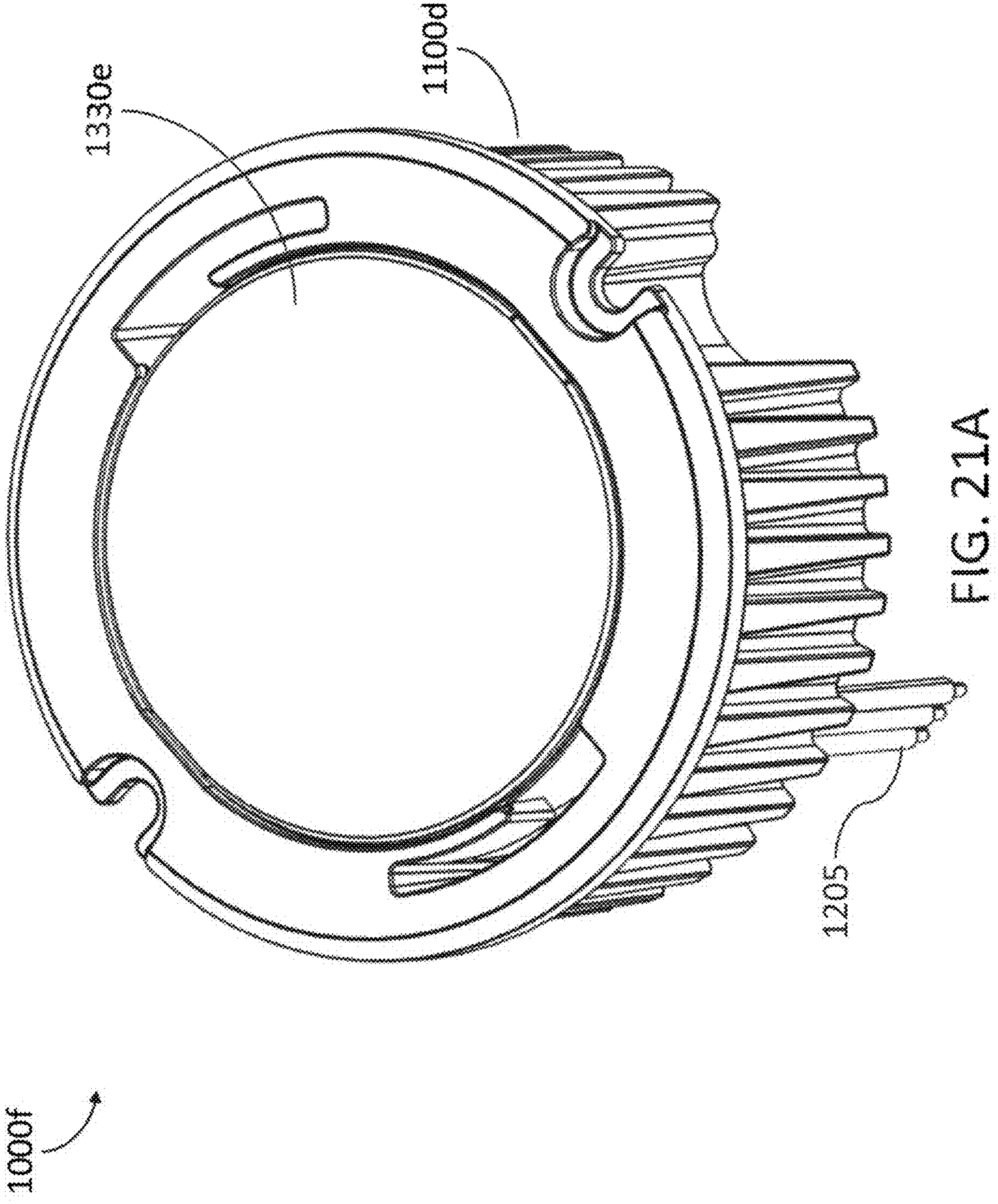
FIG. 21A shows a bottom perspective view of the lighting module of FIG. 20A with a receptacle forming part of a twist-and-lock connection.
Figure 21B:
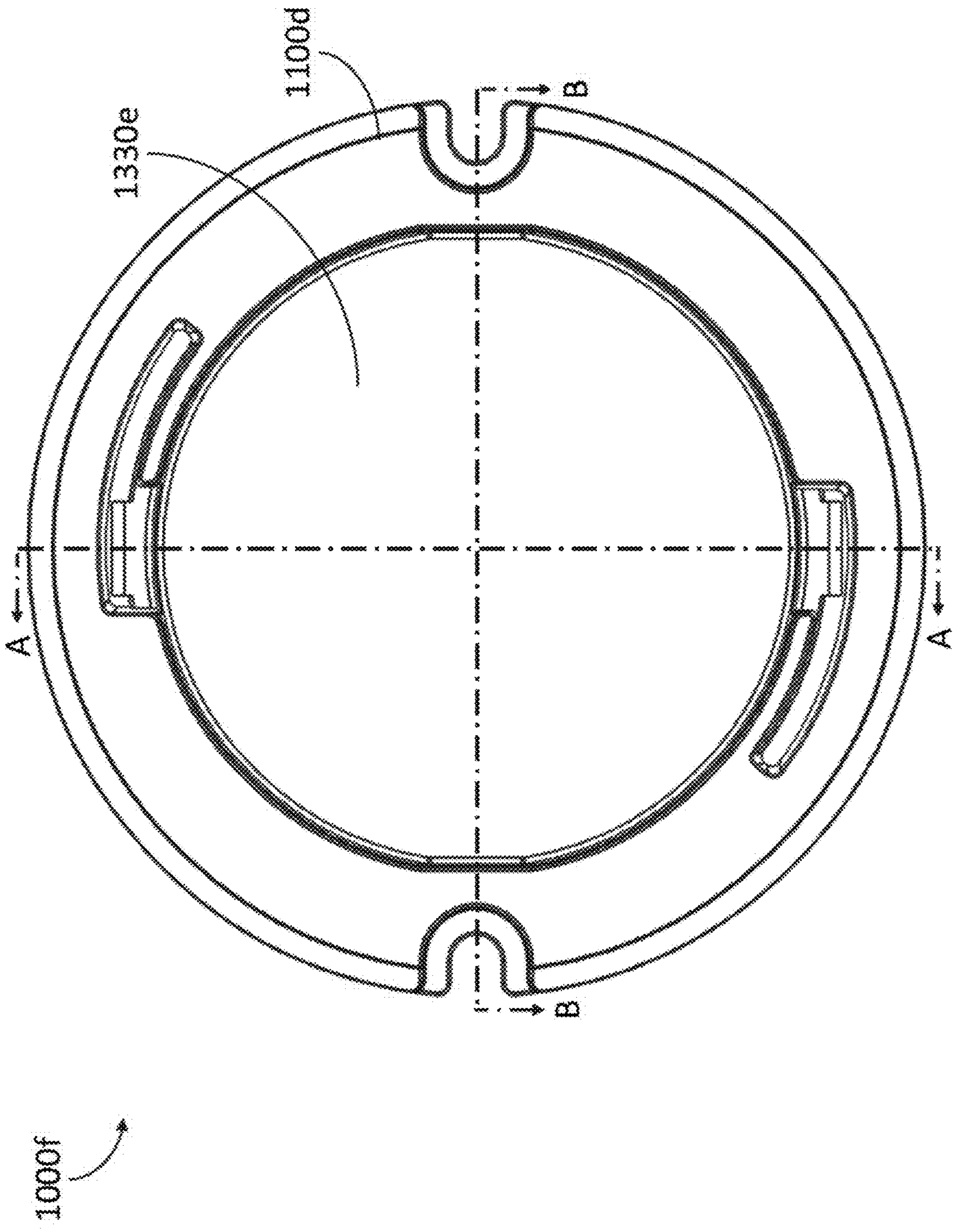
FIG. 21B shows a bottom view of the lighting module of FIG. 21A.
Figure 21C:
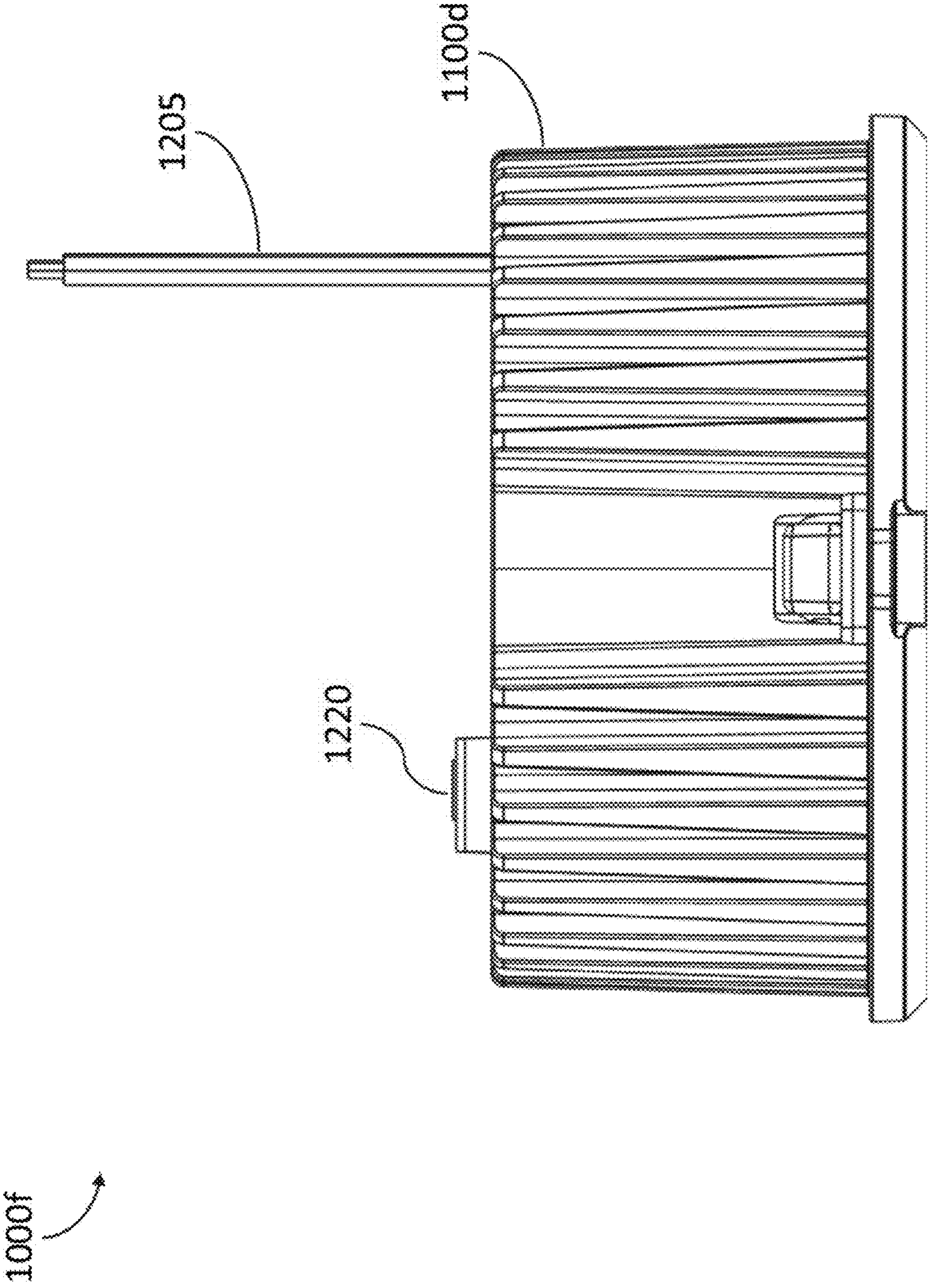
FIG. 21C shows a front view of the lighting module of FIG. 21A.
Figure 21D:
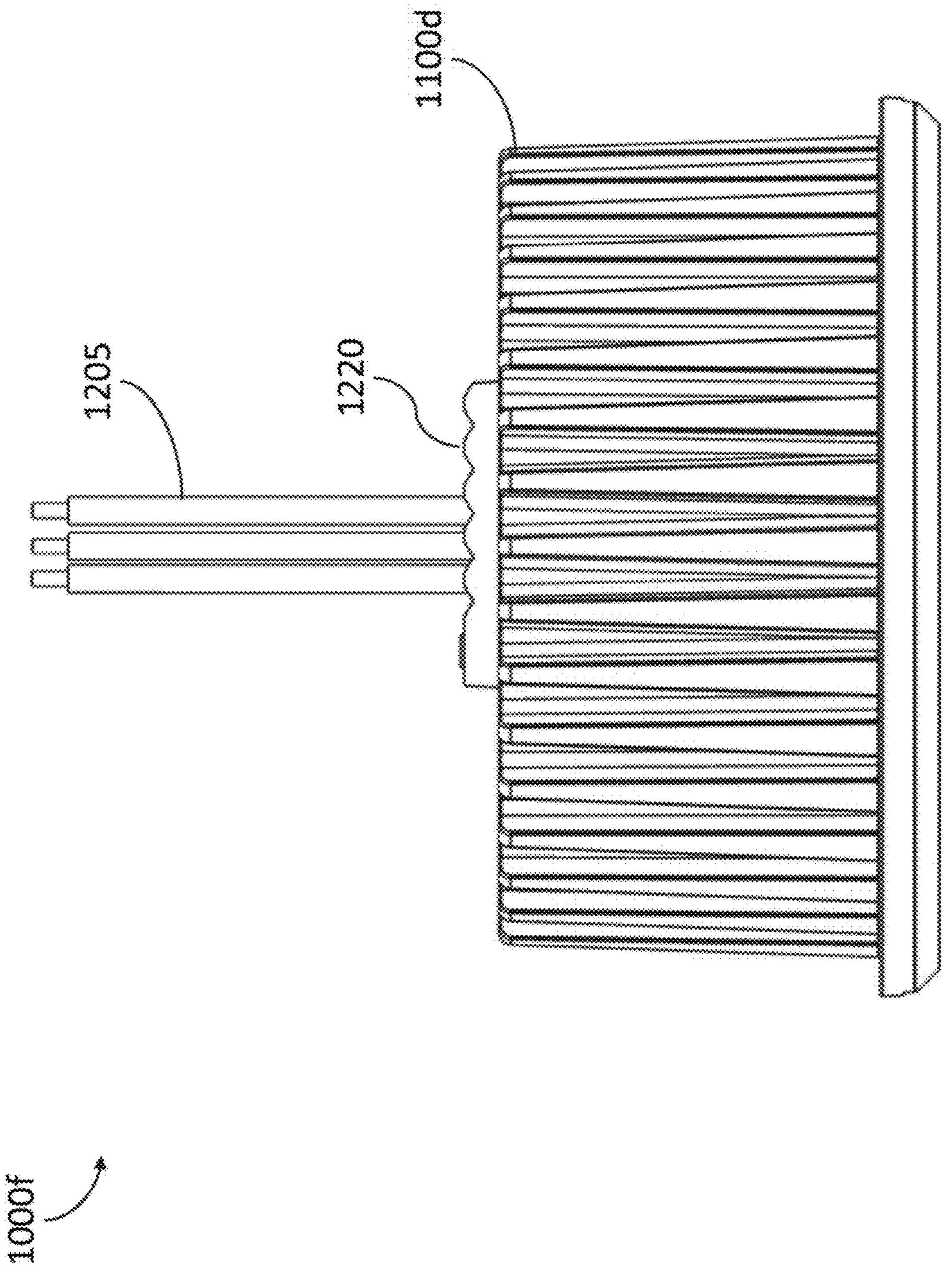
FIG. 21D shows a left-side view of the lighting module of FIG. 21A.
Figure 21E:
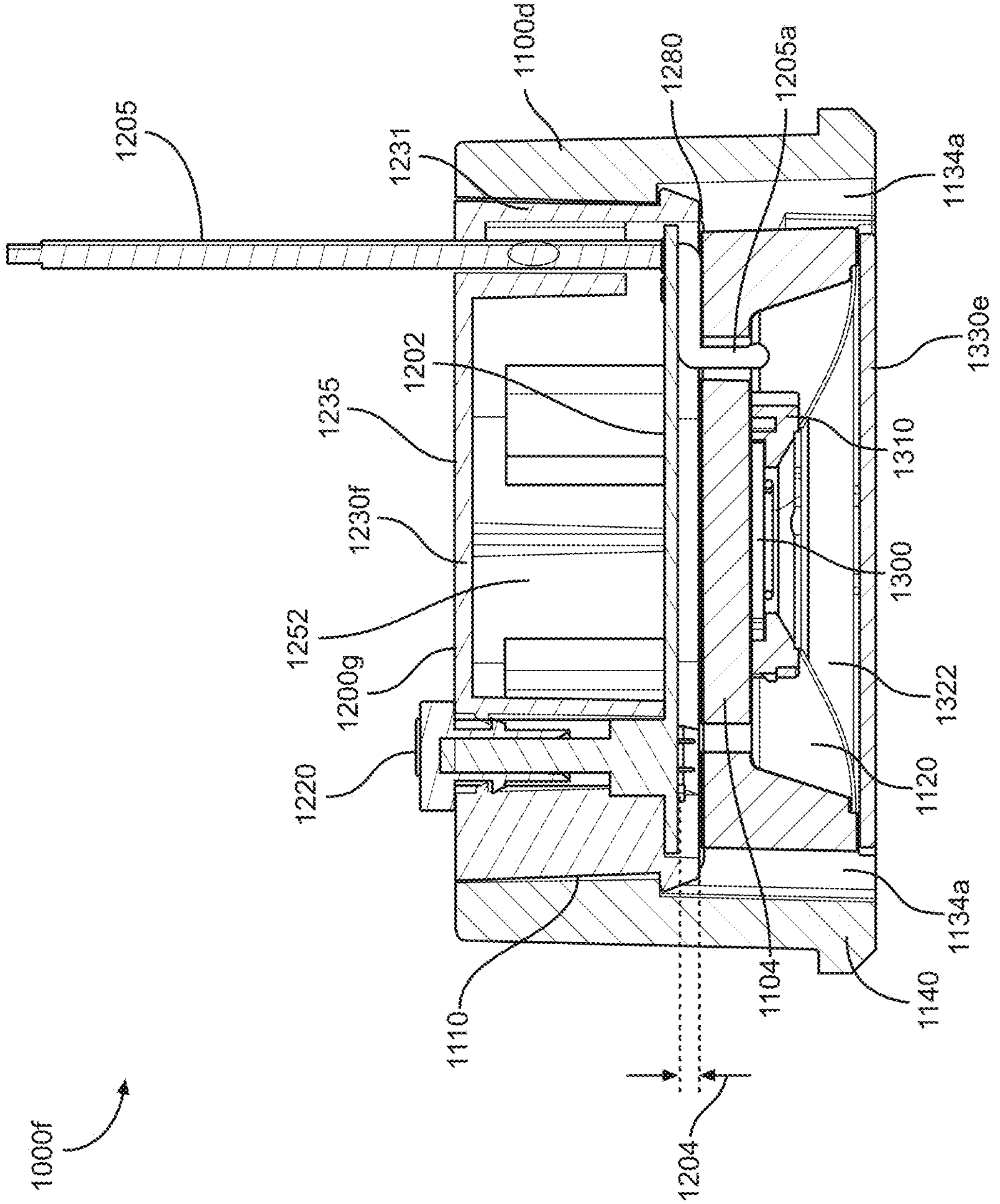
FIG. 21E shows a cross-sectional view of the lighting module corresponding to the plane A-A of FIG. 21C.

In some implementations, the heat sink 1100*d* may further include one or more receptacles 1134*a* disposed on a flange 1140 of the heat sink 1100*d* to facilitate attachment of the trim 1600 to the heat sink 1100*d*. In particular, the trim 1600 may include a connector 1620 having a connecting end 1624 that is configured to be inserted into the receptacle 1134*a*. The connection between the connecting end 1624 and the receptacle 1134*a* and the resultant interface between the heat sink 1100*d* and the trim 1600 may be tailored to enhance the dissipation of heat generated by the light source 1300 and/or the driver 1202 from the heat sink 1100*d* to the trim 1600. In some implementations, the receptacle 1134*a* and the connector 1620 may be tailored such that the trim 1600 is electrically grounded to the heat sink 1100*d*. In some implementations, the wires/cables 1205 may include a ground wire/cable 1205*a* to electrically ground the heat sink 1100*d* to an external ground. For example, FIG. 21E shows the ground wire/cable 1205*a* may be inserted through the partition 1104 and coupled to a surface adjoining the second cavity 1120. In this manner, the heat sink 1100*d*, the trim 1600, and/or the driver 1202 may be electrically grounded together to a common external ground.

It should be appreciated the various features, structures, and materials described with respect to the lighting modules 1000*a*-1000*e* describes above may also be applied to the lighting module 1000*f* shown in FIGS. 20A-21H.

As before, the lighting module 1000*f* may be shaped and/or dimensioned to fit within the confined space of a ceiling, wall, or floor and/or an enclosure. For example, the lighting module 1000*f* may have an overall width (e.g., the outer diameter w of the heat sink 1100*d*) that is less than about 3 inches. The overall height of the lighting module 1000*f* (e.g., the height h of the heat sink 1100*a*) may be less than about 1.6 inches. These dimensions may enable the lighting module 1000*f* to fit into a space having a height dimension less than or equal to about 2.25 inches and a width dimension of about 4 inches. In some implementations, the lighting module 1000*f* may fit into a space having a volume of at least about 18 cubic inches.

Figure 20F:
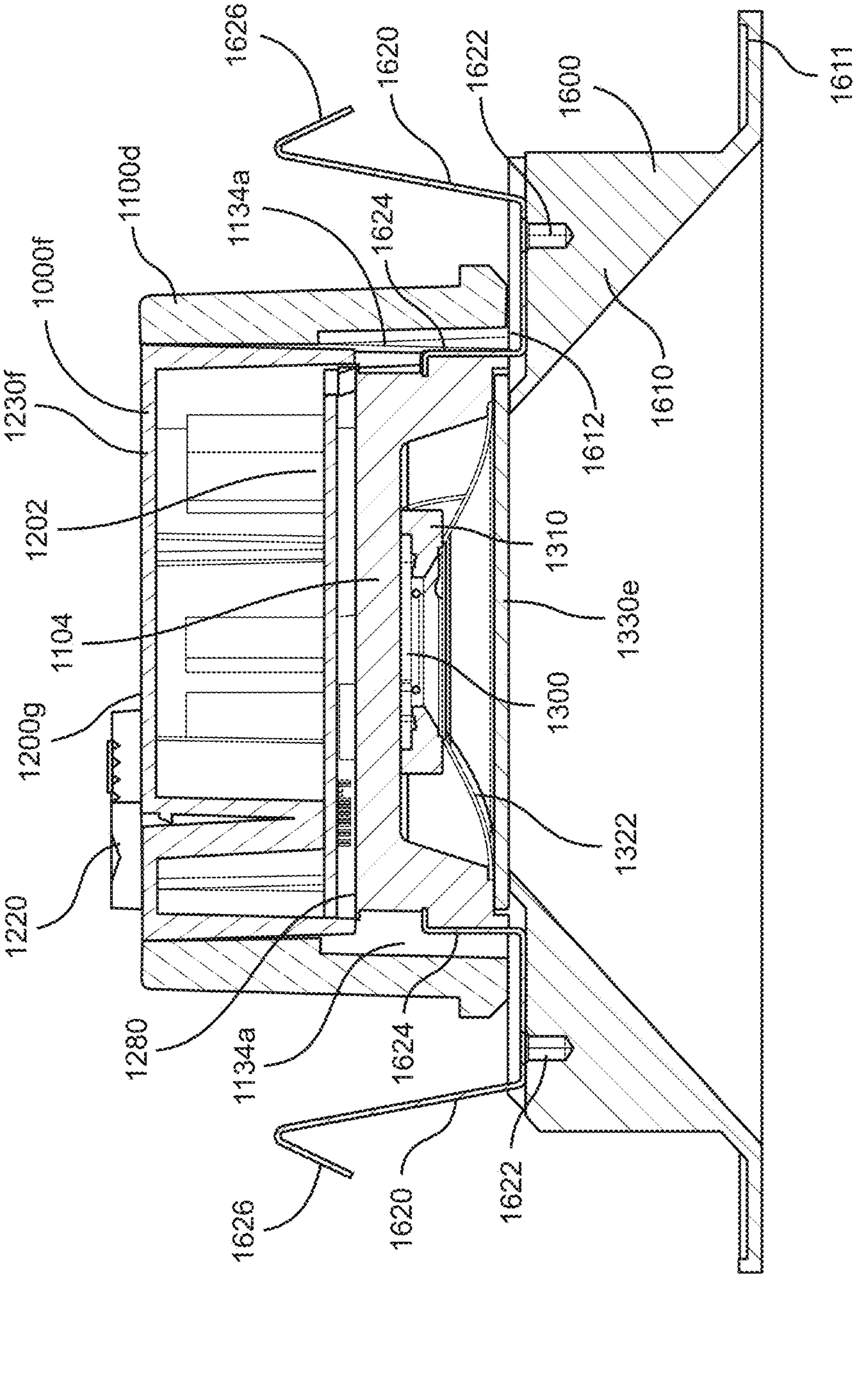
FIG. 20F shows a cross-sectional view of the lighting module and the trim corresponding to the plane A-A of FIG. 20C.
Figure 20G:
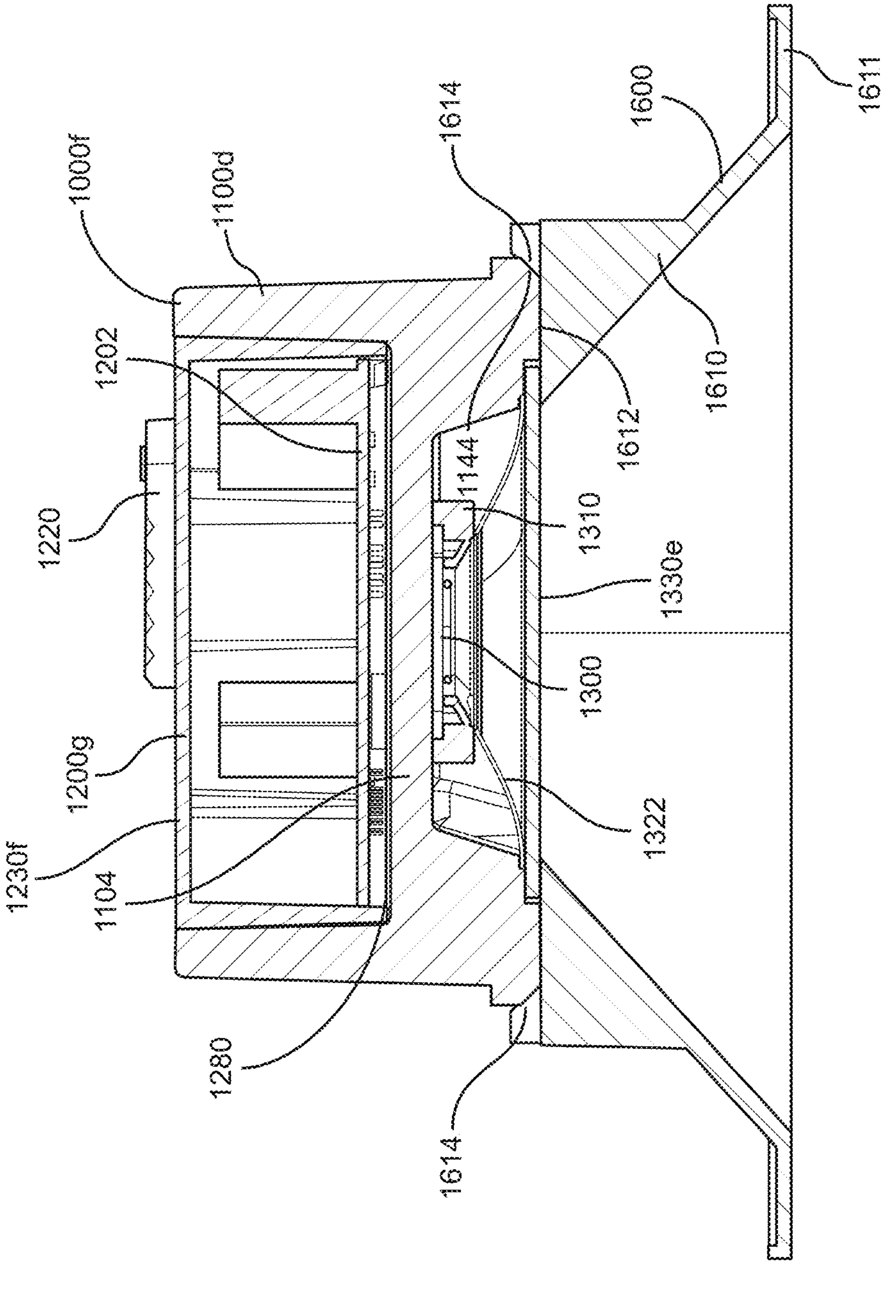
FIG. 20G shows a cross-sectional view of the lighting module and the trim corresponding to the plane B-B of FIG. 20C.

In some implementations, the lighting module 1000*f* may be inserted into an enclosure, such as a 3/0, 4/0 standard electrical junction box or a 4-10 inch recessed lighting fixture. For example, FIG. 20I shows an exemplary enclosure 2100*b* (e.g., a Carlon B720-SHK) that may house the lighting module 1000*f*. As shown, the enclosure 2100*b* may define a cavity 2110 with an open aperture having a width, w, of about 4 inches and a depth, h, of about 2.25 inches. The enclosure 2100*b* may further include posts 2120*a* and 2120*b* that have corresponding openings 2122*a* and 2122*b*. The heat sink 1100*d* may include openings 1142 that align with the openings 2122*a* and 2122*b* allowing a fastener to be inserted through the openings 1142 and 2122*a*/2122*b* thereby coupling the lighting module 1000*f* to the enclosure 2100*b*. As shown, the posts 2120*a* and 2120*b* may be arranged diametrically opposite of one another within the cavity 2110. In some implementations, the distance, $w_p$, between the posts 2120*a* and 2120*b* may be about 2.4 inches. Thus, the lighting module 1000*f* may shaped and/or dimensioned to fit between the posts 2120*a* and 2120*b* such that a substantial portion of heat sink 1100*d* is disposed within the cavity 2110.

It should be appreciated that the lighting module 1000*f* may also be installed directly into a ceiling, wall, or floor space. For example, the trim 1600 may include a spring clip to couple the trim 1600 and the lighting module 1000*f* directly to a ceiling or wall plane.

Figure 21F:
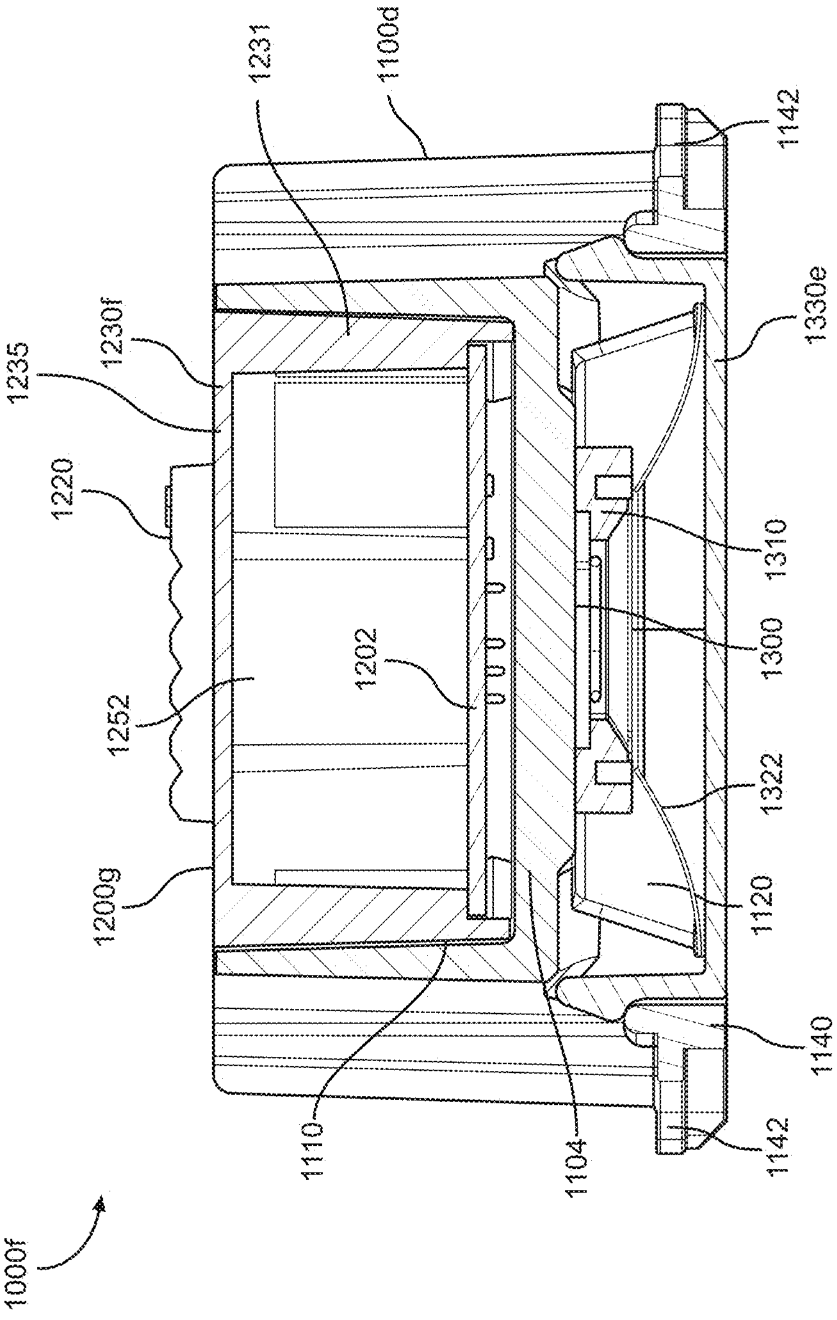
FIG. 21F shows a cross-sectional view of the lighting module corresponding to the plane B-B of FIG. 21C.

FIGS. 22A-22F show several views of the driver cover 1230*f*. As shown, the driver cover 1230*f* may include a sidewall 1231 joined to a base 1235 that together define a driver cavity 1252 to contain, at least in part, the driver 1202. As shown in FIGS. 21E and 21F, the sidewall 1231 may span the height of the first cavity 1110 when the driver enclosure 1200*g* is inserted into the first cavity 1110 of the heat sink 1100*d*. In other words, the sidewall 1231 may substantially separate the driver 1202 from an interior portion of the sidewall 1130 of the heat sink 1100*d* defining the first cavity 1110.

In some implementations, the sidewall 1231 may be shaped to conform with and physically contact the interior portion of the sidewall 1130 of the heat sink 1100*d* such that the driver cover 1230*f* substantially fills the first cavity 1110. For example, the driver cover 1230*f* may include keyed features 1236 (e.g., curved portions of the sidewall 1231) that align with corresponding keyed features 1132 of the heat sink 1100*d*. The sidewall 1231 may further include male snap-fit connector(s) 1243 disposed on a bottom exterior edge of the sidewall 1231 to couple the driver cover 1230*f* to the receptacles 1134*a* of the heat sink 1100*d*. In this manner, the driver cover 1230*f* may be coupled to the heat sink 1100*d* without the use of any tools.

The base 1235 may provide a substantially flat exterior surface. In some implementations, the base 1235 and the sidewall 1231 may be shaped and/or dimensioned such that the flat exterior surface of the base 1235 is substantially flush with a top (or rear) edge of the sidewall 1130 adjoining the first cavity 1110 as shown in FIGS. 21E and 21F. It should be appreciated, however, that in other implementations, the base 1235 may not be flush with the top edge of the heat sink 1100*d* (e.g., the base 1235 may be disposed above or below the top edge of the heat sink 1100*d*).

Figure 22A:
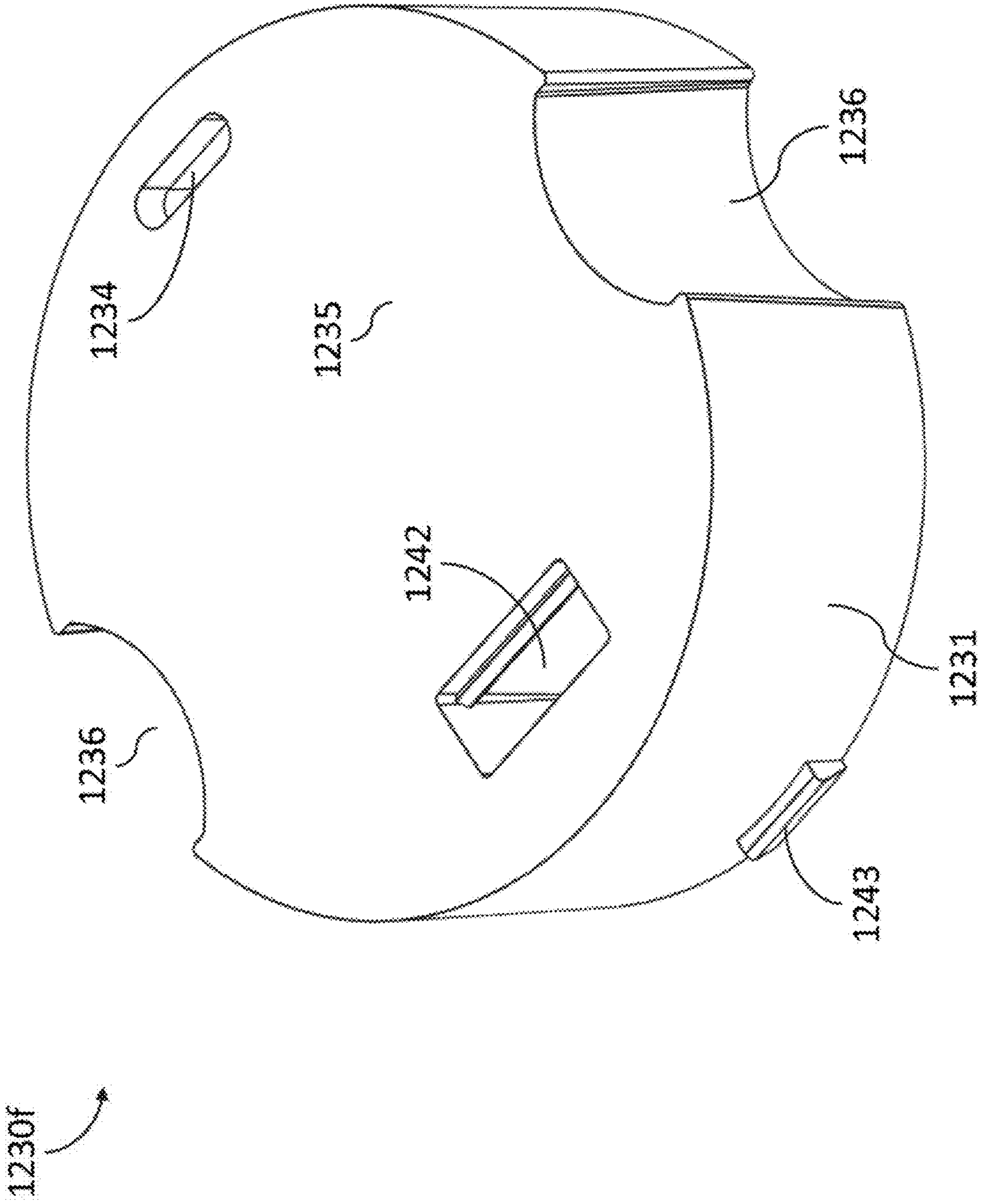
FIG. 22A shows a top perspective view of a driver cover in the lighting module of FIG. 21A.
Figure 22B:
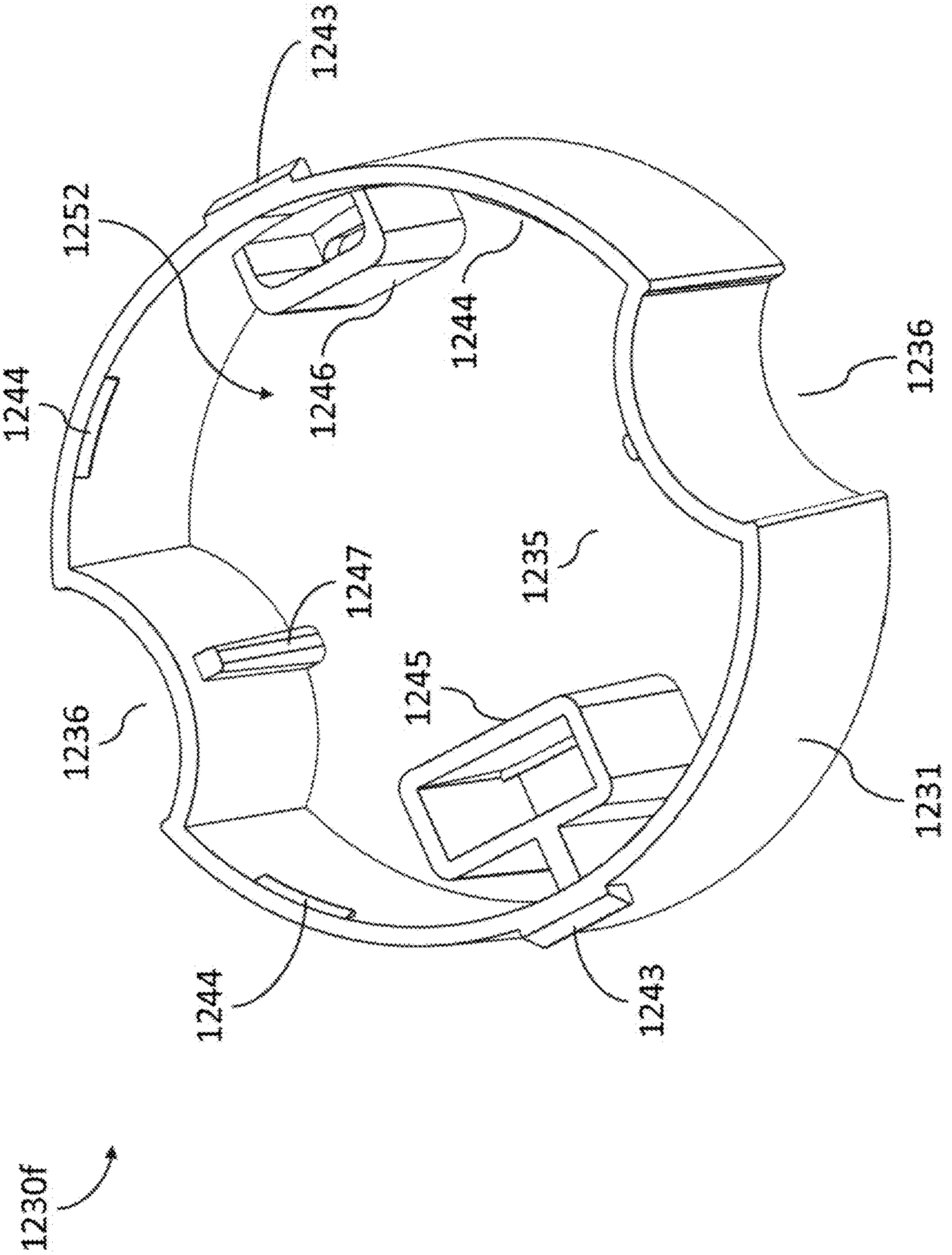
FIG. 22B shows a bottom perspective view of the driver cover of FIG. 22A.
Figure 22C:
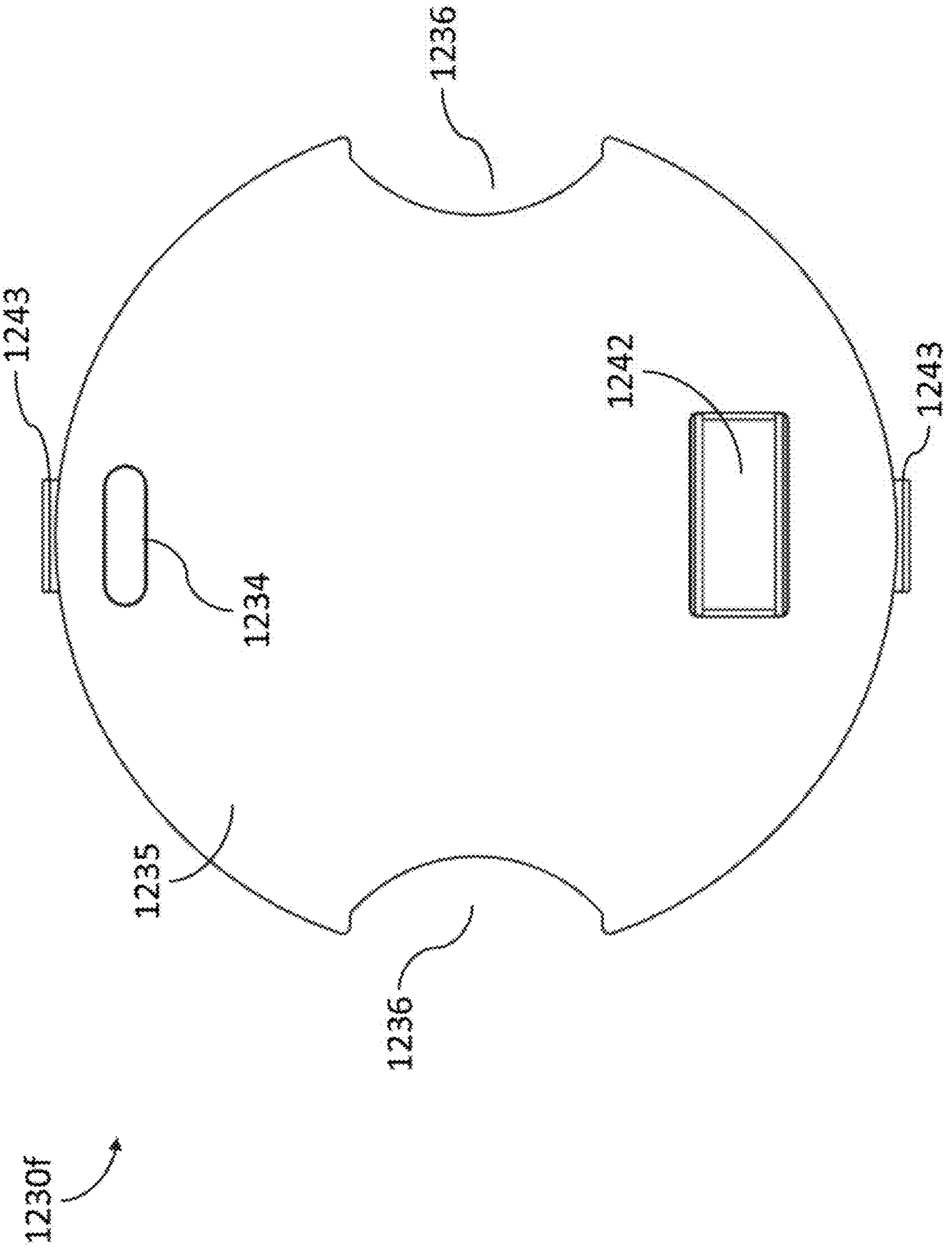
FIG. 22C shows a top view of the driver cover of FIG. 22A.
Figure 22D:
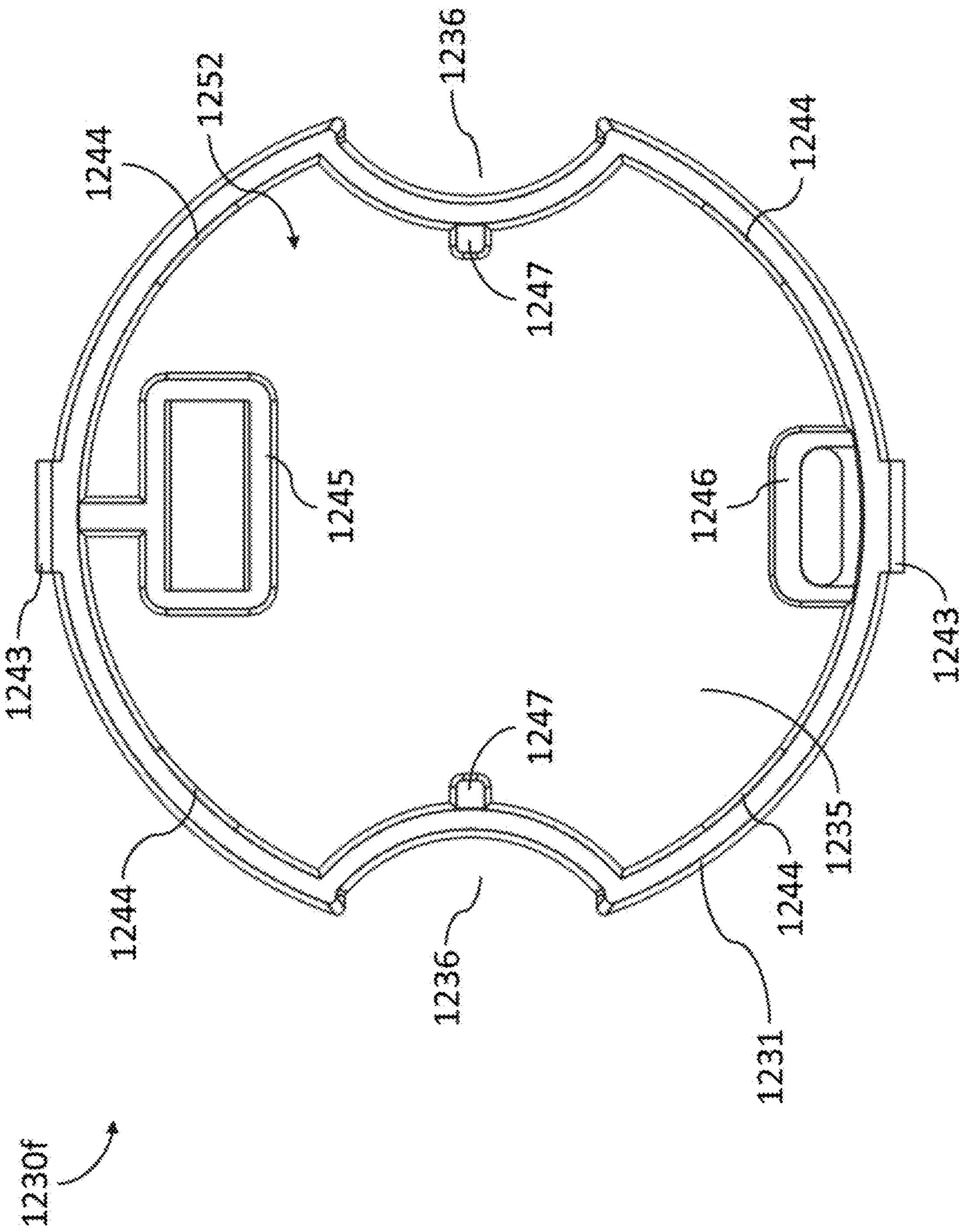
Figure 22E:
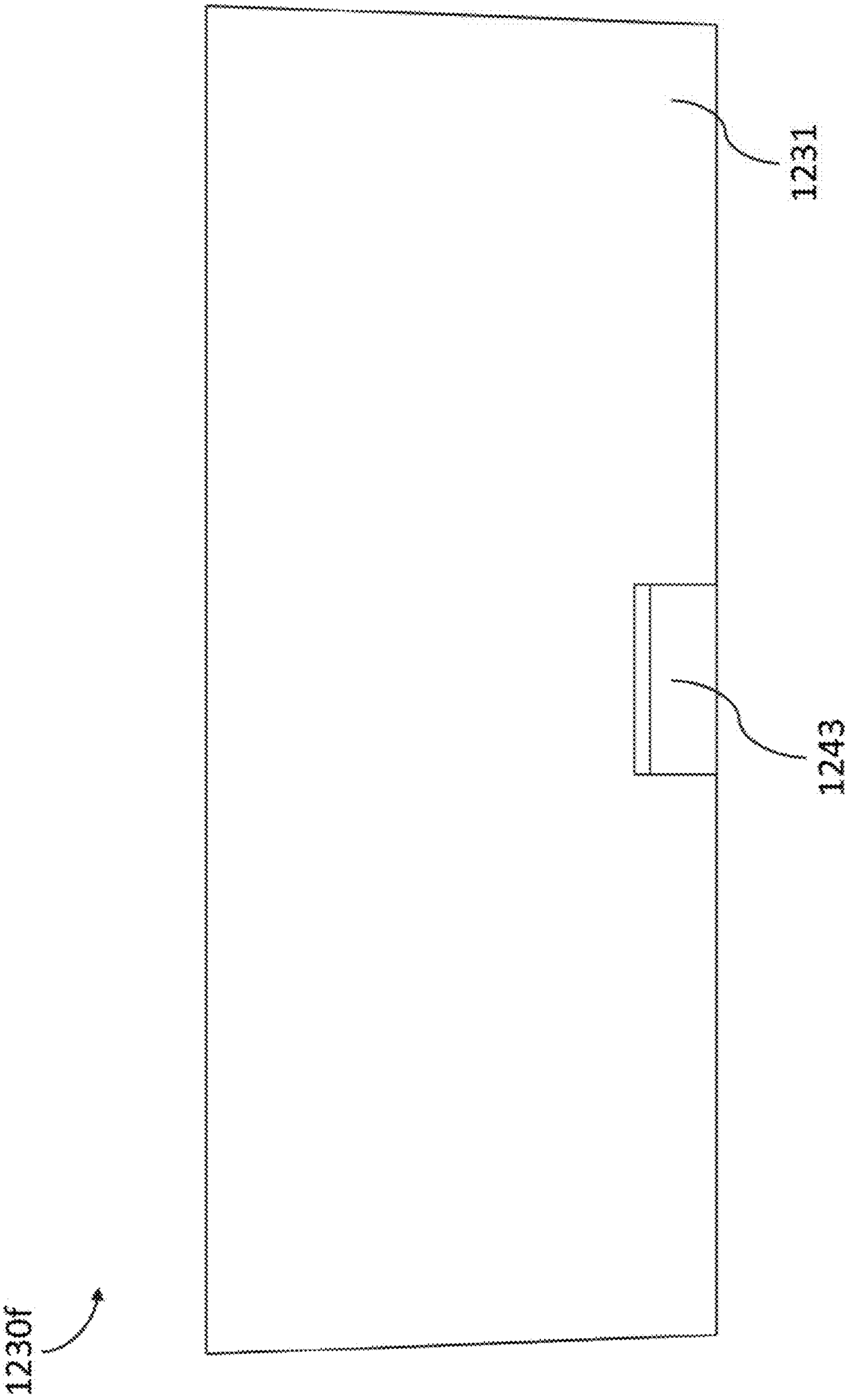
Figure 22F:
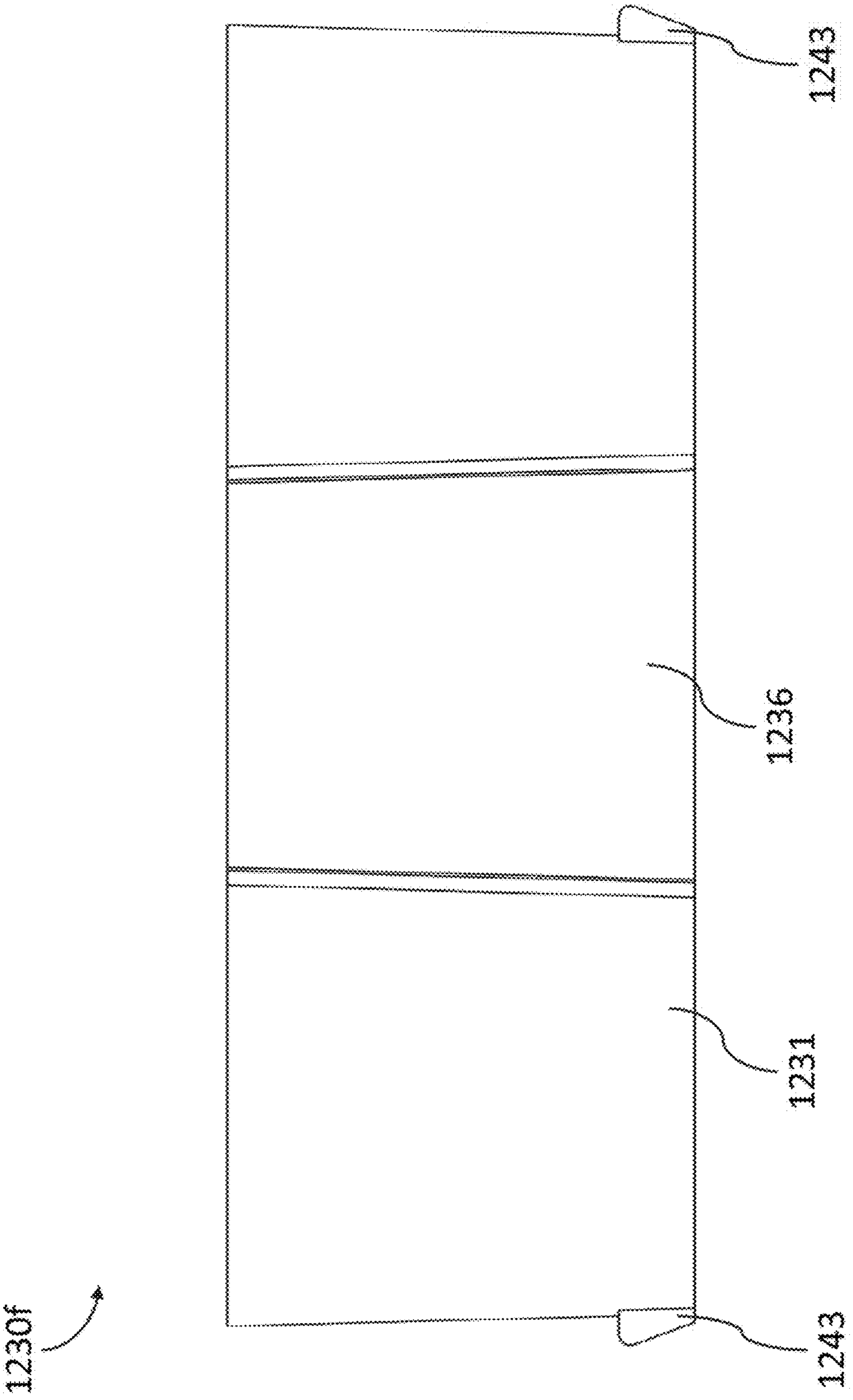

FIGS. 22A and 22C show the base 1235 may include an opening 1234 to allow wires/cables 1205 to be routed into or out of the driver enclosure for connection with the driver 1202 and/or the heat sink 1100*d*, such as the ground cable/wire 1205*a*. FIG. 22B shows the driver cover 1230*f* may further include a walled structure 1246 disposed within the cavity 1252 and aligned with the opening 1234 to guide the wires/cables 1205 to a desired portion of the driver 1202 and/or to separate the wires/cables 1205 from the various circuit elements of the driver 1202. The base 1235 may further include an opening 1242 and a walled structure 1245 through which the selectable switch 1220 may be inserted and mounted to the driver cover 1230*f*.

As described above, the driver cover 1230*f* may include ledges 1244 disposed along the bottom interior edge of the sidewall 1231. The driver cover 1230*f* may further include posts 1247 disposed on the interior portion of the sidewall 1231. The ledges 1244 and the posts 1247 may be arranged to abut opposing sides of the PCB of the driver 1202 in order to securely couple the driver 12202 to the driver cover 1230*f*. In some implementations, the ledges 1244 may offset the PCB of the driver 1202 such that the gap 1204 is formed between the PCB and the partition 1104.

Figure 21G:
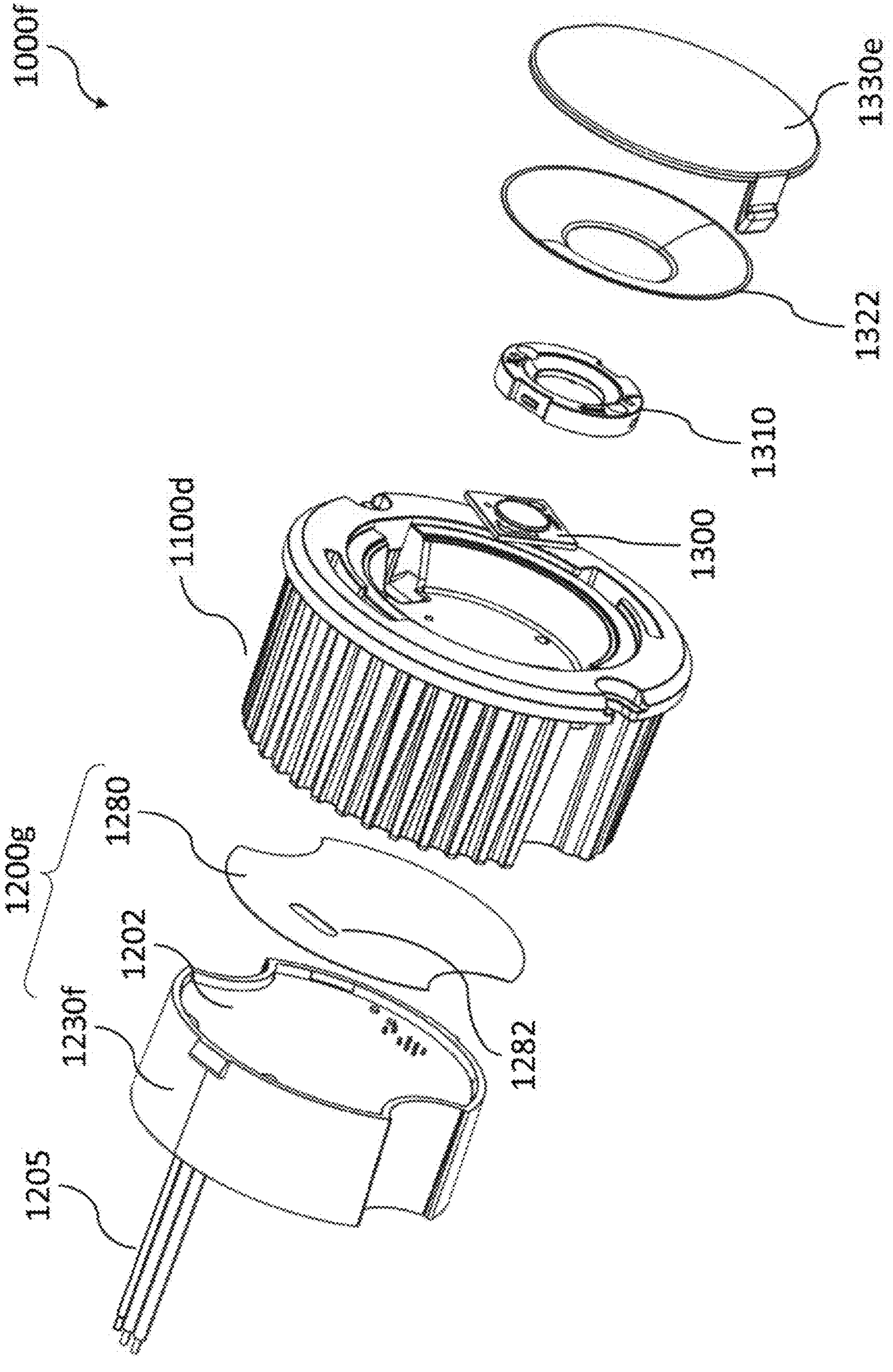
FIG. 21G shows an exploded bottom perspective view of the lighting module of FIG. 21A.
Figure 21H:
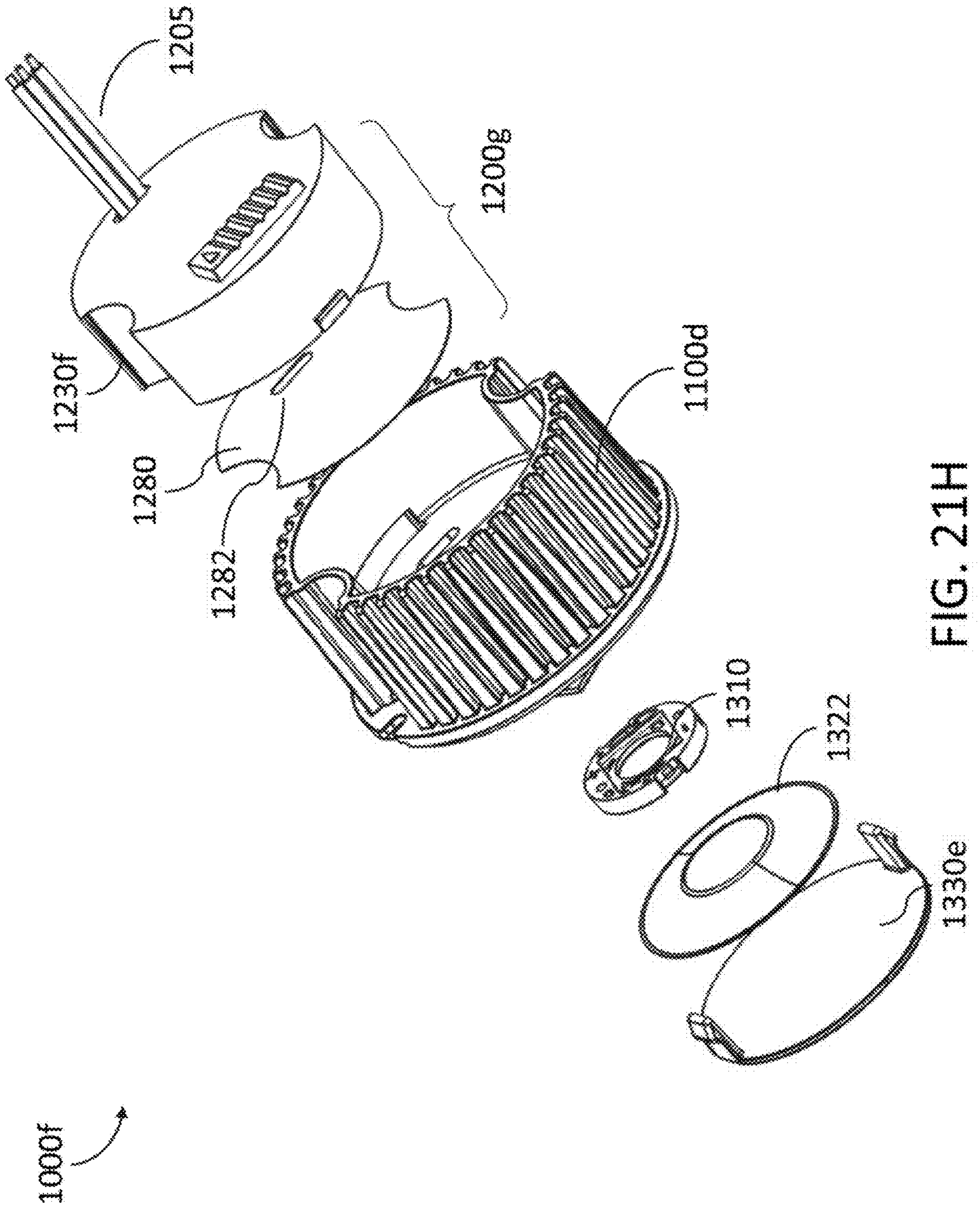
FIG. 21H shows an exploded top perspective view of the lighting module of FIG. 21A.

In some implementations, the insulating film 1280 may be shaped to conform with the opening defined by the bottom edge of the sidewall 1231. In this manner, the insulating film 1280 and the driver cover 1230*f* may provide an insulating barrier that substantially surrounds the driver 1202. FIGS. 21G and 21H show that the insulating film 1280 may include an opening 1282 that aligns with an opening 1108*a* of the heat sink 1100*d* to allow wires/cables from the driver 1202 to pass through the partition 1104 for connection with the light source 1300.

The driver housing 1230*f* and the insulating film 1280 may be formed from various electrically insulating materials including, but not limited to polyvinyl chloride (PVC), acrylonitrile butadiene styrene (ABS), polycarbonate (PC), polyurethane (PU), polyethylene, polyethylene terephthalate, polypropylene, polystyrene, and mylar.

FIGS. 23A-23H show several views of the heat sink 1100*d*. As described above, the heat sink 1100*d* may include the sidewall 1130 and the partition 1104 defining the first cavity 1110 containing the driver 1202 and the second cavity 1120 containing the light source 1300. As shown in FIGS. 21E and 21F, the partition 1104 may be shaped to be substantially flat (as opposed to being tapered and/or curved as described above). The sidewall 1130 may have a top (or rear) edge defining a top end (or rear end) opening into the first cavity 1110. Similarly, the sidewall 1130 may have a bottom (or front) edge defining a bottom end (or front end) opening into the second cavity 1120. The heat sink 1100*d* may further include a flange 1140 disposed along the bottom end of the sidewall 1130 to provide a mounting interface to couple the heat sink 1100*d* to an enclosure and/or the trim 1600 to the heat sink 1100*d*.

As shown, the heat sink 1100*d* may include one or more fins 1107 disposed along the exterior surface of the sidewall 1130. When the lighting module 1000*f* is installed into sufficiently large space, the fins 1107 may dissipate a portion of the heat generated by the light source 1300 and/or the driver 1202 via convection. However, it should be appreciated the heat sink 1100*d*, in other implementations, may not include the fins 1107.

Figure 23A:
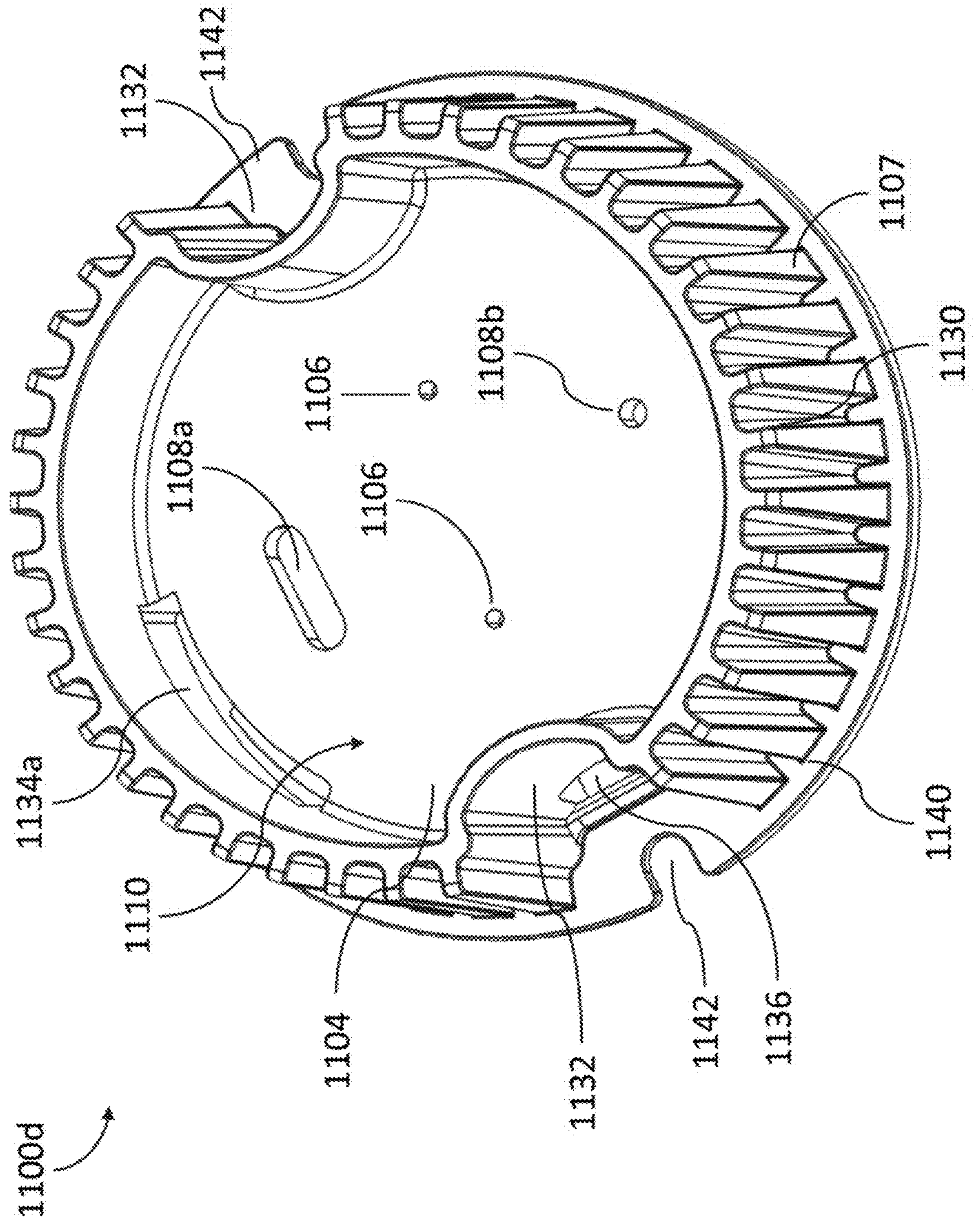

FIG. 23A shows the partition 1104 may include openings 1106, which may be used to secure the light source holder 1310 and the light source 1300 to the heat sink 1100*d* via respective screw fasteners. The partition 1104 may further include openings 1108*a* and 1108*b*. The opening 1108*a* may be used to route wires/cables from the driver 1202 through the partition 1104 for connection to the light source 1300. The opening 1108*b* may be used to route the ground wire/cable 1205*a* through the partition 1104 from the first cavity 1110 to the second cavity 1120, where the ground wire/cable 1205*a* may be coupled to one of the interior surfaces of the second cavity 1120. It should be appreciated, however, that in other implementations, the ground wire/cable 1205*a* may be coupled to one of the interior surfaces of the first cavity 1110, hence, the heat sink 1100*d* may include the opening 1108*b*.

The heat sink 1100*d* may further include one or more female snap-fit receptacles 1136 formed, in part, from the sidewall 1130 and/or the partition 1104 to receive corresponding male snap-fit connectors 1332 of the optic cover 1330*e* to couple the optic cover 1330*e* to the heat sink 1100*d*. In some implementations, the female snap-fit receptacles 1136 may be formed onto at least one surface defining the second cavity 1120.

Figure 23B:
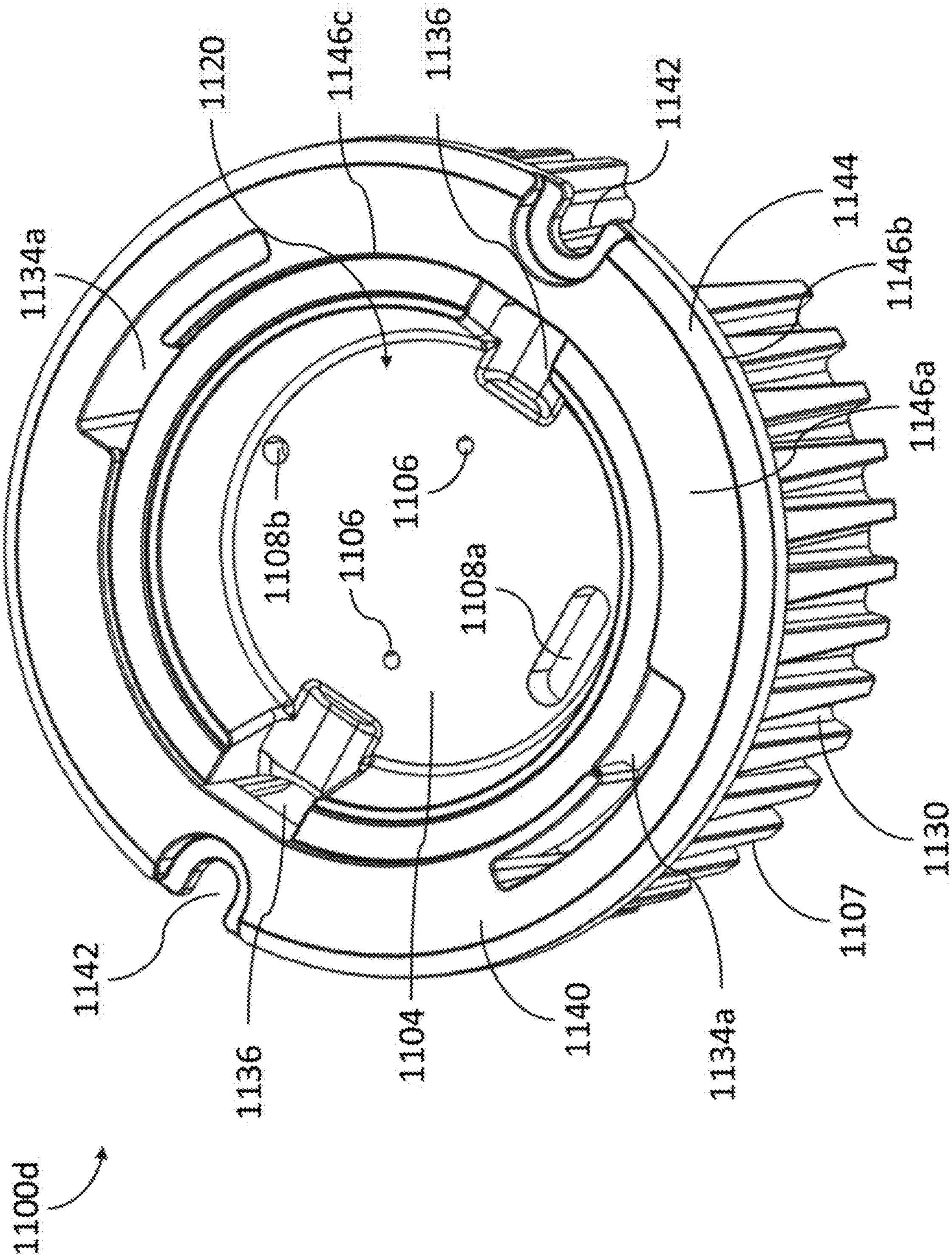
Figure 23C:
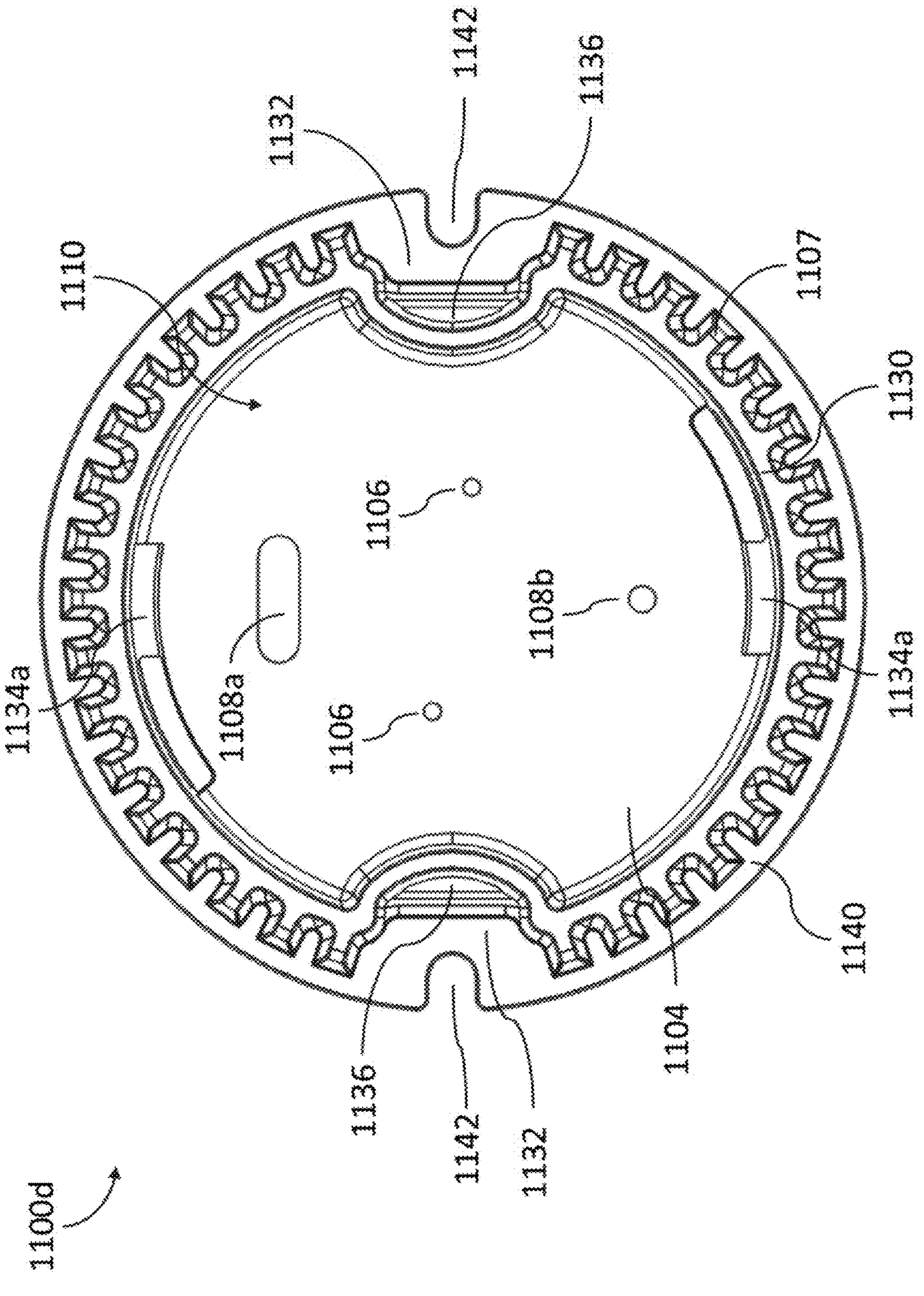
Figure 23D:
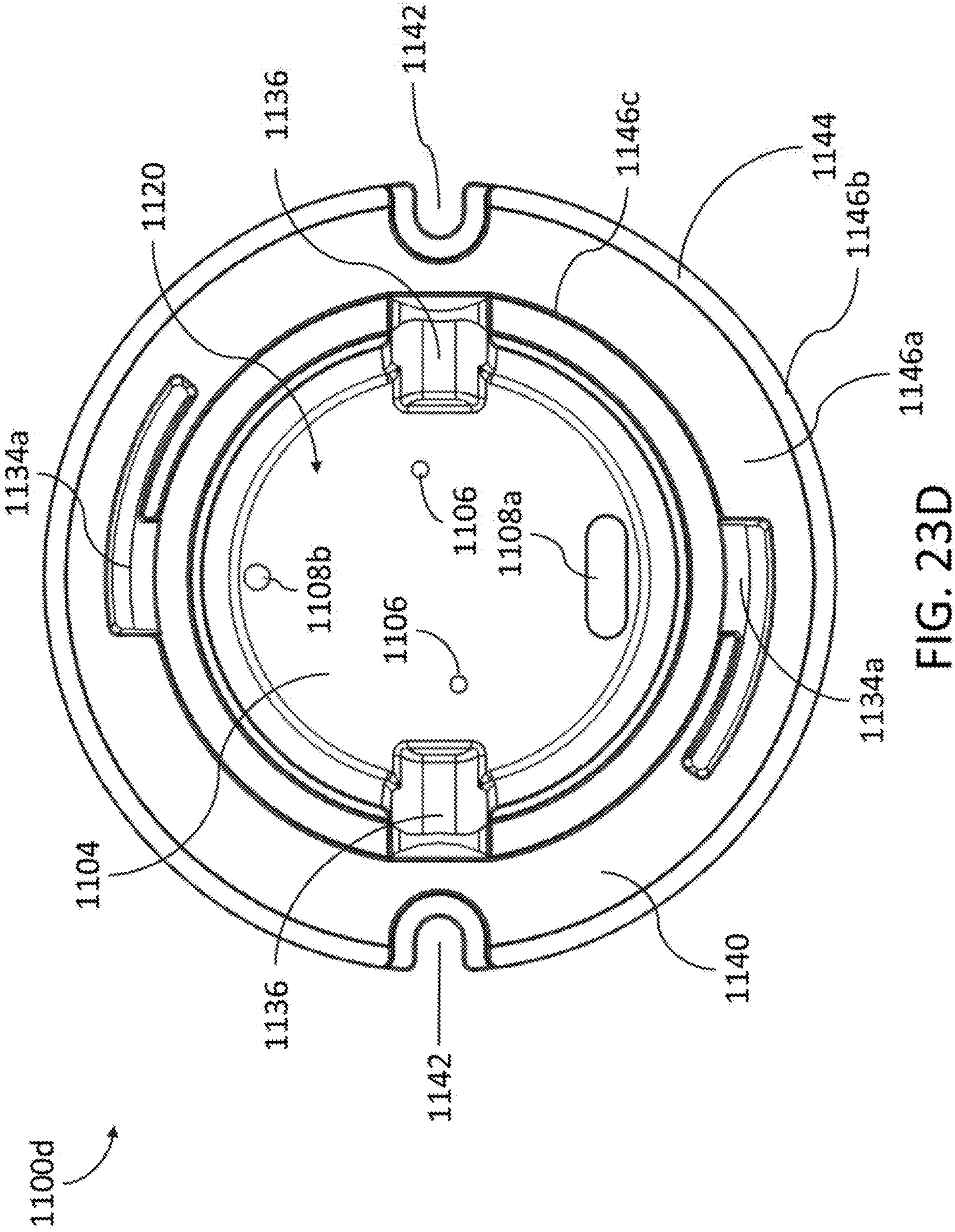
Figure 23E:
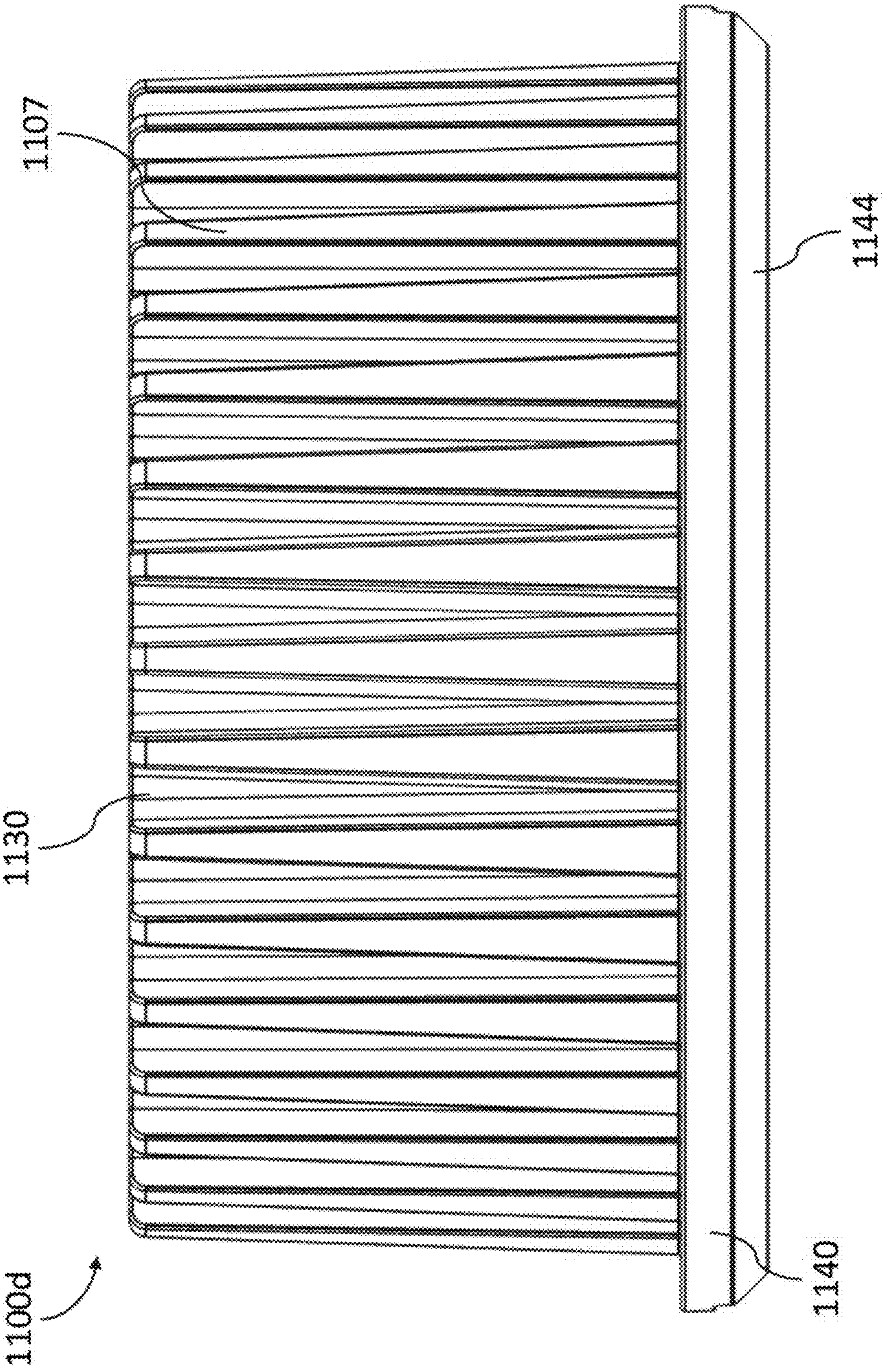
Figure 23F:
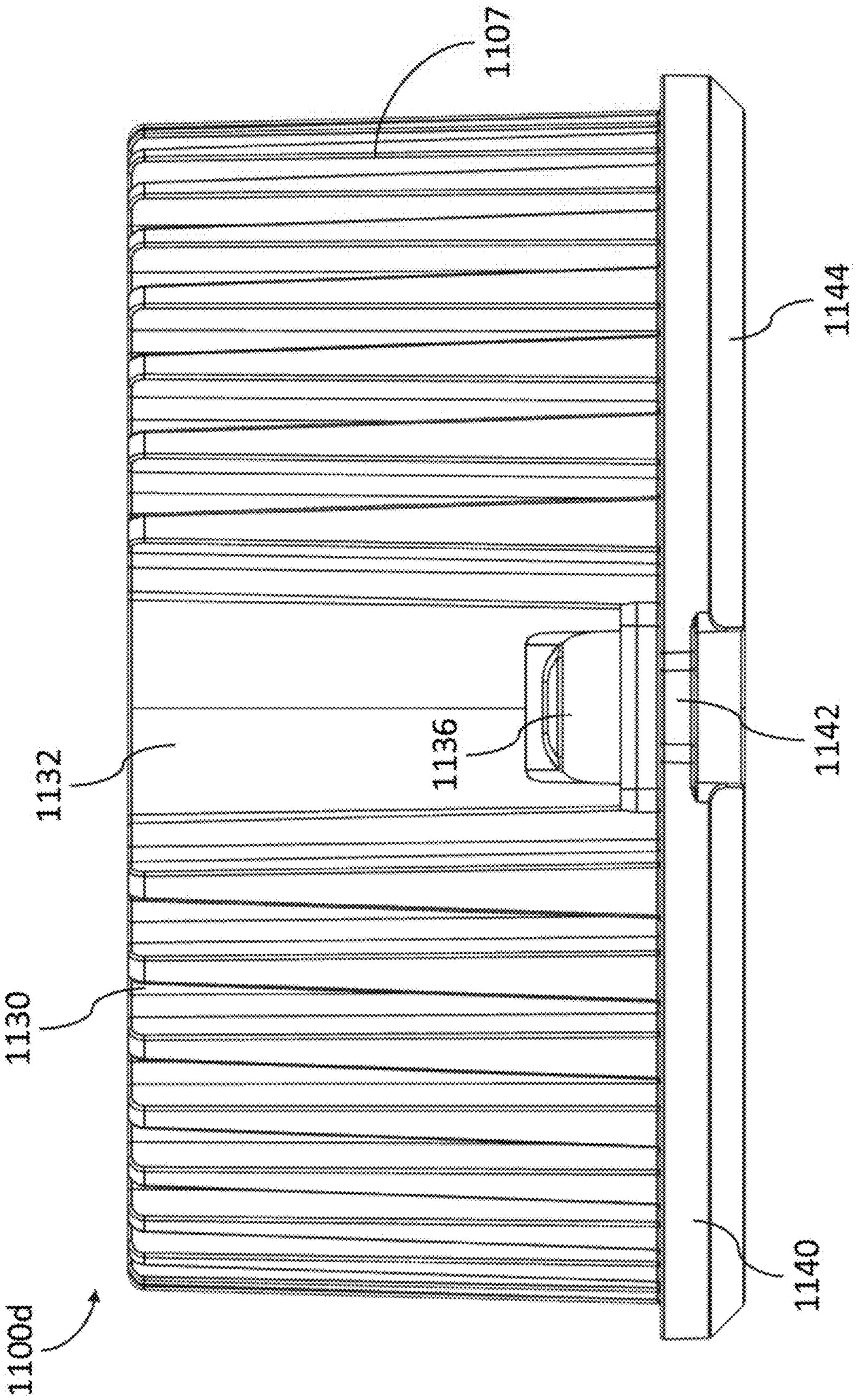

In some implementations, the flange 1140 may include an annular portion 1146*a* having an outer edge 1146*b* and an inner edge 1146*c*. As shown in FIG. 23B, the outer edge 1146*b* may define the overall width of the heat sink 1100*d* and the inner edge 1146*c* may abut the second cavity 1120.

In some implementations, the outer edge 1146b may have a rounded and/or chamfered edge 1144 that is shaped and/or dimensioned to physically contact corresponding angled tabs 1614 on the trim 1600 in order to center the trim 1600 to the heat sink 1100d during assembly.

The flange 1140 may include one or more openings 1142 (shown in FIG. 23B as a slot formed along the outer edge 1146b). As before, the openings 1142 may be used to couple the lighting module 1000f to an enclosure via fasteners inserted through the openings 1142 and the openings 2122a and 2122b on the posts 2120a and 2120b, respectively, of the enclosure 2100b. In some implementations, the heat sink 1100d may include keyed features 1132 disposed along the sidewall 1130 to provide sufficient clearance for the heat sink 1100d and, in particular, the sidewall 1130 to be inserted into the enclosure 2100b without being obstructed by the posts 2120a and 2120b. Said in another way, the keyed features 1132 may allow at least the sidewall 1130 to be inserted into the cavity 2110 of the enclosure 2100b such that the posts 2120a and 2120b may abut the flange 1140 for assembly. As before, the keyed features 1132 may be formed as curved portions of the sidewall 1130 that extend into at least the first cavity 1110. In some implementations, the keyed features 1132 may allow the heat sink 1100d and, hence, the lighting module 1000f to fit into an enclosure or a confined space having a width less than 2.4 inches.

The flange 1140 may further include one or more receptacles 1134a to receive a connecting end 1624 of a connector 1620 on the trim 1600 to couple the trim 1600 to the heat sink 1100d. In some implementations, the receptacles 1134a may be disposed on the annular portion 1146a such that no portion of the receptacle 1134a intersects the outer edge 1146b. Instead, the receptacles 1134a may be formed along the inner edge 1146c of the annular portion 1146a. In some implementations, the receptacle 1134a may provide an opening that extends through the partition 1104 and into the first cavity 1110. In some implementations, the receptacle 1134a may also receive the male snap-fit connectors 1243 of the driver enclosure 1230f.

Figure 20H:
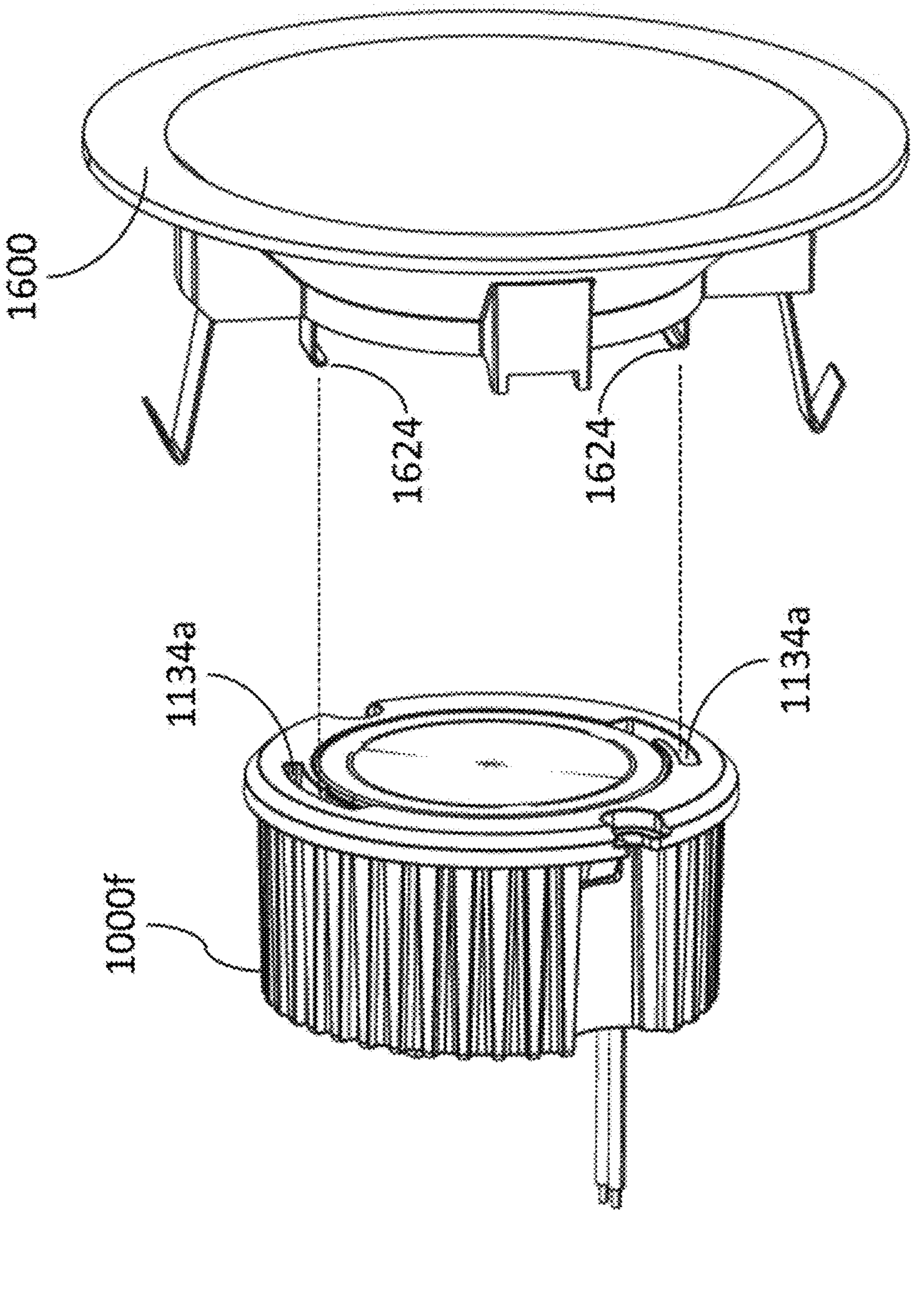
FIG. 20H shows an exploded bottom perspective view of the lighting module and the trim of FIG. 20A.
Figure 20I:
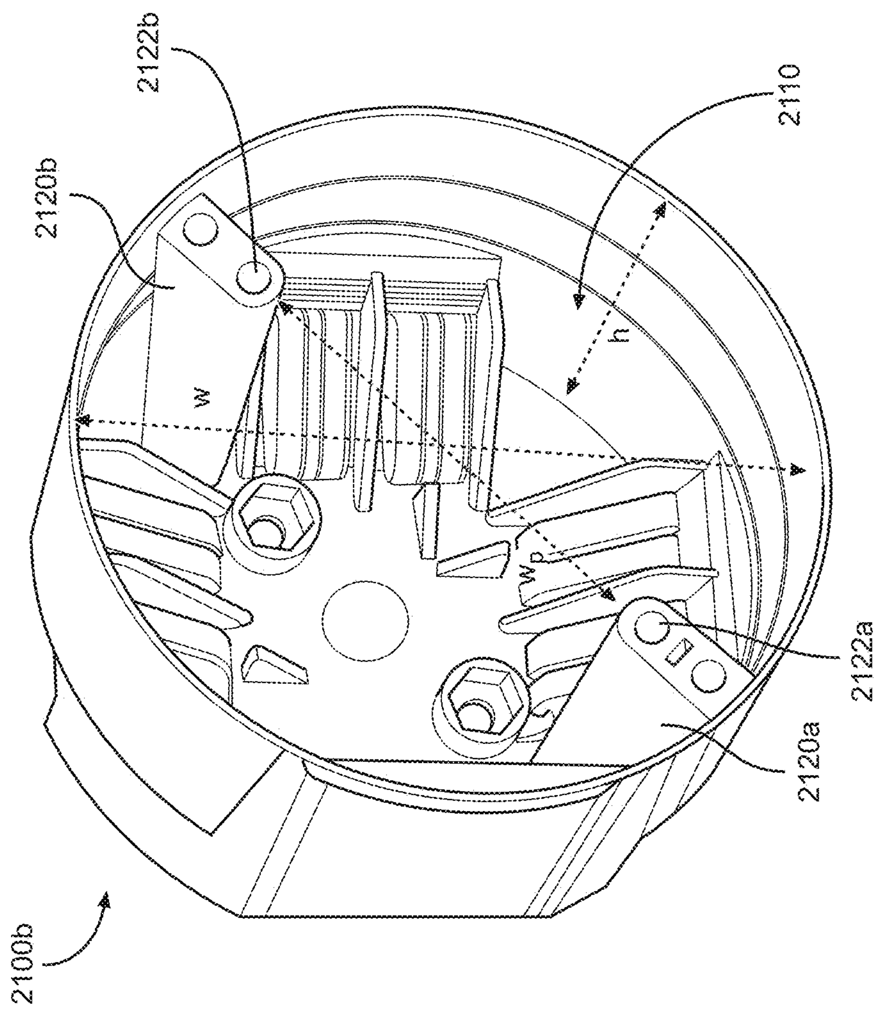
FIG. 20I shows an exemplary enclosure supporting the lighting module of FIG. 20A.
Figure 23G:
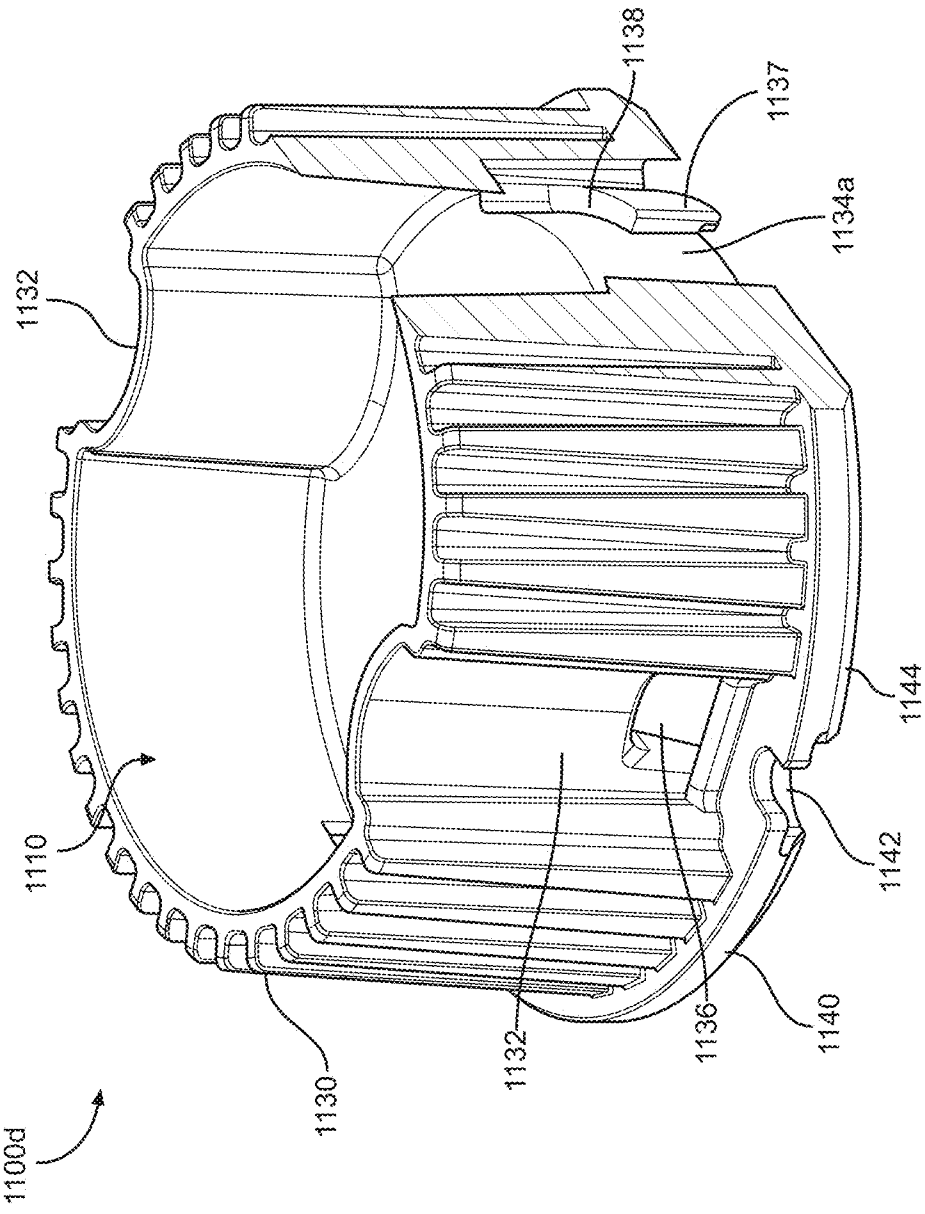
Figure 23H:
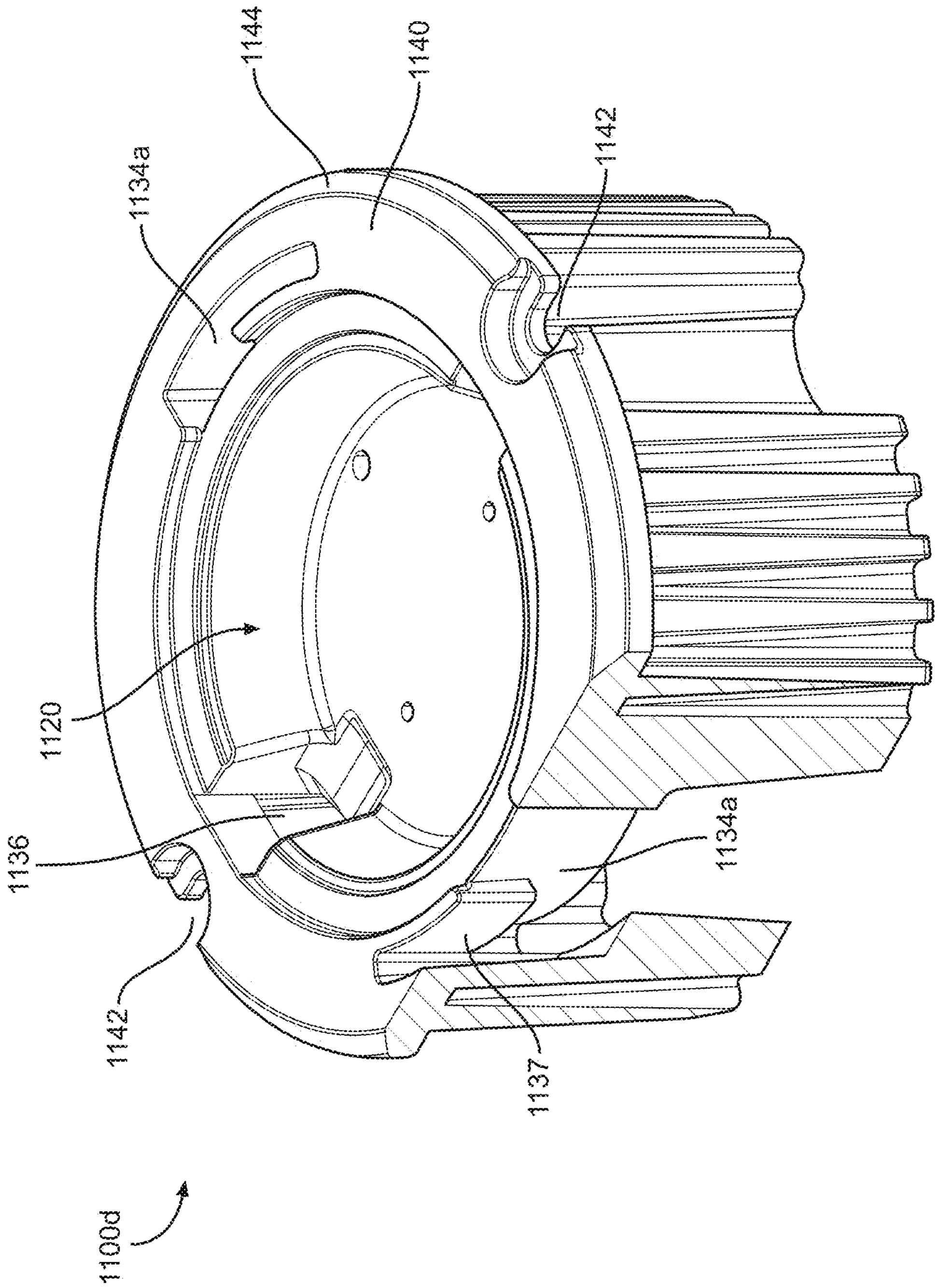

As shown in FIG. 20H, the receptacles 1134a may be shaped to form a twist-and-lock connection with the connecting end 1624. In particular, FIGS. 23G and 23H show the receptacle 1134a may include a ledge 1137 having a surface 1138. When the connecting end 1624 is inserted into the opening formed by the receptacle 1134a, the trim 1600 may be rotated such that the connecting end 1624 contacts the surface 1138 of the ledge 1137 as shown in FIG. 20F. Once the trim 1600 is coupled to the heat sink 1100d, the annular portion 1146a may physically contact a base section 1612 of the trim 1600.

The contact area between the annular portion 1146a and the base section 1612 may enable the heat sink 1100d to transfer heat received by the light source 1300 and/or the driver 1202 to the trim 1600 via heat conduction. In some implementations, the lighting module 1000f may be installed in a sufficiently confined space such that the lighting module 1000f is unable to be effectively cooled via convective cooling and/or radiative transfer from the sidewall 1130 of the heat sink 1100d to the surrounding environment within the ceiling/wall space and/or the enclosure. Thus, the heat generated by the light source 1300 and/or the driver 1202 may be dissipated primarily by the trim 1600 via heat transfer between the annular portion 1146a and the base section 1612. In some implementations, the annular portion 1146a of the flange 1140 and the base section 1612 may be shaped and/or dimensioned to provide a sufficiently large contact area to transfer heat so that the light source 1300 may generally maintain a temperature below 125° C. In some implementations, the heat sink 1100d and the trim 1600 may be designed such that the light source 1300 is preferably kept below a temperature of 85° C., particularly when the driver 1202 is supplying at least 10 W of electrical power to the light source 1300. Similarly, the heat sink 1100d and/or the trim 1600 may be tailored such that the circuit elements of the driver 1202 (e.g., a capacitor) is kept below 90° C. during operation of the lighting module 1000f. In some implementations, the annular portion 1146a of the flange 1140 and the base section 1612 may make sufficient contact such that a temperature drop between the heat sink 1100d and the trim 1600 is less than or equal to about 20° C. to provide sufficient heat flow from the heat sink to the trim and from the trim to the ambient environment (e.g., air). For example, the temperature difference between a portion of the annular portion 1146a and a portion of the base section 1612 may be less than or equal to about 20° C.

In some implementations, the surface 1138 of the ledge 1137 may be sloped such that as the trim 1600 is rotated, the connecting end 1624 may slide along the surface 1138 resulting in a progressively larger compressive force being applied to press the heat sink 1100d and the trim 1600 together. The compressive force may increase the contact area between the annular portion 1146a and the base section 1612, thus reducing the thermal contact resistance and increasing heat dissipation.

In some implementations, the trim 1600 may also be electrically grounded to the heat sink 1100d based, in part, on the contact between the connector 1620 and the receptacle 1134a. For example, the heat sink 1100d and the connector 1620 may each be formed from an electrically conductive material, such as aluminum. A portion of the receptacle 1134a, such as the surface 1138, may expose the electrically conductive material such that when the trim 1600 is coupled to the heat sink 1100d, the connecting end 1624 may physically contact the portion of the receptacle 1134a where the electrically conductive material is exposed. In this manner, the trim 1600 may be electrically coupled to the heat sink 1100d. If the lighting module 1000f includes a ground wire/cable 1205, the trim 1600 may thus be electrically grounded to an external ground together with the heat sink 1100d. In some implementations, the heat sink 1100d may be painted (e.g., with a black paint) and/or coated (e.g., anodized) such that a portion of the receptacle 1134 (e.g. the surface 1138) is left exposed to facilitate an electrical connection with the trim 1600.

FIGS. 26A-26E show several views of the trim 1600. The trim 1600 may be formed of a thermally conductive material, such as aluminum, to facilitate heat dissipation from the heat sink 1100d to the surrounding ambient environment of the space being illuminated. As shown, the trim 1600 may include a funnel section 1610 disposed between the base section 1612 and a lip 1611. The base section 1612 may further define an opening 1602 through which light exiting the heat sink 1100d may transmit through the trim 1600. The funnel section 1610 may be shaped, in part, to reflect light along a preferred direction to illuminate an environment in a desired manner. The funnel section 1610 and the lip 1611 may also be shaped according to aesthetic preferences. For example, the lip 1611 may have various shapes including, but not limited to a circle, an ellipse, a square, a polygon, and any combinations of the foregoing. The funnel section 1610, in turn, may have a frusto-conical shape that transitions between the shape of the lip 1611 (e.g., a square) and the shape of the base section 1612 (e.g., a circle).

The base section 1612 may further include angled tabs 1614 to align and center the trim 1600 to the heat sink 1100*d* via the rounded and/or chamfered edge 1144. The base section 1612 may also include the connectors 1620. The connector 1620 may be a metal clip formed separately from the base section 1612 to improve manufacturability (e.g., the metal clip may be formed using standard sheet metal processes, the components of the trim 1600 do not have any undercuts). As shown, the connector 1620 may have an opening 1622 that aligns with a corresponding opening (not shown) on the base section 1612 so that a fastener may couple the connector 1620 to the base section 1612. The connector 1620 may be disposed within a recess in the base section 1612 to ensure the base section 1612 physically contacts the heat sink 1100*d*.

As shown, the connector 1620 may include the connecting end 1624 that couples to the receptacle 1134*a*. The connector 1620 may also include a connecting end 1626 disposed outside the heat sink 1100*d* when the trim 1600 is coupled to the heat sink 1100*d*. The connecting 1626 may be used, in part, as a friction clip to couple the trim 1600 to an enclosure. The shape and/or dimensions of the connector 1620 may thus vary depending on the placement of the receptacles 1134*a* on the heat sink 1100*d* and the size of the enclosure housing the lighting module 1000*f*. As shown, the connector 1620 may include both the connecting ends 1624 and 1626 (e.g., a single metal clip may be used to couple the trim 1600 to the lighting module 1000*f* and an enclosure). However, it should be appreciated that in other implementations, the trim 1600 may include two metal clips with one metal clip including the connecting end 1624 and another metal clip including the connecting end 1626.

FIGS. 24A-24H show several views of the light source holder 1310. As shown, the light source holder 1310 may include a sidewall 1311 defining an opening 1313 for light emitted by the light source 1300 to pass through. More generally, the cross-section of the sidewall 1311 may have various shapes including, but not limited to a circle, an ellipse, a polygon, and any combination of the foregoing. The opening 1313 may be shaped based, in part, on the shape of the light emitting portion of the light source 1300. For example, the light source 1300 may emit light from a circular-shaped portion (see, for example, the light source 1300 in FIG. 21G), thus the opening 1313 may also be circular in shape. More generally, the opening 1313 may have various shapes including, but not limited to a circle, an ellipse, a polygon, and any combination of the foregoing.

The sidewall 1311 may further include a tapered section 1312 adjoining the opening 1313. In some implementations, the tapered section 1312 may have a linear profile. If the opening 1313 is circular in shape, the tapered section 1312 may thus form a conical surface. The linear profile of the tapered section 1312 may be oriented at angle, $\alpha$, with respect to an axis parallel to a centerline axis 1301 of the light source holder 1310 as shown in FIG. 24H. In some implementations, the angle, $\alpha$, may be chosen to abut and support a portion of an optical element (e.g., a reflector 1322, an optical lens 1350).

In some implementations, the light source holder 1310 and, in particular, the tapered section 1312 may be tailored to reflect at least a portion of the light emitted by the light source 1300. In this manner, the light source holder 1310 may increase the light coupling efficiency of the lighting module 1000*a* by ensuring light emitted at larger emission angles are coupled out of the lighting module 1000*a* instead of being trapped and absorbed within the lighting module 1000*a*. The light source holder 1310 may also be shaped to reflect light along a desired set of directions. For example, the light source holder 1310 may be shaped to reflect light such that light is more uniformly distributed spatially and/or angularly. In some implementations, the light source holder 1310 may be tailored to have a reflectivity of at least about 75%.

The light source holder 1310 may also include a light source recess 1314 to receive the light source 1300 for assembly. In general, the shape and/or dimensions of the light source recess 1314 may depend on the shape of the light source 1300. For example, FIG. 24B shows the light source recess 1314 may be square in shape corresponding to the light source 1300 shown in FIG. 21G. In some implementations, the depth of the light source recess 1314 may be tailored such that the light source 1300 is at least flush with the bottom side of the light source holder 1310. In some implementations, the light source holder 1310 may be configured to allow the light source 1300 to slightly protrude out of the light source recess 1314 to ensure the light source 1300 is in sufficient thermal contact with the heat sink 1100. The light source holder 1310 may further include a spring clip recess 1318 to receive a spring clip (not shown). The spring clip may press against a portion of the light source 1300 thus securing the light source 1300 to the light source holder 1310.

The sidewall 1311 may further include various mounting mechanisms to couple the light source holder 1310 to the heat sink 1100. For example, the sidewall 1311 may include one or more snap-fit connectors (e.g., snap-fit connectors 1317*a* and 1317*b*) to engage corresponding snap-fit receivers (not shown) in the recessed section 1130 of the heat sink 1100. In some implementations, the snap-fit connectors 1317*a* and 1317*b* may also be coupled to respective snap-fit receivers in the optical element (e.g., a reflector 1322, an optical lens 1350). In another example, the sidewall 1311 may include openings 1315 to receive the fasteners 1302 to couple to the heat sink 1100 via the openings 1106.

The light source holder 1310 may also provide features to connect the power cables 1030*a* and 1030*b* to the light source 1300. For example, the light source holder 1310 may include a slot formed along the sidewall 1311 to receive a poke-in connector. As shown, the slot may include an opening 1316*a* on the sidewall 1311 to receive the power cable, an opening 1316*b* adjoining the light source recess 1314 for the poke-in connector to contact a respective terminal of the light source 1300, and an opening 1316*c* to access the poke-in connector (e.g., to bend a tab once the power cable is inserted thereby restraining the power cable). As shown, the light source holder 1310 may include a pair of slots to support the power cables 1030*a* and 1030*b*. Furthermore, the light source holder 1310 may be marked to indicate the polarity of the terminal (e.g., a positive or negative terminal).

The light source holder 1310 may be formed from various electrically insulating materials including, but not limited to polyvinyl chloride (PVC), acrylonitrile butadiene styrene (ABS), polycarbonate (PC), polyurethane (PU), polyethylene, polyethylene terephthalate, polypropylene, and polystyrene. Various manufacturing techniques may be used to fabricate the light source holder 1310 depending, in part, on the material used to form the light source holder 1310 including, but not limited to injection molding, blow molding, and 3D printing.

FIGS. 25A-25C show several views of the optic cover 1330*e*. As shown, the optic cover 1330*e* may include a base 1344 shaped and/or dimensioned to substantially cover the bottom end opening of the heat sink 1100*d* in order to enclose the second cavity 1120. In some implementations, the base 1344 may be substantially flat and aligned to be substantially flush with the bottom edge of the sidewall 1130 as shown in FIGS. 21E and 21F. Similar to the optic cover 1330*c*, the optic cover 1330*e* may thus be formed of a material that is transparent to the light emitted by the light source 1300. The optic cover 1330*e* may further include one or more male snap-fit connectors 1332 disposed along an outer edge of the base 1344 for connection with the female snap-fit receptacles 1136 of the heat sink 1100*d*.

In some implementations, the heat sink may provide other connecting mechanisms to couple the trim 1600 to the heat sink. FIGS. 27A-27D show another exemplary lighting module 1000*g* with a heat sink 1100*e* that has receptacles 1134*b* disposed on a flange 1140 that are configured to form a snap-fit connection with the connecting end 1624 of the connectors 1620 of the trim 1600. The various components of the lighting module 1000*g* may remain substantially the same as the lighting module 1000*f*. This includes the trim 1600, which may include the same connector 1620 as before for connection with the heat sink 1100*e*.

FIGS. 28A and 28B show several views of the heat sink 1100*e*. As shown, the receptacles 1134*b* may be similarly formed on the annular portion 1146*a* of the flange 1140 such that no portion of the receptacles 1134*b* intersect the outer edge 1146*b*. Instead, the receptacles 1134*b* may be formed along an inner edge 1146*c* of the annular portion 1146*a*. FIG. 27C shows the receptacle 1134*b* may be formed to have a ledge 1139 to securely couple the connecting end 1624 of the connector 1620 to the heat sink 1100*e*. Instead of the inserting and rotating the trim 1600 to couple the connecting end 1624 to the receptacle 1134*a* for the lighting module 1000*f*, the trim 1600 may instead be pressed directly into the receptacle 1134*b* for the lighting module 1000*g*.

As before, the ledge 1139 may be shaped to impart a compressive force that presses the heat sink 1100*e* and the trim 1600 together in order to reduce the thermal contact resistance between the annular portion 1146*a* and the base section 1612. The heat sink 1100*e* may also be formed from an electrically conductive material (e.g., aluminum) and a portion of the ledge 1139 may expose the electrically conductive material such that an electrical connection may be formed between the trim 1600 and the heat sink 1100*e* such that the trim 1600 is electrically grounded to the heat sink 1100*e*.

Conclusion

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting module, comprising:
a heat sink comprising:
a rear end face;
a sidewall coupled to the rear face and defining an interior cavity, the sidewall having at least one exterior width dimension such that at least a portion of the sidewall proximate to the rear face fits into a space having a width of less than 2.4 inches;
a front end face that surrounds a first open end of the interior cavity; and
at least one connecting mechanism to couple a trim to the front end face of the heat sink;
a light source positioned inside the interior cavity of the heat sink and including at least one light emitting diode (LED); and
an AC to DC converter, positioned inside the interior cavity of the heat sink, to receive electrical energy and supply regulated electrical energy to power the light source.

2. The lighting module of claim 1, wherein the sidewall of the heat sink has at least one exterior height dimension such that at least a portion of the sidewall fits into a space having a height less than or equal to about 2.25 inches.

3. The lighting module of claim 1, wherein the heat sink further comprises:
a partition coupled to the sidewall, the sidewall and the partition together dividing the interior cavity into a first cavity and a second cavity;
the light source is disposed within the first cavity;
the driver is disposed within the second cavity; and
the lighting module further comprises:
a ground cable, inserted through a feedthrough opening of the partition and directly coupled to a surface of the heat sink abutting the first cavity, to electrically ground the heat sink to an external ground.

4. The lighting module of claim 1, further comprising:
an optical element, disposed within the interior cavity, to redirect the light emitted by the light source; and
an optic cover, coupled to the heat sink and at least partially disposed within the interior cavity, to enclose the interior cavity, the optic cover being formed of a material that transmits the emitted light.

5. The lighting module of claim 1, further comprising:
at least one switch, coupled to the heat sink and electrically coupled to the driver, to adjust one of a power output, a lumen output, or a color temperature of the light emitted by the light source.

6. The lighting module of claim 1, wherein tbe heat sink further comprises:
at least one keyed feature, disposed on the sidewall of the heat sink, to provide sufficient clearance between the heat sink and a surface of an enclosed space such that the sidewall of the heat sink is insertable into the enclosed space without contacting the surface.

7. The lighting module of claim 6, wherein:
the front end face of the heat sink further comprises a flange; and
the first keyed feature includes a curved portion of the sidewall that extends along a height of the sidewall and abuts the flange, the curved portion being shaped to reduce a volume of the heat sink.

8. The lighting module of claim 1, wherein:
the heat sink further comprises:
a partition coupled to the sidewall, the sidewall and the partition together defining a first cavity and a second cavity with a second open end;
the lighting module further comprises:
a driver enclosure, disposed within the second cavity, defining a driver cavity, the driver enclosure being formed of an electrically insulating material and substantially filling the second cavity of the heat sink; and
the driver is disposed within the driver cavity such that the driver enclosure provides an electrically insulating barrier between the driver and the heat sink.

9. The lighting module of claim 8, wherein the driver enclosure comprises:
a driver cover having a driver base that is substantially flush with the second open end of the heat sink, the driver cover having a driver sidewall coupled to the driver base and extending into the second cavity such that an edge of the driver sidewall is disposed proximate to the partition of the heat sink, the driver sidewall and the driver base defining the driver cavity; and
an insulator film disposed on the partition of the heat sink proximate to the edge of the driver sidewall.

10. The lighting module of claim 1, further comprising the trim.

11. The lighting module of claim 10, wherein:
each of the heat sink and the trim is formed from an electrically conductive material; and
the trim is electrically coupled to the heat sink via the at least one connecting mechanism.

12. The lighting module of claim 11, further comprising:
a ground cable, directly coupled to the heat sink, to electrically ground the heat sink and the trim to an external ground.

13. The lighting module of claim 11, wherein the electrically conductive material comprises aluminum.

14. The lighting module of claim 11, wherein:
the at least one connecting mechanism comprises:
a portion of the heat sink where the electrically conductive material is exposed; and
the trim comprises:
a connector, coupled to the at least one connecting mechanism and in direct physical contact with the portion of heat sink, to mechanically and electrically couple the trim to the heat sink.

15. The lighting module of claim 14, wherein the connector is a metal clip.

16. A lighting module, comprising:

a heat sink comprising:

a rear end face;

a sidewall coupled to the rear end face and defining an interior cavity, the sidewall having at least one exterior width dimension such that at least a portion of the sidewall proximate the rear end face fits into a space having a width of less than 2.4 inches;

a front end face that surrounds a first open end of the interior cavity;

at least one connecting mechanism to couple a trim to the front end face of the heat sink; and at least one keyed feature, disposed on the sidewall of the heat sink, to provide sufficient clearance between the heat sink and a surface of an enclosed space such that the sidewall of the heat sink is insertable into the enclosed space without contacting the surface;

a light source positioned inside the interior cavity of the heat sink and including at least one light emitting diode (LED); and a driver, positioned inside the interior cavity of the heat sink, to receive electrical energy and supply regulated electrical energy to power the light source.

17. The lighting module of claim 16, further comprising:

the trim, wherein:

each of the heat sink and the trim is formed from an electrically conductive material; and the trim is electrically coupled to the heat sink via the at least one connecting mechanism.

18. The lighting module of claim 16, wherein the sidewall of the heat sink has at least one exterior height dimension such that at least a portion of the sidewall fits into a space having a height less than or equal to about 2.25 inches.

19. The lighting module of claim 16, further comprising:

at least one switch, coupled to the heat sink and electrically coupled to the driver, to adjust one of a power output, a lumen output, or a color temperature of the light emitted by the light source.

20. The lighting module of claim 16, wherein:

the front end face of the heat sink further comprises a flange; and the first keyed feature includes a curved portion of the sidewall that extends along a height of the sidewall and abuts the flange, the curved portion being shaped to reduce a volume of the heat sink.

* * * * *